(12) United States Patent
Oh et al.

(10) Patent No.: US 10,079,649 B2
(45) Date of Patent: Sep. 18, 2018

(54) BROADCAST SIGNAL TRANSMISSION APPARATUS, BROADCAST SIGNAL RECEIVING APPARATUS, BROADCAST SIGNAL TRANSMISSION METHOD, AND BROADCAST SIGNAL RECEIVING METHOD

(71) Applicant: LG ELECTRONICS INC., Seoul (KR)

(72) Inventors: Sejin Oh, Seoul (KR); Woosuk Kwon, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/503,130

(22) PCT Filed: Sep. 8, 2015

(86) PCT No.: PCT/KR2015/009445
§ 371 (c)(1),
(2) Date: Feb. 10, 2017

(87) PCT Pub. No.: WO2016/039555
PCT Pub. Date: Mar. 17, 2016

(65) Prior Publication Data
US 2017/0230125 A1    Aug. 10, 2017

Related U.S. Application Data

(60) Provisional application No. 62/049,337, filed on Sep. 11, 2014.

(51) Int. Cl.
*H04H 60/06* (2008.01)
*H04H 20/33* (2008.01)
(Continued)

(52) U.S. Cl.
CPC ............ *H04H 60/06* (2013.01); *H04H 20/33* (2013.01); *H04H 60/82* (2013.01); *H04N 5/9201* (2013.01);
(Continued)

(58) Field of Classification Search
CPC ........ H04H 20/33; H04H 60/06; H04H 60/82; H04H 20/59; H04J 11/00; H04N 21/233;
(Continued)

(56) References Cited

U.S. PATENT DOCUMENTS

2012/0288031 A1* 11/2012 Vare .................. H04N 21/4345
375/316
2017/0134824 A1* 5/2017 Kitazato .......... H04N 21/64322

FOREIGN PATENT DOCUMENTS

KR    10-2013-0077605 A    7/2013
KR    10-2013-0117778 A    10/2013
(Continued)

*Primary Examiner* — Michael Neff
(74) *Attorney, Agent, or Firm* — Birch, Stewart, Kolasch & Birch, LLP

(57) ABSTRACT

The present invention proposes a method for providing a broadcast service. The method for providing a broadcast service in a broadcast signal transmitter according to the present invention may comprise the steps of: encoding media data to a media stream; creating signaling information for signaling the media stream; multiplexing the encoded media stream and the signaling information; and transmitting a broadcast signal comprising the multiplexed media stream and the signaling information.

6 Claims, 96 Drawing Sheets

(51) Int. Cl.
*H04H 60/82* (2008.01)
*H04N 21/2368* (2011.01)
*H04N 21/233* (2011.01)
*H04N 21/234* (2011.01)
*H04N 21/61* (2011.01)
*H04N 5/92* (2006.01)
*H04J 11/00* (2006.01)
*H04H 20/59* (2008.01)
*H04B 7/0413* (2017.01)

(52) U.S. Cl.
CPC ......... *H04N 21/233* (2013.01); *H04N 21/234* (2013.01); *H04N 21/2368* (2013.01); *H04N 21/61* (2013.01); *H04B 7/0413* (2013.01); *H04H 20/59* (2013.01); *H04J 11/00* (2013.01)

(58) Field of Classification Search
CPC ............. H04N 21/234; H04N 21/2343; H04N 21/2368; H04N 21/61; H04N 5/9201; H04N 21/236; H04N 21/23605; H04N 21/23614; H04N 21/2362; H04B 7/0413
USPC ........................................................ 375/295
See application file for complete search history.

(56) References Cited

FOREIGN PATENT DOCUMENTS

| | | |
|---|---|---|
| KR | 10-2013-0120416 A | 11/2013 |
| KR | 10-2014-0040165 A | 4/2014 |
| KR | 10-1435842 B1 | 9/2014 |
| WO | WO 2012/144867 A2 | 10/2012 |

\* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 12

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_SYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
|     DP_ID | 6 |
|     DP_START | 15 (or 13) |
|     DP_NUM_BLOCK | 10 |
|     RESERVED  end | 8 |
| EAC_FLAG | 1 |
| EAS_WAKE_UP_VERSION_NUM | 8 |
| if EAC_FLAG == 1 | |
|     EAC_LENGTH_BYTE | 12 |
| else | |
|     EAC_COUNTER | 12 |
| end | |
| for i=1:NUM_AUX | |
|     AUX_PRIVATE_DYN | 48 |
| end | |
| CRC 32 | 32 |

FIG. 23
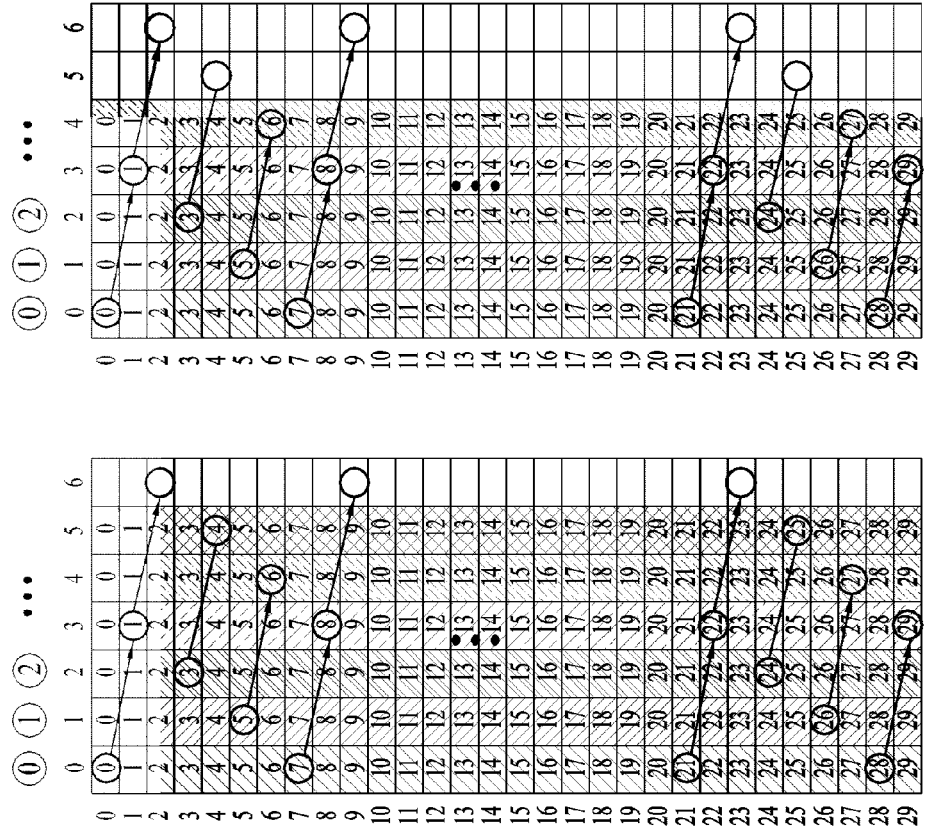
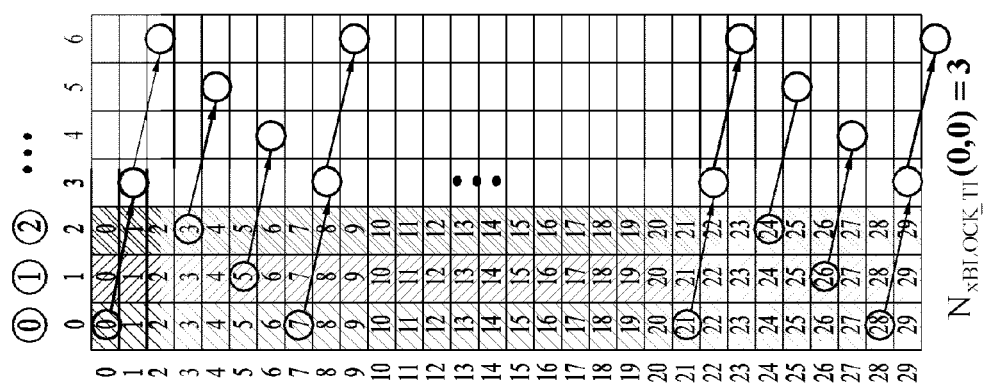

FIG. 24
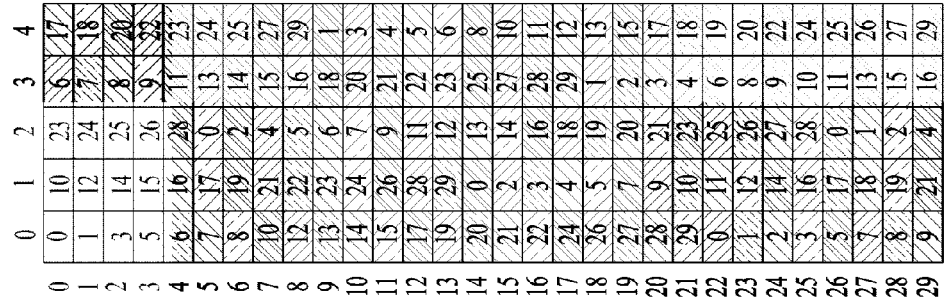
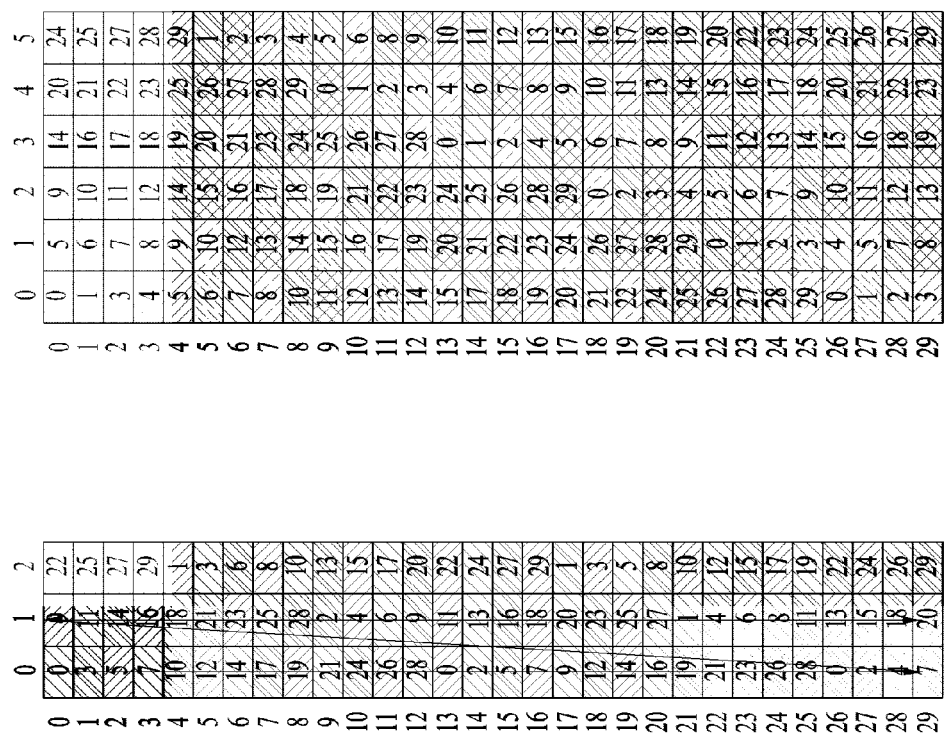

FIG. 25
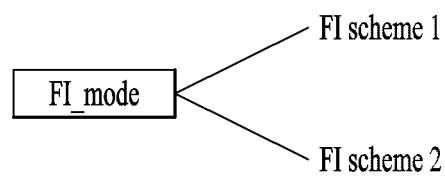
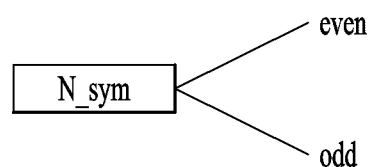
FIG. 26
|  |  | FI_mode | |
|---|---|---|---|
|  |  | 0 | 1 |
| N_sym | even | FI scheme #1 | FI scheme #1 |
|  | odd | FI scheme #1 | FI scheme #2 |

FIG. 27

|  |  | FI_mode | |
|---|---|---|---|
|  |  | 0 | 1 |
| N_sym | even | off | off |
|  | odd | on | off |

FIG. 28 t50010 — $O_{m,l} = [x_{m,l,0}, \ldots, x_{m,l,p}, \ldots, x_{m,l,N_{data}-1}]$   $l = 0, \ldots, N_{sym}-1$ t50020 — $P_{m,l} = [v_{m,l,0}, \ldots, v_{m,l,N_{data}-1}]$   $l = 0, \ldots, N_{sym}-1$

FIG. 29 t51010 — $v_{m,l,H_l(p)} = x_{m,l,p}$   $l = 0, 1, \ldots, N_{sym}-1$   $p = 0, 1, \ldots, N_{data}-1,$ t51020 — $v_{m,l,p} = x_{m,l,H_l(p)}$   $l = 0, 1, \ldots, N_{sym}-1$   $p = 0, 1, \ldots, N_{data}-1,$

FIG. 37 for $0 \leq k \leq N_{cells} N'_{BLOCK\_KTI} - 1$ $r_k = \mod(k, N_{cells})$, $t_k = \mod(S_T \times r_k, N'_{BLOCK\_KTI})$, $c_k = \mod\left(t_{j,k} + \left\lfloor \dfrac{k}{N_{cells}} \right\rfloor, N'_{BLOCK\_KTI}\right)$, $\pi(k) = N_{cells} c_k + r_k$ end where $S_T$ is defined as $S_T = \dfrac{N'_{BLOCK\_KTI} - 1}{2} + 1$ for $\begin{cases} N'_{BLOCK\_KTI} = N_{BLOCK\_KTI} + 1, & \text{if } N_{BLOCK\_KTI} \bmod 2 = 0 \\ N'_{BLOCK\_KTI} = N_{BLOCK\_KTI}, & \text{if } N_{BLOCK\_KTI} \bmod 2 = 1 \end{cases}$ $\pi(k)$: the k-th address for reading memory data
$S_T$ : shift value for use in interleaving (constant value)

FIG. 39 for $0 \leq k < N_{cells} \cdot N'_{BLOCK\_TI\_MAX} - 1$ $r_k = \mod(k, N_{cells})$, $t_k = \mod(S_T \times r_k, N'_{BLOCK\_TI\_MAX})$, $c_k = \mod\left(t_k + \left\lfloor \dfrac{k}{N_{cells}} \right\rfloor, N'_{BLOCK\_TI\_MAX}\right)$, $V(k) = N_{cells} \cdot c_k + r_k$, if $V(k) \geq N_{cells} \cdot N_{BLOCK\_TI\_Diff}$    ⟵ Skip virtual FEC blocks $\pi(C_{cnt}) = \theta(k)$, $C_{cnt} = C_{cnt} + 1$, end end where $C_{cnt} = 0$, $S_T = \dfrac{N'_{BLOCK\_TI\_MAX} - 1}{2} + 1$ for $\begin{cases} N'_{BLOCK\_TI\_MAX} = N_{BLOCK\_TI\_MAX} + 1, & \text{if } N_{BLOCK\_TI\_MAX} \bmod 2 = 0 \\ N'_{BLOCK\_TI\_MAX} = N_{BLOCK\_TI\_MAX}, & \text{if } N_{BLOCK\_TI\_MAX} \bmod 2 = 1, \end{cases}$ $N_{BLOCK\_TI\_Diff} = N'_{BLOCK\_TI\_MAX} - N_{BLOCK\_TI}$ (a)

FIG. 41

$N_{TI\_NUM} = 2$, $N_{cells} = 30$, $N_{BLOCK_{TI,0}} = 5$, $N_{BLOCK_{TI,1}} = 6$, ▫ At that time, $N_{cells} = 30$, $N_{BLOCK\_TI\_MAX} = \max(5,6) = 6$ $$S_T = \frac{N'_{BLOCK\_TI\_MAX} - 1}{2} + 1 \text{ for } \begin{cases} N'_{BLOCK_{TI\_MAX}} = N_{BLOCK_{TI\_MAX}} + 1, & \text{if } N_{BLOCK_{TI\_MAX}} \bmod 2 = 0 \\ N'_{BLOCK_{TI\_MAX}} = N_{BLOCK_{TI\_MAX}}, & \text{if } N_{BLOCK_{TI\_MAX}} \bmod 2 = 1 \end{cases}$$

$\boxed{N'_{BLOCK\_TI\_MAX} = 7}$ $\boxed{S_T = 4}$

| | 0 | 1 | 2 | 3 | 4 |
|---|---|---|---|---|---|
| 0 | 1 | 13 | 25 | 7 | 19 |
| 1 | 3 | 15 | 27 | 9 | 21 |
| 2 | 4 | 16 | 28 | 10 | 22 |
| 3 | 5 | 17 | 29 | 11 | 23 |
| 4 | 6 | 18 | 0 | 12 | 24 |
| 5 | 8 | 20 | 2 | 14 | 26 |
| 6 | 10 | 22 | 4 | 16 | 28 |
| 7 | 11 | 23 | 5 | 17 | 29 |
| 8 | 12 | 24 | 6 | 18 | 0 |
| 9 | 13 | 25 | 7 | 19 | 1 |
| 10 | 15 | 27 | 9 | 21 | 3 |
| 11 | 17 | 29 | 11 | 23 | 5 |
| 12 | 18 | 0 | 12 | 24 | 6 |
| 13 | 19 | 1 | 13 | 25 | 7 |
| 14 | 20 | 2 | 14 | 26 | 8 |
| 15 | 22 | 4 | 16 | 28 | 10 |
| 16 | 24 | 6 | 18 | 0 | 12 |
| 17 | 25 | 7 | 19 | 1 | 13 |
| 18 | 26 | 8 | 20 | 2 | 14 |
| 19 | 27 | 9 | 21 | 3 | 15 |
| 20 | 29 | 11 | 23 | 5 | 17 |
| 21 | 1 | 13 | 25 | 7 | 19 |
| 22 | 2 | 14 | 26 | 8 | 20 |
| 23 | 3 | 15 | 27 | 9 | 21 |
| 24 | 4 | 16 | 28 | 10 | 22 |
| 25 | 6 | 18 | 0 | 12 | 24 |
| 26 | 8 | 20 | 2 | 14 | 26 |
| 27 | 9 | 21 | 3 | 15 | 27 |
| 28 | 10 | 22 | 4 | 16 | 28 |
| 29 | 11 | 23 | 5 | 17 | 29 |

$N_{BLOCK\_T1,0}=5$

| | 0 | 1 | 2 | 3 | 4 | 5 |
|---|---|---|---|---|---|---|
| 0 | 1 | 6 | 11 | 16 | 21 | 26 |
| 1 | 2 | 7 | 12 | 17 | 22 | 27 |
| 2 | 3 | 8 | 13 | 18 | 23 | 28 |
| 3 | 4 | 9 | 14 | 19 | 24 | 29 |
| 4 | 5 | 10 | 15 | 20 | 25 | 0 |
| 5 | 6 | 11 | 16 | 21 | 26 | 1 |
| 6 | 8 | 13 | 18 | 23 | 28 | 3 |
| 7 | 9 | 14 | 19 | 24 | 29 | 4 |
| 8 | 10 | 15 | 20 | 25 | 0 | 5 |
| 9 | 11 | 16 | 21 | 26 | 1 | 6 |
| 10 | 12 | 17 | 22 | 27 | 2 | 7 |
| 11 | 13 | 18 | 23 | 28 | 3 | 8 |
| 12 | 15 | 20 | 25 | 0 | 5 | 10 |
| 13 | 16 | 21 | 26 | 1 | 6 | 11 |
| 14 | 17 | 22 | 27 | 2 | 7 | 12 |
| 15 | 18 | 23 | 28 | 3 | 8 | 13 |
| 16 | 19 | 24 | 29 | 4 | 9 | 14 |
| 17 | 20 | 25 | 0 | 5 | 10 | 15 |
| 18 | 22 | 27 | 2 | 7 | 12 | 17 |
| 19 | 23 | 28 | 3 | 8 | 13 | 18 |
| 20 | 24 | 29 | 4 | 9 | 14 | 19 |
| 21 | 25 | 0 | 5 | 10 | 15 | 20 |
| 22 | 26 | 1 | 6 | 11 | 16 | 21 |
| 23 | 27 | 2 | 7 | 12 | 17 | 22 |
| 24 | 29 | 4 | 9 | 14 | 19 | 24 |
| 25 | 0 | 5 | 10 | 15 | 20 | 25 |
| 26 | 1 | 6 | 11 | 16 | 21 | 26 |
| 27 | 2 | 7 | 12 | 17 | 22 | 27 |
| 28 | 3 | 8 | 13 | 18 | 23 | 28 |
| 29 | 4 | 9 | 14 | 19 | 24 | 29 |

$N_{BLOCK\_T1,0}=6$

FIG. 47 for $0 \leq k \leq N_{cells}N'_{BLOCKTI\_MAX}-1$ $r_k = \mathrm{mod}(k, N_{cells})$, $t_k = \mathrm{mod}(S_R \times r_k, N'_{BLOCKTI\_MAX})$, $c_k = \mathrm{mod}(t_k + \left\lfloor \dfrac{k}{N_{cells}} \right\rfloor, N'_{BLOCKTI\_MAX})$, $V(k) = N_{cells} c_k + r_k$,   Skip virtual FEC blocks if $V(k) \geq N_{cells}N_{BLOCKTI\_Diff}$ $\pi(C_{cnt}) = \theta(k)$, $C_{cnt} = C_{cnt} + 1$, end end where

$C_{cnt} = 0$, $S_R = N'_{BLOCKTI\_MAX} - S_T$, $N_{BLOCKTI\_Diff} = N'_{BLOCKTI\_MAX} - N_{BLOCKTI}$

| PLP_NUM | 1 | >1 |
|---|---|---|
| Interleaving type | CI | CI+BI |

<Hybrid TI structure: example-1>

<Hybrid TI structure: example-2>

<Hybrid TDI structure: example-1>

<Hybrid TDI structure: example-2>

FIG. 59
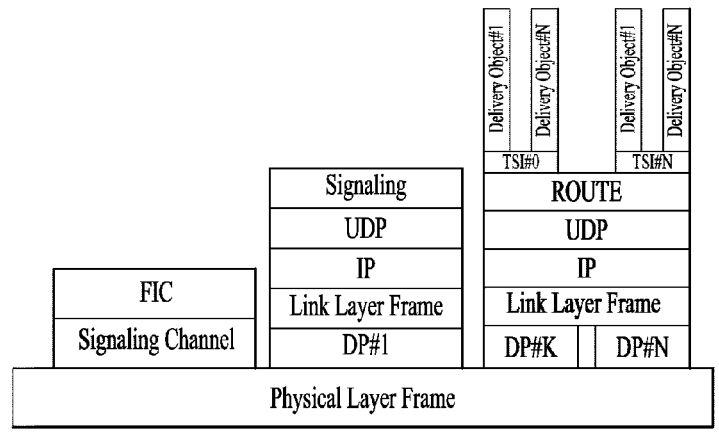
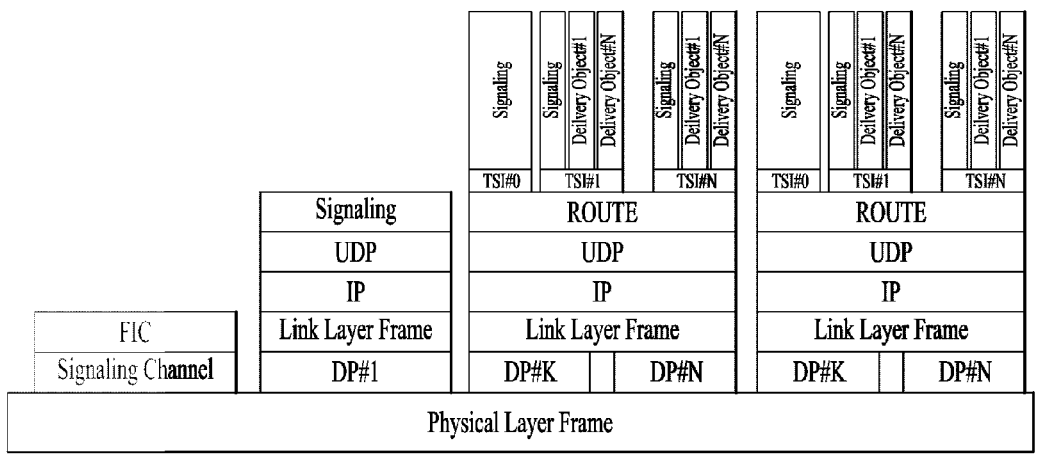
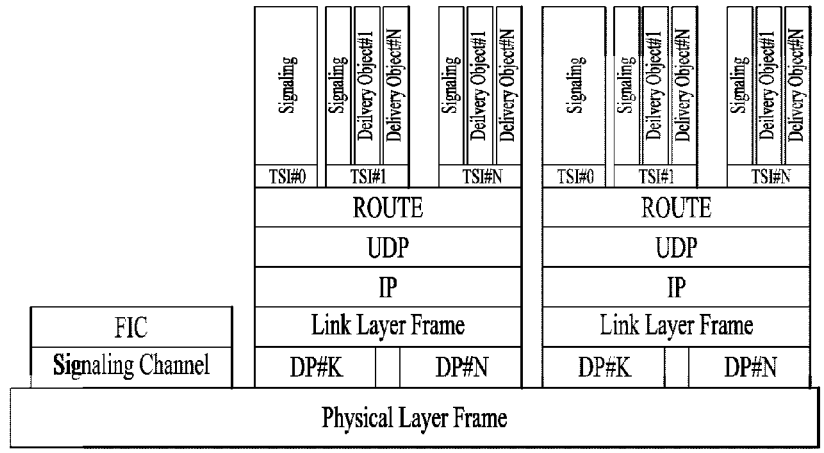

FIG. 60

| Syntax | No. Bits | Format |
|---|---|---|
| FIC(){ | | |
|     FIC_protocol_version | 8 | uimsbf |
|     TSID | 16 | uimsbf |
|     FIC_data_version | 8 | uimsbf |
|     num_partitions | 8 | uimsbf |
|     for (i-0 ; i<num_partitions ; i++) { | | |
|         partition_protocol_version | 8 | uimsbf |
|         base_DP_ID | 8 | uimsbf |
|         base_DP_version | 8 | uimsbf |
|         num_services | 8 | uimsbf |
|         For (j=0 ; j< num_services ; j++) { | | |
|             service_id | 16 | uimsbf |
|             channel_number | 16 | uimsbf |
|             service_category | 5 | uimsbf |
|             short_service_name _length /*m*/ | 3 | uimsbf |
|             short_service_name | 16*m | var |
|             service_status | 2 | uimsbf |
|             service_distribution | 2 | uimsbf |
|             sp_indicator | 1 | uimsbf |
|             reserved | 3 | '111' |
|             } | | |
|         } | | |
|     } | | |

FIG. 61

| Syntax | No. Bits | Format |
|---|---|---|
| FIC(){ | | |
|     FIC_protocol_version | 8 | uimsbf |
|     transport_stream_ID | 16 | uimsbf |
|     FIC_data_version | 8 | uimsbf |
|     num_partitions | 8 | uimsbf |
|     for (i=0; i<num_partitions ; i++) { | | |
|         partition_id | 8 | uimsbf |
|         partition_protocol_version | 8 | uimsbf |
|         num_services | 8 | uimsbf |
|         For (j=0 ; j<num_services ; j++) { | | |
|             service_id | 16 | uimsbf |
|             service_data_version | 8 | uimsbf |
|             channel_number | 16 | uimsbf |
|             service_category | 5 | uimsbf |
|             short_service_name_length /*m*/ | 3 | uimsbf |
|             short_service_name | 16*m | var |
|             service_status | 3 | uimsbf |
|             service_distribution | 2 | uimsbf |
|             sp_indicator | 1 | uimsbf |
|             IP_version_flag | 1 | bslbf |
|             source_IP_address_flag | 1 | bslbf |
|             num_transport_sessions | 8 | uimsbf |
|             for ( int k=0; k< num_transport_sessions;k ++){ | | |
|                 if( source_IP_address_flag ) | | |
|                     source_IP_addr | 32 or 128 | uimsbf |
|                 dest_IP_addr | 32 or 128 | uimsbf |
|                 dest_UDP_port | 16 | uimsbf |
|                 LSID_DP | 8 | uimsbf |
|                 service_signaling_flag | 8 | uimsbf |
|             [transport_session_descriptors] | | |
|             } | | |
|         [service_descriptors] | | |
|         } | | |
|     [partition_descriptors] | | |
|     } | | |
|     [FIC_descriptors] | | |
| } | | |

FIG. 63

| Syntax | No. Bits | Format |
|---|---|---|
| FIC(){ | | |
|   FIC_protocol_version | 8 | uimsbf |
|   transport_stream_ID | 16 | uimsbf |
|   FIC_data_version | 8 | uimsbf |
|   num_partitions | 8 | uimsbf |
|   for (i-0 ; i<num_partitions ; i++) { | | |
|     partition_id | 8 | uimsbf |
|     partition_protocol_version | 8 | uimsbf |
|     num_services | 8 | uimsbf |
|     For (j=0 ; j<num_services ; j++) { | | |
|       service_id | 16 | uimsbf |
|       service_data_version | 8 | uimsbf |
|       channel_number | 16 | uimsbf |
|       service_category | 5 | uimsbf |
|       short_service_name _ length /*m*/ | 3 | uimsbf |
|       short_service_name | 16*m | var |
|       service_status | 3 | uimsbf |
|       service_distribution | 2 | uimsbf |
|       sp_indicator | 1 | uimsbf |
|       IP_version_flag | 1 | bslbf |
|       source_IP_address_flag | 1 | bslbf |
|       num_transport_sessions | 8 | uimsbf |
|       for( int k=0; k< num_transport_sessions;k ++){ | | |
|         if(source_IP_address_flag ) | | |
|           source_IP_addr | | |
|         dest_IP_addr | | |
|         dest_UDP_port | 32 or 128 | uimsbf |
|         LSID_DP | 32 or 128 | uimsbf |
|         service_signaling_flag | 16 | uimsbf |
|         if( service_signaling_flag == TRUE){ | 8 | uimsbf |
|           signaling_data_version | 8 | uimsbf |
|           signaling_DP | | |
|         } | | |
|         [transport_session_descriptors] | 8 | uimsbf |
|       } | 8 | uimsbf |
|       [service_descriptors] | | |
|     } | | |
|   [partition_descriptors] | | |
|   } | | |
|   [FIC_descriptors] | | |
| } | | |

FIG. 65

| Signaling message header | Signaling message data (binary or XML formatted) |
|---|---|

| Syntax | No. Bits | Format |
|---|---|---|
| signaling_message_header ( ){ | | |
|    signaling_id | 8 | uimsbf |
|    signaling_length | 16 | uimsbf |
|    signaling_id_extension | 16 | uimsbf |
|    version_number | 4 | uimsbf |
|    current_next_indicator | 1 | uimsbf |
|    indicator_flags { | | |
|      fragmentation_indicator | 1 | bslbf |
|      payload_format_indicator | 1 | bslbf |
|      expiration _indicator | 1 | bslbf |
|    } | | |
|    if( fragmentation_availability == '1'){ | | |
|      fragment_number | 4 | uimsbf |
|      last_fragment_number | 4 | uimsbf |
|    } | | |
|    if( payloadformat_availability == '1'){ | | |
|      payload_format | 8 | uimsbf |
|    } | | |
|    if(expiration_availability == '1'){ | | |
|      expiration | 32 | uimsbf |
|    } | | |
|  } | | |
| } | | |

FIG. 66

| Service Mapping Table |
|---|
| Signaling_id(SMT) |
| ..  |
| protocol_version |
| broadcast_id |
| signaling_version |
| .. |
| num_services |
| for i=0..num_services-1{ |
|    service_id |
|    service_category |
|    service_status |
|    sp_indicator |
|    num_ROUTE_session |
|    .. |
| } |

| MPD Delivery Table |
|---|
| Signaling_id(MPDT) |
| .. |
| protocol_version |
| sequence_number |
| signaling_version |
| .. |
| MPD_id |
| version |
| delivery_mode |
| If(delivery_mode==embedded |
|    MPD_data( ) |
| else if(delivery_mode==referenced) |
|    MPD_URL |
| .. |

| Component Mapping Table |
|---|
| Signaling_id(CMT) |
| .. |
| protocol_version |
| .. |
| signaling_version |
| .. |
| service_id |
| num_component |
| for i=0..num_component-1{ |
|    mpd_id |
|    period_id |
|    representation_id |
|    IP |
|    port |
|    tsi |
|    DP_id |
|    .. |
| } |

| LSID Table |
|---|
| signaling_id(LSIDT) |
| .. |
| protocol_version |
| .. |
| signaling_version |
| .. |
| .... |

| Application Parameter Table |
|---|
| Signaling_id(APT) |
| .. |
| protocol_version |
| .. |
| signaling_version |
| .. |
| service_id |
| tpt_id |
| num_app |
| for i=0..num_app-1{ |
|    app_name |
|    .. |
| } |

| Initialization Segment Delivery Table |
|---|
| Signaling_id(ISDT) |
| .. |
| protocol_version |
| sequence_number |
| signaling_version |
| .. |
| mpd_id |
| period_id |
| representation_id |
| Initialization_segment_data( ) |
| .... |

FIG. 67

| Signaling message header | Service signaling message or a part thereof |

| Element or Attribute Name | Use | Description |
|---|---|---|
| Service | 1..N | specifies the service |
| @id | M | Service identifier |
| @serviceType | M | service type |
| @serviceName | O | service name |
| @channelNumber | M | channel number associated with this service |
| .. | | |
| ROUTE Session | 0..N | ROUTE session information |
| @sourceIP | O | the source address of the IP datagrams carrying ROUTE packets |
| @destinationIP | O | the destination address of the IP datagrams carrying ROUTE packets |
| @destinationPort | O | the destination port number of the IP datagrams carrying ROUTE packets |
| LSID | 0..1 | LCT session instance description used in this ROUTE session |
| LSIDLocation | 0..1 | The location where LSID can be acquired |
| @deliveryMode | M | The delivery mode of this LSID location signalling |
| BootstrapInfo | 1 | Bootstrap information of LSID according to the delivery mode |
| MPD | 0...1 | DASH media presentation description (MPD) |
| @version | 0..1 | Version of the MPD |
| MPDSignalingLocation | 0...1 | The location where MPD or MPD URL can be acquired |
| @deliveryMode | O | The delivery mode of this MPD location signalling |
| BootstrapInfo | 1 | Bootstrap information of MPD or MPD URL according to the delivery mode |
| ComponentSignalingLocation | 1...N | Component location signalling |
| @deliveryMode | O | The delivery mode of this component location signalling |
| BootstrapInfo | 1 | Bootstrap information of this component location signalling according to the delivery mode |

Legend:
For attributes: M=Mandatory, O=Optional, OD=Optional with Default Value, CM=Conditionally Mandatory.
For elements: <minOccurs >...< maxOccurs > (N=unbounded)
Note that the conditions only holds without using xlink:href. If linking is used, then all attributes are "optional" and < minOccurs =0>
Elements are bold ; attributes are non -bold and preceded with an @.

| Element or Attribute Name | Use | Description |
|---|---|---|
| BootstrapInfo | | |
| @sourceIP | O | the source address of the IP datagrams carrying associated data |
| @destinationIP | O | the destination address of the IP datagrams carrying associated data |
| @destinationPort | O | the destination port number of the IP datagrams carrying associated data |
| @tsi | O | Application layer transport session identifier of session - based transport packets carrying associated data |
| @URL | O | URL where associated data can be acquired |
| @packetid | O | The identifier of transport packets carrying the associated data |

FIG. 68

| Syntax | No. of Bits | Format |
|---|---|---|
| Service_signaling_table { | | |
|     SST_protocol_version | 8 | uimsbf |
|     partition_id | 8 | uimsbf |
|     SST_data_version | 8 | uimsbf |
|     num_services | 8 | uimsbf |
|     for (i=0; i<num_services ; i++) { | | |
|         service_id    {same    as    service_channel?} | 16 | uimsbf |
|         service_name    {string} | var | |
|         Component_signaling_locations { | | |
|             availability_flags { | | |
|                 MPD_availability | 4 | uimsbf |
|                 CMT_availability | 4 | uimsbf |
|                 AST_availability | 4 | uimsbf |
|                 reserved | 4 | uimsbf |
|             } | | |
|             DP_ID | 8 | uimsbf |
|             LCT_IP_address | 32 | uimsbf |
|             LCT_UDP_port | 16 | uimsbf |
|             LCT_TSI | 16 | uimsbf |
|             MPD_TOI | 16 | uimsbf |
|             CMT_TOI | 16 | uimsbf |
|             AST_TOI | 16 | uimsbf |
|             MPD_URL    {string} | var | |
|             CMT_URL    {string} | var | |
|             AST_URL    {string} | var | |
|         } | | |
|     } | | |
| } | | |

FIG. 70

Component Mapping Table Description Semantics

| Element/Attribute | Cardinality | Description |
|---|---|---|
| Component Mapping TableDescription | | |
|   @ service_id | 1 | Identifier associated with the component |
|   Broadcast Comp | 0..N | Components transmitted through the same broadcast stream |
|     @ mpdID | O | Associated DASH MPD identifier |
|     @ perID | O | Associated period identifier in corresponding MPD |
|     @ reptnID | O | DASH Representation identifier associated with the corresponding component |
|     @ baseURL | O | This may indicate Base URL of DASH segment associated with corresponding component |
|     @ datapipe ID | 1 | Identifier of data pipe through which corresponding component data is transmitted in a broadcast stream |
|   BBComp | 0..N | Component transmitted through the broadband network |
|     @ mpdID | O | Associated DASH MPD identifier |
|     @ perID | O | Associated period identifier in corresponding MPD |
|     @ reptnID | O | DASH Representation identifier associated with the corresponding component |
|     @ baseURL | O | This may indicate Base URL of DASH segment associated with corresponding component |
|   ForeignComp | 0..N | Components transmitted through another broadcast stream |
|     @ mpdID | O | Associated DASH MPD identifier |
|     @ perID | O | Associated period identifier in corresponding MPD |
|     @ reptnID | O | DASH Representation identifier associated with the corresponding component |
|     @ baseURL | O | This may indicate Base URL of DASH segment associated with corresponding component |
|     @ transportStreamID | 1 | Identifier of the broadcast stream containing the component data |
|     @ sourceIPAddr | 1 | Source IP address of the IP datagram containing the component data |
|     @ destIPAddr | 1 | Destination IP address of the IP datagram containing the component data |
|     @ destUDPPort | 1 | Destination UDP port number of the IP datagram containing the component data |
|     @ datapipe ID | 1 | Identifier of a data pipe through which the corresponding component data is transmitted in a broadcast stream |

Legend:
  For attributes: M=Mandatory, O=Optional, OD=Optional with Default Value, CM=Conditionally Mandatory.
  For elements: < minOccurs >...< maxOccurs > (N=unbounded)
  Note that the conditions only holds without using xlink:href. If linking is used, then all attributes are
    "optional" and < minOccurs = 0 >
Elements are bold; attributes are non-bold and preceded with an @.

| Signaling message header | Component mapping description or a part thereof |
|---|---|

FIG. 71

| Syntax | No. of Bits | Format |
|---|---|---|
| Component_mapping_table { | | |
|     CMT_protocol_version | 8 | uimsbf |
|     service_id | 16 | uimsbf |
|     CMT_data_version | 8 | uimsbf |
|     num_broadcast_streams | 8 | uimsbf |
|     for (i-0; i<num_broadcast_streams; i++) { | | |
|         TSID | 16 | uimsbf |
|         num_partitions | 8 | uimsbf |
|         for (j-0; j<num_partitions; j++) { | | |
|             partition_id | 8 | uimsbf |
|             num_data_pipes | 8 | uimsbf |
|             for (k-0; k< num_data_pipes ; k++) { | | |
|                 DP_ID | 8 | uimsbf |
|                 num_transort_sessions | 8 | |
|                 for (l-0; l<num_transport_sessions ; l++) { | | |
|                     IP_address | 32 | uimsbf |
|                     UDP_port | 16 | uimsbf |
|                     num_LCT_channels | 8 | uimsbf |
|                     for (l-0; l<num_LCT_channels ; l++) { | 8 | uimsbf |
|                         LCT_TSI | 16 | uimsbf |
|                         Representation_ID | | |
|                         Internet_availability | 1 | bslbf |
|                         reserved | 7 | '1111111' |
|                     } | | |
|                 } | | |
|             } | | |
|         } | | |
|     } | | |
|     num_internet_only_reptns | 8 | uimsbf |
|     for (l-0; l<num_internet_only_reptns; l++) { | | |
|         Representation_ID | 8 | uimsbf |
|     } | | |
| } | | |

FIG. 72

The semantics of URL Signaling Table Description

| Element/Attribute | Cardinality | Description |
|---|---|---|
| URL Signaling Table Description | | |
| @ service_id | 1 | Associated Service identifier |
| @ mpdURL | 0..1 | URL of broadband MPD |
| @ cstURL | 0..1 | URL of broadband CMT (component mapping table) |
| @ astURL | 0..1 | URL of broadband AST (application signaling table) |
| Legend: For attributes: M=Mandatory, O=Optional, OD=Optional with Default Value, CM=Conditionally Mandatory. For elements: < minOccurs >...< maxOccurs > (N=unbounded) Note that the conditions only holds without using xlink:href . If linking is used, then all attributes are "optional" and < minOccurs = 0 > Elements are bold ; attributes are non -bold and preceded with an @. | | |

| Signaling message header | URL Signaling Table Description or a part thereof |

FIG. 73

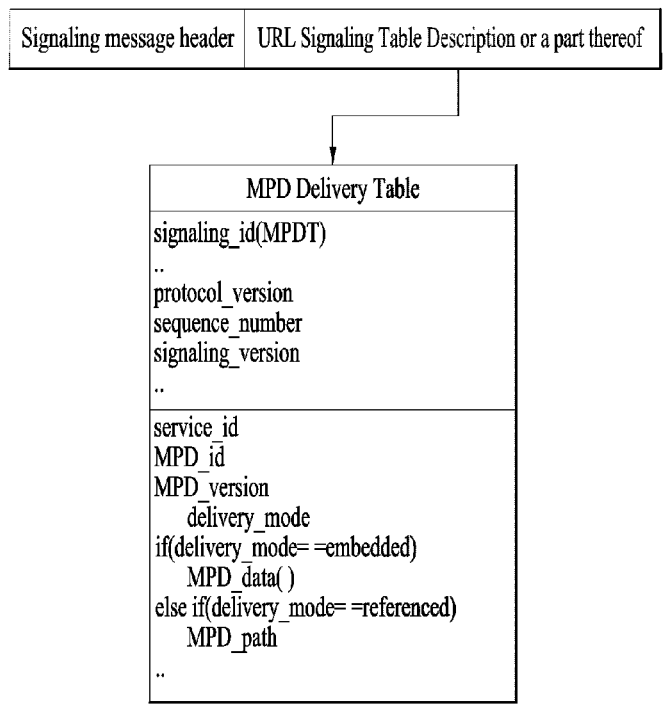

MDP Delivery Table Description Semantics

| Element/Attribute | Cardinality | Description |
|---|---|---|
| MPD Table Description | | |
| @ service_id | 1 | Identifier of associated broadcast service |
| @ MPD_id | 1 | MPD identifier |
| @ MPD_version | 1 | Version information indicating change in information of about MPD |
| @MPD_URL | 0 | URL information for acquiring MPD |
| MPD | 0 | MPD element |

Legend:
For attributes: M=Mandatory, O=Optional, OD=Optional with Default Value, CM=Conditionally Mandatory.
For elements: <minOccurs>...< maxOccurs > (N=unbounded)
Note that the conditions only holds without using xlink:href . If linking is used, then all attributes are "optional" and < minOccurs = 0 >
Elements are bold ; attributes are non-bold and preceded with an @.

FIG. 74

| Signaling message header | MPD delivery table or a part thereof |

| Syntax | No. Bits | Format |
|---|---|---|
| service_id | 16 | uimsbf |
| MPD_id_length /* M */ | 16 | uimsbf |
| MPD_id_bytes ( ) | 8*M | var |
| MPD_version | 8 | uimsbf |
| availability_flag { | | |
|   MPD_URL_availabilty | 1 | bslbf |
|   MPD_data_availability | 1 | bslbf |
| } | | |
| if( MPD_URL_availabilty ) { | | |
|   MPD_URL_length /* L */ | 14 | uimsbf |
|   MPD_URL_bytes ( ) | 8*L | var |
| } | | |
| if( MPD_data_availability ) { | | |
|   MPD_coding | 2 | uimsbf |
|   MPD_byte_length /* N */ | 14 | uimsbf |
|   MPD_bytes ( ) | 8*N | var |
| } | | |
| } | | |

| Value | Designation |
|---|---|
| 0×00 | Plain text |
| 0×01 | Compressed by gzip |
| 0×02-0×03 | Reserved for future use |

FIG. 75

LCT Session Instance Dscription Semantics

| Element or Attribute Name | Use | Description |
|---|---|---|
| LSID | | LCT Session Instance Description |
| @version | O | Version of this LCT Session Instance Description. The version is increased by one when the descriptor is updated. The received LSID with highest version number is the currently valid version. |
| @validFrom | O | The date and time from which the LSID is valid. The validFrom attribute may or may not be present. If not present, the receiver can assume the LSID version is valid immediately. |
| @expiration | O | The date and time when the LSID expires. The expiration attribute may or may not be present. If not present the receiver can assume the LSID is valid for all time, or until it receives a newer LSID with an associated expiration value. |
| TransportSession | 1...N | Provides information about LCT transport sessions |
| @ tsi | M | Specifies the transport session identifier. The session identifiers must not be 0. |
| SourceFlow | 0...1 | Provides information of a source flow carried on this tsi |
| RepairFlow | 0...1 | Provides information of a repair flow carried on the tsi. |

Legend:
  For attributes: M=Mandatory, O=Optional, OD=Optional with Default Value, CM=Conditionally Mandatory.
  For elements: <minOccurs >...< maxOccurs > (N=unbounded)
  Note that the conditions only holds without using xlink:href . If linking is used, then all attributes are "optional" and < minOccurs = 0 >
Elements are bold; attributes are non bold and preceded with an @.

FIG. 76

| Element or Attribute Name | Use | Description |
|---|---|---|
| SourceFlow | | defines a source flow in session |
|   EFDT | 0...1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
|   @idRef | 0? | Identification of the EFDT, it can be represented as a URI by the corresponding Transport Session. |
|   @realtime | OD<br>default: false | If not present it is false. If present and set to true, LCT packets contain extension headers including timestamps that express the presentation time of the included delivery object. |
|   @minBufferSize | O | Defines the maximum amount of data that needs to be stored in the receiver. This value may be present if @realtime is set to true. |
|   ApplicationIdentifier | 0...1 | May provide additional information that can be mapped to the application that is carried in this transport session, e.g. Representation ID of a DASH content or the Adaptation Set parameters of a DASH Representation in order to select the LCT transport session for rendering. |
|   PayloadFormat | 1...N | Defines payload formats of ROUTE packets carrying the objects of the source flow |
|     @codePoint | OD<br>default=0 | Defines what CodePoint value is used for this payload. This is the value of the CP field in the LCT header. When signalling this this value, the delivery of the object can follow the rules below. |
|     @deliveryObjectFormat | M | Specifies the payload format of the delivery object |
|     @fragmentation | OD<br>default=0 | Specifies the type of fragmentation<br>0 : arbitrary<br>1: application specific (sample based)<br>2 : application specific (e.g., a collection of boxes) |
|     @deliveryOrder | OD<br>default=0 | Specifies the ordering of delivery of objects<br>0 : arbitrary<br>1: in -order delivery<br>2: in -order delivery of media samples and prior to movie fragment box |
|     @sourceFecPayloadID | OD<br>default=1 | Defines the format of the Source FEC Payload ID. The following values can be defined :<br>- 0: the source FEC payload ID is absent and the entire delivery object is contained in this packet.<br>- 1: the source FEC payload ID is 32 bit and expresses the start offset in the object.<br>- 2: FECParameters defines the Format of the Source FEC Payload ID. |
|   FECParameters | 0...1 | Defines the FEC parameters . This includes the FEC-encoding -id , the instance -id , etc. It is specifically used to signal the applied Source FEC Payload ID. |

Legend:
For attributes: M=Mandatory, O=Optional, OD=Optional with Default Value, CM=Conditionally Mandatory.
For elements: <minOccurs>...<maxOccurs> (N=unbounded)
Note that the conditions only holds without using xlink:href . If linking is used, then all attributes are "optional"
and <minOccurs = 0>
Elements are bold; attributes are non bold and preceded with an @.

FIG. 77

| Element or Attribute Name | Use | Description |
|---|---|---|
| EFDT | | extended FDT instance descriptor |
| @idRef | 0...1 | Identification of the EFDT, |
| @version | O | Version of this extended FDT instance descriptor. The version if increased by one when the descriptor is updated. The received EFDT with highest version number is the currently valid version. |
| @maxExpiresDelta | O | The maximum expiry time for an object in the Transport Session after sending the first packet associated to this object. |
| @maxTransportSize | O | The maximum transport size of any object described by this EFDT. |
| FileTemplate | 0...1 | Specifies the file URL or file template in the body |
| Legend: For attributes: M=Mandatory, O=Optional, OD=Optional with Default Value, CM=Conditionally Mandatory. For elements: <minOccurs >...< maxOccurs > (N=unbounded) Note that the conditions only holds without using xlink:href . If linking is used, then all attributes are "optional" and < minOccurs = 0 > Elements are bold ; attributes are non-bold and preceded with an @. | | |

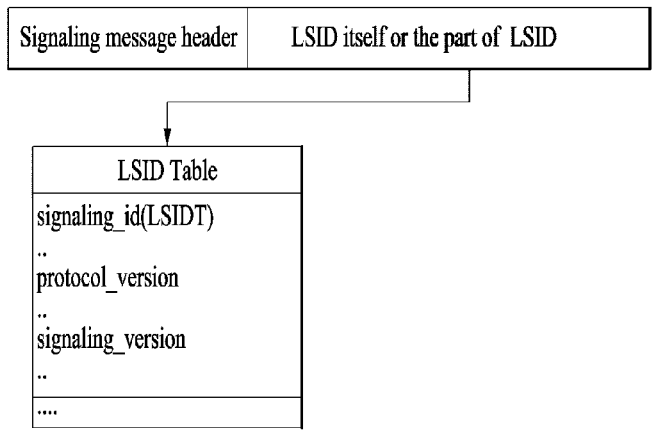

FIG. 79
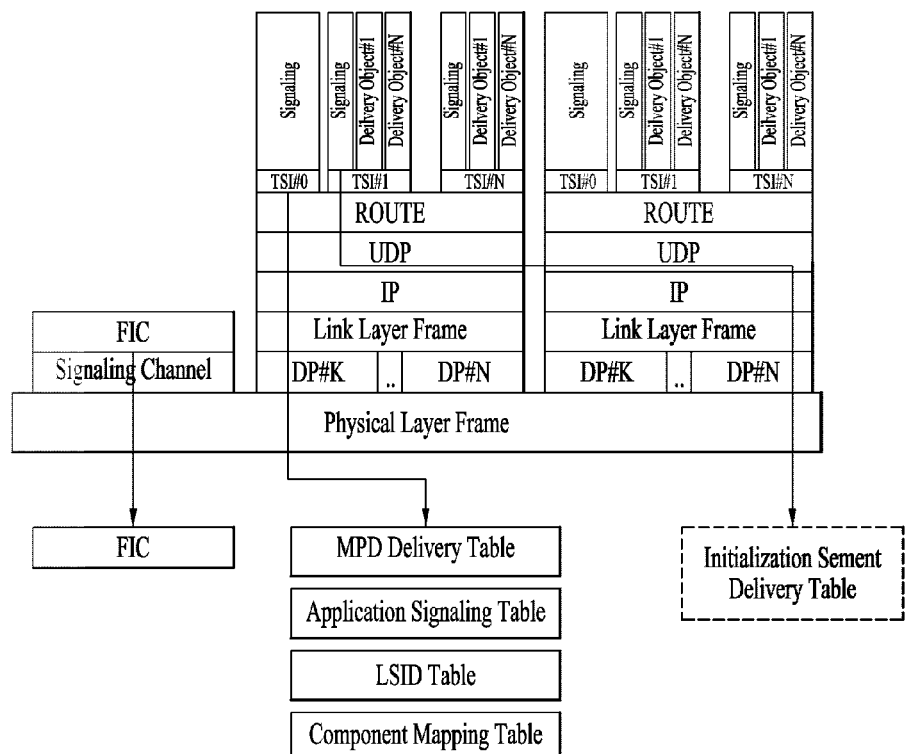
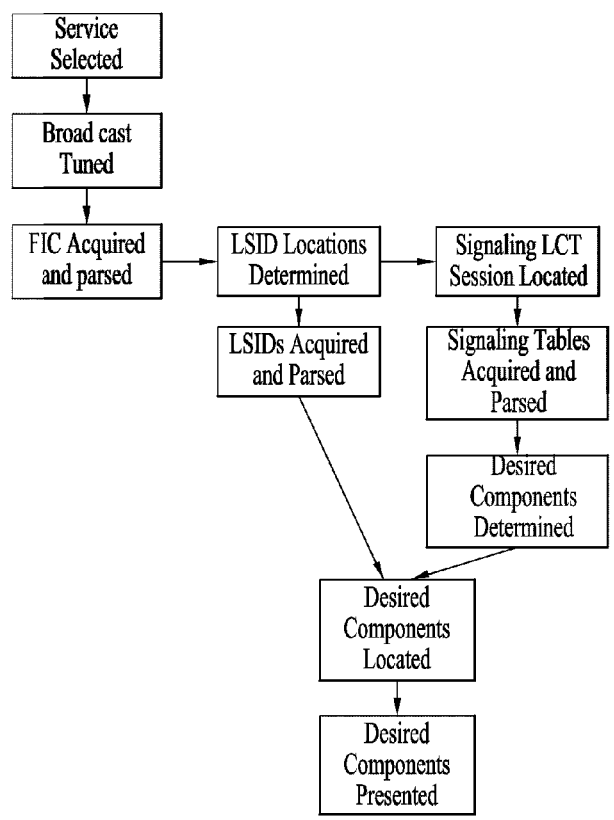

FIG. 80

| Syntax | No. Bits | Format |
|---|---|---|
| FIC(){ | | |
|   FIC_protocol_version | 8 | uimsbf |
|   transport_stream_ID | 16 | uimsbf |
|   FIC_data_version | 8 | uimsbf |
|   num_partitions | 8 | uimsbf |
|   for (i-0 ; i<num_partitions ; i++) { | | |
|     partition_id | 8 | uimsbf |
|     partition_protocol_version | 8 | uimsbf |
|     num_services | 8 | uimsbf |
|     For (j=0 ; j<num_services ; j++) { | | |
|       service_id | 16 | uimsbf |
|       service_data_version | 8 | uimsbf |
|       channel_number | 16 | uimsbf |
|       service_category | 5 | uimsbf |
|       short_service_name _ length /*m*/ | 3 | uimsbf |
|       short_service_name | 16*m | var |
|       service_status | 3 | uimsbf |
|       service_distribution | 2 | uimsbf |
|       sp_indicator | 1 | uimsbf |
|       IP_version_flag | 1 | bslbf |
|       source_IP_address_flag | 1 | bslbf |
|       num_transport_sessions | 8 | uimsbf |
|       for ( int k=0; k< num_transport_sessions;k ++){ | | |
|         if( source_IP_address_flag ) | | |
|           source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         service_signaling_flag | 8 | uimsbf |
|         if( service_signaling_flag ){ | | |
|           signaling_data_version | 8 | uimsbf |
|           signaling_DP | 8 | uimsbf |
|           signaling_tsi | 16 | uimsbf |
|         } | | |
|         [transport_session_descriptors ] | | |
|       } | | |
|       [service_descriptors ] | | |
|     } | | |
|   [partition_descriptors ] | | |
|   } | | |
|   [FIC_descriptors] | | |
| } | | |

FIG. 81

| Field | # Bits |
|---|---|
| FIC(){ | |
|   FIC_protocol_version | 8 |
|   transport_stream_ID | 16 |
|   num_partitions | 8 |
|   for i=0..num_partitions -1 | |
|     partition_id | 8 |
|     partition_protocol_version | 8 |
|     num_services | 8 |
|     for j=0..num_services -1 | |
|       service_id | 16 |
|       service_data_version | 8 |
|       service_channel_number | 16 |
|       service_category | 5 |
|       service_short_name_length /*m*/ | 3 |
|       service_short_name | m*16 |
|       service_status | 3 |
|       service_distribution | 2 |
|       sp_indicator | 1 |
|       IP_version_flag | 1 |
|       reserved | 1 |
|       num_ROUTE_sessions | 8 |
|       for k=0..num_ROUTE_sessions -1 | |
|         source_IP_addr | 32 or 128 |
|         dest_IP_addr | 32 or 128 |
|         dest_UDP_port | 16 |
|         LSID_DP | 8 |
|         LSID_tsi | 16 |
|         component_signaling_flag | 8 |
|       [ROUTE_session_descriptors] | |
|     [service_descriptors] | |
|   [partition_descriptors] | |
| [FIC_descriptors] | |
| } | |

FIG. 82

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Broadcast Comp | | 0..N | Component transmitted through the same broadcast stream |
| | | @ mpdID | 0 | Associated dash mpd identifier |
| | | @perID | 0 | Associated period identifier in corresponding mpd |
| | | @ reptnID | 0 | Dash representation identifier associated with corresponding component |
| | | @ baseURL | 0 | This indicates base url of segments included in dash representation associated with corresponding component |
| | | @ datapipe ID | 1 | Identifier of data pipe for transmitting corresponding component data in broadcast stream |
| | BBComp | | 0..N | Component transmitted through broadband network |
| | | @ mpdID | 0 | Associated dash mpd identifier |
| | | @ perID | 0 | Associated period identifier in corresponding mpd |
| | | @ reptnID | 0 | Dash representation identifier associated with corresponding component |
| | | @ baseURL | 0 | This indicates base url of segments included in dash representation associated with corresponding component. |
| | ForeignComp | | 0..N | Component transmitted through other broadcast streams |
| | | @mpdID | 0 | Associated dash mpd identifier |
| | | @ perID | 0 | Associated period identifier in corresponding mpd |
| | | @ reptnID | 0 | Dash representation identifier associated with corresponding component |
| | | @ baseURL | 0 | This indicates base url of segments included in dash representation associated with corresponding component. |
| | | @ transportStreamID | 1 | Identifier of broadcast stream including corresponding component data |
| | | @ sourceIPAddr | 0 | Source ip address of ip datagram including corresponding component data |
| | | @ destIPAddr | 0 | Destination ip address of ip datagram including corresponding component data |
| | | @ destUDPPort | 0 | Destination udp port number of ip datagram including corresponding component data |
| | | @ datapipe ID | 0 | Identifier of data pipe for transmitting corresponding component data in corresponding broadcast stream |
| Legend: | | | | |
| For attributes: M=Mandatory, O=Optional, OD=Optional with Default Value, CM=Conditionally Mandatory. | | | | |
| For elements: < minOccurs >...< maxOccurs > (N=unbounded) | | | | |
| Note that the conditions only holds without using xlink:href . If linking is used, then all attributes are "optional" and < minOccurs = 0 > | | | | |
| Elements are bold ; attributes are non-bold and preceded with an @. | | | | |

| Signaling message header | Component mapping description or portion |
|---|---|

FIG. 83

Component Mapping Table Description Semantics

| Element/Attribute | | | Cardinality | Description |
|---|---|---|---|---|
| Component Mapping Table Description | | | | |
| | @ service_id | | 1 | Associated broadcast service identifier |
| | Broadcast Comp | | 0..N | Component transmitted through the same broadcast stream |
| | | @ mpdID | O | Associated dash mpd identifier |
| | | @ perID | O | Associated period identifier in corresponding mpd |
| | | @ reptnID | O | Dash representation identifier associated with corresponding component |
| | | @ baseURL | O | This indicates base url of segments included in dash representation associated with corresponding component. |
| | | @ tsi | O | This indicates identifier of transfer session for transmitting corresponding component data in broadcast stream |
| | | @ datapipe ID | 1 | Identifier of data pipe for transmitting corresponding component data in broadcast stream |
| | BBComp | | 0..N | Component transmitted through broadband network |
| | | @ mpdID | O | Associated dash mpd identifier |
| | | @ perID | O | Associated period identifier in corresponding mpd |
| | | @ reptnID | O | Dash representation identifier associated with corresponding component |
| | | @ baseURL | O | This indicates base url of segments included in dash representation associated with corresponding component. |
| | ForeignComp | | 0..N | Component transmitted through other broadcast streams |
| | | @mpdID | O | Associated dash mpd identifier |
| | | @ perID | O | Associated period identifier in corresponding mpd |
| | | @ reptnID | O | Dash representation identifier associated with corresponding component |
| | | @ baseURL | O | Dash representation identifier associated with corresponding component |
| | | @ transportStreamID | 1 | Identifier of broadcast stream including corresponding component data |
| | | @ sourceIPAddr | O | Source ip address of ip datagram including corresponding component data |
| | | @ destIPAddr | O | Destination ip address of ip datagram including corresponding component data |
| | | @ destUDPPort | O | Destination udp port number of ip datagram including corresponding component data |
| | | @ tsi | O | This indicates identifier of transfer session for transmitting corresponding component data in corresponding broadcast stream |
| | | @ datapipe ID | O | Identifier of data pipe for transmitting corresponding component data in corresponding broadcast stream |

Legend:
    For attributes: M=Mandatory, O=Optional, OD=Optional with Default Value, CM=Conditionally Mandatory.
    For elements: < minOccurs >...< maxOccurs > (N=unbounded)
    Note that the conditions only holds without using xlink:href . If linking is used, then all attributes are
    "optional" and < minOccurs = 0 >
Elements are bold ; attributes are non-bold and preceded with an @.

| Signaling message header | Component mapping description or portion |
|---|---|

FIG. 84

Component Mapping Table Description Semantics

| Element/Attribute | Cardinality | Description |
|---|---|---|
| Component Mapping Table Description | | |
| @ service_id | 1 | Associated broadcast service identifier |
| Component | 0..N | Component in corresponding broadcast service |
| @ mpdID | O | Associated dash mpd identifier |
| @ perID | O | Associated period identifier in corresponding mpd |
| @ reptnID | M | Dash representation identifier associated with corresponding component |
| @ baseURL | O | This indicates base url of segments included in dash representation associated with corresponding component. |
| DeliveryParameter | 0..N | Including detailed information on path, etc. for transmitting corresponding component |
| PayloadFormat | 0..N | |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold ; attributes are non -bold and preceded with an @.

FIG. 85

| Element/Attribute | | Cardinality | Description |
|---|---|---|---|
| DeliveryParameter | | | |
| | @ transportStreamID | 0 | Identifier of broadcast stream including component data |
| | @ sourceIPAddr | 0 | Source ip address of ip datagram including component data |
| | @ destIPAddr | 0 | Destination ip address of ip datagram including component data |
| | @ destUDPPort | 0 | Destination udp port number of ip datagram including component data UDP port number |
| | @ tsi | 0 | This indicates identifier of transfer session for transmitting corresponding component data in broadcast stream. |
| | @ datapipe ID | 0 | Identifier of physical layer data pipe for transmitting corresponding component data in broadcast stream |
| | @URL | 0 | This indicates url information for acquiring corresponding component data through internet, etc. |

| Element/Attribute | | Cardinality | Description |
|---|---|---|---|
| PayloadFormat | | 1 ... N | Defines payload formats of packets carrying the component data |
| | @ codePoint | OD default=0 | Defines what CodePoint value is used for this payload. This is the value of the CP field in the LCT header. When signalling this this value, the delivery of the object can follow the rules below. |
| | @ deliveryObjectFormat | M | Specifies the payload format of the delivery object |
| | @fragmentation | OD default=0 | Specifies the type of fragmentation<br>0 : arbitrary<br>1: application specific (sample based)<br>2: application specific (e.g., a collection of boxes) |
| | @deliveryOrder | OD default=0 | Specifies the ordering of delivery of objects<br>0 : arbitrary<br>1: in -order delivery<br>2: in -order delivery of media samples and prior to movie fragment box |
| | @ sourceFecPayloadID | OD default=1 | Defines the format of the Source FEC Payload ID. The following values can be defined :<br>• 0: the source FEC payload ID is absent and the entire delivery object is contained in this packet.<br>• 1: the source FEC payload ID is 32 bit and expresses the start offset in the object.<br>• 2: FECParameters defines the Format of the Source FEC Payload ID. |
| FECParameters | | 0 ... 1 | Defines the FEC parameters. This includes the FEC- encoding id, the - instance -id, etc. It is specifically used to signal the applied Source FEC Payload ID . |

FIG. 86

Component Mapping Table Description Semantics

| Element/Attribute | | | | Cardinality | Description |
|---|---|---|---|---|---|
| Component Mapping Table Description | | | | | |
| | @ service_id | | | 1 | identifier associated with component |
| | @mpdID | | | 0..1 | associated dash mpd identifier |
| | @ perID | | | 0..1 | Associated period identifier in corresponding mpd |
| | Broadcast Comp | | | 0..N | Component transmitted through the same broadcast stream |
| | | @ reptnID | | 0 | Dash representation identifier associated with corresponding component |
| | | @ baseURL | | 0 | This indicates base url of segments included in dash representation associated with corresponding component. |
| | | @ tsi | | 0 | This indicates identifier of transfer session for transmitting corresponding component data in broadcast stream |
| | | @ datapipe ID | | 1 | Identifier of data pipe for transmitting corresponding component data in broadcast stream |
| | BBComp | | | 0..N | Component transmitted through broadcast network |
| | | @ reptnID | | 0 | Dash representation identifier associated with corresponding component |
| | | @ baseURL | | 0 | This indicates base url of segments included in dash representation associated with corresponding component. |
| | ForeignComp | | | 0..N | Component transmitted through other broadcast streams |
| | | @ reptnID | | 0 | Dash representation identifier associated with corresponding component |
| | | @ baseURL | | 0 | This indicates base url of segments included in dash representation associated with corresponding component. |
| | | @ transportStreamID | | 1 | Identifier of broadcast stream including corresponding component data |
| | | @ sourceIPAddr | | 0 | Source ip address of ip datagram including corresponding component data |
| | | @ destIPAddr | | 0 | Destination ip address of ip datagram including corresponding component data |
| | | @ destUDPPort | | 0 | Destination udp port number of ip datagram including corresponding component data |
| | | @ tsi | | 0 | This indicates identifier of transfer session for transmitting corresponding component data in corresponding broadcast stream |
| | | @ datapipe ID | | 0 | Identifier of data pipe for transmitting corresponding component data in corresponding broadcast stream |
| Legend: | | | | | |
| For attributes: M=Mandatory, O=Optional, OD=Optional with Default Value, CM=Conditionally Mandatory. | | | | | |
| For elements: < minOccurs >...< maxOccurs > (N=unbounded) | | | | | |
| Note that the conditions only holds without using xlink:href . If linking is used, then all attributes are "optional" and < minOccurs = 0 > | | | | | |
| Elements are bold ; attributes are non bold and preceded with an @. | | | | | |

( 1 )BBComp means a broadband component.
( 2 )ForeignComp means component is another broadcast stream.
( 3 )The mpdID, perID and reptnID of each component identify the service component; the URLs of the component Segments can be determined from the current MPD for the service.
( 4 )The mpdID, perID and reptnID of a foreign component identify the service component. The precise location of the service component can be determined from the signaling in the other broadcast stream.

FIG. 87

| Element/Attribute | Cardinality | Description |
|---|---|---|
| Common attributes and elements | | |
| @profiles | O | specifies the profiles which the associated Representation( s ) conform to of the list of Media Presentation |
| @width | O | specifies the horizontal visual presentation size of the video media type on a grid determined by the @ sar attribute |
| @height | O | specifies the vertical visual presentation size of the video media type, on a grid determined by the @sar attribute. |
| @ sar | O | specifies the sample aspect ratio of the video media component type, |
| @ frameRate | O | specifies the output frame rate of the video media type in the Representation. |
| @ audioSamplingRate | O | Either a single decimal integer value specifying the sampling rate or a whitespace separated pair of decimal integer values specifying the minimum and maximum sampling rate of the audio media component type |
| @ mimeType | O | specifies the MIME type of the concatenation of the Initialization Segment, if present, and all consecutive Media Segments in the Representation. |
| @ segmentProfiles | O | specifies the profiles of Segments that are essential to process the Representation. The detailed semantics depend on the value of the @ mimeType attribute. |
| @codecs | O | specifies the codecs present within the Representation. |
| @ maximumSAPPeriod | O | when present, specifies the maximum SAP interval in seconds of all contained media streams |
| @ startWithSAP | O | specifies that in the associated Representations, each Media Segment starts with a SAP of type less than or equal to the value of this attribute value in each media stream. |
| @ maxPlayoutRate | O | specifies the maximum playout rate |
| @ codingDependency | O | When present and 學rue? for all contained media streams, specifies that there is at least one access unit that depends on one or more other access units for decoding. |
| @ scanType | O | specifies the scan type of the source material of the video media component type. |
| FramePacking | 0...N | specifies frame-packing arrangement information of the video media component type. |
| AudioChannelConfiguration | 0...N | specifies the audio channel configuration of the audio media component type. |
| ContentProtection | 0...N | specifies information about content protection schemes used for the associated Representations. |
| EssentialProperty | 0...N | specifies information about the containing element that is considered essential by the Media Presentation author for processing the containing element. |
| SupplementalProperty | 0...N | specifies supplemental information about the containing element that may be used by the DASH client optimizing the processing. |
| InbandEventStream | 0...N | specifies the presence of an inband event stream in the associated Representations. |
| Location | 0...N | specifies a location at which the associated Representation(s) are available, for example, it can indicate a broadcast stream, or the physical layer data pipe(s) carrying the associated Representation(s) |

Legend:
 For attributes: M=Mandatory, O=Optional, OD=Optional with Default Value, CM=Conditionally Mandatory.
 For elements: < minOccurs >...< maxOccurs > (N=unbounded)
 Note that the conditions only holds without using xlink:href . If linking is used, then all attributes are
  "optional" and <minOccurs = 0 >
 Elements are bold ; attributes are non -bold and preceded with an @.

FIG. 88

LCT Session Instance Description Semantics

| Element or Attribute Name | | | | Use | Description |
|---|---|---|---|---|---|
| LSID | | | | | LCT Session Instance Description |
| | @version | | | O | Version of this LCT Session Instance Description. The version is increased by one when the descriptor is updated. The received LSID with highest version number is the currently valid version. |
| | @validFrom | | | O | The date and time from which the LSID is valid. The validFrom attribute may or may not be present. If not present, the receiver can assume the LSID version is valid immediately. |
| | @expiration | | | O | The date and time when the LSID expires. The expiration attribute may or may not be present. If not present the receiver can assume the LSID is valid for all time, or until it receives a newer LSID with an associated expiration value. |
| | TransportSession | | | 1...N | Provides information about LCT transport sessions |
| | | @tsi | | M | Specifies the transport session identifier. The session identifiers must not be 0. |
| | | SourceFlow | | 0...1 | Provides information of a source flow carried on this tsi |
| | | RepairFlow | | 0...1 | Provides information of a repair flow carried on the tsi. |
| | | TransportSessionProperty | | 0...N | provides additional property information about this transport session |
| Legend: | | | | | |
| For attributes: M=Mandatory, O=Optional, OD=Optional with Default Value, CM=Conditionally Mandatory. | | | | | |
| For elements: < minOccurs >...< maxOccurs > (N=unbounded) | | | | | |
| Note that the conditions only holds without using xlink:href . If linking is used, then all attributes are "optional" and < minOccurs = 0 > | | | | | |
| Elements are bold; attributes are non-bold and preceded with an @. | | | | | |

FIG. 89

| Element or Attribute Name | Use | Description |
|---|---|---|
| SourceFlow | | defines a source flow in session |
|   EFDT | 0...1 | If provided, it specifies the details of the file delivery data. This is the extended File Delivery Table(FDT) instance.<br>The EFDT may either be embedded or may be provided as a reference. If provided as a reference the EFDT may be updated independently of the LSID. |
|     @idRef | 0? | Identification of the EFDT, it can be represented as a URI by the corresponding Transport Session. |
|     @realtime | OD<br>default: false | If not present it is false. If present and set to true, LCT packets contain extension headers including timestamps that express the presentation time of the included delivery object. |
|     @minBufferSize | 0 | Defines the maximum amount of data that needs to be stored in the receiver. This value may be present if @realtime is set to true. |
|   ApplicationIdentifier | 0...1 | May provide additional information that can be mapped to the application that is carried in this transport session, e.g. Representation ID of a DASH content or the Adaptation Set parameters of a DASH Representation in order to select the LCT transport session for rendering. |
|   PayloadFormat | 1...N | Defines payload formats of ROUTE packets carrying the objects of the source flow |
|     @codePoint | OD<br>default=0 | Defines what CodePoint value is used for this payload. This is the value of the CP field in the LCT header. When signalling this this value, the delivery of the object can follow the rules below. |
|     @deliveryObjectFormat | M | Specifies the payload format of the delivery object |
|     @fragmentation | OD<br>default=0 | Specifies the type of fragmentation<br>0 : arbitrary<br>1: application specific (sample based)<br>2 : application specific (e.g., a collection of boxes) |
|     @deliveryOrder | OD<br>default=0 | Specifies the ordering of delivery of objects<br>0 : arbitrary<br>1: in -order delivery<br>2: in -order delivery of media samples and prior to movie fragment box |
|     @sourceFecPayloadID | OD<br>default=1 | Defines the format of the Source FEC Payload ID. The following values can be defined :<br>  • 0: the source FEC payload ID is absent and the entire delivery object is contained in this packet.<br>  • 1: the source FEC payload ID is 32 bit and expresses the start offset in the object.<br>  • 2: FECParameters defines the Format of the Source FEC Payload ID. |
|   FECParameters | 0...1 | Defines the FEC parameters . This includes the FEC-encoding - id , the instance -id , etc. It is specifically used to signal the applied Source FEC Payload ID. |
|   SourceFlowProperty | 0...N | provides property information about this source flow, e.g., broadcast location (e.g., data pipe within the broadcast stream) carrying this source flow data. |

Legend:
For attributes: M=Mandatory, O=Optional, OD=Optional with Default Value, CM=Conditionally Mandatory.
For elements: < minOccurs >...< maxOccurs > (N=unbounded)
Note that the conditions only holds without using xlink:href . If linking is used, then all attributes are "optional" and < minOccurs = 0 >
Elements are bold; attributes are non -bold and preceded with an @.

FIG. 90

| Syntax | No. Bits | Format |
|---|---|---|
| FIC(){ | | |
|   FIC_protocol_version | 8 | uimsbf |
|   transport_stream_ID | 16 | uimsbf |
|   FIC_data_version | 8 | uimsbf |
|   num_partitions | 8 | uimsbf |
|   for (i-0; i<num_partitions; i++) { | | |
|     partition_id | 8 | uimsbf |
|     partition_protocol_version | 8 | uimsbf |
|     num_services | 8 | uimsbf |
|     For (j=0; j<num_services; j++) { | | |
|       service_id | 16 | uimsbf |
|       service_data_version | 8 | uimsbf |
|       channel_number | 16 | uimsbf |
|       service_category | 5 | uimsbf |
|       short_service_name_length /*m*/ | 3 | uimsbf |
|       short_service_name | 16*m | var |
|       service_status | 3 | uimsbf |
|       service_distribution | 2 | uimsbf |
|       sp_indicator | 1 | uimsbf |
|       IP_version_flag | 1 | bslbf |
|       source_IP_address_flag | 1 | bslbf |
|       num_transport_sessions | 8 | uimsbf |
|       for (int k=0; k<num_transport_sessions;k++){ | | |
|         if(source_IP_address_flag) | | |
|           source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         service_signaling_flag | 8 | uimsbf |
|         if(service_signaling_flag=='1'){ | | |
|           signaling_data_version | 8 | uimsbf |
|           signaling_DP | 8 | uimsbf |
|           signaling_tsi | 16 | uimsbf |
|         } | | |
|         link_layer_signaling_flag | 8 | uimsbf |
|         if(link_layer_signaling_flag=='1'){ | | |
|           link_layer_signaling_data_version | 8 | uimsbf |
|           link_layer_signaling_DP | 8 | uimsbf |
|         } | | |
|         [transport_session_descriptors] | | |
|       } | | |
|       [service_descriptors] | | |
|     } | | |
|     [partition_descriptors] | | |
|   } | | |
|   [FIC_descriptors] | | |
| } | | |

FIG. 91

| Field | # Bits | format |
|---|---|---|
| FIC(){ | | |
|   FIC_protocol_version | 8 | uimsbf |
|   transport_stream_ID | 16 | uimsbf |
|   num_partitions | 8 | uimsbf |
|   for i=0..num_partitions-1 | | |
|     partition_id | 8 | uimsbf |
|     partition_protocol_version | 8 | uimsbf |
|     num_services | 8 | uimsbf |
|     for j=0..num_services-1 | | |
|       service_id | 16 | uimsbf |
|       service_data_version | 8 | uimsbf |
|       service_channel_number | 16 | uimsbf |
|       service_category | 5 | uimsbf |
|       service_short_name_length /*m*/ | 3 | uimsbf |
|       service_short_name | m*16 | var |
|       service_status | 3 | uimsbf |
|       service_distribution | 2 | uimsbf |
|       sp_indicator | 1 | bslbf |
|       IP_version_flag | 1 | bslbf |
|       reserved | 1 | '1' |
|       num_ROUTE_sessions | 8 | uimsbf |
|       for k=0..num_ROUTE_sessions-1 | | |
|         source_IP_addr | 32 or 128 | uimsbf |
|         dest_IP_addr | 32 or 128 | uimsbf |
|         dest_UDP_port | 16 | uimsbf |
|         LSID_DP | 8 | uimsbf |
|         LSID_tsi | 16 | uimsbf |
|         reserved | 6 | '111111' |
|         component_signaling_flag | 1 | bslbf |
|         link_layer_signaling_flag | 1 | bslbf |
|         if(link_layer_signaling_flag=='1'){ | | |
|           link_layer_signaling_data_version | 8 | uimsbf |
|           link_layer_signaling_DP | 8 | uimsbf |
|         } | | |
|       [ROUTE_session_descriptors] | | |
|       [service_descriptors] | | |
|     [partition_descriptors] | | |
|   [FIC_descriptors] | | |
| } | | |

BROADCAST SIGNAL TRANSMISSION APPARATUS, BROADCAST SIGNAL RECEIVING APPARATUS, BROADCAST SIGNAL TRANSMISSION METHOD, AND BROADCAST SIGNAL RECEIVING METHOD

CROSS REFERENCE TO RELATED APPLICATIONS

This application is the National Phase of PCT International Application No. PCT/KR2015/009445, filed on Sep. 8, 2015, which claims priority under 35 U.S.C. 119(e) to U.S. Provisional Application No. 62/049,337, filed on Sep. 11, 2014, all of which are hereby expressly incorporated by reference into the present application.

TECHNICAL FIELD

The present invention relates to a broadcast signal transmitting device, a broadcast signal receiving device, and a broadcast transceiving method.

BACKGROUND ART

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as video/audio data.

DISCLOSURE

Technical Problem

That is, a digital broadcast system may provide a high definition (HD) image, multi-channel audio, and various additional services. However, for digital broadcast, network flexibility obtained by considering data transmission efficiency for a large amount of data transmission, robustness of a transceiving network, and a mobile receiving apparatus needs to be enhanced.

Technical Solution

The object of the present invention can be achieved by providing a according to an embodiment of the present invention, a method of transmitting a broadcast signal includes encoding media data in a media stream, generating signaling information for signaling the media stream, multiplexing the encoded media stream and the signaling information, and transmitting a broadcast signal including the multiplexed media stream and the signaling information.

The signaling information may include information for rapid service scan and acquisition.

The information for rapid service scan and acquisition may signal a location for transmitting service layer signaling or link layer signaling.

The signaling information may include service signaling such as User Service Bundle Description (USBD).

The signaling information may include service layer signaling.

The service layer signaling may include a header and the header may include filtering information.

The filtering information may include signaling identifier information and version information.

The signaling information may include physical layer signaling, signaling for rapid service scan and acquisition, and service layer signaling, the physical layer signaling may signal whether signaling for the rapid service scan and acquisition is parsed, the signaling for rapid service scan and acquisition may signal a location of the service layer signaling or link layer signaling, the link layer signaling may signal link layer information on a transfer packet including the media stream data, and the service layer signaling may signal a location of the media stream.

In another aspect of the present invention, provided herein is a according to an embodiment of the present invention, an apparatus for transmitting a broadcast signal includes an encoder configured to encode media data into a media stream, a signaling generator configured to generate signaling information for signaling the media stream, a multiplexer configured to multiplex the encoded media stream and the signaling information, and a transmitter configured to transmit a broadcast signal including the multiplexed media stream and the signaling information.

The signaling information may include information for rapid service scan and acquisition.

The information for rapid service scan and acquisition may signal a location for transmitting service layer signaling or link layer signaling.

The signaling information may include service signaling such as User Service Bundle Description (USBD).

The signaling information may include service layer signaling.

The service layer signaling may include a header and the header may include filtering information.

The filtering information may include signaling identifier information and version information.

The signaling information may include physical layer signaling, signaling for rapid service scan and acquisition, and service layer signaling, the physical layer signaling may signal whether signaling for the rapid service scan and acquisition is parsed, the signaling for rapid service scan and acquisition may signal a location of the service layer signaling or link layer signaling, the link layer signaling may signal link layer information associated with a transfer packet including the media stream, and the service layer signaling may signal a location of the media stream.

In another aspect of the present invention, provided herein is a according to an embodiment of the present invention, a method of receiving a broadcast signal includes receiving a broadcast signal, the broadcast signal including a multiplexed media stream and signaling information for signaling the media stream, demultiplexing the broadcast signal to acquire the signaling information, and acquiring a media stream using the signaling information.

The signaling information may include service layer signaling including a header, the header may include filtering information, and the filtering information may include signaling identifier information and version information.

In another aspect of the present invention, provided herein is a according to an embodiment of the present invention, an apparatus for receiving a broadcast signal includes a receiver configured to receive a broadcast signal, the broadcast signal including a multiplexed media stream and signaling information for signaling the media stream, a demultiplexer configured to demultiplex the broadcast signal to acquire the signaling information, and a processor configured to acquire a media stream using the signaling information.

The signaling information may include service layer signaling including a header, the header may include filtering information, and the filtering information may include signaling identifier information and version information.

Advantageous Effects

According to the present invention, various broadcast services may be provided by processing data according to service properties and controlling quality of service (QoS) of each service or service component.

According to the present invention, transmission flexibility may be achieved by transmitting various broadcast services through the same radio frequency (RF) signal bandwidth.

According to the present invention, data transmission efficiency and transceiving robustness of a broadcast signal may be enhanced using a multiple-input multiple-output (MIMO) system.

The present invention may provide a broadcast signal transmission and reception method for receiving a digital broadcast signal without error even if a mobile receiving apparatus is used or a current environment is an indoor environment.

According to the present invention, rapid service scan and service acquisition may be provided.

According to the present invention, location information on an associated component may be provided.

According to the present invention, service layer signaling may be selectively parsed using filtering information.

DESCRIPTION OF DRAWINGS

The accompanying drawings, which are included to provide a further understanding of the invention, illustrate embodiments of the invention and together with the description serve to explain the principle of the invention.

In the drawings:

FIG. 12 illustrates PLS1 data according to an embodiment of the present invention.

FIG. 13 illustrates PLS2 data according to an embodiment of the present invention.

FIG. 23 illustrates a diagonal-wise reading pattern of a twisted row-column block interleaver according to an embodiment of the present invention.

FIG. 24 illustrates interlaved XFECBLOCKs from each interleaving array according to an embodiment of the present invention.

FIG. 25 illustrates signaling for single-memory deinterleaving irrespective of the number of symbols in a frame according to an embodiment of the present invention.

FIG. 26 illustrates FI schemes of FSS in signaling for single-memory deinterleaving irrespective of the number of symbols in a frame according to an embodiment of the present invention.

FIG. 27 illustrates operation of a reset mode in signaling for single-memory deinterleaving irrespective of the number of symbols in a frame according to an embodiment of the present invention.

FIG. 28 illustrates equations indicating input and output of the frequency interleaver in signaling for single-memory deinterleaving irrespective of the number of symbols in a frame according to an embodiment of the present invention.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

FIG. 37 shows equations representing block interleaving according to an embodiment of the present invention.

FIG. 39 shows equations representing reading operation after insertion of virtual FEC blocks according to an embodiment of the present invention.

FIG. 41 shows equations representing a process of determining a shift value and a maximum TI block size according to an embodiment of the present invention.

FIG. 42 illustrates writing operation according to an embodiment of the present invention.

FIG. 43 illustrates reading operation according to an embodiment of the present invention.

FIG. 44 illustrates a result of skip operation in reading operation according to an embodiment of the present invention.

FIG. 45 shows a writing process of time deinterleaving according to an embodiment of the present invention.

FIG. 46 illustrates a writing process of time deinterleaving according to another embodiment of the present invention.

FIG. 47 shows equations representing reading operation of time deinterleaving according to another embodiment of the present invention.

FIG. 59 illustrates a method of transmitting signaling data in a next generation broadcast system according to an embodiment of the present invention.

FIG. 60 shows signaling data transmitted by a next generation broadcast system according to an embodiment of the present invention for rapid broadcast service scan of a receiver.

FIG. 61 shows signaling data transmitted by a next generation broadcast system according to an embodiment of the present invention for rapid broadcast service scan of a receiver.

FIG. 63 shows signaling data transmitted by a next generation broadcast system according to an embodiment of the present invention for rapid broadcast service scan of a receiver.

FIG. 65 is a diagram illustrating a service signaling message format of a next generation broadcast system according to an embodiment of the present invention.

FIG. 66 shows a service signaling table used in a next generation broadcast system according to an embodiment of the present invention.

FIG. 67 is a diagram illustrating a service mapping table used in a next generation broadcast system according to an embodiment of the present invention.

FIG. 68 shows a service signaling table of a next generation broadcast system according to an embodiment of the present invention.

FIG. 70 illustrates a component mapping table description according to an embodiment of the present invention.

FIG. 71 shows syntax of a component mapping table of a next generation broadcast system according to an embodiment of the present invention.

FIG. 72 illustrates a method for delivering signaling associated with each service over a broadband network in a next generation broadcast system according to an embodiment of the present invention.

FIG. 73 illustrates a method for signaling MPD in a next generation broadcast system according to an embodiment of the present invention.

FIG. 74 shows syntax of an MPD delivery table of a next generation broadcast system according to an embodiment of the present invention.

FIG. 75 shows a description of a transmission session instance of a next generation broadcast system according to an embodiment of the present invention.

FIG. 76 shows a SourceFlow element of a next generation broadcast system according to an embodiment of the present invention.

FIG. 77 shows an EFDT of a next generation broadcast system according to an embodiment of the present invention.

FIG. 79 shows a delivery structure of a signaling message of a next generation broadcast system according to an embodiment of the present invention.

FIG. 80 illustrates signaling data transmitted for rapidly scanning a broadcast service of a receiver of a next-generation broadcast system according to an embodiment of the present invention.

FIG. 81 illustrates signaling data transmitted for rapidly scanning a broadcast service of a receiver of a next-generation broadcast system according to an embodiment of the present invention.

FIG. 82 illustrates component mapping table description according to an embodiment of the present invention.

FIG. 83 illustrates component mapping table description according to an embodiment of the present invention.

FIGS. 84 and 85 illustrate component mapping table description according to an embodiment of the present invention.

FIG. 86 illustrates component mapping table description according to an embodiment of the present invention.

FIG. 87 is a diagram illustrating common attributes and elements of MPD according to an embodiment of the present invention.

FIG. 88 is a diagram illustrating a transfer session instance description according to an embodiment of the present invention.

FIG. 89 illustrates SourceFlow element of another next-generation broadcast system according to an embodiment of the present invention.

FIG. 90 illustrates signaling data transmitted to rapidly scan a broadcast service by a receiver in a next-generation broadcast system according to another embodiment of the present invention.

FIG. 91 illustrates signaling data transmitted for rapid scan of a broadcast service of a receiver by a next-generation broadcast system according to another embodiment of the present invention.

BEST MODE

Figure 1:
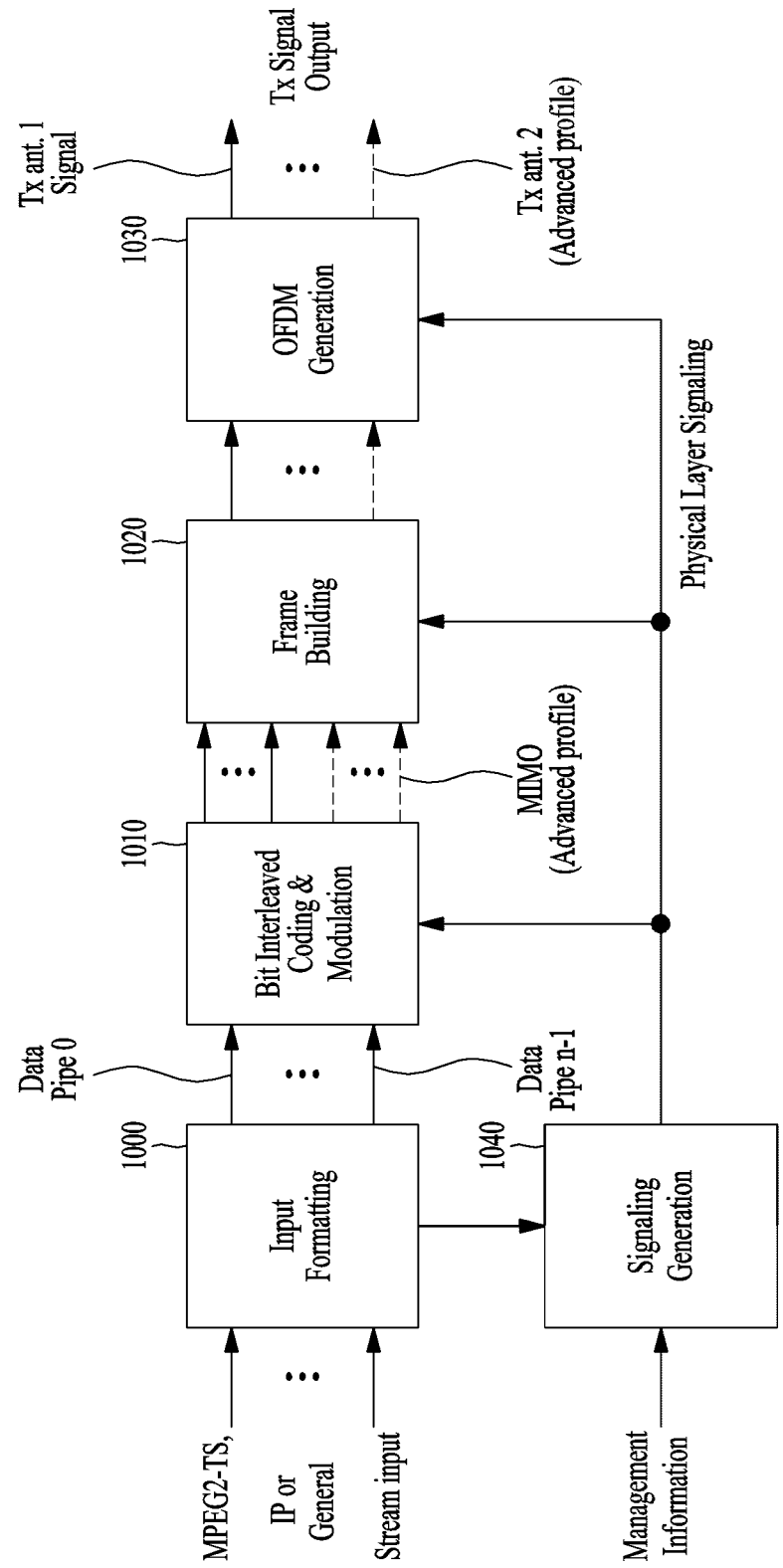
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | $\leq 2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |

TABLE 3-continued

| | |
|---|---|
| Time de-interleaving memory size | $\leq 2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8-bit field identifies uniquely a DP within the system identified by the SYSTEM_ID dummy cell: cell carrying a pseudo-random value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame quick information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcast system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for quick initial band scan to detect the system signal, its timing, frequency offset, and FFT-size.

reserved for future use: not defined by the present document but may be defined in future super-frame: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
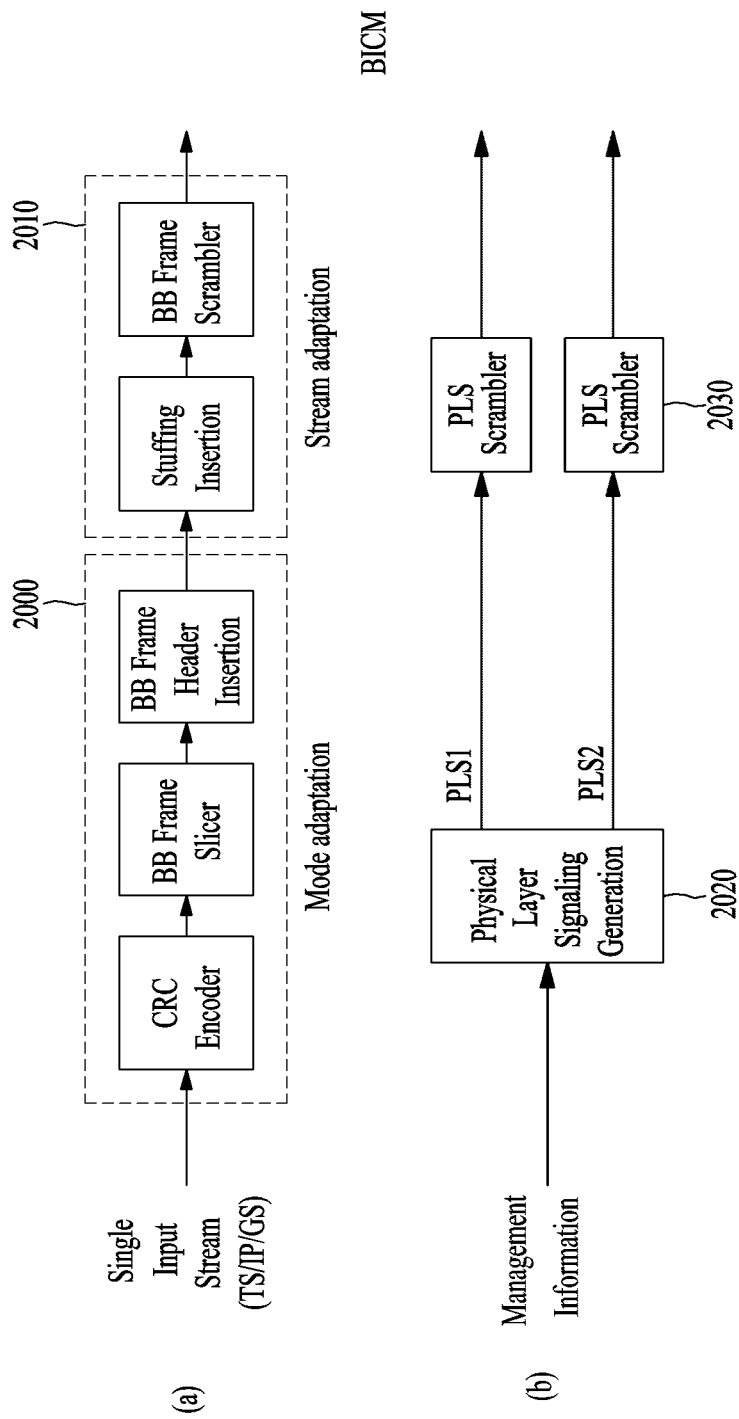
FIG. 2 illustrates an input formatting block according to one embodiment of the present invention.
Figure 3:
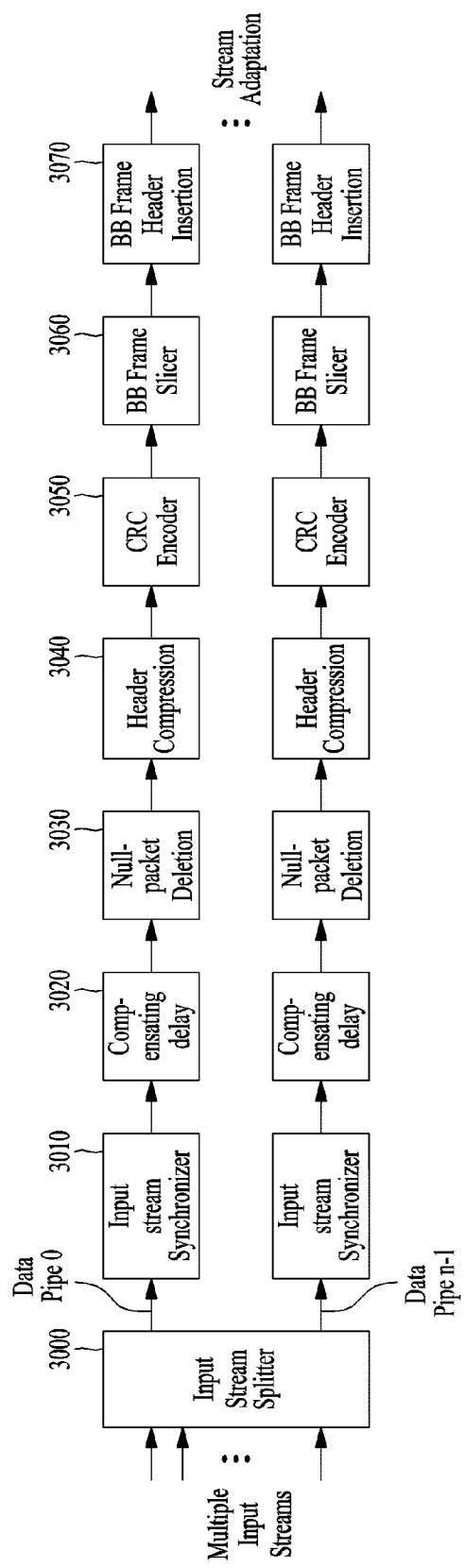
FIG. 3 illustrates an input formatting block according to another embodiment of the present invention.
Figure 4:
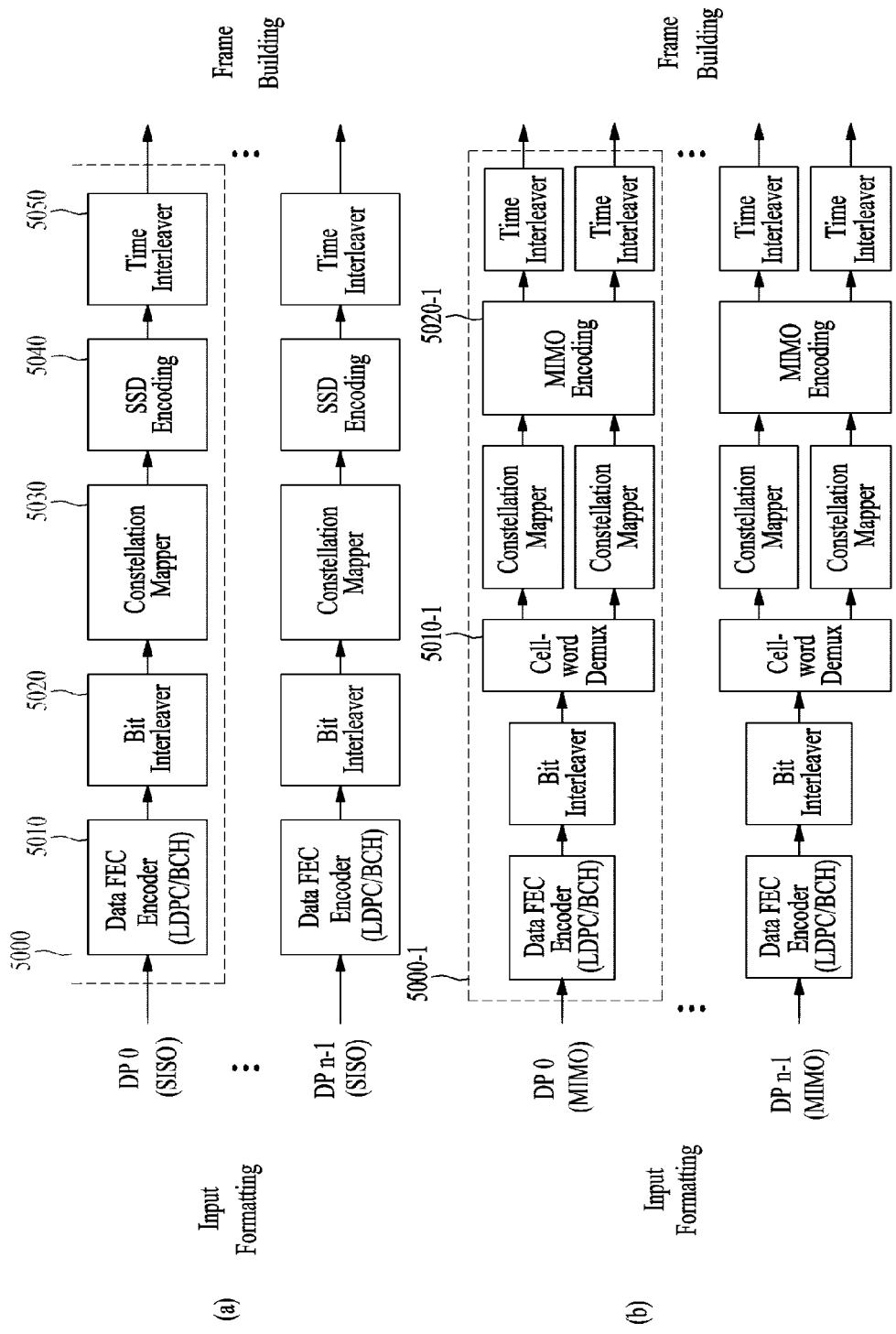
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-

TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2 -STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, el. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output ($g_{1,i}$ and $g_{2,i}$) is transmitted by the same carrier k and OFDM symbol l of their respective TX antennas.

The above-described blocks may be omitted or replaced by blocks having similar or identical functions.

Figure 5:
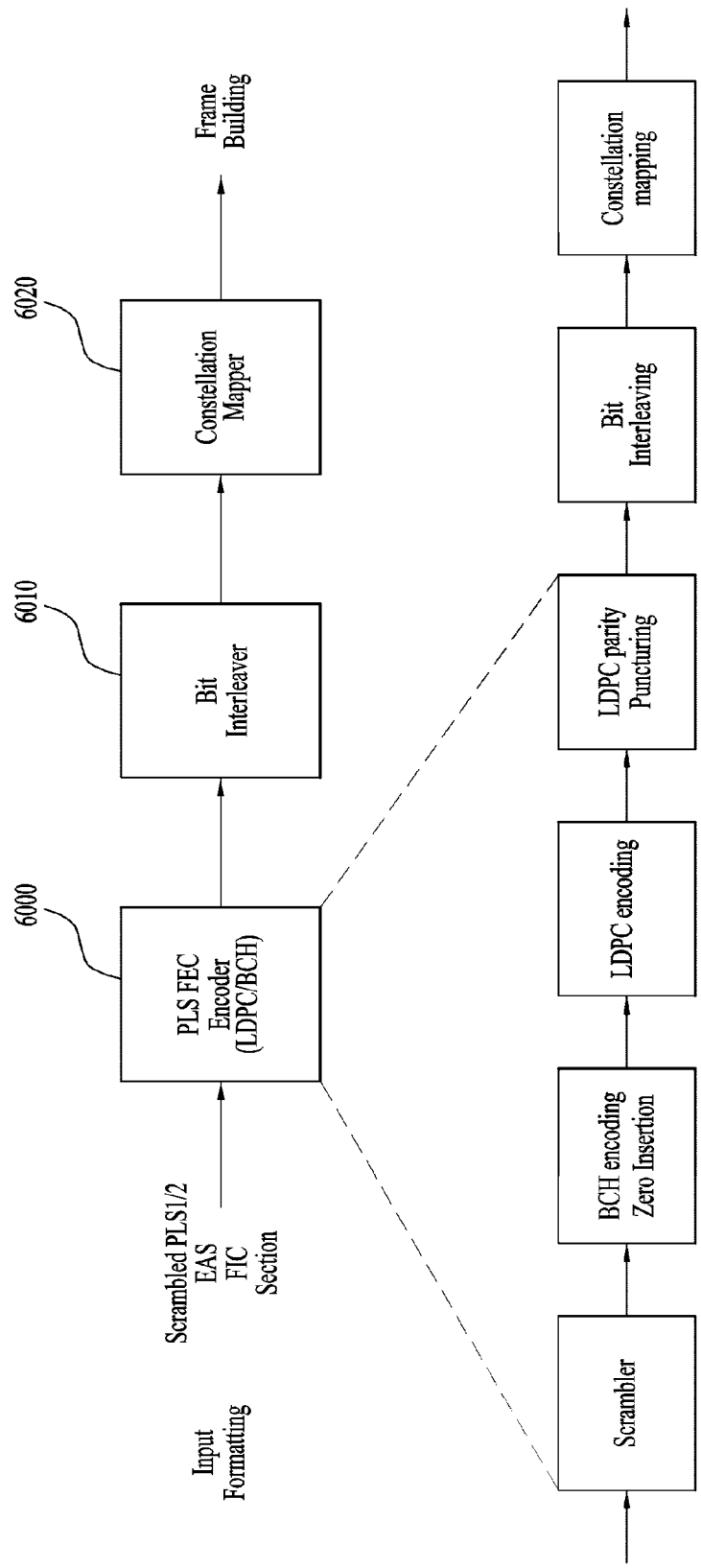
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and quick information channel (FIC). EAC is a part of a frame that carries EAS information data and FIC is a logical channel in a frame that carries the mapping information between a service and the corresponding base DP. Details of the EAC and FIC will be described later.

Figure 6:
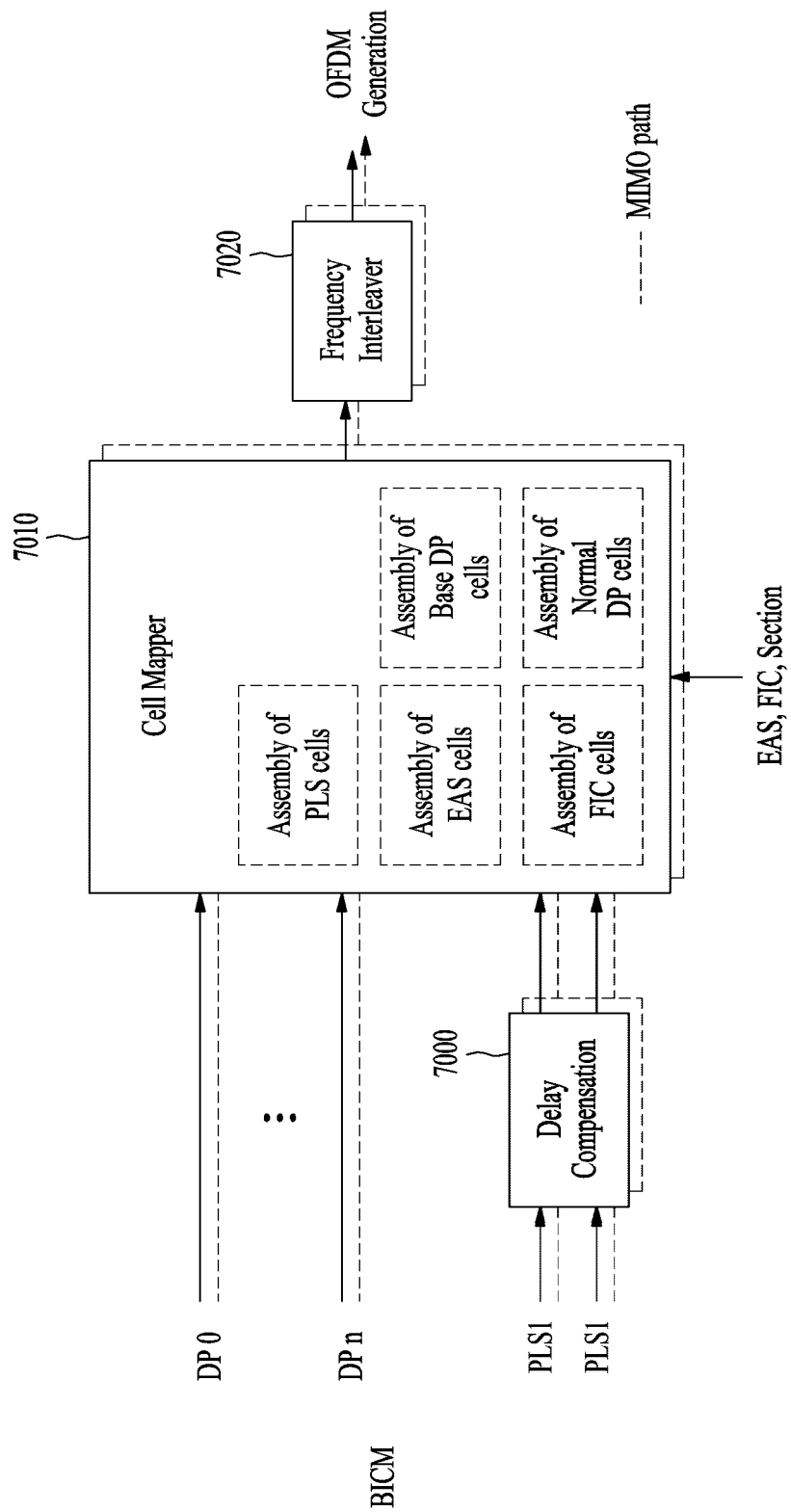
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS 1 data only, the output bits of the zero insertion may be permutted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC code parameters for PLS 1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 3 |
| PLS2 <1021 | | | | | | | | |
| >1020 | 2100 | | 2160 | 7200 | 5040 | 3/10 | 56 |

The LDPC parity puncturing block can perform puncturing on the PLS1 data and PLS2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit ineterlaeved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
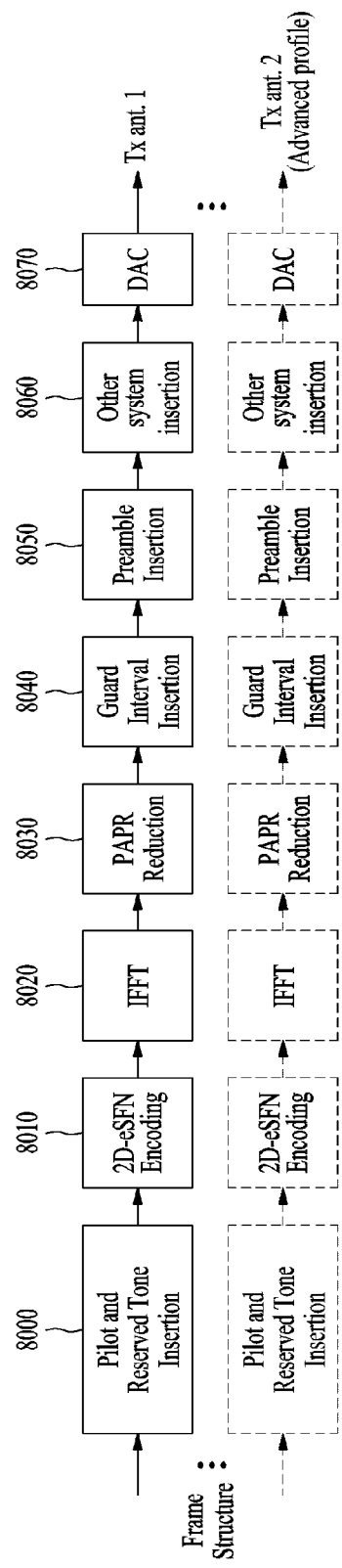
FIG. 7 illustrates an orthogonal frequency division multiplexing (OFDM) generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Quick Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
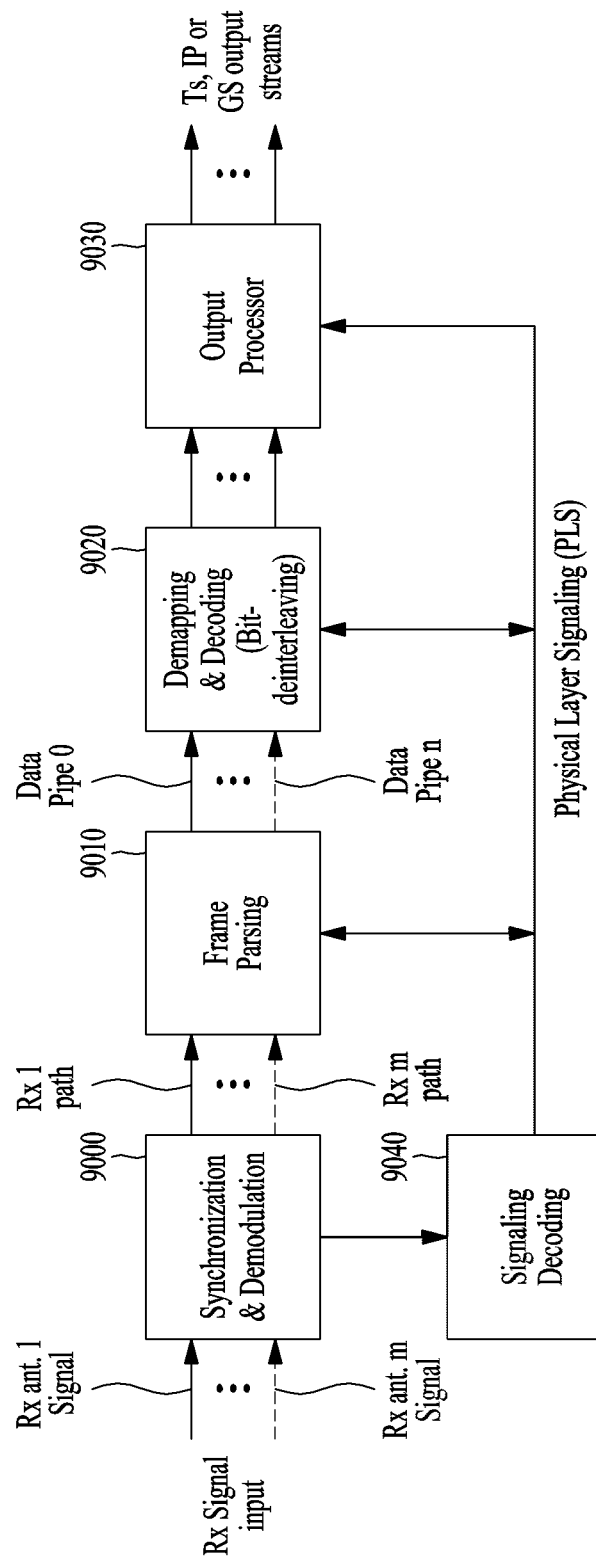
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
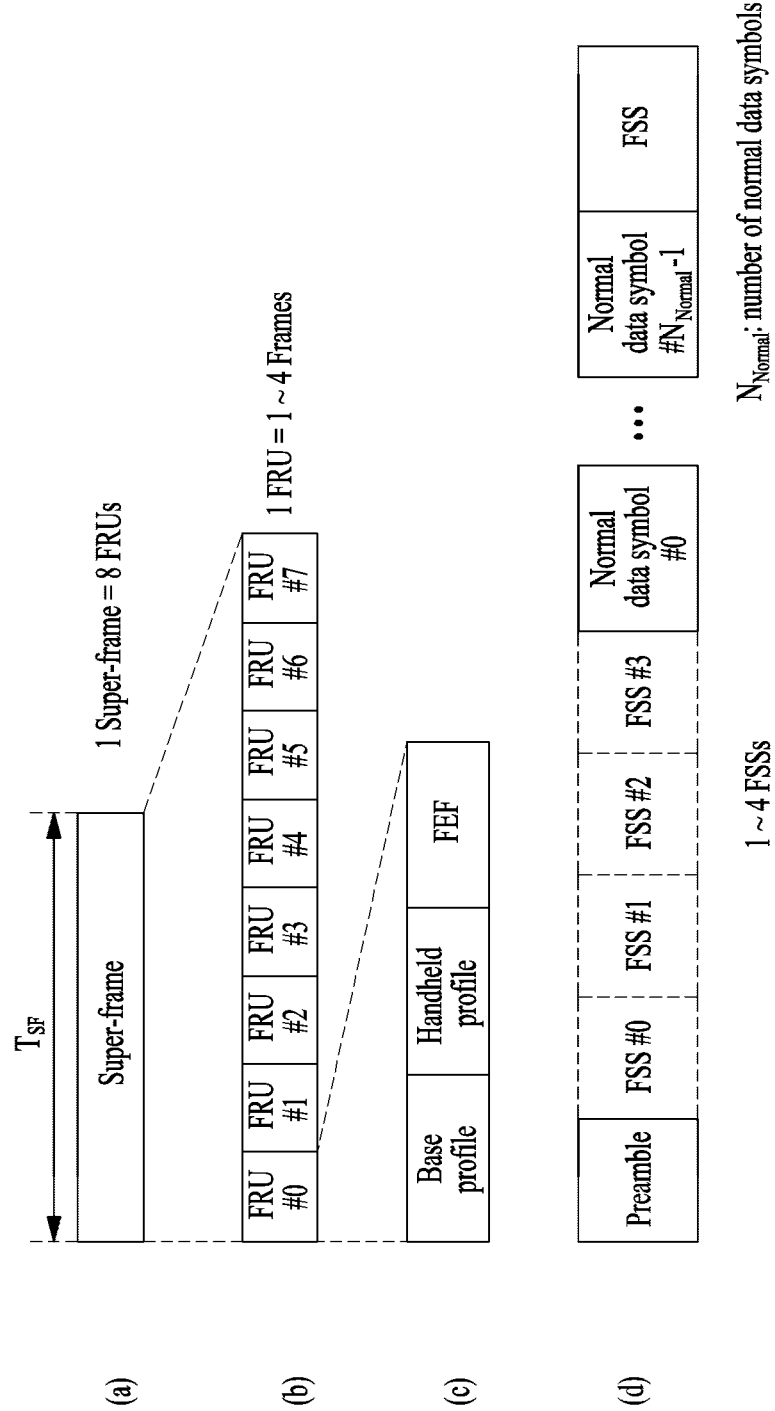
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables quick Futurecast UTB system signal detection and provides a set of basic transmission parameters for efficient transmission and reception of the signal. The detailed description of the preamble will be will be described later.

The main purpose of the FSS(s) is to carry the PLS data. For quick synchronization and channel estimation, and hence quick decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 10, 11:
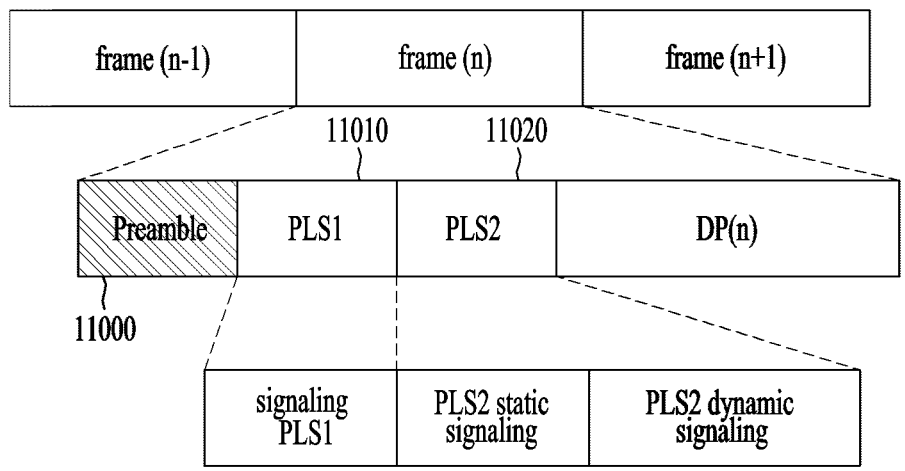
FIG. 10 illustrates a signaling hierarchy structure of the frame according to an embodiment of the present invention.
FIG. 11 illustrates preamble signaling data according to an embodiment of the present invention.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 11 | FEF |

FFT_SIZE: This 2 bit field indicates the FFT size of the current frame within a frame-group, as described in below table 6.

TABLE 6

| Value | FT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/4 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If this field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' ( EF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE= X1X | Advanced profile present | Advanced profile present | Handheld profile present | Handheld profile present |
| FRU_CONFIGURE= XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
| --- | --- |
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
| --- | --- |
| 000 | BPSK |
| 001 | QPSK |
| 010 | QAM-16 |

TABLE 11-continued

| Value | PLS2_MODE |
| --- | --- |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Valu | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | P |
| 10 | GS |
| 11 | reserved |

DP_INBAND_MODE: This 2-bit field indicates whether the current DP carries in-band signaling information. The in-band signaling type is signaled according to the below table 20.

TABLE 20

| alue | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| If DP_PAYLOAD_TYPE Value Is TS | If DP_PAYLOAD_TYPE Is IP | If DP_PAYLOAD_TYPE Is GS |
|---|---|---|
| 00 MPEG2-TS | IPv4 | (Note) |
| 01 Reserved | IPv6 | Reserved |
| 10 Reserved | Reserved | Reserved |
| 11 Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
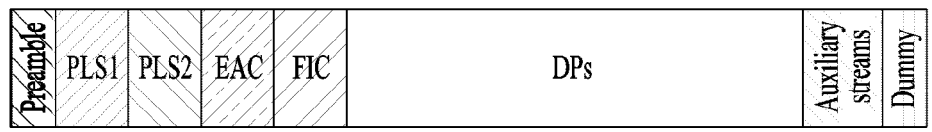
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the content of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| | DP_START field size | |
|---|---|---|
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023.

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
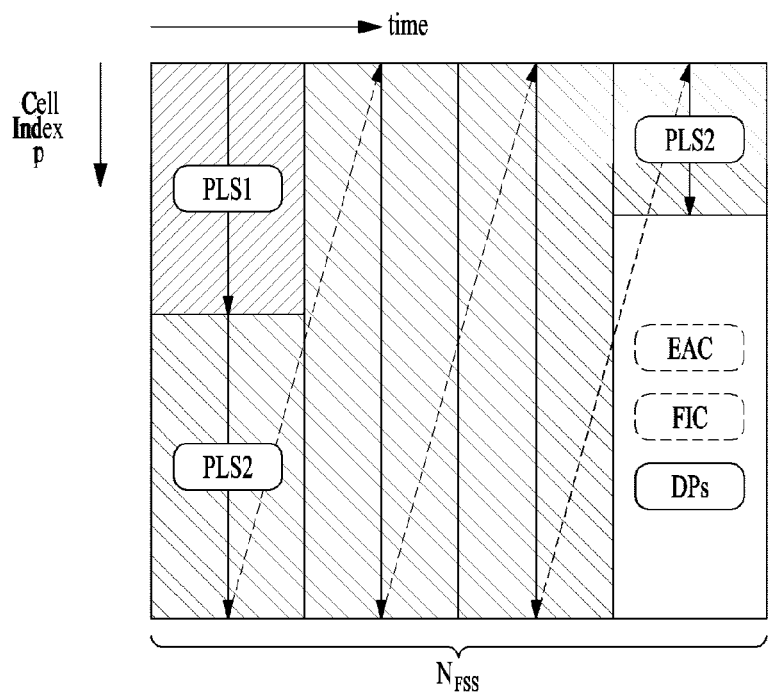
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing quick synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
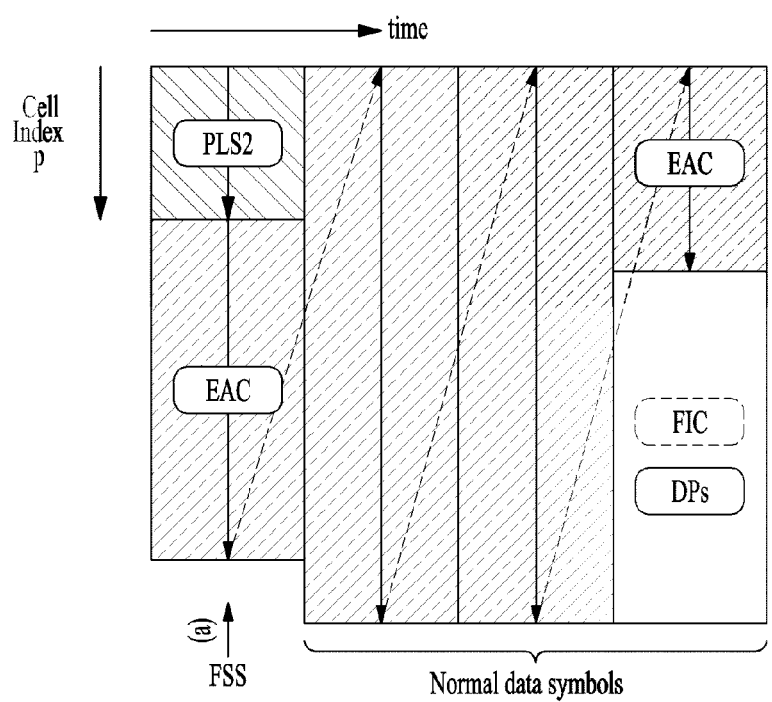
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
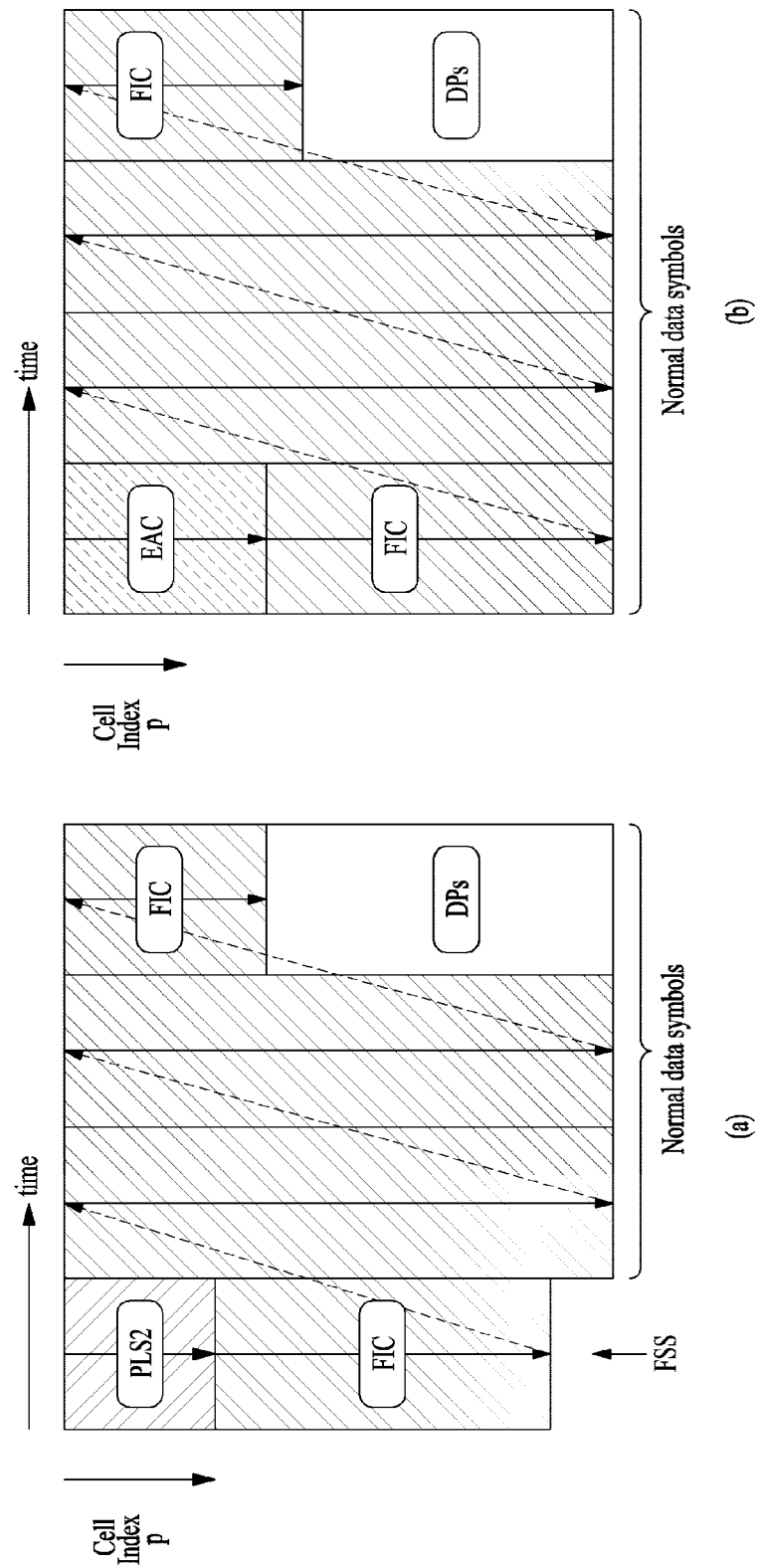
FIG. 18 illustrates FIC mapping according to an embodiment of the present invention.

FIG. 18 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable quick service acquisition and channel scan. This information primarily includes channel binding information between DPs and the services of each broadcaster. For quick scan, a receiver can decode FIC and obtain information such as broadcaster ID, number of services, and BASE_DP_ID. For quick service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
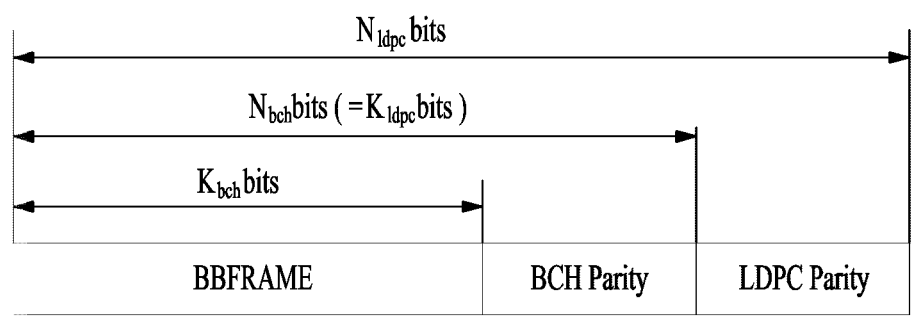
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
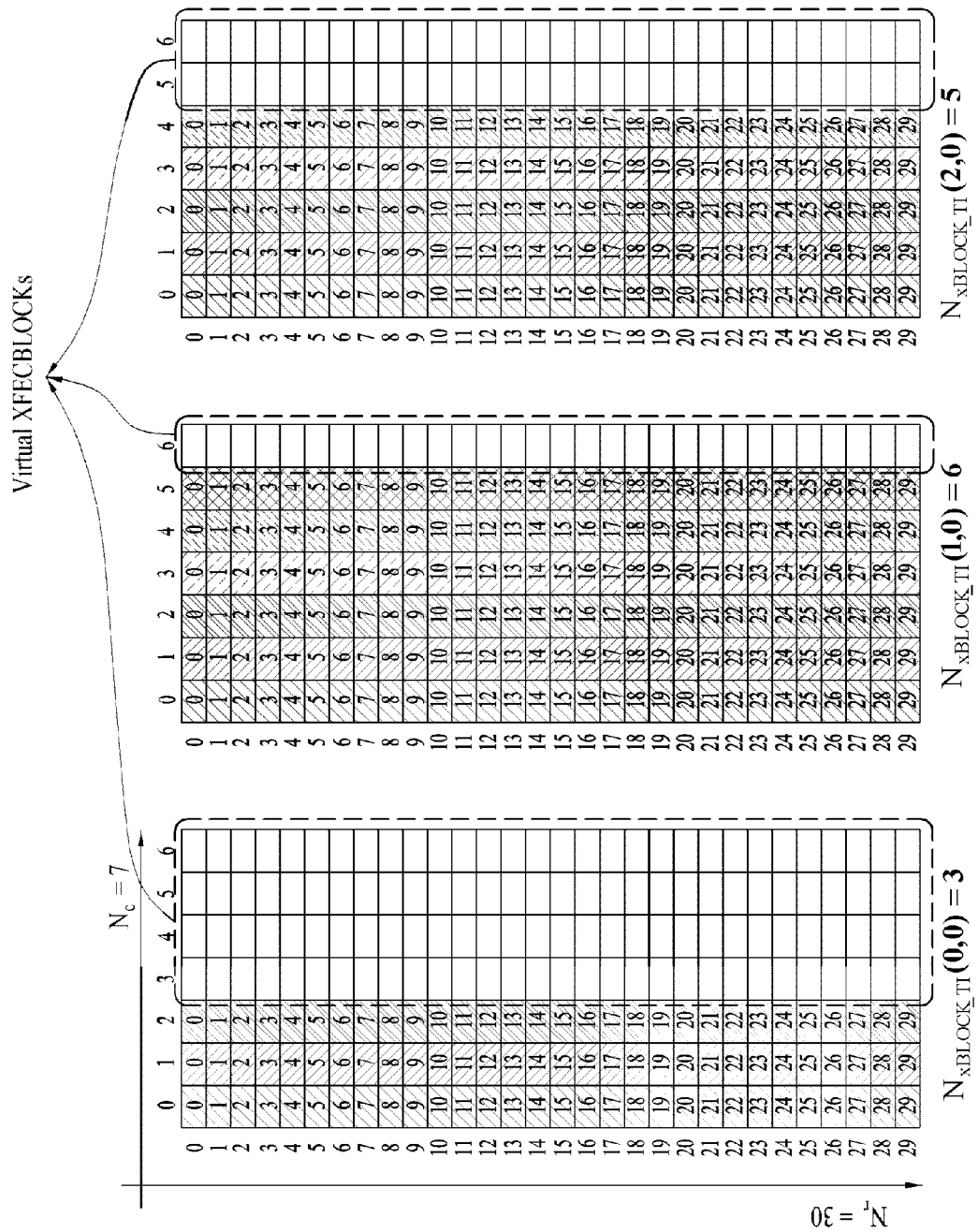
FIG. 22 illustrates an operation of a twisted row-column block interleaver according to another embodiment of the present invention.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/1 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/5 | | 1880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as follow equation.

$$B_{ldpc} = [I_{ldpc}\ P_{ldpc}] = [i_0, i_1, \ldots, i_{K_{ldpc}-1}, p_0, p_1, \ldots, p_{N_{ldpc}-K_{ldpc}-1}]$$ [Equation 2]

The parameters for long FECBLOCK and short FECBLOCK are given in Tables 28 and 29 above, respectively.

The detailed procedure to calculate $N_{ldpc} - K_{ldpc}$ parity bits for long FECBLOCK, is as follows:

1) Initialize the parity bits, $$p_0 = p_1 = p_2 = \ldots = p_{N_{ldpc}-K_{ldpc}-1} = 0$$ [Equation 3]

2) Accumulate the first information bit-i0, at parity bit addresses specified in the first row of an addresses of parity check matrix. The details of addresses of parity check matrix will be described later. For example, for rate 13/15:

$$p_{983} = p_{983} \oplus i_0\ p_{2815} = p_{2815} \oplus i_0$$

$$p_{4837} = p_{4837} \oplus i_0\ p_{4989} = p_{4989} \oplus i_0$$

$$p_{6138} = p_{6138} \oplus i_0\ p_{6458} = p_{6458} \oplus i_0$$

$$p_{6921} = p_{6921} \oplus i_0\ p_{6974} = p_{6974} \oplus i_0$$

$$p_{7572} = p_{7572} \oplus i_0\ p_{8260} = p_{8260} \oplus i_0$$

$$p_{8496} = p_{8496} \oplus i_0$$ [Equation 4]

3) For the next 359 information bits, is, s=1, 2, . . . , 359 accumulate is at parity bit addresses using following equation.

$$\{x + (s \bmod 360) \times Q_{ldpc}\} \bmod (N_{ldpc} - K_{ldpc})$$ [Equation 5]

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1\ p_{2839} = p_{2839} \oplus i_1$$

$$p_{4861} = p_{4861} \oplus i_1\ p_{5013} = p_{5013} \oplus i_1$$

$$p_{6162} = p_{6162} \oplus i_1\ p_{6482} = p_{6482} \oplus i_1$$

$$p_{6945} = p_{6945} \oplus i_1\ p_{6998} = p_{6998} \oplus i_1$$

$$p_{7556} = p_{7556} \oplus i_1\ p_{8281} = p_{8281} \oplus i_1$$

$$p_{8520} = p_{8520} \oplus i_1$$ [Equation 6]

4) For the 361st information bit $i_{360}$, the addresses of the parity bit accumulators are given in the second row of the addresses of parity check matrix. In a similar manner the addresses of the parity bit accumulators for the following 359 information bits $i_s$, s=361, 362, . . . , 719 are obtained using the equation 6, where x denotes the address of the parity bit accumulator corresponding to the information bit $i_{360}$, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldpc} - K_{ldpc} - 1$$ [Equation 7]

Herein, final content of $p_i$, i=0,1, . . . $N_{ldpc} - K_{ldpc} - 1$ is equal to the parity bit $p_i$.

TABLE 30

| Code Rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 20:
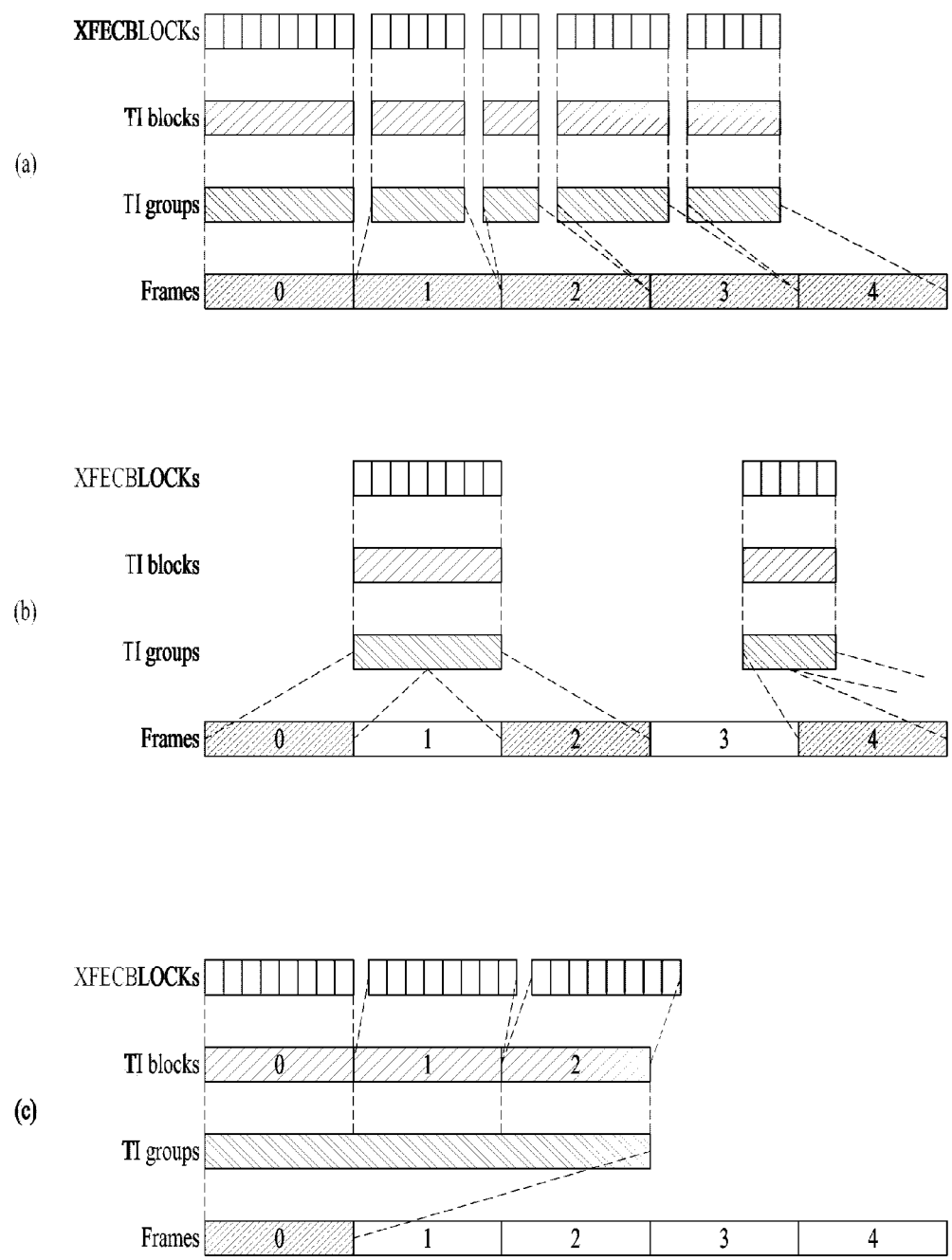
FIG. 20 illustrates a time interleaving according to an embodiment of the present invention.

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks(NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
|---|---|
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r=N_{cells}$ while the number of columns $N_c$ is equal to the number $N_{xBLOCK\_TI}(n,s)$.

Figure 21:
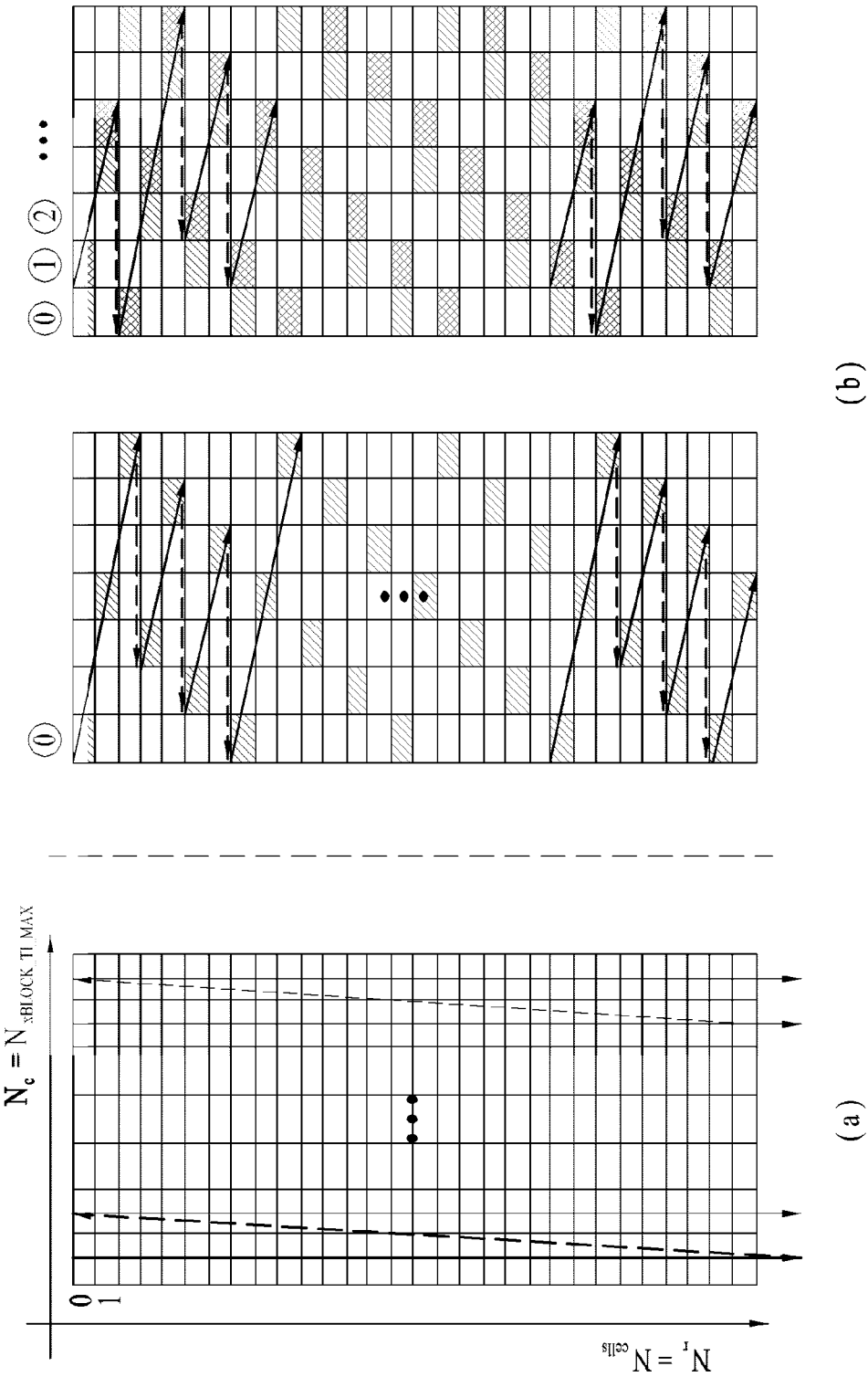
FIG. 21 illustrates the basic operation of a twisted row-column block interleaver according to an embodiment of the present invention.

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

$$\text{GENERATE}(R_{n,s,i}, C_{n,s,i}) = \qquad \text{[Equation 8]}$$
$$\{$$
$$R_{n,s,i} = \text{mod}(i, N_r),$$
$$T_{n,s,i} = \text{mod}(S_{shift} \times R_{n,s,i}, N_c),$$
$$C_{n,s,i} = \text{mod}\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows equation.

[Equation 9]

for $$\begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases}$$

$$S_{shift} = \frac{N'_{xBLOCK\_TI\_MAX} - 1}{2}$$

As a result, the cell positions to be read are calculated by a coordinate as $Z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}(0,0)=3$ $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'_{xBLOCK\_TI\_MAX}$ by inserting the virtual XFECBLOCKs into the TI memory and the reading process is accomplished as follow equation.

[Equation 10]

$p = 0;$ for $i = 0; i < N_{cells} N'_{xBLOCK\_TI\_MAX}; i = i + 1$

{GENERATE($R_{n,s,i}, C_{n,s,i}$);

$V_i = N_r C_{n,s,j} + R_{n,s,j}$ if $V_i < N_{cells} N_{xBLOCK\_TI}(n, s)$

{

$Z_{n,s,p} = V_i; p = p + 1;$

}

}

The number of TI groups is set to 3. The option of time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX}=6$.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells}$ $N_{xBLOCK\_TI}(n, s)$ the value of Vi is skipped and the next calculated value of Vi is used.

FIG. 24 illustrates interlaved XFECBLOCKs from each interleaving array according to an embodiment of the present invention.

FIG. 24 illustrates the interleaved XFECBLOCKs from each interleaving array with parameters of $N'_{xBLOCK\_TI\_MAX}=7$ and Sshift=3.

FIG. 25 illustrates signaling for single-memory deinterleaving irrespective of the number of symbols in a frame according to an embodiment of the present invention.

As described above, the frequency interleaver according to the present invention performs interleaving using different interleaving sequences in a plurality of OFDM symbols, but the frequency deinterleaver may perform single-memory deinterleaving on the received OFDM symbols.

The present invention proposes a method for performing single-memory deinterleaving by the frequency deinterleaver irrespective of whether the number of OFDM symbols in one frame is an even number or an odd number. To this end, the above-described architecture of the frequency interleaver may operate differently depending on whether the number of OFDM symbols is an even number or an odd number. Furthermore, signaling information related thereto may be additionally defined in the above-described preamble and/or the physical layer signal (PLS). As such, single-memory deinterleaving is not limited to a case in which the number of OFDM symbols is an even number, and may always be enabled.

Here, the PLS may be transmitted in a frame starting symbol (FSS) of every frame. Alternatively, according to another embodiment, the PLS may be transmitted in the first OFDM symbol. Otherwise, based on whether the PLS is present, signaling information corresponding to the PLS may be completely transmitted in the preamble. Or, signaling information corresponding to the preamble and/or the PLS may be transmitted in bootstrap information. The bootstrap information may be an information part located in front of the preamble.

Information about, for example, a processing operation used by the frequency interleaver of the transmitter may include an FI_mode field and an N_sym field.

The FI_mode field may be a 1-bit field which can be located in the preamble. The FI_mode field may indicate an interleaving scheme used in the FSS or the first OFDM symbol of every frame.

The interleaving scheme indicated as the FI_mode field may include FI scheme #1 and FI scheme #2.

FI scheme #1 can indicate that the frequency interleaver of the transmitter performs random writing operation and then linear reading operation on the FSS. This case may correspond to a case in which the FI_mode field value is 0. The random writing or linear reading operation may be performed in or from memory using a value generated by an arbitrary random sequence generator using, for example, a pseudo-random binary sequence (PRBS). Here, linear reading may refer to sequentially reading operation.

FI scheme #2 can indicate that the transmitter performs linear writing operation and then random reading operation on the FSS. This case may correspond to a case in which the FI_mode field value is 1. Likewise, the linear writing or random reading operation may be performed in or from memory using a value generated by an arbitrary random sequence generator using, for example, PRBS. Here, linear writing may refer to a sequentially writing operation.

In addition, the FI_mode field may indicate an interleaving scheme used in a frame edge symbol (FES) or the last OFDM symbol of every frame. The interleaving scheme applied to the FES may be indicated differently from the value of the N_sym field transmitted by the PLS. That is, the interleaving scheme indicated as the FI_mode field may differ depending on whether the number of OFDM symbols is an odd number or an even number. Mapping information between the two fields may be predefined as a table by the transmitter and the receiver.

The FI_mode field may be defined and transmitted in a part of the frame other than the preamble according to another embodiment.

The N_sym field may be a field which can be located in the PLS part. The number of bits of the N_sym field is variable according to embodiments. The N_sym field may indicate number of OFDM symbols included in one frame. As such, the receiver can acquire information about whether the number of OFDM symbols is an even number or an odd number.

Operation of the frequency deinterleaver corresponding to the frequency interleaver irrespective of the number of OFDM symbols in one frame is as described below. This frequency deinterleaver may perform single-memory deinterleaving by utilizing the proposed signaling fields irrespective of whether the number of OFDM symbols is an even number or an odd number.

Initially, the frequency deinterleaver may perform frequency deinterleaving on the FSS using information of the FI_mode field of the preamble because the frequency interleaving scheme used in the FSS is indicated as the FI_mode.

The frequency deinterleaver may perform frequency deinterleaving on the FES using signaling information of the FI_mode field and signaling information of the N_sym field of the PLS. In this case, the mapping information between the two fields may be acquired using the predefined table. A description of the predefined table will be given below.

Overall deinterleaving operation on the other symbols may be performed inversely from the interleaving operation of the transmitter. That is, on a pair of contiguously input OFDM symbols, the frequency deinterleaver may perform deinterleaving using one interleaving sequence. Here, the interleaving sequence may be an interleaving sequence used by the frequency interleaver for reading & writing. The frequency deinterleaver may perform reading & writing operation inversely using the interleaving sequence.

However, the frequency deinterleaver according to the present invention may not use a ping pong architecture using double memories. The frequency deinterleaver may perform deinterleaving on contiguously input OFDM symbols using a single memory. As such, the efficiency of using memory by the frequency deinterleaver may be increased.

FIG. 26 illustrates FI schemes of FSS in signaling for single-memory deinterleaving irrespective of the number of symbols in a frame according to an embodiment of the present invention.

An interleaving scheme applied to frequency interleaving operation may be determined using the above-described FI_mode field and the N_sym field.

In the case of FSS, when the number of OFDM symbols indicated as the N_sym field is an even number, FI scheme #1 may be performed on the FSS irrespective of the FI_mode field value.

When the number of OFDM symbols indicated as the N_sym field is an odd number, FI scheme #1 may be applied to the FSS if the FI_mode field has a value of 0, and FI scheme #2 may be applied to the FSS if the FI_mode field has a value of 1. That is, when the number of OFDM symbols is an odd number, FI schemes #1 and #2 may be alternately applied to the FSS symbols for frequency interleaving.

FIG. 27 illustrates operation of a reset mode in signaling for single-memory deinterleaving irrespective of the number of symbols in a frame according to an embodiment of the present invention.

For frequency interleaving on FES, the above-described symbol offset generator may adopt a reset mode as a new concept. The reset mode may refer to a mode in which a symbol offset value generated by the symbol offset generator is 'O'.

For frequency interleaving on FES, whether to use the reset mode may be determined using the above-described FI_mode field and the N_sym field.

When the number of OFDM symbols indicated as the N_sym field is an even number, the reset mode of the symbol offset generator may not operate (off) irrespective of the value of the FI_mode field.

When the number of OFDM symbols indicated as the N_sym field is an odd number, if the value of the FI_mode field is 0, the symbol offset generator may operate in the reset mode (on). Otherwise, if the value of the FI_mode field is 1, the reset mode of the symbol offset generator may not operate (off). That is, when the number of OFDM symbols is an odd number, the reset mode may be alternately turned on and off for frequency interleaving.

FIG. 28 illustrates equations indicating input and output of the frequency interleaver in signaling for single-memory deinterleaving irrespective of the number of symbols in a frame according to an embodiment of the present invention.

As described above, OFDM symbol pairs of memory bank-A and memory bank-B may be processed through the above-described interleaving operation. As described above, for interleaving, a variety of different interleaving seeds generated by cyclically shifting one main interleaving seed may be used. Here, the interleaving seed may also be called an interleaving sequence. Alternatively, the interleaving seed may also be called an interleaving address value, an address value, or an interleaving address. Here, the term "interleaving address value(s)" can be used for referring plural address values, or for referring an interleaving seed which is a singular. That is, depending on embodiments, interleaving address value(s) can mean H(p) itself, or each addresses belong to H(p).

Input of frequency interleaving to be interleaved within one OFDM symbol may be indicated as Om,l (t50010). Here, data cells may be indicated as xm,l,0, . . . xm,l,Ndata−1. Meanwhile, p may indicate a cell index, l may indicate an OFDM symbol index, and m may indicate a frame index. That is, xm,l,p may indicate a p-th data cell of an l-th OFDM symbol of an m-th frame. Ndata may indicate the number of data cells. Nsym may indicate the number of symbols (frame signaling symbols, normal data symbols, or frame edge symbols).

Data cells which are interleaved based on the above-described operation may be indicated as Pm,l (t50020). The interleaved data cells may be indicated as vm,l,0, . . . vm,l,Ndata−1. Meanwhile, p, l, and m may have the above-described index values.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

A description is now given of frequency interleaving based on FI scheme #1. As described above, frequency interleaving may be performed using an interleaving sequence (interleaving address) of each memory bank.

Interleaving operation on an even symbol (j mod 2=0) may be mathematically expressed as given by equation t51010. On input data x, frequency interleaving may be performed using the interleaving sequence (interleaving address) to acquire output v. Here, p-th input data x may be permuted to be identical to H(p)-th output data v.

That is, on an even symbol (the first symbol), random writing operation may be performed using the interleaving sequence, and then linear reading operation for sequentially reading data may be performed. Here, the interleaving sequence (interleaving address) may be a value generated by an arbitrary random sequence generator using, for example, PRBS.

Interleaving operation on an odd symbol (j mod 2=1) may be mathematically expressed as given by equation t51020. On input data x, frequency interleaving may be performed using the interleaving sequence (interleaving address) to acquire output v. Here, H(p)-th input data x may be permuted to be identical to p-th output data v. That is, compared to the interleaving process performed on the even symbol, the interleaving sequence (interleaving address) may be applied inversely.

That is, on an odd symbol (the second symbol), a linear writing operation for sequentially writing data in memory may be performed, and then random reading operation for randomly reading the data using the interleaving sequence may be performed. Likewise, the interleaving sequence (interleaving address) may be a value generated by an arbitrary random sequence generator using, for example, PRBS.

A description is now given of frequency interleaving based on FI scheme #2.

In the case of frequency interleaving based on FI scheme #2, operation on an even/odd symbol may be performed inversely from the operation based on FI scheme #1.

That is, on the even symbol, linear writing operation may be performed and then random reading operation may be performed as given by equation t51020. In addition, on the odd symbol, random writing operation may be performed and then linear reading operation may be performed as given by equation t51010. A detailed description thereof is the same as that given above in relation to FI scheme #1.

The symbol index 1 may be indicated as 0, 1, ..., $N_{sym}-1$, and the cell index p may be indicated as 0, 1, ..., $N_{data}-1$. According to another embodiment, the frequency interleaving scheme on an even symbol and the frequency interleaving scheme on an odd symbol may be switched. In addition, according to another embodiment, the frequency interleaving scheme based on FI scheme #1 and the frequency interleaving scheme based on FI scheme #2 may be switched.

Figure 30:
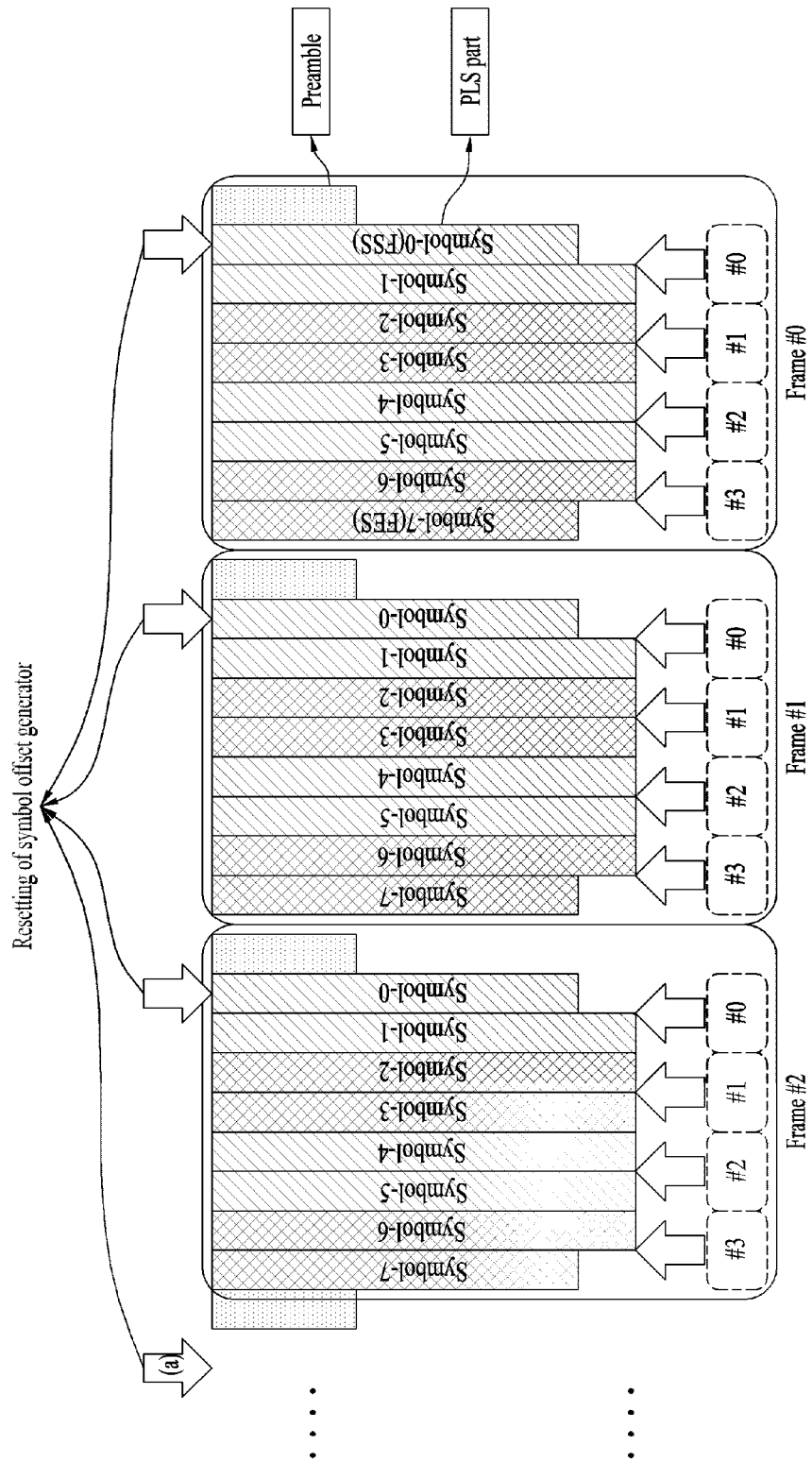
FIG. 30 illustrates an example in which the number of symbols is an even number in signaling for single-memory deinterleaving irrespective of the number of symbols in a frame according to an embodiment of the present invention.

FIG. 30 illustrates an example in which the number of symbols is an even number in signaling for single-memory deinterleaving irrespective of the number of symbols in a frame according to an embodiment of the present invention.

In the current embodiment, the N_sym field may indicate that the number of OFDM symbols in one frame is an even number. The current embodiment assumes that one frame includes one preamble and eight OFDM symbols. According to another embodiment, bootstrap information may be further included in front of the preamble. The bootstrap information is not illustrated.

In the current embodiment, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Accordingly, the first and second symbols may be processed using the same interleaving sequence. In addition, sequence #0 may be used for operation whenever each frame starts. After that, sequences #1 and #2 may be sequentially used for operation of the frequency interleaver/deinterleaver.

Figure 31:
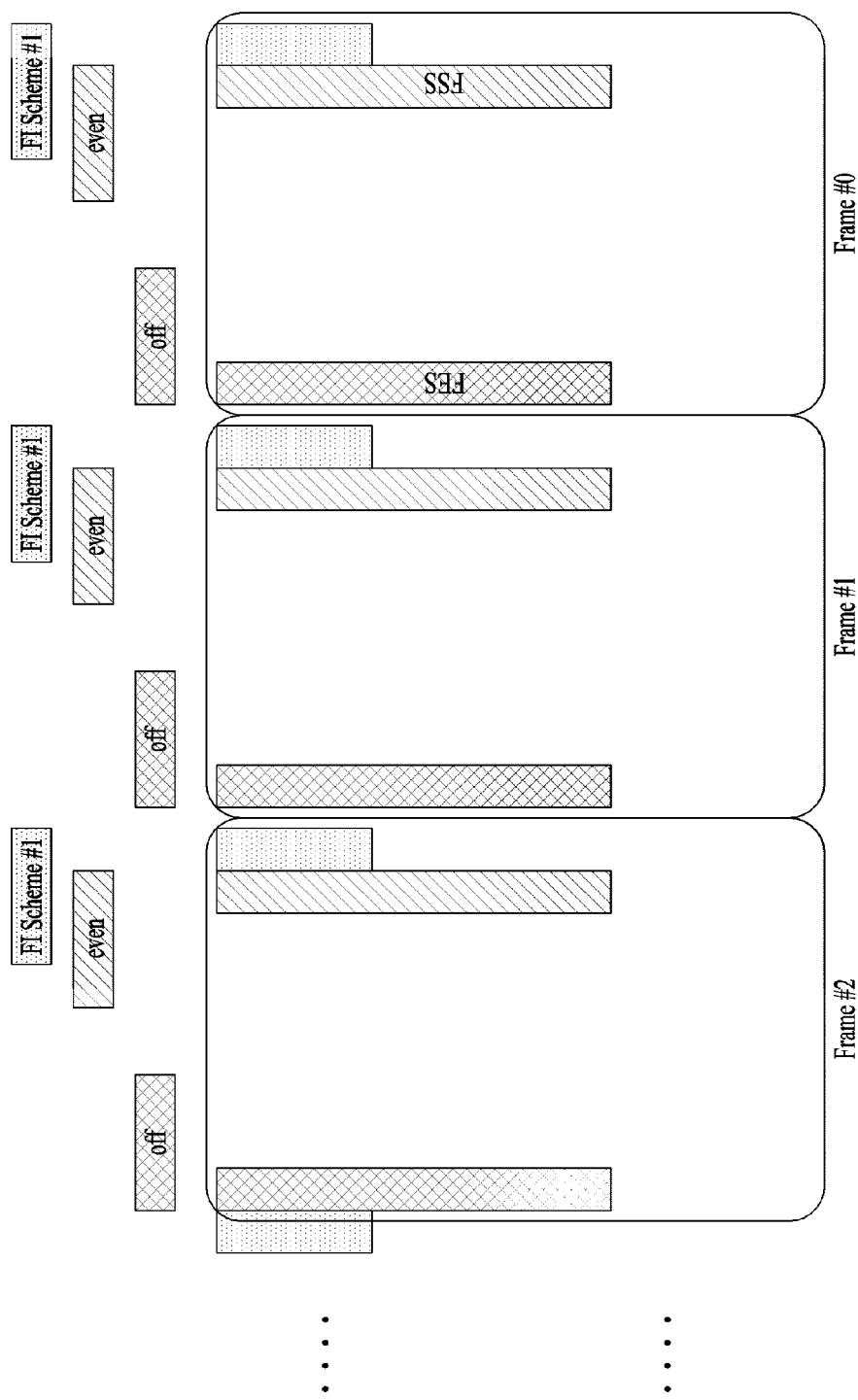
FIG. 31 illustrates an example in which the number of symbols is an even number in signaling for single-memory deinterleaving irrespective of the number of symbols in a frame according to an embodiment of the present invention.

FIG. 31 illustrates an example in which the number of symbols is an even number in signaling for single-memory deinterleaving irrespective of the number of symbols in a frame according to an embodiment of the present invention.

In the first frame, information about an interleaving scheme of the FSS may be acquired from the FI_mode field of the preamble. In the current embodiment, since the number of OFDM symbols is an even number, only FI scheme #1 may be used.

Then, the FSS may be decoded and thus N_sym information may be acquired. The N_sym information indicates that the number of symbols in the current frame is an even number. After that, the acquired FI_mode information and the N_sym information may be used when the frequency deinterleaver decodes the FES. Since the number of symbols is an even number, the symbol offset generator does not operate in the above-described reset mode. That is, the reset mode may be in an off state.

Subsequently, even in another frame, since an even number of OFDM symbols are included, the frequency deinterleaver may operate in the same manner. That is, the FI scheme to be used in the FSS is FI scheme #1, and the reset mode to be used in the FES may be in an off state.

Figure 32:
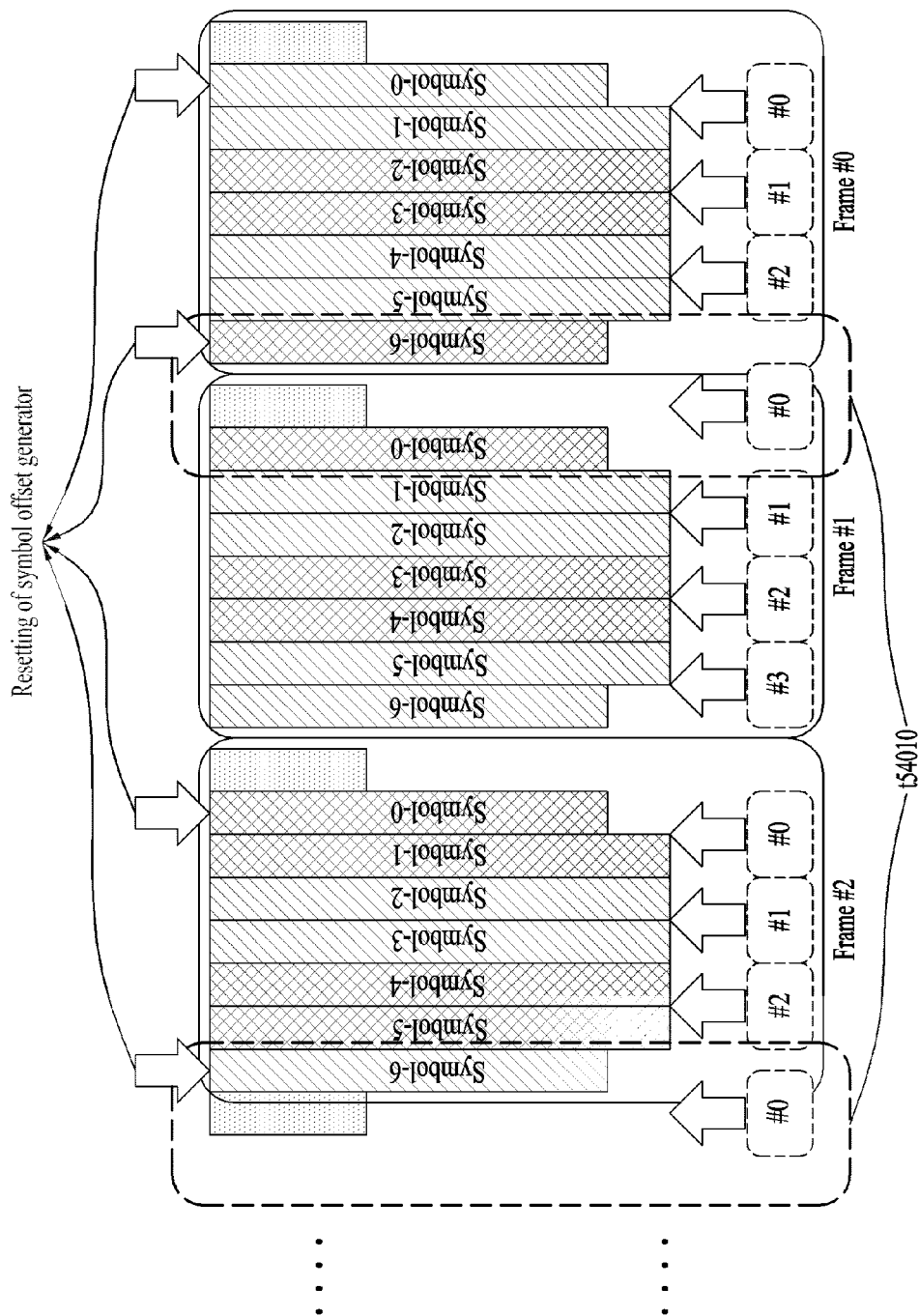
FIG. 32 illustrates an example in which the number of symbols is an odd number in signaling for single-memory deinterleaving irrespective of the number of symbols in a frame according to an embodiment of the present invention.

FIG. 32 illustrates an example in which the number of symbols is an odd number in signaling for single-memory deinterleaving irrespective of the number of symbols in a frame according to an embodiment of the present invention.

In the current embodiment, the N_sym field may indicate that the number of OFDM symbols in one frame is an odd number. The current embodiment assumes that one frame includes one preamble and seven OFDM symbols. According to another embodiment, bootstrap information may be further included in front of the preamble. The bootstrap information is not illustrated.

In the current embodiment, like the case in which the number of symbols is an even number, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Furthermore, in the FES of an arbitrary frame, the symbol offset generator may operate in a reset mode based on the values of the FI_mode field and the N_sym field. Accordingly, in the FES of the arbitrary frame, the value of the symbol offset generator may be reset or not reset to 0. These reset operations may be alternately performed on frames.

The symbol offset generator may be reset in the last symbol of the first frame, i.e., the FES. Accordingly, the interleaving sequence may be reset to sequence #0. As such, the frequency interleaver/deinterleaver may process the corresponding FES based on sequence #0 (t54010).

In the FSS of a subsequent frame, the symbol offset generator may be reset again and thus sequence #0 may be used (t54010). The symbol offset generator may not be reset in the FES of the second frame (frame #1), and may be reset again in the FES of the third frame (frame #2).

Figure 33:
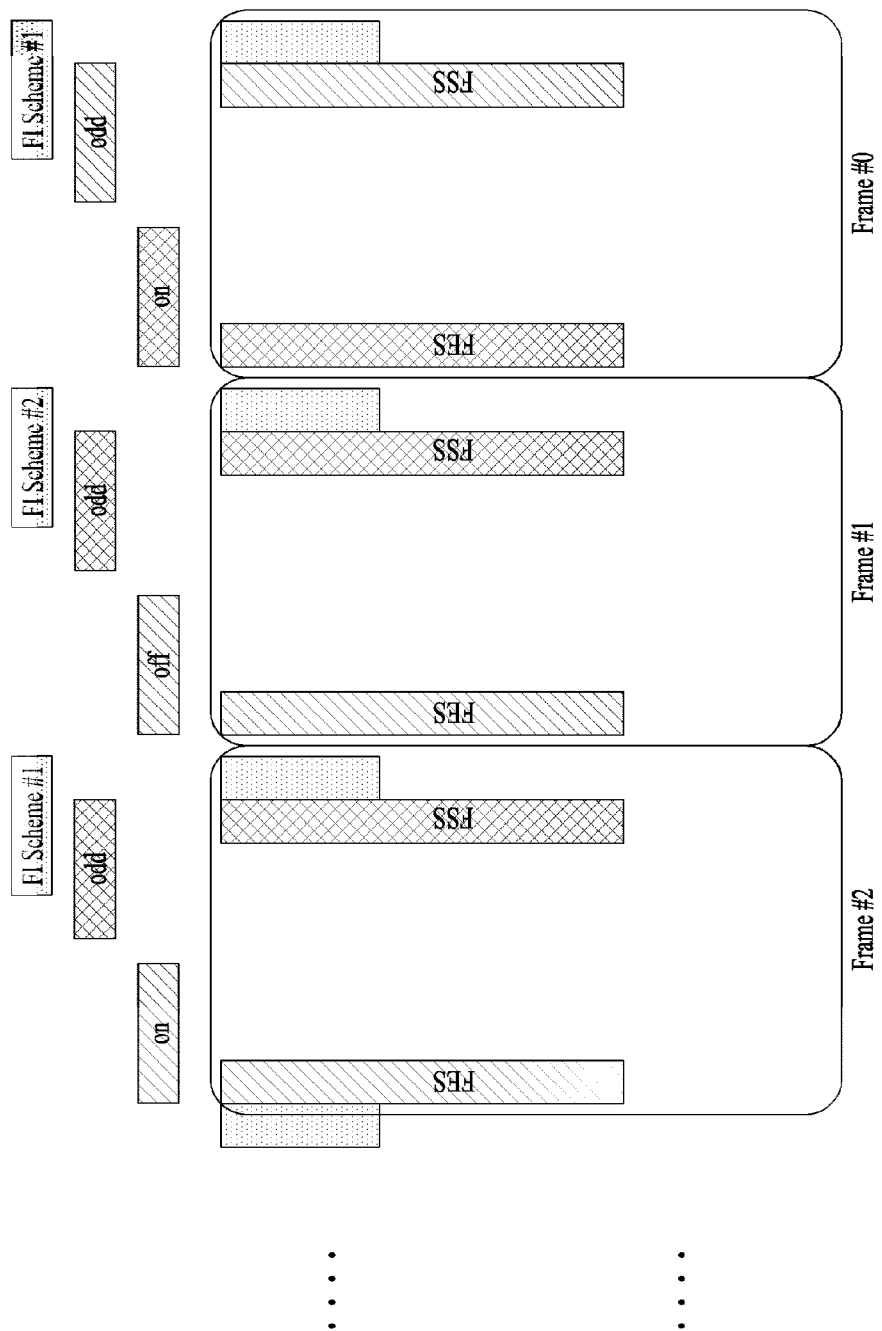
FIG. 33 illustrates an example in which the number of symbols is an odd number in signaling for single-memory deinterleaving irrespective of the number of symbols in a frame according to an embodiment of the present invention.

FIG. 33 illustrates an example in which the number of symbols is an odd number in signaling for single-memory deinterleaving irrespective of the number of symbols in a frame according to an embodiment of the present invention.

In the first frame, information about an interleaving scheme of the FSS may be acquired from the FI_mode field of the preamble. Since the number of OFDM symbols is an odd number, FI scheme #1 and FI scheme #2 may be used. In the current embodiment, FI scheme #1 is used in the first frame.

Then, the FSS may be decoded and thus N_sym information may be acquired. The N_sym information indicates that the number of symbols in the current frame is an odd number. After that, the acquired FI_mode information and the N_sym information may be used when the frequency deinterleaver decodes the FES. Since the number of symbols is an odd number and FI scheme#1 is used, the FI_mode field value is 0. Since the FI_mode is 0, the symbol offset generator may operate in the above-described reset mode. That is, the reset mode may be in an on state.

The symbol offset generator may operate in the reset mode and thus may be reset to 0. Since the FI_mode field value is 1 in the second frame, this indicates that the FSS is processed based on FI scheme #2. The N_sym field indicates that the number of symbols is an odd number. In the second frame, since the FI_mode field value is 1 and the number of symbols is an odd number, the symbol offset generator may not operate in the reset mode.

In this manner, the FI scheme to be used in the FSS may be alternately set to FI schemes #1 and #2. Furthermore, the reset mode to be used in the FES may be alternately set to be on and off. According to another embodiment, the settings may not be changed every frame.

Figure 34:
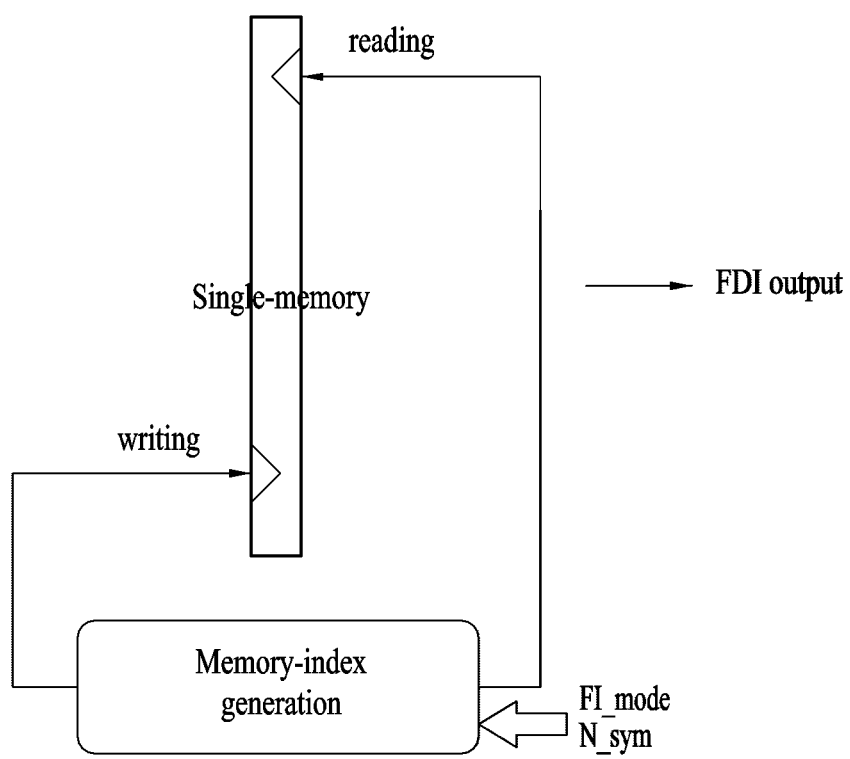
FIG. 34 illustrates operation of the frequency deinterleaver in signaling for single-memory deinterleaving irrespective of the number of symbols in a frame according to an embodiment of the present invention.

FIG. 34 illustrates operation of the frequency deinterleaver in signaling for single-memory deinterleaving irrespective of the number of symbols in a frame according to an embodiment of the present invention.

The frequency deinterleaver may perform frequency deinterleaving using information of the predefined FI_mode field and/or the N_sym field. As described above, the frequency deinterleaver may operate using a single memory. Basically, frequency deinterleaving may be inverse operation of the frequency interleaving operation performed by the transmitter, to restore the order of data.

As described above, frequency deinterleaving on the FSS may be performed based on information about the FI scheme which is acquired from the FI_mode field and the N_sym field of the preamble. Frequency deinterleaving on the FES may be performed based on information indicating whether to the reset mode operates, which is acquired using the FI_mode field and the N_sym field.

That is, on a pair of input OFDM symbols, the frequency deinterleaver may perform inverse operation of the reading/writing operation of the frequency interleaver. One interleaving sequence may be used in this operation.

However, as described above, the frequency interleaver follows the ping pong architecture using double memories, but the frequency deinterleaver may perform deinterleaving using a single memory. This single-memory frequency deinterleaving operation may be performed using information of the FI_mode field and the N_sym field. This information may allow single-memory frequency deinterleaving even on a frame having an odd number of OFDM symbols irrespective of the number of OFDM symbols.

The frequency interleaver according to the present invention may perform frequency interleaving on all data cells of the OFDM symbols. The frequency interleaver may map the data cells to available data carriers of the symbols.

The frequency interleaver according to the present invention may operate in different interleaving modes based on FFT size. For example, when the FFT size is 32K, the frequency interleaver may perform random writing/linear reading operation on an even symbol and perform linear writing/random reading operation on an odd symbol as in FI scheme #1 described above. Alternatively, when the FFT size is 16K or 8K, the frequency interleaver may perform linear reading/random writing operation on all symbols irrespective of an even/odd number.

The FFT size, which determines whether to switch the interleaving modes, may vary according to embodiments. That is, interleaving as in FI scheme #1 may be performed in the case of 32K and 16K, and interleaving irrespective of an even/odd number may be performed in the case of 8K. Alternatively, interleaving as in FI scheme #1 may be performed for all FFT sizes, or interleaving irrespective of an even/odd number may be performed for all FFT sizes. Otherwise, according to another embodiment, interleaving as in FI scheme #2 may be performed for a specific FFT size.

This frequency interleaving operation may be performed using the above-described interleaving sequence (interleaving address). The interleaving sequence may be variously generated using an offset value as described above. Alternatively, address check may be performed to generate various interleaving sequences.

Figure 35:
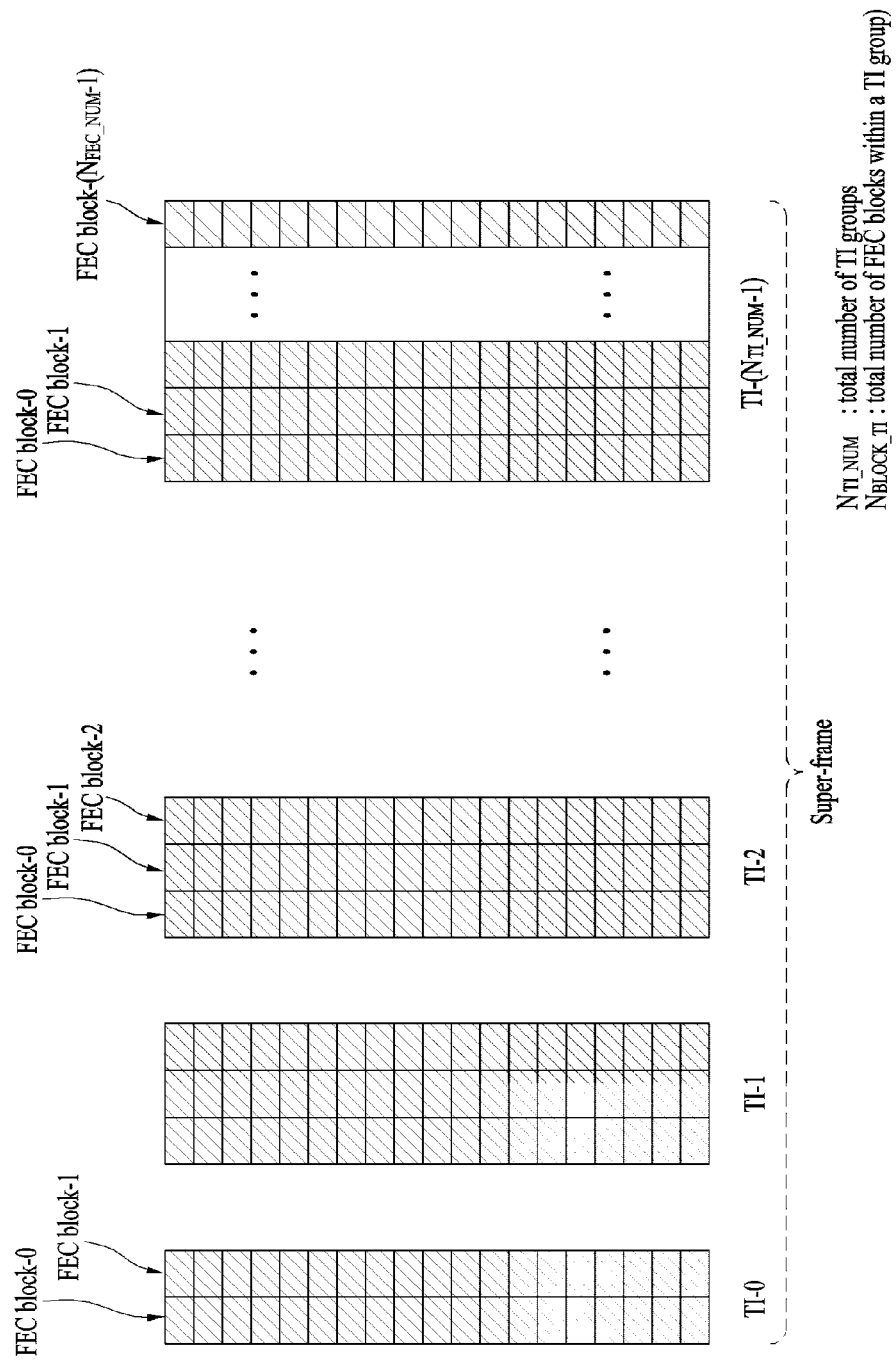
FIG. 35 illustrates the concept of a variable bit-rate system according to an embodiment of the present invention.

FIG. 35 illustrates the concept of a variable bit-rate system according to an embodiment of the present invention.

Specifically, a transport superframe, shown in FIG. 35, is composed of NTI_NUM_TI groups and each TI group can include N BLOCK_TI FEC blocks. In this case, TI groups may respectively include different numbers of FEC blocks. The TI group according to an embodiment of the present invention can be defined as a block for performing time interleaving and can be used in the same meaning as the aforementioned TI block or IF. That is, one IF can include at least one TI block and the number of FEC blocks in the TI block is variable.

When TI groups include different numbers of FEC blocks, the present invention performs interleaving on the TI groups using one twisted row-column block interleaving rule in an embodiment. Accordingly, the receiver can perform deinterleaving using a single memory. A description will be given of an input FEC block memory arrangement method and reading operation of the time interleaver in consideration of variable bit-rate (VBR) transmission in which the number of FEC blocks can be changed per TI group.

Figure 36:
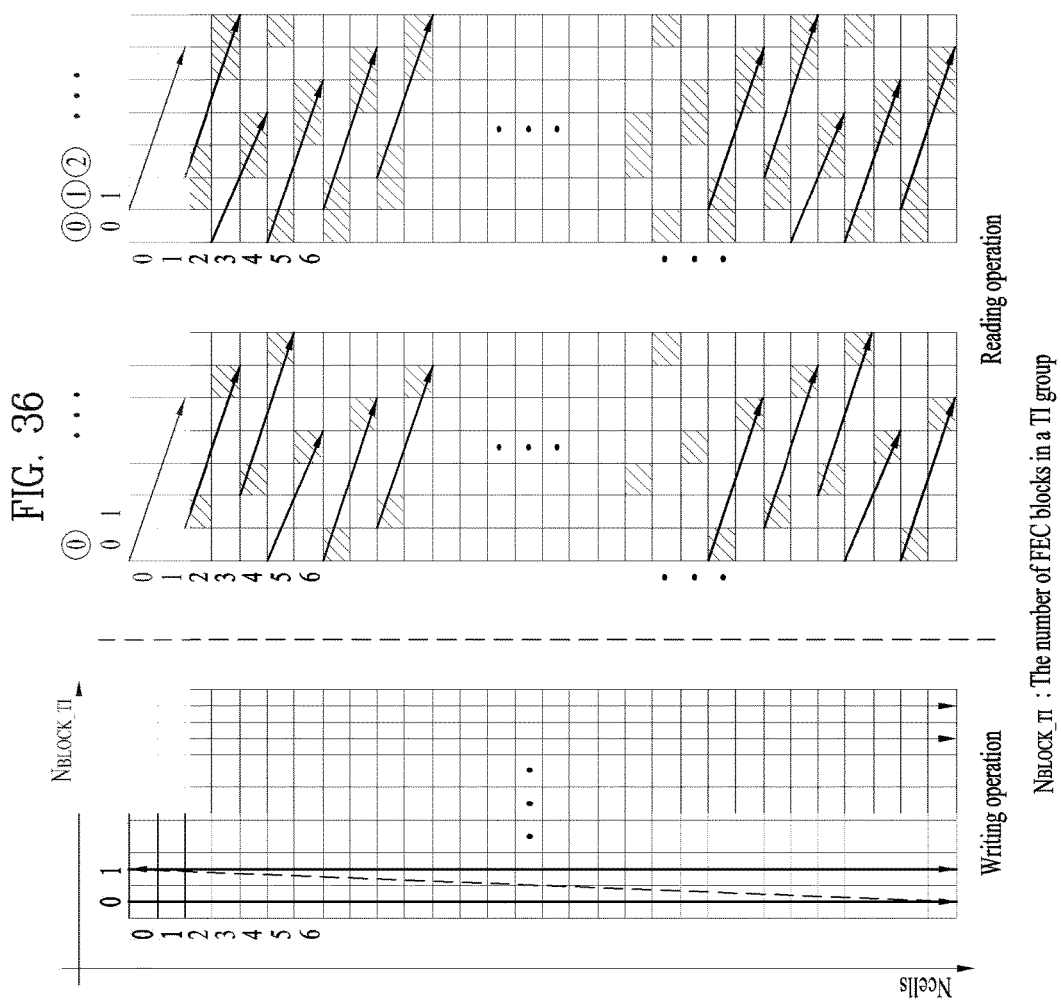
FIG. 36 illustrates writing and reading operations of block interleaving according to an embodiment of the present invention. Detailed descriptions about this figure were described before.

FIG. 36 illustrates writing and reading operations of block interleaving according to an embodiment of the present invention. Detailed descriptions about this figure were described before.

FIG. 37 shows equations representing block interleaving according to an embodiment of the present invention.

The equations shown in the figure represent block interleaving applied per TI group. As expressed by the equations, shift values can be respectively calculated in a case in which the number of FEC blocks included in a TI group is an odd number and a case in which the number of FEC blocks included in a TI group is an even number. That is, block interleaving according to an embodiment of the present invention can calculate a shift value after making the number of FEC blocks be an odd-number.

A time interleaver according to an embodiment of the present invention can determine parameters related to interleaving on the basis of a TI group having a maximum number of FEC blocks in the corresponding superframe. Accordingly, the receiver can perform deinterleaving using a single memory. Here, for a TI group having a smaller number of FEC blocks than the maximum number of FEC blocks, virtual FEC blocks corresponding to a difference between the number of FEC blocks and the maximum number of FEC blocks can be added.

Virtual FEC blocks according to an embodiment of the present invention can be inserted before actual FEC blocks. Subsequently, the time interleaver according to an embodiment of the present invention can perform interleaving on the TI groups using one twisted row-column block interleaving rule in consideration of the virtual FEC blocks. In addition, the time interleaver according to an embodiment of the present invention can perform the aforementioned skip operation when a memory-index corresponding to virtual FEC blocks is generated during reading operation. In the following writing operation, the number of FEC blocks of input TI groups is matched to the number of FEC blocks of output TI groups. Consequently, according to time interleaving according to an embodiment of the present invention, loss of data rate of data actually transmitted may be prevented through skip operation even if virtual FEC blocks are inserted in order to perform efficient single-memory deinterleaving in the receiver.

Figure 38:
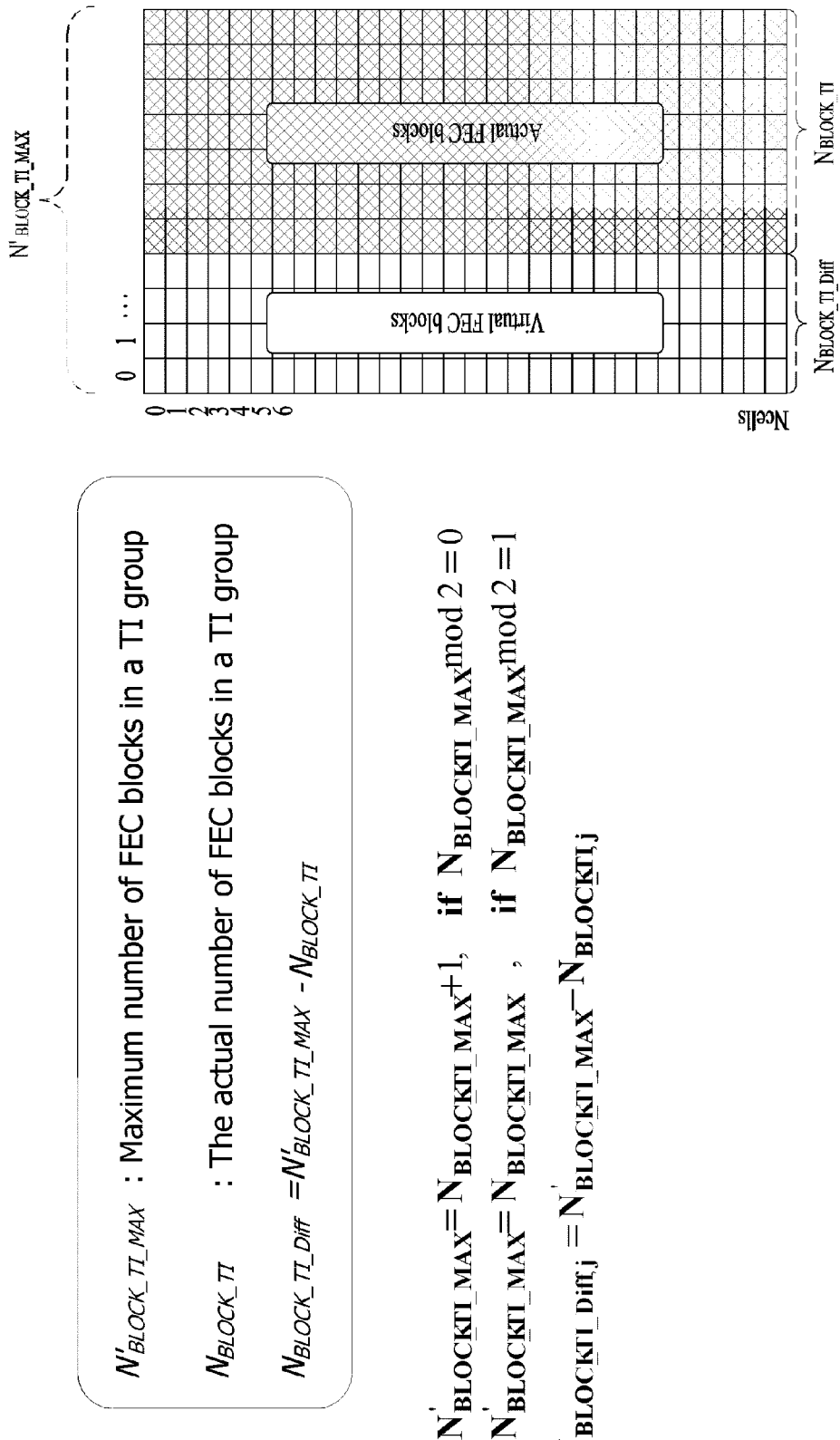
FIG. 38 illustrates virtual FEC blocks according to an embodiment of the present invention.

FIG. 38 illustrates virtual FEC blocks according to an embodiment of the present invention.

The left side of the figure shows parameters indicating a maximum number of FEC blocks in a TI group, the actual number of FEC blocks included in a TI group and a difference between the maximum number of FEC blocks and the actual number of FEC blocks, and equations for deriving the number of virtual FEC blocks.

The right side of the figure shows an embodiment of inserting virtual FEC blocks into a TI group. In this case, the virtual FEC blocks can be inserted before actual FEC blocks, as described above.

FIG. 39 shows equations representing reading operation after insertion of virtual FEC blocks according to an embodiment of the present invention.

Skip operation illustrated in the figure can skip virtual FEC blocks in reading operation.

Figure 40:
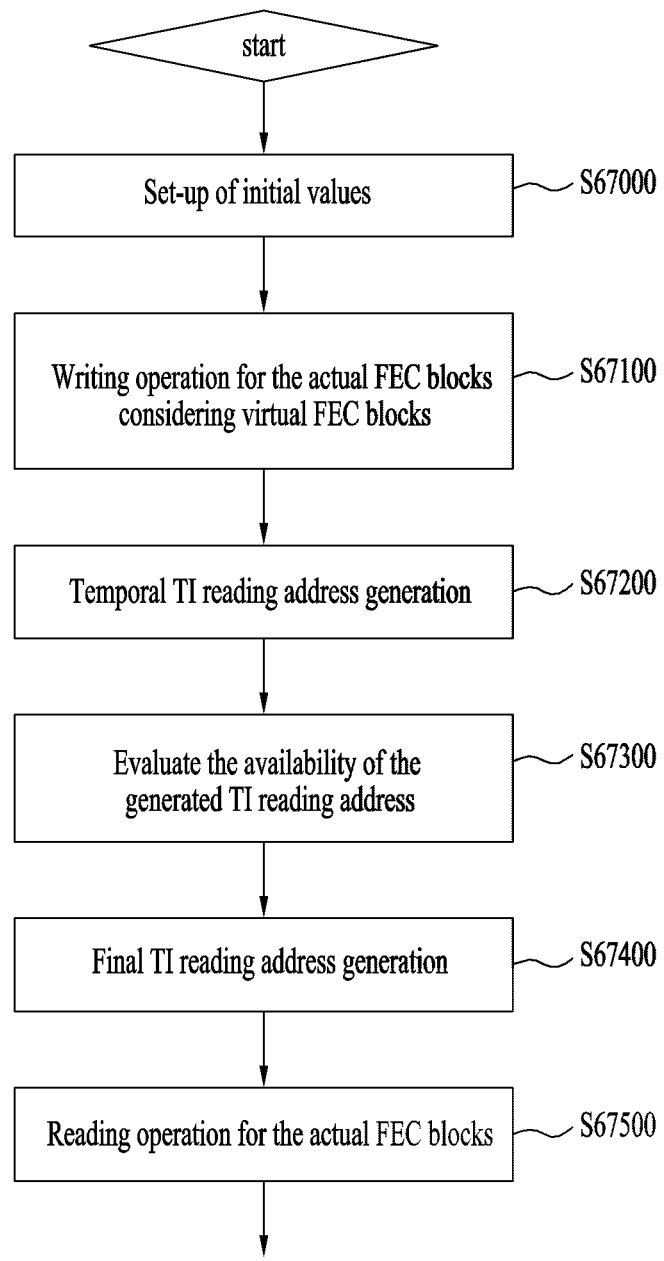
FIG. 40 is a flowchart illustrating a time interleaving process according to an embodiment of the present invention.

FIG. 40 is a flowchart illustrating a time interleaving process according to an embodiment of the present invention.

A time interleaver according to an embodiment of the present invention can setup initial values (S67000).

Then, the time interleaver according to an embodiment of the present invention can perform writing operation on actual FEC blocks in consideration of virtual FEC blocks (S67100).

The time interleaver according to an embodiment of the present invention can generate a temporal TI address (S67200).

Subsequently, the time interleaver according to an embodiment of the present invention can evaluate the availability of the generated TI reading address (S67300). Then, the time interleaver according to an embodiment of the present invention can generate a final TI reading address (S67400).

The time interleaver according to an embodiment of the present invention can read the actual FEC blocks (S67500).

FIG. 41 shows equations representing a process of determining a shift value and a maximum TI block size according to an embodiment of the present invention.

The figure shows an embodiment in which the number of TI groups is 2, the number of cells in a TI group is 30, the number of FEC blocks included in the first TI group is 5 and the number of FEC blocks included in the second TI block is 6. While a maximum number of FEC blocks is 6, 6 is an even number. Accordingly, a maximum number of FEC blocks, which is adjusted in order to obtain the shift value, can be 7 and the shift value can be calculated as 4.

Figure 42:
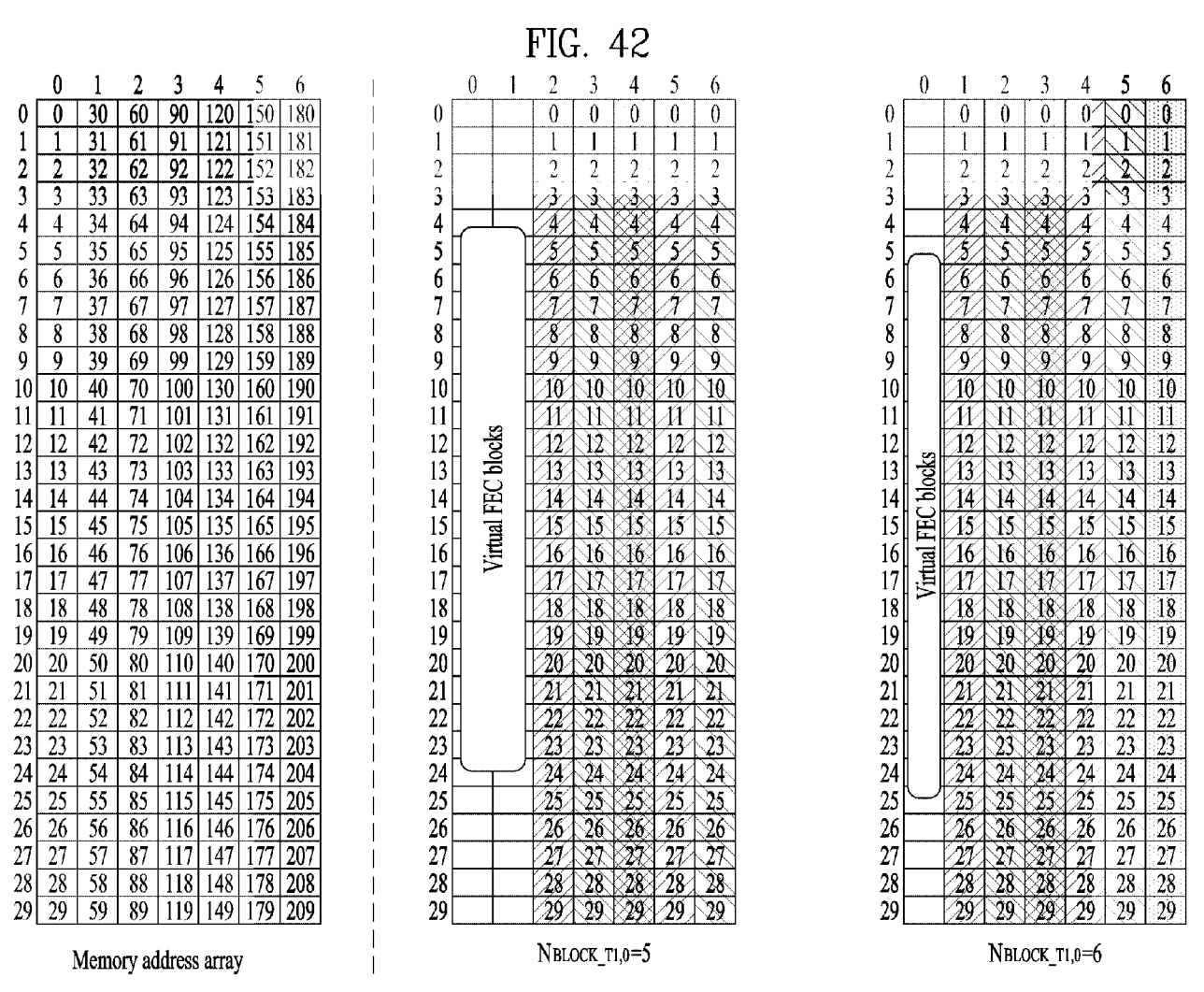
Figure 43:
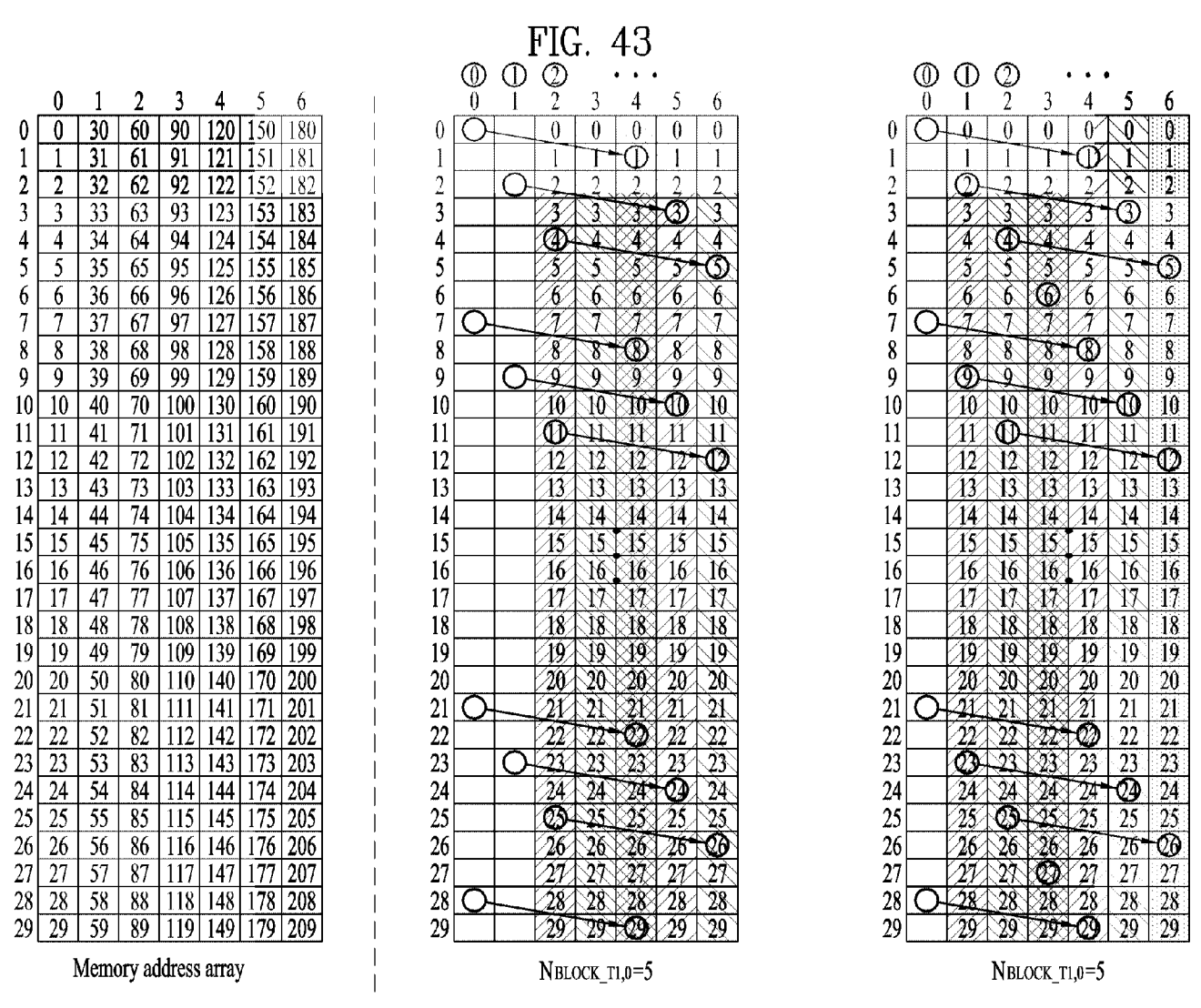

FIGS. 42 to 44 illustrate a TI process of the embodiment described before.

FIG. 42 illustrates writing operation according to an embodiment of the present invention.

FIG. 42 shows writing operation for the two TI groups described before.

A block shown in the left side of the figure represents a TI memory address array and blocks shown in the right side of the figure illustrate writing operation when two virtual FEC blocks and one virtual FEC block are respectively inserted into two continuous TI groups. Since the adjusted maximum number of FEC blocks is 7, as described above, two virtual FEC blocks are inserted into the first TI group and one virtual FEC block is inserted into the second TI group.

FIG. 43 illustrates reading operation according to an embodiment of the present invention.

A block shown in the left side of the figure represents a TI memory address array and blocks shown in the right side of the figure illustrate reading operation when two virtual FEC blocks and one virtual FEC block are respectively inserted into two continuous TI groups. In this case, reading operation can be performed on the virtual FEC blocks in the same manner as the reading operation performed on actual FEC blocks.

FIG. 44 illustrates a result of skip operation in reading operation according to an embodiment of the present invention.

As shown in the figure, virtual FEC blocks can be skipped in two TI groups.

Figure 45:
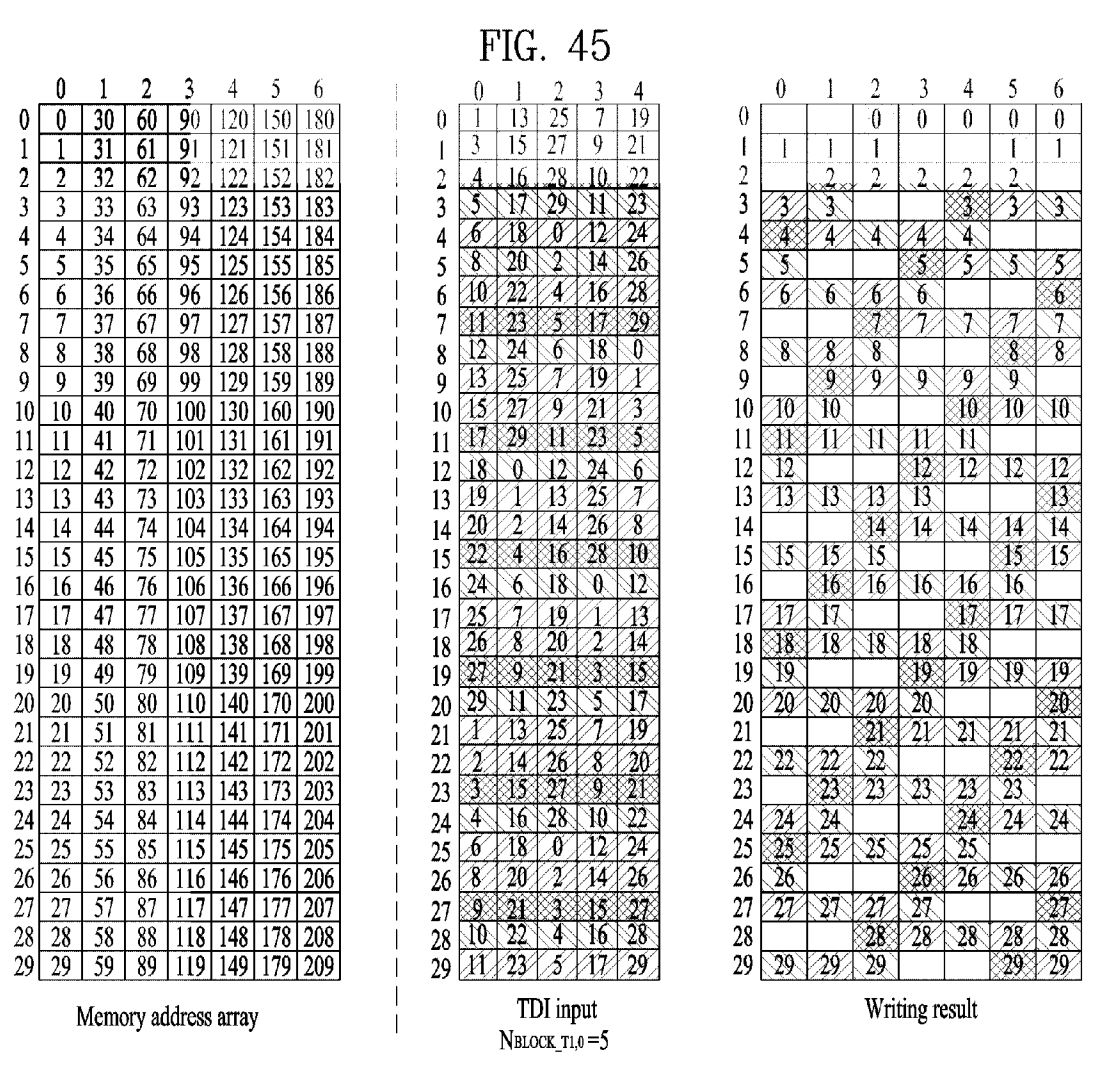
Figure 46:
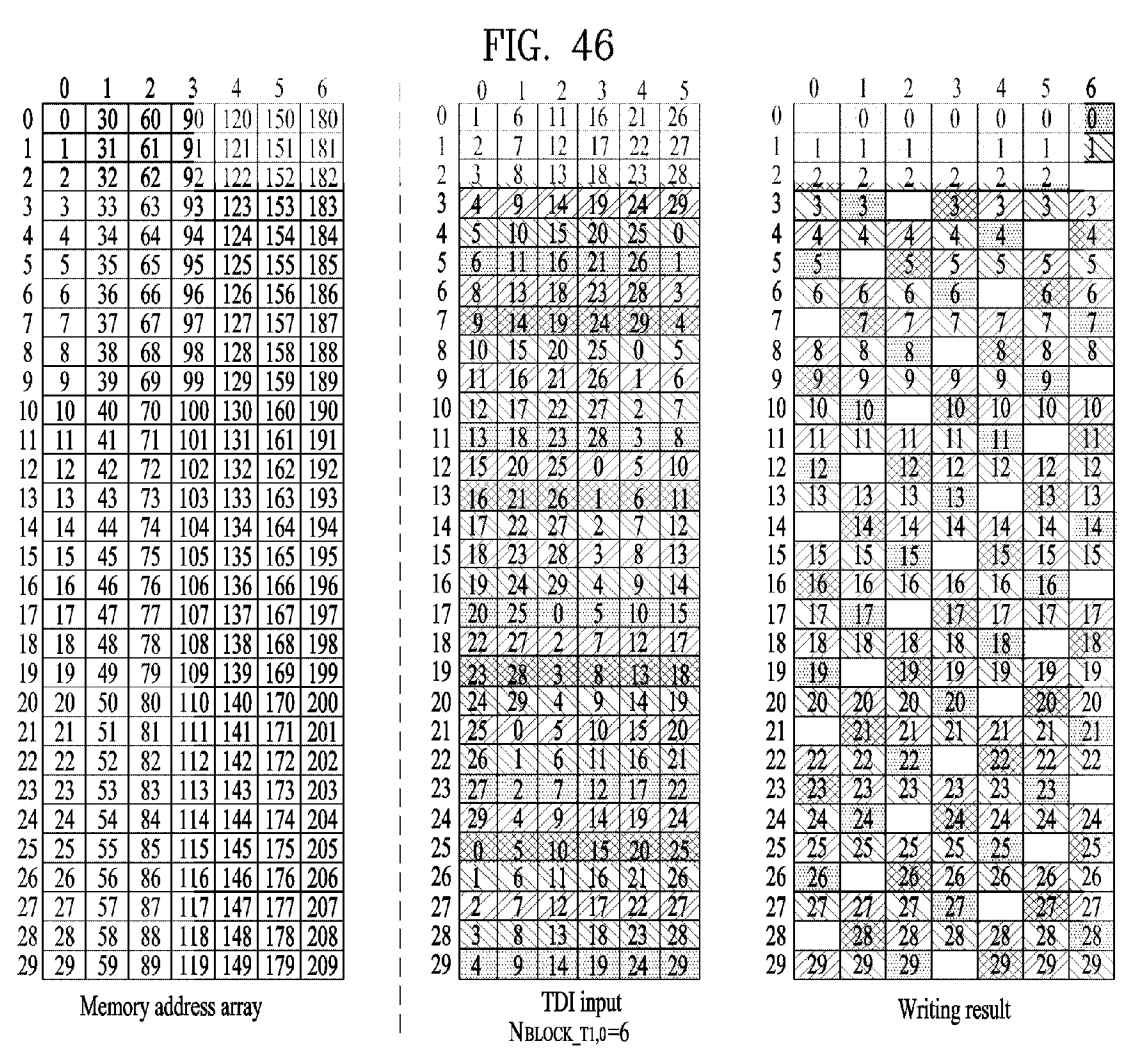

FIGS. 45 to 46 illustrate time deinterleaving corresponding to a reverse of TI described before.

Specifically, FIG. 45 illustrates time deinterleaving for the first TI group and FIG. 46 illustrates time deinterleaving for the second TI group.

FIG. 45 shows a writing process of time deinterleaving according to an embodiment of the present invention.

A left block in the figure shows a TI memory address array, a middle block shows the first TI group input to a time deinterleaver and a right block shows a writing process performed in consideration of virtual FEC blocks that are skipped with respect to the first TI group.

As shown in the figure, two virtual FEC blocks skipped during TI can be restored for correct reading operation in the writing process. In this case, the positions and quantity of the skipped two virtual FEC blocks can be estimated through an arbitrary algorithm.

FIG. 46 illustrates a writing process of time deinterleaving according to another embodiment of the present invention.

A left block in the figure shows a TI memory address array, a middle block shows the second TI group input to the time deinterleaver and a right block shows a writing process performed in consideration of virtual FEC blocks that are skipped with respect to the second TI group.

As shown in the figure, one virtual FEC block skipped during TI can be restored for correct reading operation in the writing process. In this case, the position and quantity of the skipped one virtual FEC block can be estimated through an arbitrary algorithm.

FIG. 47 shows equations representing reading operation of time deinterleaving according to another embodiment of the present invention.

A TDI shift value used in the receiver can be determined by a shift value used in the transmitter, and skip operation can skip virtual FEC blocks in reading operation, similarly to skip operation performed in the transmitter.

Figure 48:
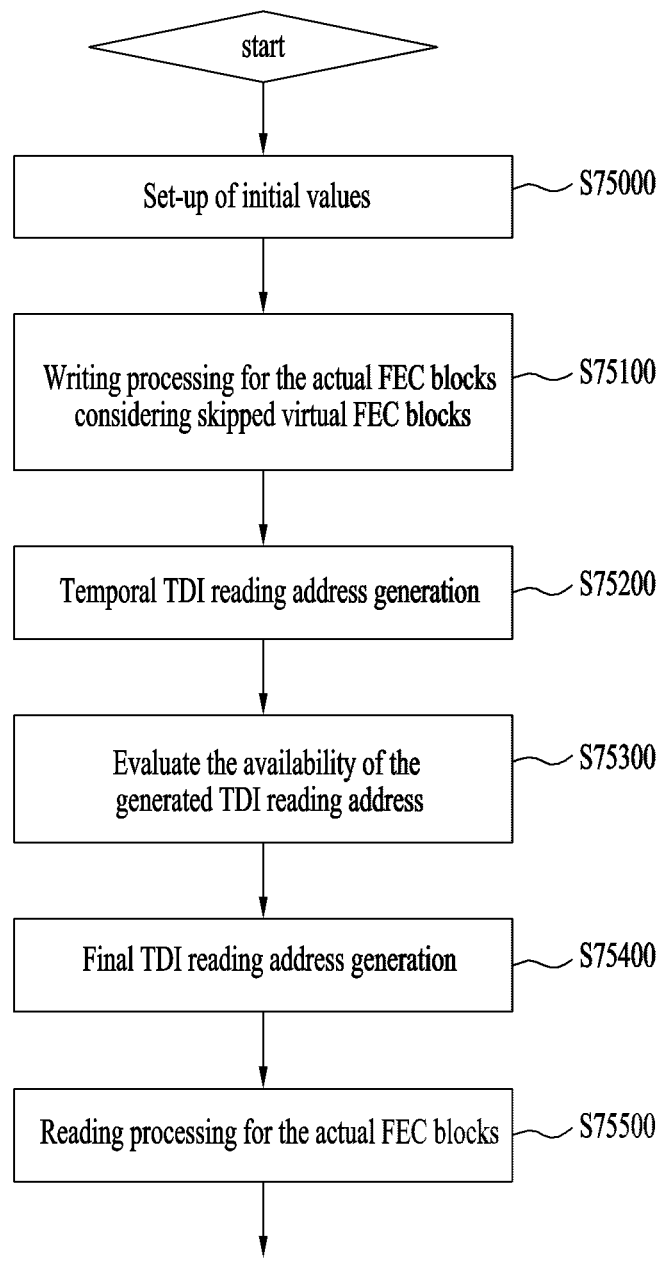
FIG. 48 is a flowchart illustrating a time deinterleaving process according to an embodiment of the present invention.

FIG. 48 is a flowchart illustrating a time deinterleaving process according to an embodiment of the present invention.

A time deinterleaver according to an embodiment of the present invention can setup initial values (S75000).

Then, the time deinterleaver according to an embodiment of the present invention can perform writing operation on actual FEC blocks in consideration of virtual FEC blocks (S75100).

Subsequently, the time deinterleaver according to an embodiment of the present invention can generate a temporal TDI reading address (S75200).

The time deinterleaver according to an embodiment of the present invention can evaluate the availability of the generated TDI reading address (S75300). Then, the time deinterleaver according to an embodiment of the present invention can generate a final TDI reading address (S75400).

Subsequently, the time deinterleaver according to an embodiment of the present invention can read the actual FEC blocks (S75500).

Figures 49, 50:
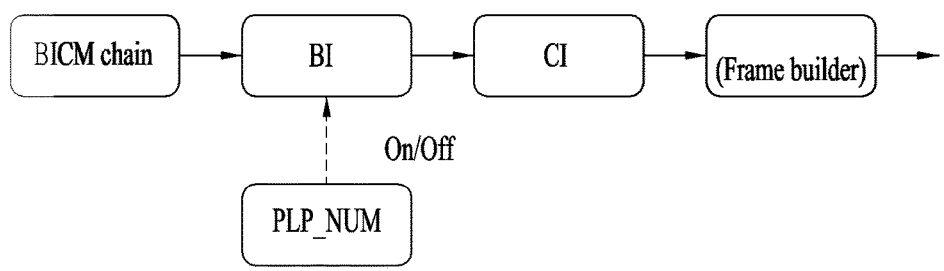
FIG. 49 is a table showing an interleaving type applied based on the number of PLPs.
FIG. 50 is a block diagram including a first embodiment of the above-described hybrid time interleaver structure.

FIG. 49 is a table showing an interleaving type applied based on the number of PLPs. The time interleaver according to an embodiment of the present invention may determine an interleaving type thereof based on the value of PLP_NUM. PLP_NUM is a signaling field indicating a PLP mode. When the value of PLP_NUM is 1, the PLP mode is the single PLP mode. The single PLP mode according to an embodiment of the present invention may be applied to only the convolutional interleaver.

When the value of PLP_NUM is greater than 1, the PLP mode is the multiple PLP mode. The multiple PLP mode according to an embodiment of the present invention may be applied to the convolutional interleaver and the block interleave. In this case, the convolutional interleaver may perform inter frame interleaving, and the block interleaver may perform intra frame interleaving. A detailed description of inter frame interleaving and intra frame interleaving is the same as that given above.

FIG. 50 is a block diagram including a first embodiment of the above-described hybrid time interleaver structure. The hybrid time interleaver according to the first embodiment may include a block interleaver (BI) and a convolutional interleaver (CI). The time interleaver according to the present invention may be located between a BICM chain block and a frame builder. The BICM chain block illustrated in FIGS. 50 and 51 may include the processing blocks 5000 of the BICM block illustrated in FIG. 5, excluding the time interleaver 5050. The frame builder illustrated in FIGS. 50 and 51 may perform function the same as that of the frame building block 1020 of FIG. 1.

As described above, whether to apply the block interleaver of the hybrid time interleaver structure according to the first embodiment may be determined based on the value of PLP_NUM. That is, when PLP_NUM=1, the block interleaver is not applied (block interleaver off) and only the convolutional interleaver is applied. When PLP_NUM>1, both of the block interleaver and the convolutional interleaver may be applied (block interleaver on). The structure and operation of the convolutional interleaver applied when PLP_NUM>1 may be the same as or similar to those of the convolutional interleaver applied when PLP_NUM=1.

Figure 51:
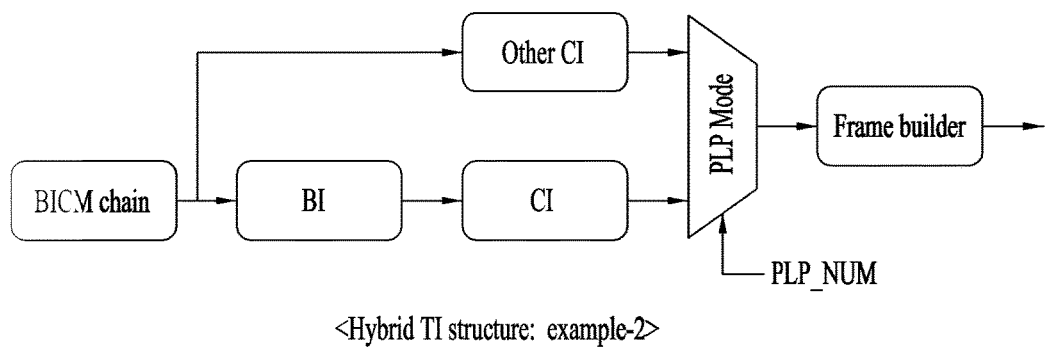
FIG. 51 is a block diagram including a second embodiment of the above-described hybrid time interleaver structure.

FIG. 51 is a block diagram including a second embodiment of the above-described hybrid time interleaver structure.

Operations of blocks included in the hybrid time interleaver structure according to the second embodiment are the same as those described above in relation to FIG. 50. Whether to apply the block interleaver of the hybrid time interleaver structure according to the second embodiment may be determined based on the value of PLP_NUM. The blocks of the hybrid time interleaver according to the second embodiment may perform operations according to embodiments of the present invention. In this case, the structure and operation of a convolutional interleaver applied when PLP_NUM=1 may differ from those of a convolutional interleaver applied when PLP_NUM>1.

Figure 52:
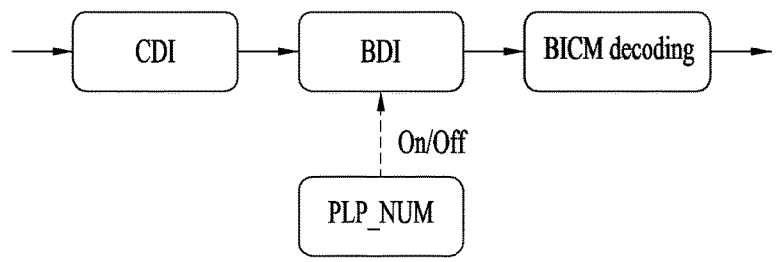
FIG. 52 is a block diagram including a first embodiment of the hybrid time deinterleaver structure.

FIG. 52 is a block diagram including a first embodiment of the hybrid time deinterleaver structure.

The hybrid time deinterleaver according to the first embodiment may perform operation inversely corresponding to the operation performed by the above-described hybrid time interleaver according to the first embodiment. Accordingly, the hybrid time deinterleaver of FIG. 52 according to the first embodiment may include a convolutional deinterleaver (CDI) and a block deinterleaver (BDI).

The structure and operation of the convolutional deinterleaver applied when PLP_NUM>1 may be the same as or similar to those of the convolutional deinterleaver applied when PLP_NUM=1.

Whether to apply the block deinterleaver of the hybrid time deinterleaver structure according to the first embodiment may be determined based on the value of PLP_NUM. That is, when PLP_NUM=1, the block deinterleaver is not applied (block deinterleaver off) and only the convolutional deinterleaver is applied.

The convolutional deinterleaver of the hybrid time deinterleaver may perform inter frame deinterleaving, and the block deinterleaver may perform intra frame deinterleaving. A detailed description of inter frame deinterleaving and intra frame deinterleaving is the same as that given above.

Figure 53:
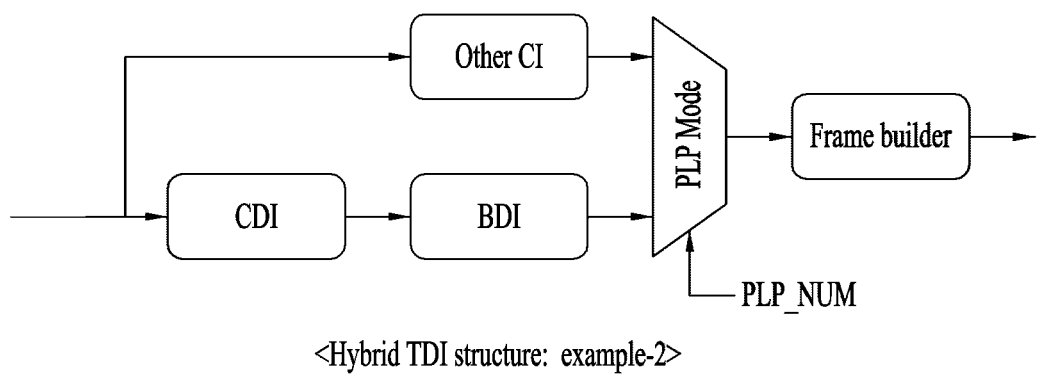
FIG. 53 is a block diagram including a second embodiment of the hybrid time deinterleaver structure.

A BICM decoding block illustrated in FIGS. 52 and 53 may perform operation inversely corresponding to the operation performed by the BICM chain block of FIGS. 50 and 51.

FIG. 53 is a block diagram including a second embodiment of the hybrid time deinterleaver structure.

The hybrid time deinterleaver according to the second embodiment may perform operation inversely corresponding to the operation performed by the above-described hybrid time interleaver according to the second embodiment. Operations of blocks included in the hybrid time deinterleaver structure according to the second embodiment are the same as those described above in relation to FIG. 52.

Whether to apply the block deinterleaver of the hybrid time deinterleaver structure according to the second embodiment may be determined based on the value of PLP_NUM. Blocks of the hybrid time deinterleaver according to the second embodiment may perform operations according to embodiments of the present invention. In this case, the structure and operation of a convolutional deinterleaver applied when PLP_NUM=1 may differ from those of a convolutional deinterleaver applied when PLP_NUM>1.

Figure 54:
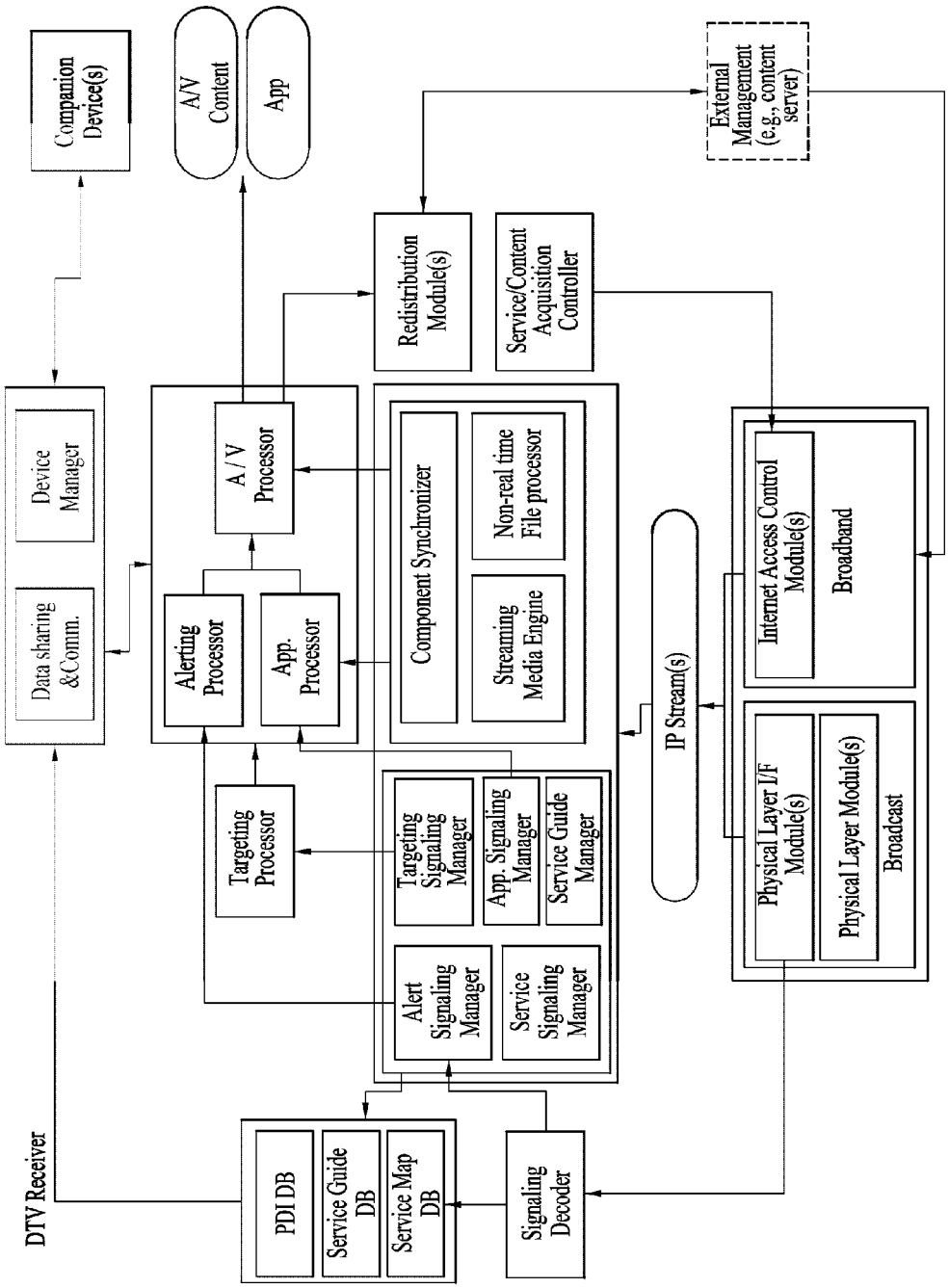
FIG. 54 illustrates a hybrid broadcast reception device according to an embodiment of the present invention.

FIG. 54 illustrates a hybrid broadcast reception device according to an embodiment of the present invention. The hybrid broadcast system may transmit a broadcast signal in conjunction with a terrestrial broadcast network and an Internet network. The hybrid broadcast reception device may receive a broadcast signal through a terrestrial broadcast network (broadcast) and an Internet network (broadband). The hybrid broadcast reception device may include a physical layer module, a physical layer I/F module, a service/content acquisition controller, an Internet access control module, a signaling decoder, a service signaling manager, a service guide manager, an App signaling manager, an alert signal manager, an alert signal parser, a targeting signal parser, a streaming media engine, a non-real-time file processor, a component synchronizer, a targeting processor, an application processor, an A/V processor, a device manager, a data sharing and communication unit, a redistribution module, a companion device and/or an external module.

The physical layer module(s) may receive and process broadcast-related signals through a terrestrial broadcast channel, convert the same into appropriate forms, and transmit the converted signals to the physical layer I/F module.

The physical layer I/F module(s) may acquire IP datagrams from the information obtained from the physical layer module. In addition, the physical layer I/F module may convert the acquired IP datagram or the like into a specific frame (for example, RS frame, GSE).

The service/content acquisition controller may perform control operations for acquiring services, content and signaling data associated therewith over a broadcast and/or broadband channel.

The Internet access control module(s) may control receiver operations to acquire services, content, and the like over a broadband channel.

The signaling decoder may decode the signaling information acquired over a broadcast channel or the like.

The service signaling manager may extract, parse, and manage signaling information related to service scan and services/content from the IP datagram and the like.

The service guide manager may extract announcement information from IP datagrams, manage an SG (Service Guide) database, and provide a service guide.

The App signaling manager may extract, parse, and manage signaling information related to application acquisition and the like from IP datagrams and the like.

The alert signal parser may extract, parse, and manage alerting related signaling information from IP datagrams and the like.

The targeting signal parser may extract, parse, and manage signaling information related to service/content personalization or targeting from IP datagrams and the like. The targeting signal parser may also deliver the parsed signaling information to the targeting processor.

The streaming media engine may extract and decode audio/video data for A/V streaming from IP datagrams and the like.

The non-real time file processor may extract, decode, and manage NRT data and file type data such as applications from IP datagrams and the like.

The component synchronizer may synchronize services and content such as streaming audio/video data and NRT data.

The targeting processor may process operations related to personalization of the service/content based on the targeting signaling data received from the targeting signal parser.

The application processor (App processor) may process application-related information, the status of a downloaded application and display parameters.

The A/V processor may perform audio/video rendering related operations based on decoded audio and video data, application data, and the like.

The device manager may perform connection and data exchange with an external device. The device manager may also perform management of external devices such as addition/deletion/update of operatively connectable external devices.

The data sharing and communication unit (Data Sharing & Comm.) may process information related to data transmission and exchange between the hybrid broadcast receiver and an external device. Here, the data that may be transmitted and exchanged may be signaling, A/V data, and the like.

The redistribution module(s) may acquire related information about the next generation broadcast service and content when the broadcast receiver cannot directly receive the terrestrial broadcast signal. The redistribution module may also support acquisition of broadcast services and content by the next generation broadcast system when the broadcast receiver cannot directly receive the terrestrial broadcast signal.

The companion device(s) may be coupled to the broadcast receiver of the present invention to share audio, video, or signaling-containing data. The companion device may refer to an external device connected to the broadcast receiver.

An external management module (External Management) may refer to a module for providing broadcast service/content, for example, a next generation broadcast service/content server. The external module may refer to an external device connected to the broadcast receiver.

Figure 55:
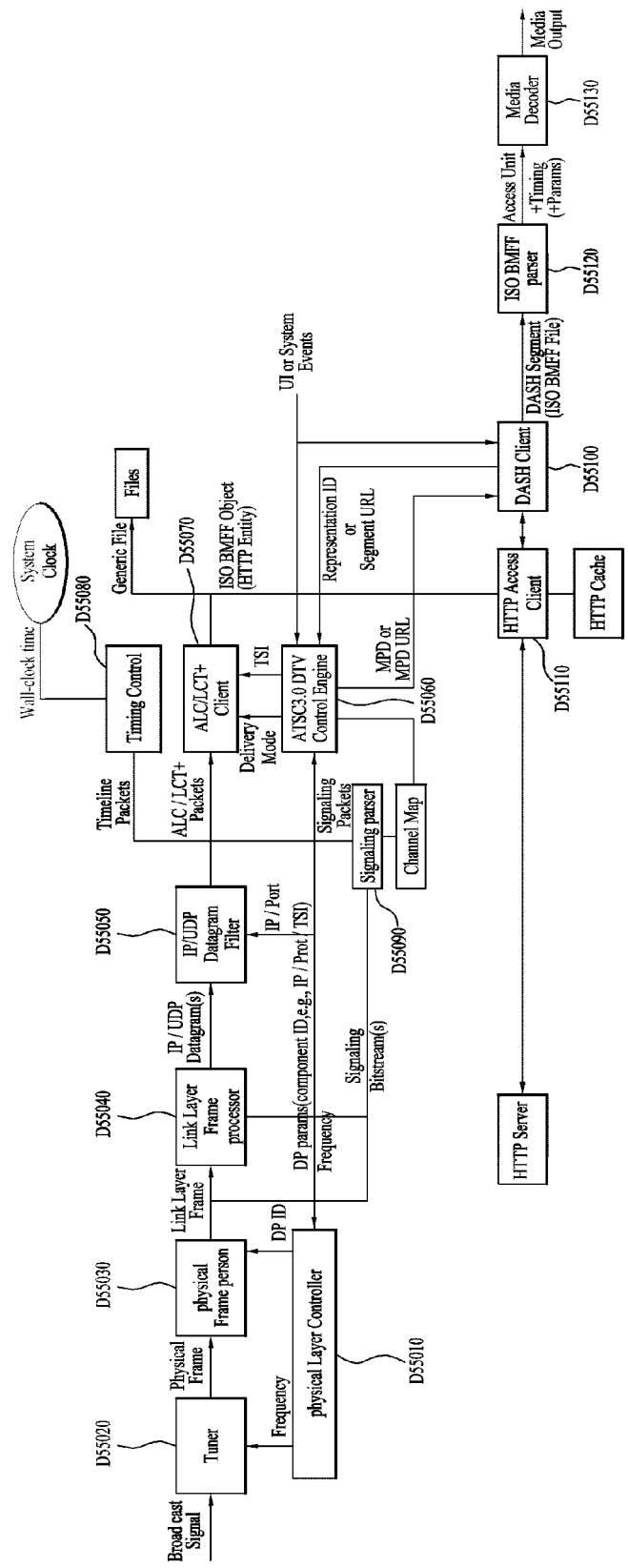
FIG. 55 is a block diagram illustrating a hybrid broadcast receiver according to an embodiment of the present invention.

FIG. 55 is a block diagram illustrating a hybrid broadcast receiver according to an embodiment of the present invention.

The hybrid broadcast receiver may receive the hybrid broadcast service through operative connection of terrestrial broadcast and broadband in the DTV service of the next generation broadcast system. The hybrid broadcast receiver may receive broadcast audio/video (A/V) content transmitted through a terrestrial broadcast and receive part of enhancement data or broadcast A/V content associated therewith in real time through broadband. In this specification, the broadcast audio/video (A/V) content may be referred to as media content.

The hybrid broadcast receiver may include a physical layer controller D55010, a tuner D55020, a physical frame parser D55030, a link layer frame parser D55040, an IP/UDP datagram filter D55050, an ATSC 3.0 DTV (Digital Television) Control Engine D55060, an ALC/LCT+ Client D55070, a timing control D55080, a signaling parser D55090, a DASH (Dynamic Adaptive Streaming over HTTP) client D55100, an HTTP access client D55110, an ISO BMFF parser D55120, and/or a media decoder D55130.

The physical layer controller D55010 may control operations of the tuner D55020, the physical frame parser D55030, and the like using radio frequency (RF) information about a terrestrial broadcast channel to be received by the hybrid broadcast receiver.

The tuner D55020 may receive and process broadcast related signals through a terrestrial broadcast channel and convert the same into an appropriate form. For example, the tuner D55020 may convert a received terrestrial broadcast signal into a physical frame.

The physical frame parser D55030 may parse the received physical frame and acquire a link layer frame through related processing.

The link layer parser D55040 may acquire link layer signaling from the link layer frame or perform related operations to acquire an IP/UDP datagram or an MPEG-2 TS. The link layer parser D55040 may output at least one IP/UDP datagram or the like.

The IP/UDP datagram filter D55050 may filter a specific IP/UDP datagram from at least one received IP/UDP datagram or the like. That is, the IP/UDP datagram filter D55050 may selectively filter an IP/UDP datagram selected by the ATSC 3.0 DTV control engine D55060 among the at least one IP/UDP datagram output from the link layer parser D55040. The IP/UDP datagram filter D55050 may output an application layer transport protocol packet such as ALC/LCT+.

The ATSC 3.0 DTV control engine D55060 may serve as an interface between modules included in each hybrid broadcast receiver. The ATSC 3.0 DTV control engine D55060 may also provide necessary parameters for each module, thereby controlling the operation of each module. In the present invention, the ATSC 3.0 DTV control engine D55060 may deliver a media presentation description (MPD) and/or an MPD URL to the DASH client D55100. In the present invention, the ATSC 3.0 digital television control engine D55060 may also deliver a delivery mode and/or a transport session identifier (TSI) to the ALC/LCT+ client D55070. Here, TSI may represent the identifier of a session for transmitting a transport packet including a signaling message such as MPD or MPD URL related signaling, for example, the identifier of a FLUTE session or an ALC/LCT+ session, which is an application layer transmission protocol. The TSI may correspond to the Asset id of MMT.

The ALC/LCT+ client D55070 may process application layer transport protocol packets such as ALC/LCT+, and collect and process a plurality of packets to create one or more ISO Base Media File Format (ISOBMFF) objects. The application layer transport protocol packets may include ALC/LCT packets, ALC/LCT+ packets, ROUTE packets, and/or MMTP packets.

The timing control D55080 may process a packet including system time information to control the system clock.

The signaling parser D55090 may acquire and parse DTV broadcast service related signaling, and generate and manage a channel map and the like based on the parsed signaling. In the present invention, the signaling parser may parse the extended MPD or MPD related information from the signaling information.

The DASH client D55100 may perform operations related to real-time streaming or adaptive streaming. The DASH client D55100 may receive DASH content from the HTTP server through the HTTP access client D55110. The DASH client D55100 may process the received DASH segment and output an ISO Base Media File Format object. In the present invention, the DASH client D55100 may deliver a Fully Qualified Representation ID or a segment URL to the ATSC 3.0 DTV control engine D55060. Here, the Fully Qualified Representation ID may refer to an ID that combines, for example, the MPD URL, period@id, and representation@id. The DASH client D55100 may also receive the MPD or MPD URL from the ATSC 3.0 DTV control engine D55060. The DASH client D55100 may receive a desired media stream or DASH segment from the HTTP server using the received MPD or MPD URL. In this specification, the DASH client D55100 may be referred to as a processor.

The HTTP access client D55110 may make a request for specific information to the HTTP server, and may receive and process a response from the HTTP server. Here, the HTTP server may process the request received from the HTTP access client and provide a response thereto.

The ISO BMFF parser D55120 may extract audio/video data from the ISO Base Media File Format object.

The media decoder D55130 may decode the received audio and/or video data and perform processing to present the decoded audio/video data.

The hybrid broadcast receiver of the present invention is required to extend or modify the MPD in order to provide the hybrid broadcast service through operative connection between the terrestrial broadcast network and the broadband. The terrestrial broadcast system may transmit the extended or modified MPD, and the hybrid broadcast receiver may receive the broadcast or broadband content using the extended or modified MPD. That is, the hybrid broadcast receiver may receive the extended or modified MPD through terrestrial broadcasting and receive content via terrestrial broadcasting or broadband based on MPD. The following describes elements and attributes that should be additionally included in the extended or modified MPD compared to the existing MPD. In the following description, the extended or modified MPD may be referred to as an MPD.

The MPD may be extended or modified to represent ATSC 3.0 services. An extended or modified MPD may additionally include MPD@anchorPresentationTime, Common@presentable, Common.Targeting, Common.TargetDevice and/or Common@associatedTo.

MPD@anchorPresentationTime may represent the presentation time anchor of segments included in the MPD, that is, a base time. Hereinafter, MPD@anchorPresentationTime may be used as an effective time of the MPD. MPD@anchorPresentationTime may represent the earliest playback point in time among the segments included in the MPD.

The MPD may further include common attributes and elements. The common attributes and elements may be applied to the AdaptionSet, Representation, SubRepresentation, and the like in the MPD. Common@presentable may indicate that the media described by MPD is a presentable component.

Common.Targeting may indicate the targeting properties and/or personalization properties of the media described by the MPD.

Common.TargetDevice may represent a target device or target devices of the media described by the MPD.

Common@associatedTo may represent an adaptationSet and/or representation associated with the media described by the MPD.

In addition, the MPD@id, Period@id, and AdaptationSet@id included in the MPD may be required to specify the media content described by the MPD. In other words, the DASH client may specify the content to be received as MPD@id, Period@id, and AdaptationSet@id based on the MPD and deliver the same to the ATSC 3.0 DTV control engine. The ATSC 3.0 DTV control engine may receive the content and deliver the same to the DASH client.

Figure 56:
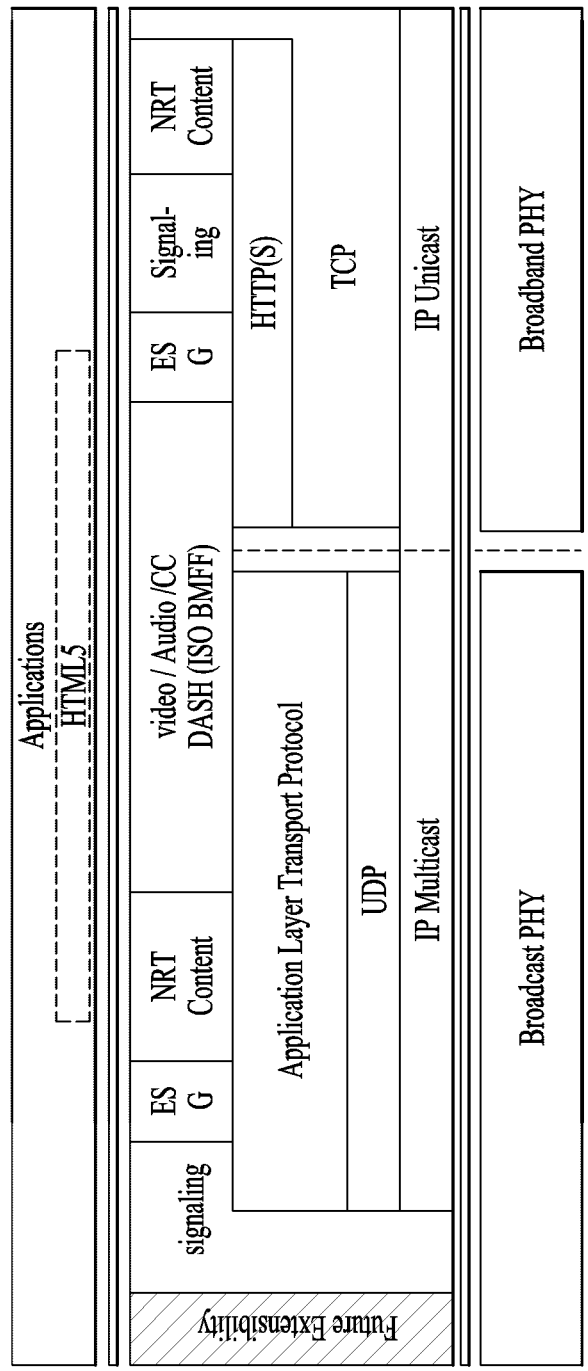
FIG. 56 shows a protocol stack of a next generation hybrid broadcast system according to an embodiment of the present invention.

FIG. 56 shows a protocol stack of a next generation hybrid broadcast system according to an embodiment of the present invention. As shown in the figure, a next generation broadcast system supporting IP-based hybrid broadcasting may encapsulate audio or video data of a broadcast service in an ISO Base Media File Format (hereinafter referred to as ISO BMFF). Here, the encapsulation may be in the form of a DASH segment or an MPU (Media Processing Unit) of MMT. In addition, the next generation broadcast system may transmit encapsulated data over the broadcast network and the Internet network equally or differently according to the properties of each transmission network. The next generation broadcast system may also transmit the encapsulated data using at least one of broadcast or broadband. In case of broadcast network, the broadcast system may transmit data encapsulated in ISO Base Media File (ISO BMFF) through an application layer transport protocol packet supporting real time object transmission. For example, the broadcast system may encapsulate the data with Real-Time Object Delivery over Unidirectional Transport (ROUTE) or MMTP transport packet. Then, the broadcast system may generate an IP/UDP datagram from the encapsulated data, and transmit the same through a broadcast signal. When broadband is used, the broadcast system may transmit the encapsulated data to the receiving side based on a streaming technique such as DASH.

In addition, the broadcast system may transmit the signaling information of the broadcast service in the following manner. In the case of a broadcast network using broadcasting, the broadcast system may transmit signaling information through the physical layer of the next generation broadcast transmission system and the broadcast network according to the attribute of the signaling. Here, the broadcast system may transmit signaling information through a specific data pipe (DP) of a transport frame included in the broadcast signal. The broadcast signaling may be encapsulated in a bit stream or an IP/UDP datagram. When using broadband, the broadcast system may return signaling data in response to the request of the receiver.

In addition, the broadcast system may transmit the ESG or NRT content of the broadcast service in the following manner. In the case of a broadcast network, the broadcast system may encapsulate ESG or NRT content in an application layer transport protocol packet, for example, Real-Time Object Delivery over Unidirectional Transport (ROUTE), MMTP transport packet, or the like. Then, the broadcast system may generate an IP/UDP datagram from the encapsulated ESG or NRT content and transmit the same through a broadcast signal. When using broadband, the broadcast system may return the ESG or NRT content in response to the request of the receiver.

Figure 57:
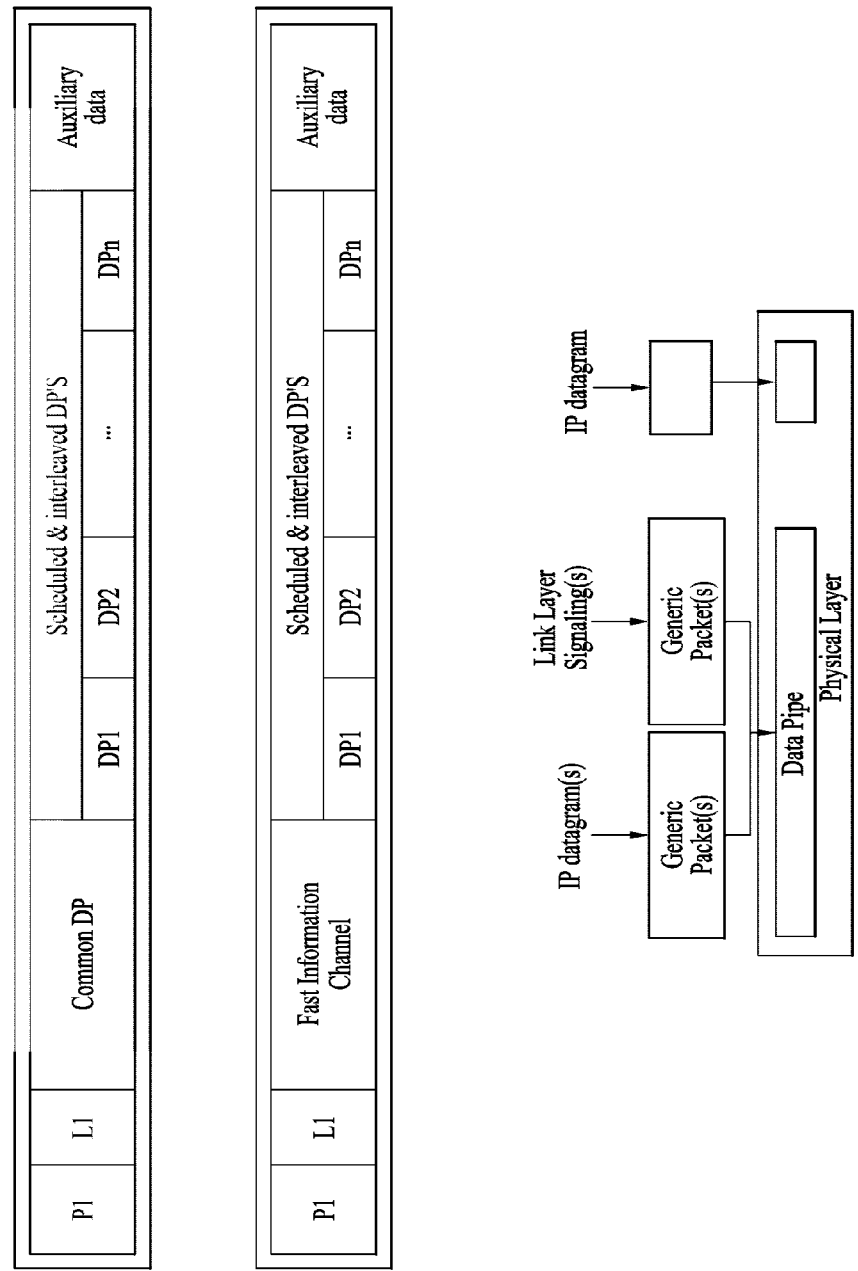
FIG. 57 shows a structure of a transport frame transmitted to a physical layer of a next generation broadcast transmission system according to an embodiment of the present invention.

FIG. 57 shows a structure of a transport frame transmitted to a physical layer of a next generation broadcast transmission system according to an embodiment of the present invention. The next generation broadcast system may broadcast a transport frame. In the figure, P1, located at the front part of a transport frame, may refer to a symbol including information for transport signal detection. P1 may contain tuning information and the receiver may decode the L1 part located after P1 based on the parameters contained in the P1 symbol. The broadcast system may include information on the configuration of the transport frame and the characteristics of each data pipe (DP) in the L1 part. That is, the receiver may obtain information on the configuration of the transport frame and the characteristics of each DP by decoding the L1 part. In addition, the receiver may acquire information to be shared between the DPs via a common DP. Depending on the embodiment, the transport frame may not include the common DP.

In the transport frame, components such as Audio, Video, and Data are transmitted in the interleaved DP area composed of DP1 to DPn. Here, a DP through which a component constituting each service (channel) is transmitted may be signaled through L1, common PLP, or the like.

In addition, the next generation broadcast system may transmit information for quickly acquiring information on a service included in a transport frame. That is, the next generation broadcast system may enable the next generation broadcast receiver to quickly acquire the broadcast service and the content related information included in the transport frame. In addition, when a service/content generated by one or more broadcast stations exists in the frame, the next generation broadcast system may enable the receiver to efficiently recognize the service/content according to the broadcast stations. That is, the next-generation broadcast system may transmit service list information for a service in a transport frame.

The broadcast system may transmit broadcast service related information through a separate channel, for example, a Quick Information Channel (FIC), in order to enable the receiver to quickly scan the broadcast service and content within the frequency. As shown in the middle part of FIG. 57, the broadcast system may transmit information for scan and acquiring broadcast services in a transport frame. Herein, the area including the information for scan and acquisition of broadcast services may be referred to as FIC. The receiver may acquire information on the broadcast service generated and transmitted by one or more broadcast stations through the FIC, thereby making it possible to easily and quickly perform scan of the broadcast services available on the receiver.

In addition, a specific DP included in the transport frame may operate as a base DP for quickly and robustly transmitting signaling of a broadcast service and content transmitted in the corresponding transport frame. The data transmitted through each DP of the transport frame of the physical layer are exemplarily shown at the bottom of FIG. 57. That is, link layer signaling or IP datagrams may be encapsulated in a specific type of generic packet and then transmitted through the DP. Here, the generic packet may include signaling data. Link (low) layer signaling may include signaling related to quick service scan/acquisition, context information of IP header compression, emergency alert, and the like.

Figure 58:
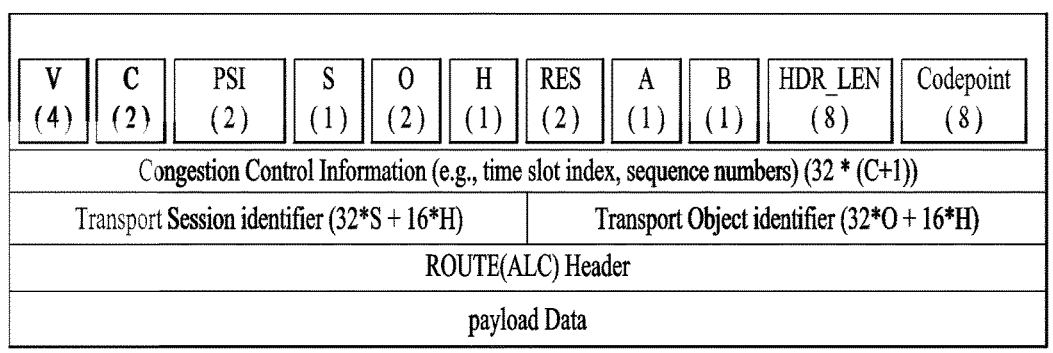
FIG. 58 is a diagram illustrating a transport packet of an application layer transmission protocol according to an embodiment of the present invention.

FIG. 58 is a diagram illustrating a transport packet of an application layer transmission protocol according to an embodiment of the present invention. The application layer transport session may be configured by a combination of an IP address and a port number. If the application layer transport protocol is Real-Time Object Delivery over Unidirectional Transport (ROUTE), the ROUTE session may consist of one or more Layered Coding Transport (LCT) sessions. For example, when one media component (e.g., a DASH Representation or the like) is transmitted through one LCT transport session, one or more media components may be multiplexed and transmitted through one application transport session. Further, one or more transport objects may be delivered through one LCT transport session, and each transport object may be a DASH segment associated with a DASH representation delivered through the transport session.

For example, if the application layer transport protocol is an LCT-based protocol, transport packets may be configured as follows. The transport packet may include an LCT header, a ROUTE header, and payload data, and a plurality of fields may be included in the transport packet.

The LCT header may include the following fields. The V (version) field may indicate the version information of the corresponding transport protocol packet. The C field may indicate a flag associated with the length of the Congestion Control Information field described below. The PSI field is protocol-specific information and may indicate information specified for the protocol. The S field may indicate a flag associated with the length of the transport session identifier (TSI) field. The O field may indicate a flag associated with the length of the transport object identifier (TOI) field. The H field may indicate whether a half-word (16 bits) is added to the length of the TSI and TOI fields. A (Close Session flag) field may indicate that the session is terminated or that termination is imminent. The B (Close Object flag) field may indicate that the object being transmitted is ending or that the end is imminent. The Code point field may indicate information related to encoding or decoding the payload of a packet. For example, the payload type may correspond to this information. The Congestion Control Information field may contain information associated with congestion control. For example, the information associated with congestion control may be the current time slot index (CTSI), the channel number, or the packet sequence number within the channel. The Transport Session Identifier field may indicate the identifier of the transport session. The Transport Object Identifier field may represent an identifier of an object transmitted through the transport session.

The ROUTE (ALC) header may include transmission of additional information of the preceding LCT header, such as the payload identifier associated with the forward error correction scheme.

The payload data may represent the substantial data portion of the payload of the packet.

FIG. 59 illustrates a method of transmitting signaling data in a next generation broadcast system according to an embodiment of the present invention. The signaling data of the next generation broadcast system may be transmitted as shown in the figure. In order to support quick service/content scan and acquisition by the receiver, the next generation broadcast transmission system may deliver signaling data for a broadcast service delivered by a corresponding physical layer frame through a Fast Information Channel (FIC). In the present specification, FIC may mean information on a service list. If there is no separate FIC, the signaling data may be transmitted through the path along which the link layer signaling is delivered. In other words, signaling information including a service and information on components (audio, video, etc.) in the service may be encapsulated and transmitted in IP/UDP datagrams through one or more DPs in the physical layer frame. According to an embodiment, the signaling information on a service and service components may be encapsulated and transmitted in an application layer transport packet (e.g., ROUTE packet or MMTP packet).

The upper part of FIG. 59 shows an embodiment in which the above-described signaling data is transmitted via FIC and one or more DPs. Signaling data for supporting rapid service scan/acquisition may be transmitted through FIC, and signaling data including detailed information about services and the like may be encapsulated in an IP datagram and transmitted through a specific DP. In the present specification, the signaling data including detailed information on services and the like may be referred to as service layer signaling.

The middle part of FIG. 59 shows an embodiment in which the above-described signaling data is transmitted through the FIC and one or more DPs. Signaling data for supporting rapid service scan/acquisition may be transmitted through FIC, and signaling data including detailed information about services and the like may be encapsulated in an IP datagram and transmitted through a specific DP. In addition, a portion of the signaling data, including information about a specific component included in the service may be transmitted through one or more transport sessions in the application layer transmission protocol. For example, a portion of the signaling data may be delivered over one or more transport sessions within a ROUTE session.

The lower part of FIG. 59 shows an embodiment in which the above-described signaling data is transmitted through the FIC and one or more DPs. Signaling data for supporting rapid service scan/acquisition may be transmitted through FIC, and signaling data containing detailed information about the service may be transmitted through one or more transport sessions in the ROUTE session.

FIG. 60 shows signaling data transmitted by a next generation broadcast system according to an embodiment of the present invention for rapid broadcast service scan of a receiver. The present specification proposes signaling information used for a next generation broadcast reception device to scan and acquire a broadcast service. In the next generation broadcast system, broadcast services and content generated by one or more broadcast stations within a specific frequency may be transmitted. The receiver may use the above-described signaling information to rapidly and easily scan broadcast stations existing within the frequency and the service/content of the corresponding broadcast stations. This may be represented by syntax as shown in the figure or may be represented in other formats such as XML.

Signaling information for rapid service scan and acquisition may be delivered over a rapid information channel (FIC), which is a separate channel in the physical layer transport frame. In addition, the signaling information may be transmitted through a common DP, which may transmit information that may be shared among the data pipes of the physical layer. Also, In addition, the signaling information may be transmitted through a path along which the signaling of the link layer is transmitted. The above-described signaling information may be encapsulated in an IP datagram and transmitted through a specific DP. The signaling information may be transmitted through a service signaling channel through which service signaling is delivered, or a transport session of the application layer.

The signaling information (FIC information) for rapid service scan and acquisition may include at least one of the following fields. Herein, the FIC information may be referred to as service acquisition information. The FIC_portocol_version field may indicate the protocol version of the FIC signaling information (version of the structure of FIC). The TSID field may indicate an identifier of the overall broadcast stream. The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster. Each partition may represent a portion of the broadcast stream used by one broadcaster. The partition_protocol_version field may indicate the version of the partition structure described above. The base_DP_ID field may indicate an identifier for the base DP of the partition. The base DP may include a service signaling table. The service signaling table may include a list of all services in the partition. That is, the service signaling table may list the services to be transmitted. Default properties for each service may also be defined. The base DP may be a robust DP within the partition and may contain other signaling tables for the partition. The base_DP_version field may indicate version information indicating a change in data transmitted through the base DP. For example, in transmitting service signaling or the like through the base DP, the base_DP_version field may be incremented by 1 when a change in service signaling occurs. The num_services field may indicate the number of at least one service belonging to the partition. The service_id field may indicate an identifier for the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service. The short_Service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. For example, the service_distribution field may indicate information about whether the service is included in the partition, whether the service is partially included in the partition but is presentable with the partition, whether another partition is required for presentation, or whether another broadcast stream is required for presentation. The sp_indicator field is a service protection flag that may indicate whether one or more components needed for the presentation are protected.

FIG. 61 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the following fields. The FIC_portocol_version field may indicate the protocol version of the FIC signaling information (version of the structure of FIC). The TSID field may indicate an identifier of the overall broadcast stream. The FIC_data_version field may indicate the data version of the FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster. Each partition may represent a portion of the broadcast stream used by one broadcaster. The partition_id field may indicate the identifier of the partition. The partition_protocol_version field may indicate the version of the partition structure described above. The num_services field may indicate the number of at least one component belonging to the partition. The service_id field may indicate an identifier for the service. The service_data_version field may indicate a change in service loop data in the FIC or a change in service signaling data associated with the service. The service_data_version field may be incremented by 1 each time a change occurs in the included service data. The receiver may use the service_data_version field to detect a change in the service loop data of the FIC or a change in the signaling associated with the service. The channel_number field may indicate the channel number associated with the service. The service_category field may indicate a category of the corresponding service and may indicate, for example, A/V, audio, ESG, CoD, or the like. The short_service_name _length field may indicate the length of the name representing the service. The short_service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. For example, the service_distribution field may indicate information about whether the service is included in the partition, whether the service is partially included in the partition but presentable with the partition, whether another partition is required for presentation, or whether another broadcast stream is required for presentation. The sp_indicator field is a service protection flag that may indicate whether one or more components needed for the presentation are protected. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the UDP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE. The service_signaling_flag field may indicate whether the transport session transmits service signaling. When the value of service_signaling_flag is 1, it may indicate that the data transmitted through the corresponding transport session (for example, ROUTE or MMTP session) includes service signaling. The Transport session descriptors field may contain descriptors at the transport session level. Each descriptor is extensible, and each descriptor may include a num_descriptors field. Each descriptor may include as many descriptor loops as the value indicated by the num_descriptors field. The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 62:
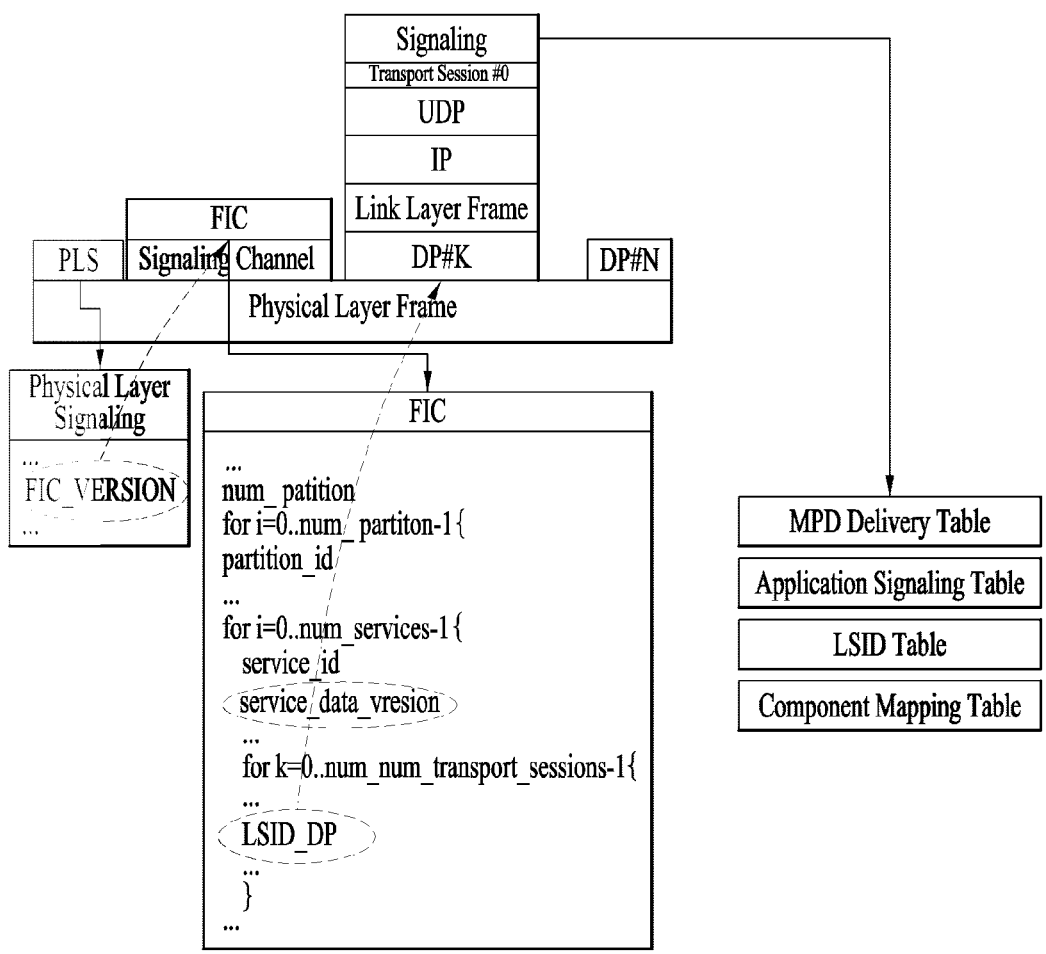
FIG. 62 illustrates a method of signaling a location of service layer signaling through FIC as signaling for rapid service scan and acquisition to acquire service layer signaling from the corresponding location according to an embodiment of the present invention.

FIG. 62 illustrates a method for transmitting FIC-based signaling according to an embodiment of the present invention. The above-mentioned FIC-based signaling may be delivered as shown in the figure. The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver may parse the service acquisition information and check whether the data of the service signaling is changed through the service_data_version information. When the service signaling data is changed, the broadcast signal receiver may check the data pipe identifier of the physical layer that carries signaling including detailed information on the transport session, using the LSID_DP field. The broadcast receiver may verify the details of the transport session by parsing the DP indicated by the corresponding DP identifier. That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT).

FIG. 63 shows signaling data transmitted by a next generation broadcast system according to an embodiment of the present invention for rapid broadcast service scan of a receiver. FIC information (service acquisition information) to support rapid broadcast service scan and service/component acquisition may include information about an application layer transport session carrying service and component data. As shown in the figure, the FIC information may be expressed in binary format, but may be represented in other formats such as XML according to an embodiment. The FIC information may include the following fields. The FIC_portocol_version field may indicate the protocol version of the FIC signaling information (version of the structure of FIC). The TSID field may indicate an identifier of the overall broadcast stream. The FIC_data_version field may indicate the data version of the this FIC instance. The FIC_data_version field may be incremented if there is a change in the content of the FIC. The num_partitions field may represent the number of partitions in the broadcast stream. It is assumed that each broadcast stream can be transmitted in one or more partitions in order for the num_partitions field to be used. Each partition may contain a plurality of DPs by one broadcaster. Each partition may represent a portion of the broadcast stream used by one broadcaster. The partition_id field may indicate the identifier of the partition. The partition_protocol_version field may indicate the version of the partition structure described above. The num_services field may indicate the number of at least one component belonging to the partition. The service_id field may indicate an identifier for the service. The service_data_version field may indicate a change in service loop data in the FIC or a change in service signaling data associated with the service. The service_data_version field may be incremented by 1 each time a change occurs in the included service data. The receiver may use the service_data_version field to detect a change in the service loop data of the FIC or a change in the signaling associated with the service. The channel_number field may indicate the channel number associated with the service. The service_category field may indicate a category of the corresponding service and may indicate, for example, A/V, audio, ESG, CoD, or the like. The short_service_name_length field may indicate the length of the name representing the service. The short_service_name field may indicate a name representing the service. The service_status field may indicate the status of the service and may indicate an active or suspended, hidden or shown attribute depending on the value thereof. The service_distribution field may have attributes similar to the "multi-ensemble" flag of the ATSC M/H document. For example, the service_distribution field may indicate information about whether the service is included in the partition, whether the service is partially included in the partition but presentable with the partition, whether another partition is required for presentation, or whether another broadcast stream is required for presentation. The sp_indicator field is a service protection flag that may indicate whether one or more components needed for the presentation are protected. The IP_version_flag field may indicate the format of the IP address that follows. If the value of the field is 0, it indicates that IPv4 format is used, and if 1, it indicates that IPv6 address format is used. The source_IP_address_flag field may indicate whether source_IP_addr is included. If the value of this field is 1, it indicates that source_IP_addr exists. The num_transport_session field may indicate the number of transport sessions (for example, ROUTE or MMTP sessions) for transmitting component data of the corresponding service in the broadcast stream. The source_IP_addr field may indicate the source IP address of the IP datagram including the component data of the corresponding service when the value of the source_IP_address_flag is 1. The dest_IP_addr field may indicate the destination IP address of the IP datagram including the component data of the corresponding service. The dest_UDP_port field may indicate the UDP port number of the IP datagram that contains the component data of the corresponding service. The LSID_DP field may represent a data pipe identifier of the physical layer carrying signaling including detailed information about the transport session. Here, the signaling including the detailed information about the transport session may be, for example, an LCT session instance description including information on the detailed LCT transport session of each ROUTE session in the case of ROUTE. The service_signaling_flag field may indicate whether the transport session transmits service signaling. If the value of the service_signaling_flag value is 1, it may indicate that there is a DP including service signaling. The signaling_data_version field may indicate a change in the associated service signaling data. Each time the service signaling data changes, the field may be incremented by 1. The receiver may use the signaling_data_version field to detect changes in the signaling associated with the service. The signaling_DP field may indicate the data pipe identifier of the physical layer carrying the service signaling. The Transport session descriptors field may contain descriptors at the transport session level. Each descriptor is extensible, and each descriptor may include a num_descriptors field. Each descriptor may include as many descriptor loops as the value indicated by the num_descriptors field. The Transport session descriptors field may contain descriptors at the transport session level. The service descriptors field may include service level descriptors. The Partition descriptors field may include a partition level descriptor, and one partition may indicate a part of a broadcast stream used by one broadcaster or the like. The FIC session descriptors field may contain FIC level descriptors. According to an embodiment, each of the fields included in the FIC described above may be included in a table other than the FIC and transmitted together with a broadcast signal.

Figure 64:
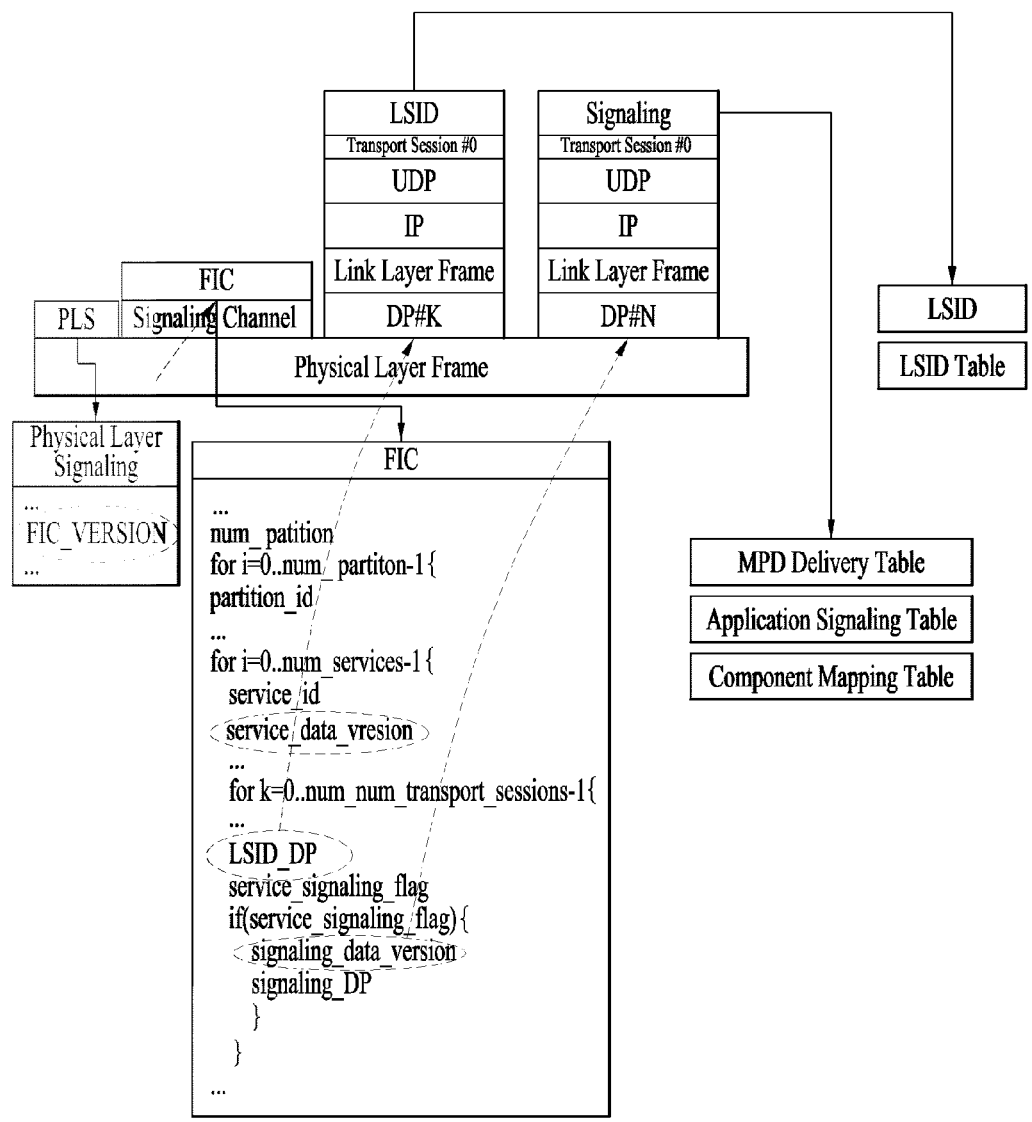
FIG. 64 illustrates a method of signaling a location of service layer signaling through FIC as signaling for rapid service scan and acquisition to acquire service layer signaling from the corresponding location according to another embodiment of the present invention.

FIG. 64 illustrates a method for transmitting FIC-based signaling according to another embodiment of the present invention. The above-mentioned FIC-based signaling may be delivered as shown in the figure. The FIC-based signaling may be referred to as service acquisition information or service acquisition signaling. As shown in the figure, the physical layer signaling may include a field for service acquisition information. The field for the service acquisition information may inform the receiver of whether the service acquisition information (FIC) is parsed. The receiver parses the service acquisition information and may check whether the data of the service signaling is changed through the service_data_version information. When the service signaling data is changed, the broadcast signal receiver may acquire the LSID or LSID Table including detailed information on the transport session using the LSID_DP field through the DP identified from the LSID_DP field. In addition, the receiver may recognize change of the signaling data using information such as service_signaling_flag, signaling_data_version, signaling_DP, etc., and acquire the signaling data through the DP identified from the signaling_DP.

That is, the signaling method of the next generation broadcast system includes a procedure of signaling whether the physical layer signaling parses the service acquisition information, and the service acquisition information signals the location of the detailed information about the transport session to check the detailed information about the transport session. Here, the detailed information about the transport session may include an MPD transport table, an application signaling table, a transport session descriptor (LSID), and/or a component mapping table (CMT), and each detail of the transmission session may be delivered by different examples.

FIG. 65 is a diagram illustrating a service signaling message format of a next generation broadcast system according to an embodiment of the present invention. In this specification, the service signaling message may be referred to as signaling data or service layer signaling including detailed information on services and the like. The service signaling message may include a signaling message header and a signaling message. The signaling message may be expressed in binary or XML format. It may be sent in an IP datagram or a payload of application layer transport packets (e.g., ROUTE or MMTP). The syntax of the signaling message header may be as follows, which may be represented in other formats such as XML. The Signaling message header may include the following fields. The signaling_id field may indicate an identifier of a signaling message. For example, if the signaling message is in the form of a section, it may indicate the id of the signaling table section. The signaling length field may indicate the length of the included signaling message. The signaling_id_extension field may indicate extension information about an identifier for the signaling message. The signaling_id_extension field together with the signaling_id field may be used as information for identifying the signaling. For example, the signaling_id_extension field may include a protocol version of the signaling message. The version_number field may indicate the version information of the signaling message. The version_number field may be changed if the content of the signaling message changes. The current_next_indicator field may indicate whether the included signaling message is currently available. If the value of this field is '1', it indicates that the included signaling message is currently available. If the value of this field is '0', it indicates that the signaling message is not currently available and that a signaling message containing the same signaling_id, signaling_id_extension, or fragment_number will be available later. The fragmentation_indicator field may indicate whether the signaling message has been fragmented. If the value of this field is '1', this may indicate that the message has been fragmented. This may in turn indicate that part of the signaling data is included in signaling_message_data( ). If the value of this field is '0', this may indicate that the entire signaling data is included in signaling_message_data( ). The payload_format_indicator field may indicate whether the payload_format_indicator field currently contains the value of payload_format in the signaling message header. If the value of this field is '1', this may indicate that the payload_format value is included in the header part of the signaling message. The expiration_indicator field may indicate whether the header part of the signaling message currently contains an expiration value. If the value of this field is '1', it may indicate that the expiration value is included in the header part of the signaling message. The fragment_number field may indicate the fragment number of the current signaling message when a signaling message transmitted is divided into multiple fragments. The last_fragment_number field indicates the number of the fragment containing the last data of the signaling message when one signaling message is divided into several fragments. The payload_format field may indicate the format of the signaling message data contained in the payload. For example, the field may indicate binary, XML, or the like. The expiration field may indicate the valid time of the signaling message included in the payload.

FIG. 66 shows a service signaling table used in a next generation broadcast system according to an embodiment of the present invention. In the present invention, the following service signaling tables/messages may be used in the next generation broadcast network and signal the following information. The information contained in each table/message may be individually transmitted in different tables and is not limited by the illustrated embodiment. In some embodiments, the signaling information belonging to different tables may be merged into one table and transmitted. The service mapping table may include attributes of a service and information related to the service. The attribute information of the service may include, for example, as an ID, a name, and a category. The information associated with the service may include path information for acquiring the service. The MPD Delivery table may contain DASH MPD associated with the service/content or path information for acquiring the DASH MPD. The component mapping table may contain information about components in the service and information associated with the components. The component information may include associated DASH representation information, and the information associated with the component may include path information for acquiring the component. The LSID table may contain information about a transport session for transmitting a service/component and the like and a configuration of a transport packet. The Initialization Segment Delivery table may contain Initialization Segment information about the DASH Representation associated with the component in the service or a path for acquiring the same. The application parameter table may contain related information such as detailed information about an application associated with a broadcast service and a path for acquiring the same. These signaling messages/tables may be transmitted over the broadcast network, through a Rapid Information Channel (FIC), a Service Signaling Channel (SSC), or an application layer transport session (for example, ROUTE or MMTP session). Further, the signaling messages/tables may be transmitted over the Internet network (broadband).

FIG. 67 is a diagram illustrating a service mapping table used in a next generation broadcast system according to an embodiment of the present invention. The content described below may be included in a portion of the service signaling message following the signaling message header.

The service mapping table may contain information on service mapping signaling and may be expressed in XML format or binary format. The service mapping table, which is one of service signaling, may contain a service identifier (id), a service type, a service name, a channel number, ROUTE session related information, MPD related information, and component signaling location information. The service identifier may indicate information for identifying the service and may be expressed by an id attribute. The service type information may indicate the type of the service, and may be expressed by the serviceType attribute. The service name information may indicate the name of the service, and may be expressed by the serviceName attribute. The channel number information may indicate a channel number associated with the service, and may be expressed by the channelNumber attribute.

The ROUTE session related information may include a sourceIP attribute, a destinationIP attribute, and a destinationPort attribute. The sourceIP attribute may indicate the source address of the IP datagrams containing the associated data. The destinationIP attribute may indicate the destination address of the IP datagrams containing the associated data. The destinationPort attribute may indicate the destination port number of the UDP packet header in the IP datagram containing the associated data.

The ROUTE session related information may include detailed information (LSID) about the transport sessions, and may include, for example, each LSID location and delivery mode information for each LSID location information. The detailed information (LSID) about the transport sessions may also include bootstrap information. The bootstrap information included in the LSID may include bootstrap information about the LSID according to the delivery mode. The attributes included in the bootstrap information are described in detail below.

The MPD related information may include information about the MPD or MPD signaling location. The information about the MPD may include the version attribute and indicate the version of the MPD DT. The MPDSignalingLocation information may indicate a location where signaling associated with the MPD or MPD URL can be acquired. The deliveryMode information included in the MPD signaling location may indicate the delivery mode of the MPD location signaling. The BootstrapInfo information included in the MPDSignalingLocation may include bootstrap information about the MPD or MPD URL according to the delivery mode.

The ComponentSignalingLocation information may include a deliveryMode attribute. The deliveryMode attribute may indicate the delivery mode of the corresponding component signaling location information. The bootstrap information included in the MPDSignalingLocation may include bootstrap information of the corresponding component location signaling according to the delivery mode.

The bootstrap information may include at least one of the following attributes depending on the delivery mode.

The sourceIP attribute may indicate the source address of the IP datagrams containing the associated data. The destinationIP attribute may indicate the destination address of the IP datagrams containing the associated data. The destinationPort attribute may indicate the destination port number of the UDP packet header containing the associated data. The tsi attribute may indicate an identifier for the transport session carrying transport packets carrying the associated data. The URL attribute may indicate a URL where the associated data can be acquired. The packetid may indicate the identifier of transport packets carrying the associated data.

FIG. 68 shows a service signaling table of a next generation broadcast system according to an embodiment of the present invention. The next generation broadcast system may provide broadcast service signaling to allow the receiver to receive broadcast services and content. This allows the receiver to acquire relevant signaling if the signaling data is transmitted over the same Transport session Identifier (TSI). The service signaling table may be represented in a binary format as shown in the figure and may be represented in other forms such as XML according to an embodiment. The service signaling table may also be encapsulated in the signaling message format described above. The service signaling table may contain the following fields. The SST_portocol_version field may indicate the version of the service signaling table. The partition_id field may indicate the identifier of the partition. The SST_data_version field may indicate the data version of the service signaling table. The num_services field may indicate the number of at least one service included in the partition. The service_id field may indicate the identifier of the corresponding service. The service_name field may indicate the name of the service. The MPD_availability field may indicate whether the MPD can be acquired over the broadcast, cellular network, and/or wifi/Ethernet. The CMT_availability field may indicate whether a Component Mapping Table (CMT) is available over the broadcast, cellular network and/or wifi/Ethernet. The ASL_availability field may indicate whether the Application Signaling Table (AST) is available over the broadcast, cellular network, and/or wifi/Ethernet. The DP_ID field may indicate the identifier of the DP that delivers the MPD, CMT, and/or ASL through broadcast. The LCT_IP_address field may indicate the IP address of the LCT channel carrying the MPD, CMT and/or ASL. The LCT_UDP_port field may indicate the UDP port of the LCT channel carrying the MPD, CMT and/or ASL. The LCT_TSI field may indicate a Transport Session Identifier (TSI) of the LCT channel carrying MPD, CMT and/or ASL. The MPD_TOI field may indicate a Transport Object Identifier of an application transport packet that carries the MPD when the MPD is delivered through broadcast. The CMT TOI field may indicate a Transport Object Identifier of an application transport packet that carries the CMT when the CMT is delivered through broadcast. The AST_TOI field may indicate a transport object identifier of an application transport packet that carries the AST when the AST is delivered via broadcast. The MPD_URL field may indicate URL information for acquiring MPD over broadband. The CMT_URL field may indicate URL information for acquiring CMT over broadband. AST_URL Broadband may indicate URL information for acquiring AST.

Figure 69:
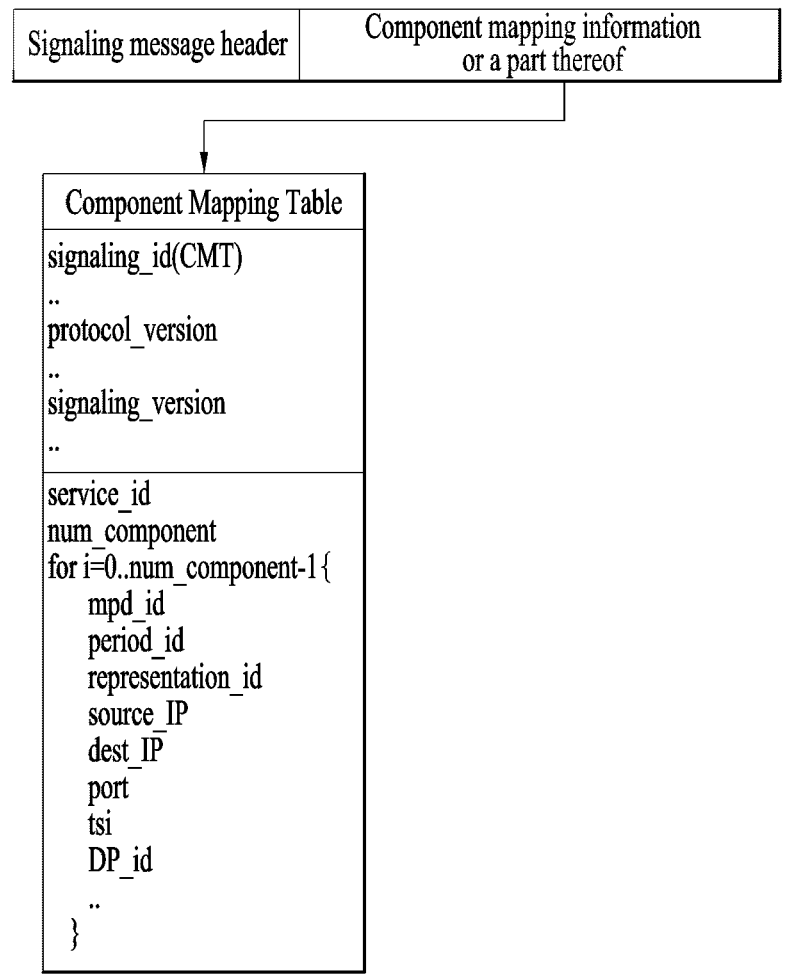
FIG. 69 is a diagram illustrating a component mapping table used in a next generation broadcast system according to an embodiment of the present invention.

FIG. 69 is a diagram illustrating a component mapping table used in a next generation broadcast system according to an embodiment of the present invention. The content described below may be included in a portion of the service signaling message located after the signaling message header. The component mapping table may contain information on component mapping signaling and may be expressed in the XML format or binary format. The component mapping table, which is one of the service signaling, may include the following fields. The Signaling_id field may contain an identifier indicating that the corresponding table is a component mapping table. The protocol_version field may indicate the protocol version of the component mapping table, such as the component mapping table syntax. The Signaling_version field may indicate a change in the signaling data of the component mapping table. The Service_id field may indicate an identifier for a service associated with the components. The Num_component field may indicate the number of components included in the service. The Mpd_id field may indicate the DASH MPD identifier associated with the component. The Period_id field may indicate a DASH period identifier associated with the component. The representation_id field may indicate a DASH representation identifier associated with the component. The Source_IP field may indicate the source IP address of the IP/UDP datagram containing the component data. The Dest_IP field may indicate a destination IP address of an IP/UDP datagram including the component data. The port field may indicate the port number of the IP/UDP datagram containing the component data. The tsi field may indicate the identifier of the application layer transport session containing the component data. The DP_id field may indicate the identifier of a physical layer data pipe carrying the corresponding component data. With the above information, the CMT may define the components associated with each service and inform the receiver of the location or path where the components can be received.

FIG. 70 illustrates a component mapping table description according to an embodiment of the present invention. The Component Mapping Table Description may signal information on a transmission path of components included in a broadcast service in a next generation broadcast system. It may be expressed by a bitstream in the XML format or binary format. The component mapping table description may include the following elements and attributes. The service_id attribute may indicate the identifier of the service associated with the component. BroadcastComp may indicate one or more components transmitted over the same broadcast stream. BroadcastComp may include at least one of mpdID, perID, reptnID, baseURL, and/or datapipeID. The mpdID attribute may indicate the DASH MPD identifier associated with BroadcastComp. The perID attribute may indicate the associated period identifier in the corresponding MPD. The reptnID attribute may indicate the DASH Representation identifier associated with the component. The baseURL attribute may indicate the Base URL associated with the DASH segment associated with that component. The datapipeID attribute may indicate the identifier of a data pipe through which the corresponding component data is transmitted in a broadcast stream.

BBComp may indicate one or more components transmitted over a broadband network. BBComp may include at least one of mpdID, perID, reptnID, and/or baseURL. The mpdID attribute may indicate the DASH MPD identifier associated with BBComp. The perID attribute may indicate the associated period identifier in the corresponding MPD. The reptnID attribute may indicate the DASH Representation identifier associated with the component. The baseURL attribute may indicate the Base URL associated with the DASH segment associated with that component.

The ForeignComp may indicate one or more components transmitted through another broadcast stream. The ForeignComp may include at least one of mpdID, perID, reptnID, baseURL, transportStreamID, sourceIPAddr, destIPAddr, and/or destUDPPort. The mpdID attribute may indicate the DASH MPD identifier associated with ForeignComp. The perID attribute may indicate the associated period identifier in the corresponding MPD. The reptnID attribute may indicate the DASH Representation identifier associated with the component. The baseURL attribute may indicate the base URL of the DASH segment associated with the component. The transportStreamID attribute may indicate the identifier of the broadcast stream containing the component data. The sourceIPAddr attribute may indicate the source IP address of the IP datagram containing the component data. The destIPAddr attribute may indicate the destination IP address of the IP datagram containing the component data. The destUDPPort attribute may indicate the destination UDP port number of the IP datagram containing the component data. The datapipeID attribute may indicate the identifier of a data pipe through which the corresponding component data is transmitted in the broadcast stream. The Component Mapping Description may be encapsulated in a single XML file or in the signaling message format proposed above. As shown in the lower part of FIG. 70, the Signaling message header may take the form described above, and the component message description or a part thereof may be included in the service message part. With the above information, the CMT may define the components associated with each service and inform the receiver of the location or path where information related to the components can be received.

FIG. 71 shows syntax of a component mapping table of a next generation broadcast system according to an embodiment of the present invention. The next generation broadcast system may signal the component mapping table (CMT) to allow the receiver to acquire the components of the broadcast service. The CMT may be expressed in other formats such as the binary format or XML format and may be encapsulated in the signaling message format described above. The CMT may contain the following fields. The CMT_portocol_version field may indicate the version of the structure of the Component Mapping Table (CMT). The service_id field may indicate an identifier of a service related to a component location provided by the corresponding CMT. The CMT_data_version field may indicate a data version of the corresponding CMT. The num_broadcast_streams field may indicate the number of broadcast streams including at least one component associated with the service. The TSID field may indicate the transport session identifier of the broadcast stream. The num_partitions field may indicate the number of partitions of the broadcast stream including at least one component associated with the service. The CMT may include a plurality of partitions. The partition_id field may indicate the identifier of the partition. The num_data_pipes field may indicate the number of data pipes in the partition that includes at least one component associated with the service. The DP_ID field may indicate the identifier of each data pipe. The num_ROUTE_sessions field may indicate the number of transport sessions (e.g., ROUTE sessions) included in each datapipe. Each datapipe may include at least one component associated with the service. The IP_address field may indicate the IP address of each transport session. The UDP_port field may indicate the UDP port of each transport session. The num_LCT_channels field may indicate the number of LCT channels in the transport session including the component associated with the service. The LCT_TSI field may indicate a Transport Session Identifier (TSI). The Representation_ID field may indicate the identifier of the DASH Representation carried by the corresponding LCT channel. According to an embodiment, the CMT may further include an MPD id field and a Period id field. In this case, a globally unique ID may be acquired by combining MPD id, Period id, and Representation id. The Internet_availability field may be an identifier that indicates whether the Representation can be received over the Internet or broadband. The num_internet_only_reptns field may indicate the number of Representations that may be received only over the Internet or broadband. The Representation_ID field may indicate an identifier of a DASH Representation that can be received only over the Internet or broadband within a loop of num_internet_only_reptns. As described above, according to embodiments, a globally unique identifier may be configured by combining MPD id, Period id, and Representation id. With the above information, the CMT may define the components associated with each service and inform the receiver of the location or path where the components can be received.

FIG. 72 illustrates a method for delivering signaling associated with each service over a broadband network in a next generation broadcast system according to an embodiment of the present invention. The next generation broadcast system may transmit signaling related to the service to the receiver over the broadband network or the like. The next generation broadcast system may transmit signaling to the receiver through a broadband network or the like using URL Signaling Table Description. It may be represented in other formats such as XML or binary. The URL Signaling Table Description may include the following attributes. The service_id attribute may indicate the identifier of the service associated with the signaling. The mpdURL attribute may indicate the URL of the broadband MPD. The cstURL attribute may indicate the URL of the broadband CMT. The CMT may contain information on the component data acquisition path in the broadcast service. The astURL attribute may indicate the URL of the broadband AST. The AST may include information about an application associated with the broadcast service. The receiver may receive the description and receive the corresponding signaling based on the URL for each signaling. The URL Signaling Table Description may be encapsulated in a single XML file or in the signaling message format proposed above. As shown in the lower part of the figure, the signaling message header may conform to the form proposed above, and the header may include a URL Signaling Table Description or a part thereof.

FIG. 73 illustrates a method for signaling MPD in a next generation broadcast system according to an embodiment of the present invention. The signaling message for the MPD of the broadcast service available in the next generation broadcast network may include a signaling message header and a signaling message as shown in the upper part of the figure. The Signaling message header may conform to the above-described format, and the MPD delivery table information may include the following information. The Signaling_id information may identify that the corresponding signaling message is a signaling message that includes the MPD or path information for acquiring the MPD. The protocol_version information may indicate the protocol version of the MPD delivery table, such as the syntax of the signaling message. The Signaling_version information may indicate a change in the signaling data of the MPD delivery table. The Service_id information may indicate a service identifier associated with the signaling information. The Mpd_id information may indicate the identifier of the DASH MPD associated with the signaling message. The MPD_version information may represent version information indicating a change of the corresponding MPD or the like. The Delivery_mode information may indicate whether the signaling message includes the corresponding MPD or whether the MPD is transmitted through another path. The MPD_data( ) information may include the MPD data if the signaling message includes the MPD. The MPD_path information may include information on a path for acquiring the MPD. For example, a path may represent a URL, etc.

The MPD delivery table description may contain the following information: The service_id attribute may indicate the identifier of the service associated with the signaling. The MPD_id attribute may indicate the identifier of the MPD. MPD_version may indicate version information that may indicate the MPD change information. The MPD_URL attribute may include URL information for acquiring an MPD. The MPD element may also include MPD information. The MPD Delivery Table Description may be encapsulated in a single XML file or in the signaling message format proposed above. That is, the signaling message header may conform to the previously proposed format, followed by an MPD Delivery Table Description or a part thereof.

FIG. 74 shows syntax of an MPD delivery table of a next generation broadcast system according to an embodiment of the present invention. The information of the MPD delivery table or a part thereof may be included after the signaling message header, and the information of the MPD delivery table may contain the following fields. The service_id field may indicate the identifier of an associated broadcast service. The MPD_id length field may indicate the length of subsequent MPD_id_bytes( ). The MPD_id_bytes field may indicate the identifier of the MPD file included in the signaling message. The MPD_version field may indicate version information such as a change in data of the MPD. The MPD_URL_availabilty field may indicate whether the URL information of the MPD exists in the corresponding signaling table/message. The MPD_data_availabilty field may indicate whether the MPD is included in the signaling table/message. If the value of this field is '1', this may indicate that the MPD is included in the signaling table/message. The MPD_URL_length field may indicate the length of subsequent MPD_URL_bytes( ). The MPD_URL_bytes field may indicate the MPD URL included in the signaling message. The MPD_coding field may indicate the encoding scheme of the MPD file included in the signaling message. As shown in the lower part of the figure, the MPD_coding field may indicate that MPD files are encoded in different encoding schemes according to the values. For example, if the value of the MPD_coding field is '0x00', this may indicate that the MPD file includes the MPD file. If the value of the field is '0x01', this may indicate that MPD file compressed by gzip is included. For example, if the MPD compressed by gzip is divided into a plurality of messages/tables, the corresponding MPD_bytes( ) may be concatenated and ungziped. The MPD byte length field may indicate the following MPD_bytes( ) length. The MPD_bytes field may contain the actual data of the MPD file included in the signaling message according to the encoding scheme specified in MPD_coding. The next generation broadcast system allows the receiver to receive or acquire the MPD associated with the service through the MPD delivery table including the fields described above.

FIG. 75 shows a description of a transmission session instance of a next generation broadcast system according to an embodiment of the present invention. When the application layer transmission method is Real-Time Object Delivery over Unidirectional Transport (ROUTE), a ROUTE session may include one or more Layered Coding Transport (LCT) sessions. The details of one or more transport sessions may be signaled through a transport session instance description. The transport session instance descriptor may be referred to as LCT Session Instance Description (LSID) if it is ROUTE. In particular, the transport session instance description may define what is delivered by each LCT transport session constituting the ROUTE session. Each transport session may be uniquely identified by the Transport Session Identifier (TSI). The transport session identifier may be included in the LCT header. The transport session instance description may describe all transport sessions that are transmitted through the session. For example, the LSID may describe a mode LCT session carried by a ROUTE session. The transport session instance description may be delivered through the same ROUTE session as the transport sessions, or may be delivered through different ROUTE sessions or unicast.

When delivered in the same ROUTE session, the transport session instance description may be transmitted in the transport session with a specified transport session identifier (TSI) 0. Other objects referenced in the transport session instance description may also be delivered with TSI=0, but may have a TOI value different from the transport session instance description. Alternatively, it may be delivered in a separate session with TSI≠0. The transport session instance description may be updated using at least one of the version number, validity information, and expiration information. The transport session instance description may be represented in a bitstream or the like in addition to the illustrated format.

The transport session instance description may include a version attribute, a validFrom attribute, an expiration attribute, and may include TSI attributes and SourceFlow and RepairFlow information for each transport session. The version attribute may indicate the version information about the corresponding transport session instance description, and the version information may be incremented each time the content is updated. The transfer session instance description with the highest version number may indicate the most recent valid version. The validFrom attribute may indicate when the transfer session instance description begins to be valid. The validFrom attribute may not be included in the transport session instance description according to an embodiment. This indicates that the transport session instance description is valid immediately upon receiving the description. The expiration attribute may indicate when the transfer session instance description expires. The expiration attribute may not be included in the transport session instance description according to the embodiment. This indicates that the transport session instance description is continuously valid. If a transport session instance description with an expiration attribute is received, expiration may conform to the expiration attribute. The TSI attribute may indicate a transport session identifier, and the SourceFlow element provides information about the source flow to be transmitted to the TSI, the details of which will be described below. The RepairFlow element may provide information about the repair flow sent to the corresponding TSI.

FIG. 76 shows a SourceFlow element of a next generation broadcast system according to an embodiment of the present invention. The source flow element may include an EFDT element, an idRef attribute, a realtime attribute, a minBufferSize attribute, an Application Identifier element, and a PayloadFormat element. The EFDT element may include detailed information of the file delivery data. An EFDT may indicate an extended File Delivery Table (FDT) instance, described in more detail below. The idRef attribute may indicate the identifier of the EFDT and may be represented as a URI by the corresponding transport session. The realtime attribute may indicate that the corresponding LCT packets include an extension header. The extension header may include a timestamp indicating the presentation time of the delivery object. The minBufferSize attribute may define the maximum amount of data needed to be stored in the receiver. The Application Identifier element may provide additional information that may be mapped to an application carried by that transport session. For example, the Representation ID of the DASH content or the Adaptation Set parameter of the DASH representation for selecting a transport session for rendering may be provided as additional information. The PayloadFormat element may define the payload format of a ROUTE packet carrying an object of the source flow. The PayloadFormat element may include a codePoint attribute, a deliveryObjectFormat attribute, a fragmentation attribute, a deliveryOrder attribute, a sourceFecPayloadID attribute, and/or a FECParameters element. The codePoint attribute may define the structure of the packet with the code point value used in the payload. This may indicate the value of the CP field in the LCT header. The deliveryObjectFormat attribute may indicate the payload format of the delivery object. The fragmentation attribute may define fragmentation rules when an object to be transmitted is divided into one or more transport packets. The deliveryOrder attribute may indicate the order of transmission of the content of each transport packet carrying one transport object. The sourceFecPayloadID attribute may define the format of the source FEC payload identifier. The FECParameters element may define FEC parameters. This may include FEC encoding id and instance id.

FIG. 77 shows an EFDT of a next generation broadcast system according to an embodiment of the present invention. The EFDT may include detailed information of the file delivery data. The EFDT may include an idRef attribute, a version attribute, a maxExpiresDelta attribute, a maxTransportSize attribute, and a FileTemplate element. The idRef attribute may indicate the identifier of the EFDT. The version attribute may indicate the version of the EFDT instance descriptor. This attribute may be incremented by 1 when EFDT is updated. It may indicate that the EFDT having the highest version number among the received EFDTs is the currently valid version. The maxExpiresDelta attribute may indicate the maximum expiry time of the object after the first packet associated with the object is sent. The maxTransportSize attribute may indicate the maximum transmission size of the object described by the EFDT. For the FileTemplate element, the file URL or file template of the body part may be specified.

The transfport session instance descriptor (LSID) element may be transmitted by the Transport Session Instance Descriptor Table (LSID Table) at the bottom of the figure. The LSID table may be transmitted by the above-described signaling message, which may be divided into a signaling message header and a signaling message data part. The signaling message data part may include a transport session instance descriptor (LSID) or a part thereof. The signaling message data may include a Transport Session Instance Descriptor (LSID) Table and may include the following fields. The Signaling_id field may indicate identifier information indicating that the signaling table includes a transport session instance descriptor (LSID). The protocol_version field may indicate a protocol version of the signaling, such as a signaling syntax that includes a transport session instance descriptor (LSID). The Signaling_version field may indicate a change in signaling data, including a transport session instance descriptor (LSID). In addition, the transport session instance descriptor table may further include the content of the LSID element described above.

Figure 78:
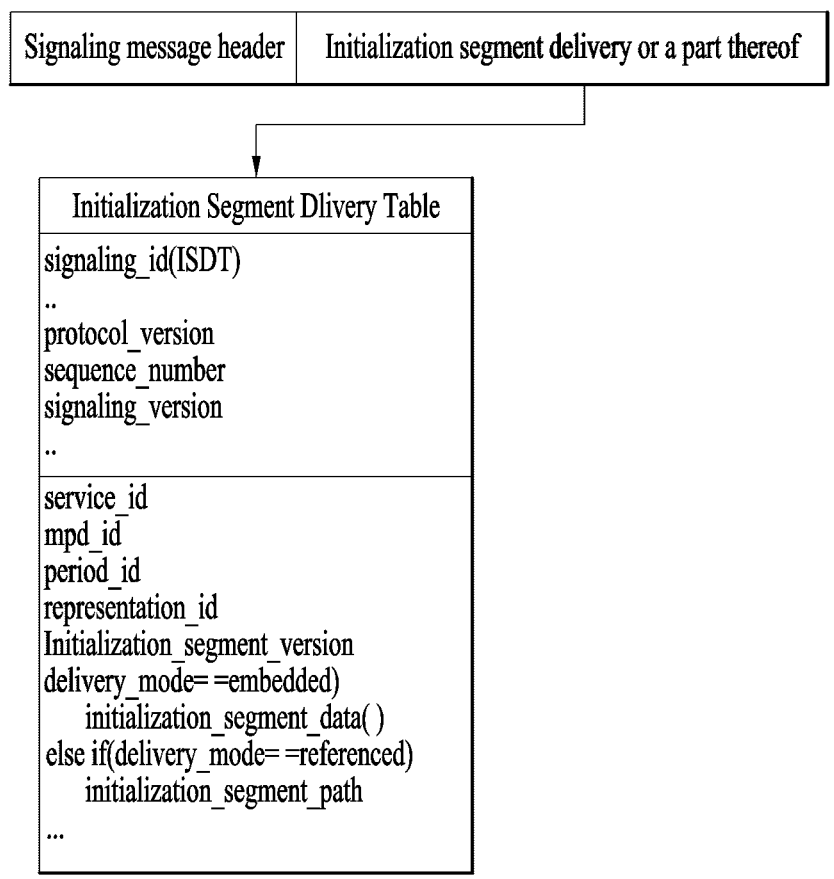
FIG. 78 shows a method for transmitting an ISDT used by a next generation broadcast system according to an embodiment of the present invention.

FIG. 78 shows a method for transmitting an ISDT used by a next generation broadcast system according to an embodiment of the present invention. The next generation broadcast system may transmit signaling information for the initialization segment of the DASH Representation associated with the component in the broadcast service by transmitting the Initialization Segment Delivery Table (ISDT). A signaling message for the initialization segment of a DASH Representation associated with a component in a broadcast service may include a header and data. The signaling message header may conform to the above-described format, and the signaling message data may include initialization segment delivery information or a part thereof. The initialization segment delivery information may include the following information. The Signaling_id information may identify the initialization segment or a signaling message including path information. The protocol_version information may indicate the protocol version of the initialization segment delivery table, such as the syntax of the corresponding signaling message. The Sequence_number information may indicate the identifier for an instance of the initialization segment delivery table. The Signaling_version information may indicate a change in the signaling data of the initialization segment delivery table. The Service_id information may identify the service associated with the component. The Mpd_id information may indicate an associated DASH MPD identifier associated with the component. The period_id information may indicate an associated DASH Period identifier associated with the component. The representation_id information may indicate a DASH representation identifier associated with the component. The initialization_segment_versioninformation may be version information indicating a change of the corresponding MPD or the like. The Delivery_mode information may indicate information about whether the initialization segment is included or is transmitted through another route. Initialization_segment_data( ) information may contain the initialization segment data itself. The initialization segment path information may include information on a path for acquiring an initialization segment, such as a URL for an initialization segment. Through the ISDT, the receiver may receive information about the Initialization segment of the DASH Representation associated with the component.

FIG. 79 shows a delivery structure of a signaling message of a next generation broadcast system according to an embodiment of the present invention. The above signaling data may be communicated as shown in the figure if it is sent based on an application layer transport, for example, ROUTE. That is, a part signaling may be transmitted through a fast information channel in order to support rapid service scan. And a part of the signaling may be transmitted over a specific transport session and may also be delivered mixed with the component data.

The signaling information for supporting the rapid service scan and acquisition may be received on a channel separate from the transport session. Here, the separate channel may mean a separate data pipe (DP). Further, detailed information about the service may be received through a separately designated transport session. The transport session may have a value of TSI=0. The information delivered through the transport session designated herein may include an MPD delivery table, an application signaling table, a transport session instance description table, and/or a component mapping table. In addition, a part of signaling information may be delivered in the transport session along with the component data. For example, an initialization segment delivery table may be delivered with the component data.

The lower part of the figure shows an embodiment of acquiring a broadcast service in a next generation broadcast network. The receiver may tune the broadcast and acquire and parse information for rapid service scanning and acquisition when the service is selected. The location of the service layer signaling or transport session instance description (e.g., LSID) is then determined from the information for rapid service scan and acquisition to acquire and parse the description. In addition, the receiver may identify the transport session including the signaling, from which it may acquire and parse the signaling table, and determine a desired component. Through this process, the desired component may be presented. That is, the broadcast service may be provided to the user by acquiring information about the transport session from the information for rapid service scan and acquisition, checking the position of the desired component from the information about the transport session, and reproducing the component.

FIG. 80 illustrates signaling data transmitted for rapidly scanning a broadcast service of a receiver of a next-generation broadcast system according to an embodiment of the present invention. FIC information (service acquisition information) for supporting rapid broadcast service scan and service/component acquisition may include information on an application layer transport session for transferring service and component data. As illustrated in the drawing, the FIC information may be represented in a binary format but, in some embodiments, may be represented in a different format such as XML. The FIC information may include the following fields. An FIC_portocol_version field may indicate a protocol version (version of structure of FIC) of signaling information. A TSID field may indicate an identifier of an overall broadcast stream. An FIC_data_version field may indicate data version of this FIC instance. An FIC_data_version field may be increased when the content of the FIC is changed. A num_partitions field may indicate the number of partitions of a broadcast stream. In order to use the num_partitions field, it may be assumed that each broadcast stream is capable of being divided into one or more partitions and transmitted. Each partition may include a plurality of IDPs by one broadcaster. Each partition may indicate a part of a broadcast stream used by one broadcaster. A partition_id field may indicate an identifier of a corresponding partition. A partition_protocol_version field may indicate a version of the aforementioned partition structure. A num_services field may indicate the number of at least one component belonging to a corresponding partition. A service_id field may indicate an identifier of a service. A service_data_version field may indicate change in service loop data in the FIC or change of service signaling data associated with a corresponding service. A service_data_version field may be incremented by 1 whenever service data is changed. A receiver may detect change in data of a service loop of the FIC or change in signaling associated with a corresponding service using the service_data_version field, A channel_number field may indicate a channel number of a corresponding service. A service_category field may indicate a category of a corresponding service and indicate, for example, A/V, audio, ESG, or CoD. A short_service_name_length field may indicate a length of a name of a corresponding service. A short_service_name field may indicate a name indicating a corresponding service. A service_status field may indicate the status of the service and may indicate an active or suspended, hidden or shown attribute depending on the value thereof. A service_distribution field may have attributes similar to a "multi-ensemble" flag of the ATSC M/H document. For example, the field may indicate information on whether a corresponding service is entirely included in a corresponding partition, whether presentation is possible only in a corresponding partition even if the service is partially included in the corresponding partition, whether another partition is required for presentation, or whether another broadcast stream is required for presentation. An sp_indicator field may indicate whether one or more components required for presentation need to be protected for presentation as a service protection flag. An IP_version_flag field may indicate a subsequent IP address format. When a corresponding field value is 0, the field may indicate that an IPv4 address format is used, and when the value is 1, the field may indicate that an IPv6 address format is used. A source_IP_address_flag field may indicate whether a source_IP_addr is included. When a corresponding field value is 1, this may indicate that a source_IP_addr is present. A num_transport_session field may indicate the number of transport sessions (e.g., ROUTE or MMTP session) for transmitting component data of a corresponding service in a broadcast stream. A source_IP_addr field may indicate a source IP address of an IP datagram including component data of a corresponding service when the aforementioned source_IP_address_flag value is 1. A dest_IP_addr field may indicate a destination IP address of an IP datagram including component data of a corresponding service. A dest_UDP_port field may indicate a UDP port number of an IP datagram including component data of a corresponding service. An LSID_DP field may indicate a data pipe identifier of a physical layer for transmitting signaling including detailed information on a transfer session. Here, signaling including the detailed information on the transfer session may be, for example, LCT session instance description including information on a detailed LCT transfer session of each ROUTE session in the case of ROUTE. An LSID_tsi field may indicate an identifier of a transfer session for transmitting a transfer session instance description as signaling including detailed information on a transfer session. Here, the session instance description may be LSID in the case of an LCT transfer session. Service signaling associated with a corresponding service may be transmitted through a transfer session for transmitting transfer session instance description. A service_signaling_flag field may indicate whether the transfer session transmits service signaling. When a value of the service_signaling_flag is 1, this may indicate that a DP including service signaling is present. A signaling_data_version field may indicate change in the associated service signaling data. Whenever service signaling data is changed, a corresponding field may be incremented by 1. The receiver may detect change in signaling associated with a corresponding service using the signaling_ data_version field. A signaling_DP field may indicate an identifier of a data pipe of a physical layer for transmitting service signaling. A signaling_tsi field may indicate an identifier of a transfer session for transmitting service signaling. A Transport session descriptors field may indicate a transfer session level of descriptors. Each descriptor is capable of being extended and may include a num_descriptors field. Each descriptor may include descriptor loops, the number of which corresponds to the number indicated by the num_descriptors field. A transport session descriptors field may include a transfer session level of descriptors. A service descriptors field may include a service level of descriptors. A partition descriptors field may include a partition level of descriptor and one partition may indicate a portion of a broadcast stream used by one broadcaster or the like. An FIC session descriptors field may include an FIC level of descriptors. In some embodiments, each field included in the aforementioned FIC may be included in another table other than the FIC and transmitted along with a broadcast signal.

FIG. 81 illustrates signaling data transmitted for rapidly scanning a broadcast service of a receiver of a next-generation broadcast system according to an embodiment of the present invention. FIC information (service acquisition information) for supporting rapid broadcast service scan and service/component acquisition may include information on an application layer transport session for transferring service and component data. As illustrated in the drawing, the FIC information may be represented in a binary format but, in some embodiments, may be represented in a different format such as XML. The FIC information may include the following fields. An FIC_portocol_version field may indicate a protocol version (version of structure of FIC) of signaling information. A TSID field may indicate an identifier of an overall broadcast stream. A num_partitions field may indicate the number of partitions of a broadcast stream. In order to use the num_partitions field, it may be assumed that each broadcast stream is capable of being divided into one or more partitions and transmitted. Each partition may include a plurality of DPs by one broadcaster. Each partition may indicate a part of a broadcast stream used by one broadcaster. A partition_id field may indicate an identifier of a corresponding partition. A partition_protocol_version field may indicate a version of the aforementioned partition structure. A num_services field may indicate the number of at least one component belonging to a corresponding partition. Each service may include a plurality of signaling tables. For example, each service may include DASH MPD including information on components and segments thereof, CMT including an identifier of components included in a broadband stream and other broadcast streams, AST as an application signaling table, and a URL signaling table (UST) including at least one URL among MPD, CMT, and AST. These signaling tables may be included in a signaling channel of a corresponding service. A service_id field may indicate an identifier of a service. A service_data_version field may indicate change in service loop data in FIC. A service_data_version field may be incremented by 1 whenever included service data is changed. For example, whenever FIC, MPD, CMT, AST, or UST is changed, the field may be incremented by 1. The receiver may detect change in data of a service loop of FIC or change in signaling associated with a corresponding service using the service_data_version field. A service_channel_number field may indicate a channel number associated with a corresponding service. A service_category field may indicate a category of a corresponding service and may be, for example, A/V, audio, ESG, or CoD. A service_short_name_length field may indicate a length of a name indicating a corresponding service. A service_short_name field may indicate a name indicating a corresponding service. A service_status field may indicate the status of the service and may indicate an active or suspended, hidden or shown attribute depending on the value thereof. A service_distribution field may have attributes similar to a "multi-ensemble" flag of the ATSC M/H document. For example, the field may indicate information on whether a corresponding service is entirely included in a corresponding partition, whether presentation is possible only in a corresponding partition even if the service is partially included in the corresponding partition, whether another partition is required for presentation, or whether another broadcast stream is required for presentation. An sp_indicator field may indicate whether one or more components required for presentation need to be protected for presentation as a service protection flag. An IP_version_flag field may indicate subsequent IP address format. When a corresponding field value is 0, the field may indicate that an IPv4 address format is used, and when the value is 1, the field may indicate that an IPv6 address format is used. A num_ROUTE_sessions field may include the number of transfer sessions for transmitting component data of a corresponding service in a broadcast stream. For example, the transfer session may be a ROUTE session. The following information may be set with respect to each ROUTE session. A source_IP_addr field may indicate a source IP address of an IP datagram including component data of a corresponding service. A dest_IP_addr field may indicate a destination IP address of an IP datagram including component data of a corresponding service. A dest_UDP_port field may indicate a UDP port number of an IP datagram of component data of a corresponding service. An LSID_DP field may indicate a data pipe identifier of a physical layer for transmitting signaling including detailed information on a transfer session. Here, the signaling including the detailed information on the transfer session may be, for example, LCT session instance description including information on a detailed LCT transfer session of each ROUTE session in the case of ROUTE. An LSID_tsi field may indicate an identifier of a transfer session for transmitting a transfer session instance description as signaling including detailed information on a transfer session. Here, the session instance description may be LSID in the case of LCT transfer session. Service signaling associated with a corresponding service may be transmitted through a transfer session for transmitting transfer session instance description. A component_signaling_flag_field may indicate whether the transfer session transmits service signaling. When a value of the component_signaling_flag is 1, this may indicate that the field includes service signaling (e.g., DASH media presentation description (MPD) or CMT) of data transmitted through a corresponding transfer session. HI-ere, the CMT may be a component mapping table and may include an identifier of components transmitted through a broadband and also include information on a component included in a broadcast stream. Each service may include a service signaling channel and the service signaling channel may include MPD, CMT, AST, and/or UST. A service signaling channel may be one signaling channel of a plurality of ROUTE sessions for a service and whether the service signaling channel is present may be indicated through a component signaling flag. When a plurality of transfer sessions (ROUTE or MMTP session) transmits signaling and service components, the aforementioned service signaling tables may be transmitted in one transfer session.

A ROUTE session descriptors field may include a transfer session level of descriptors. Each descriptor is capable of being extended and may include a num_descriptors field. Each descriptor may include descriptor loops, the number of which corresponds to the number indicated by the num_descriptors field. A transport session descriptors field may include a transfer session level of descriptors. A service descriptors field may include a service level of descriptors, A partition descriptors field may include a partition level of a descriptor and one partition may indicate a portion of a broadcast stream used by one broadcaster or the like. An FIC descriptors field may include an FIC level of descriptors.

In some embodiments, each field included in the aforementioned FIC may be included in another table other than FIC and transmitted along with a broadcast signal.

FIG. 82 illustrates a component mapping table description according to an embodiment of the present invention. The component mapping table description may signal information on a transmission path of a component included in a broadcast service in a next-generation broadcast system. This may be represented in XML format, binary bitstream, or the like. The component mapping table description may include the following elements and attributes. A service_id attribute may indicate an identifier of a service associated with a component. A BroadcastComp may indicate one or more components transmitted through the same broadcast stream. The BroadcastComp may include at least one of mpdID, perID, reptnID, baseURL, and/or datapipeID. The mpdID attribute may indicate a DASH MPD identifier associated with BroadcastComp. The perID attribute may indicate an associated period identifier in a corresponding MPD. The reptnID attribute may indicate an identifier of a DASH Representation associated with a corresponding component. The baseURL attribute may indicate Base URL of Segments constituting a DASH Representation associated with a corresponding component. The datapipeID attribute may indicate an identifier of a data pipe for transmitting corresponding component data in a broadcast stream.

The BBComp may indicate one or more components transmitted through a broadband network. The BBComp may include at least of mpdID, perID, reptnID, and/or baseURL. The mpdID attribute may indicate an identifier of DASH MPD associated with the BBComp. The perID attribute may indicate an associated period identifier in a corresponding MPD. The reptnID attribute may indicate an identifier of a DASH Representation associated with a corresponding component. The baseURL attribute may indicate Base URL of segments constituting a DASH Representation associated with a corresponding component.

The ForeignComp may indicate one or more components transmitted through another broadcast stream. The ForeignComp may include at least one of mpdID, perID, reptnID, baseURL, transportStreamID, sourceIPAddr, destIPAddr, destUDPPort, and/or datapipeID. The mpdID attribute may indicate an identifier of DASH MPD associated with the ForeignComp. The perID attribute may indicate an associated period identifier in a corresponding MPD. The reptnID attribute may indicate an identifier of a DASH Representation associated with a corresponding component. The baseURL attribute may indicate a Base URL of segments constituting a DASH Representation associated with a corresponding component. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP address of an IP datagram including corresponding component data. The destUDPPort attribute may indicate a destination UDP port number of an IP datagram including corresponding component data. The datapipeID attribute may indicate an identifier of a data pipe for transmitting corresponding component data in a corresponding broadcast stream. The aforementioned sourceIPAddrattribute, destIPAddr attribute, destUDPPort attribute, and datapipeID attribute may be optional attributes and may be selectively included in CMT in some embodiments. The above Component Mapping Description may be encapsulated and transmitted in one XML file or the above proposed signaling message format. As illustrated in the lower part, the signaling message header may follow the aforementioned form and include component mapping description or a part thereof in a service message part. The CMT may define components associated with each service and a location or a path for receiving information related to corresponding components may be signaled to the receiver through the above information.

FIG. 83 illustrates component mapping table description according to an embodiment of the present invention. The component mapping table description may signal information on a transmission path of a component included in a broadcast service in a next-generation broadcast system. This may be represented as a bitstream such as an XML or binary form. The component mapping table description may include the following element and attribute. A service_id attribute may indicate an identifier of a service associated with a component. A BroadcastComp may indicate one or more components transmitted through the same broadcast stream. The BroadcastComp may include at least one of mpdID, perID, reptnID, baseURL, tsi, and/or datapipeID. The mpdID attribute may indicate an identifier of DASH MPD associated with BroadcastComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component. A tsi attribute may indicate an identifier of a transfer session for transmitting corresponding component data in a broadcast stream. A datapipeID attribute may indicate an identifier of a data pipe for transmitting corresponding component data in a broadcast stream.

The BBComp may indicate one or more components transmitted through a broadband network. The BBComp may include at least one of mpdID, perID, reptnID, and/or baseURL. The mpdID attribute may indicate an identifier of DASH MPD associated with the BBComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component.

ForeignComp may indicate one or more components transmitted through different broadcast streams. The ForeignComp may indicate may include at least one of mpdID, perID, reptnID, baseURL, transportStreamID, sourceIPAddr, destIPAddr, destUDPPort, tsi, and/or datapipeID. The mpdID attribute may indicate an identifier of DASH MPD associated with the ForeignComp. The perID attribute may indicate an associated period identifier in a corresponding MPD. The reptnID attribute may indicate an identifier of a DASH Representation associated with a corresponding component. The baseURL attribute may indicate a Base URL of segments included in a DASH Representation associated with a corresponding component. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP address of an IP datagram including corresponding component data. The destUDPPort attribute may indicate may indicate a destination UDP port number of an IP datagram including corresponding component data. The tsi attribute may indicate an identifier of a transfer session for transmitting corresponding component data in a broadcast stream. The datapipeID attribute may indicate an identifier of a data pipe for transmitting corresponding component data in a corresponding broadcast stream. The aforementioned sourceIPAddrattribute, destIPAddr attribute, destUDPPort attribute, and datapipeID attribute may be optional attributes and may be selectively included in CMT in some embodiments. The above Component Mapping Description may be may be encapsulated and transmitted in one XML file or the above proposed signaling message format. As illustrated in the lower part, the signaling message header may follow the aforementioned form and include component mapping description or a part thereof in a service message part. The CMT may define components associated with each service and a location or a path for receiving information related to corresponding components may be signaled to the receiver through the above information.

FIGS. 84 and 85 illustrate component mapping table description according to an embodiment of the present invention. The component mapping table description may signal information on a transmission path of a component included in a broadcast service in a next-generation broadcast system. This may be represented in XML format, binary bitstream, or the like. The component mapping table may include a delivery parameter element and a payload format element which are transmitted along with a DASH related identifier.

The component mapping table description may include the following element and attribute. A service_id attribute may indicate an identifier of a service associated with a component. A component element may indicate a component in a corresponding broadcast service. The component element may include at least one of an mpdID attribute, a perID attribute, a reptnID attribute, a baseURL attribute, a DeliveryParameter element, and/or a PayloadFormat element. The mpdID attribute may indicate an identifier of DASH MPD associated with a component. The perID attribute may indicate an associated period identifier in a corresponding MPD. The reptnID attribute may indicate an identifier of a DASH Representation associated with corresponding component. The baseURL attribute may indicate a Base URL of segments included in a DASH Representation associated with the corresponding component.

The DeliveryParameter element may include detailed information on a path and the like for transmitting a corresponding component. The DeliveryParameter element may include at least one of transportStreamID, sourceIPAddr, destIPAddr, destUDPPort, tsi, datapipeID, and/or URL. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP data of an IP datagram including corresponding component data, The destUDPPort attribute may indicate a destination UDP port number of an IP datagram including corresponding component data. The tsi attribute may indicate an identifier of a transfer session for transmitting corresponding component data in a corresponding broadcast stream. The datapipeID attribute may indicate an identifier of a physical layer data pipe for transmitting corresponding component data in a corresponding broadcast stream. The URL attribute may indicate URL information for acquiring corresponding component data through the Internet and so on. The aforementioned sourceIPAddrattribute, destIPAddr attribute, destUDPPort attribute, datapipeID attribute, and/or URL attribute may be optional attributes and may be selectively included in the DeliveryParameter element in some embodiments.

The PayloadFormat element may include detailed information on a payload form of a packet for transmitting corresponding component data. The PayloadFormat element may include a codePoint attribute, a deliveryObjectFormat attribute, a fragmentation attribute, a deliveryOrder attribute, a sourceFecPayloadID attribute, and/or an FECParameters element. The codePoint attribute may define a codepoint used in a corresponding payload. This may indicate a value of a CP field of an LCT header. This may be an index of a set of values of a subsequent deliveryObjectFormat attribute, a fragmentation attribute, a deliveryOrder attribute, and a sourceFecPayloadID attribute. The deliveryObjectFormat attribute may indicate a payload format of a corresponding delivery object. The fragmentation attribute may define a type of fragmentation. The deliveryOrder attribute may indicate a delivery order of an object. The sourceFecPayloadID attribute may define the format of an identifier of a source FEC payload. The FECParameters element may define FEC parameters. This may include FEC encoding id, instance id, and so on.

FIG. 86 illustrates a component mapping table description according to an embodiment of the present invention. The component mapping table description may signal information on a transmission path of a component included in a broadcast service in a next-generation broadcast system. This may be represented as a bitstream such as an XML or binary form. The component mapping table description may include a service_id attribute, an mpd_id attribute, a per_id attribute, a BroadcastComp element, a BBComp element, and a ForeignComp element. The component mapping table description may include the following element and attribute. The service_id attribute may indicate an identifier of a service associated with a component. CMT description may include the mpdID attribute and the perID attribute at the same level as the service_id attribute. That is, the CMT description may describe mpdID attribute and perID attribute that are commonly applied to the BroadcastComp element, the BBComp element, and the ForeignComp element at the same level as the service_id attribute without redundantly describing these. The mpdID attribute may indicate an identifier of DASH MPD associated with a corresponding service. The perID attribute may indicate an associated period identifier in a corresponding MPD.

The BroadcastComp may indicate one or more components transmitted through the same broadcast stream. The BroadcastComp may include at least one of reptnID, baseURL, tsi, and/or datapipeID. The reptnID attribute may indicate an identifier of a DASH Representation associated with a corresponding component. The baseURL attribute may indicate a Base URL of segments included in a DASH Representation associated with a corresponding component. The tsi attribute may indicate an identifier of a transfer session for transmitting corresponding component data in a broadcast stream. The datapipeID attribute may indicate an identifier of a data pipe for transmitting corresponding component data in a broadcast stream.

The BBComp element may indicate one or more components transmitted through a broadband network. The BBComp may include at least one of reptnID and/or baseURL. The reptnID attribute may indicate an identifier of a DASH Representation associated with a corresponding component. The baseURL attribute may indicate a Base URL of components included in a DASH Representation associated with a corresponding component.

The ForeignComp may indicate one or more components transmitted through different broadcast streams. The ForeignComp may include at least one of reptnID, baseURL, transportStreamID, sourceIPAddr, destIPAddr, destUDPPort, tsi, and/or datapipeID. The reptnID attribute may indicate an identifier of a DASH Representation associated with a corresponding component. The baseURL attribute may indicate a Base URL of segments included in a DASH Representation associated with a corresponding component. The transportStreamID attribute may indicate an identifier of a broadcast stream including corresponding component data. The sourceIPAddr attribute may indicate a source IP address of an IP datagram including corresponding component data. The destIPAddr attribute may indicate a destination IP address of an IP datagram including corresponding component data. The destUDPPort attribute may indicate a destination UDP port number of an IP datagram including corresponding component data. The tsi attribute may indicate an identifier of a transfer session for transmitting corresponding component data in a corresponding broadcast stream. The datapipeID attribute may indicate an identifier of a data pipe for transmitting corresponding component data in a corresponding broadcast stream. The aforementioned sourceIPAddrattribute, destIPAddr attribute, destUDPPort attribute, tsi attribute, and datapipeID) attribute may be optional attributes and may be selectively included in CMT in some embodiments. The above Component Mapping Description may be may be encapsulated and transmitted in one XML file or the above proposed signaling message format. The CMT may define components associated with each service and a location or a path for receiving information related to corresponding components may be signaled to the receiver through the above information.

FIG. 87 is a diagram illustrating common attributes and elements of MPD according to an embodiment of the present invention. A next-generation broadcast system may provide a DASH-based hybrid broadcast service. The next-generation broadcast system may indicate that segments associated with representation and so on in DASH MPD are transmitted through different distribution paths. The common attributes and elements of the MPD may be commonly presented in adaptation sets, representations, and sub-representation elements and, as illustrated in the drawings, may include location information on an associated representation. The next-generation broadcast system may allow a DASH client to know a location of an associated representation or segment using location information on the associated representation included in the common attributes and elements of the MPD. The common attributes and elements of the MPD may include the following attributes and elements. The @profiles attribute may indicate a profile of associated representation as a profile attribute. The @width attribute may indicate a video media type of a horizontal visual presentation size for display. The @height attribute may indicate a video media type of a vertical visual presentation size for display. The @sar attribute may indicate a video media component type of sample aspect ratio. The @frameRate attribute may indicate an output frame rate of a representation. The @audioSamplingRate attribute may indicate an audio media component type of sampling rate. The @mimeType attribute may indicate a MIME type of concatenation of an initialization segment. The @segmentProfiles attribute may indicate profiles of segments required to process a corresponding representation. The @codecs attribute may indicate codec used in a corresponding representation. The @maximumSAPPeriod attribute may indicate a maximum stream access point (SAP) of an included media stream. The @startWithSAP attribute may indicate the number of media segments started along with SAP. The @maxPlayoutRate attribute may indicate a maximum playout rate. The @codingDependency attribute may indicate whether there is at least one access unit dependent upon one or more other access units for decoding. The @scanType attribute may indicate a scan type of video media component type of source material, The FramePacking element may indicate a video media component type of frame-packing information. The AudioChannelConfiguration element may indicate an audio media component type of audio channel setting. The ContentProtection element may indicate information on a content protection scheme used in an associated representation. The EssentialProperty element may indicate information on an element that is necessarily considered in processing. The SupplementalProperty element may include additional information used to optimize processing. The InbandEventStream element may indicate whether an inband event stream is present in an associated representation. The Location element may include location information for acquisition of an associated representation. The Location element may include information on a broadcast stream or a physical layer data pipe for delivery of an associated representation. A DASH client or a next-generation broadcast receiving apparatus may acquire an associated representation using a location element. That is, the next-generation broadcast system receiving apparatus may acquire information on a location of an associated representation using location information included in common attributes and elements and acquire an associated representation based on the information on the location even if the receiving apparatus does not use the aforementioned CMT. The aforementioned representation may be described as a component in some embodiments.

According to another embodiment of the present invention, a next-generation broadcast system may allocate information on a transmission path such as associated representation and so on to an @servicelocation attribute of a Base URL element in DASH MPD. The next-generation broadcast system may allow a DASH client to know information on a transmission path of segments associated with a corresponding representation using the @servicelocation attribute.

FIG. 88 is a diagram illustrating a transfer session instance description according to an embodiment of the present invention. When an application layer transmission method is real-time object delivery over unidirectional transport (hereinafter, ROUTE), a ROUTE session may include one or more layered coding transport (LCT) sessions. Detailed information on one or more transfer sessions may be signaled through the transfer session instance description. The transfer session instance descriptor may be referred to as LCT Session Instance Description (LSID) in the case of ROUTE. In particular, the transfer session instance description may define what is transmitted by each LCT transfer session included in the ROUTE session. Each transfer session may be uniquely identified by a transfer session identifier (TSI). The transfer session identifier may be included an LCT header. The transfer session instance description may describe all transfer sessions transmitted through a corresponding session. For example, the LSID may describe a mode LCT session transmitted through the ROUTE session. The transfer session instance description may be transmitted through the same ROUTE session as the transfer sessions or through different ROUTE sessions or be unicast.

When transmitted through the same ROUTE session, the transfer session instance description may be transmitted through a transfer session with a predetermined transfer session identifier (TSI) of 0. Another object referred to by the transfer session instance description may also be transmitted with TSI=0 but may have a different TOI value from the transfer session instance description. Alternatively, another object may be transmitted through a divided transfer session with TSI≠0. The transfer session instance description may be updated using at least one of a version number, validity information, and expiration information. The transfer session instance description may be represented in a bitstream other than the illustrated form.

The transfer session instance description may include a version attribute, a validFrom attribute, and an expiration attribute and include a TSI attribute, SourceFlowelement, RepairFlow element, and TransportSessionProperty element with respect to each transfer session. The version attribute may indicate version information on the corresponding transfer session instance description and version information may be increased whenever content thereof is updated. This may indicate that the transfer session instance description with the highest version number is the most recent version. The validFrom attribute may indicate a time point when a corresponding transfer session instance description is valid. In some embodiments, the validFrom attribute may not be included in the transfer session instance description and, in this case, the validFrom attribute may indicate that a corresponding transfer session instance description is valid upon being immediately received. The expiration attribute may indicate a time point when a corresponding transfer session instance description expires. In some embodiments, the expiration attribute may not be included in the transfer session instance description and, in this case, the expiration attribute may indicate that the corresponding transfer session instance description is continuously valid. Upon receiving a transfer session instance description with an expiration attribute, a corresponding expiration attribute may be followed. The TSI attribute may indicate a transfer session identifier, the SourceFlow element may provide information on source flow transmitted to a corresponding TSI, and detailed description thereof will be given below. The RepairFlow element may provide information on a repair flow transmitted to a corresponding TSI. The TransportSessionProperty element may include additional attribute information on a corresponding transfer session. The transfer session instance description may include additional attribute information on a transfer session in the TransportSessionProperty element and, for example, the additional information may include service signaling information on a transfer session.

FIG. 89 illustrates SourceFlow element of another next-generation broadcast system according to an embodiment of the present invention. The SourceFlow element may include an EFDT element, an idRef attribute, a realtime attribute, a minBufferSize attribute, an Application an Identifier element, a PayloadFormat element, and/or a SourceFlowProperty element. The EFDT element may include detailed information on file delivery data. The EFDT may indicate an extended File Delivery Table (FDT) instance and a detailed description thereof will be described below. The idRef attribute may indicate an identifier of the EFDT and may be represented according to a URI by a corresponding transfer session. The realtime attribute may indicate that corresponding LCT packets include an extension header. The extension header may include a timestamp indicating a presentation time of a delivery object. The minBufferSize attribute may define a maximum amount of data required to store the data in a receiver. The Application Identifier element may provide additional information to be mapped to an application delivered by a corresponding transfer session. For example, an Adaptation Set parameter of a DASH representation or Representation ID of DASH content for selecting a transfer session for rendering may be provided as additional information. The PayloadFormat element may define a payload format of a ROUTE packet for delivery of an object of source flow. The PayloadFormat element may include a codePoint attribute, a deliveryObjectFormat attribute, a fragmentation attribute, a deliveryOrder attribute, a sourceFecPayloadID attribute, and/or a FECParameters element. The codePoint attribute may define a code point used in a corresponding payload. This may indicate a value of a CP field of an LCT header. The deliveryObjectFormat attribute may indicate a payload format of a corresponding delivery object. The fragmentation attribute may define the type of fragmentation. The deliveryOrder attribute may indicate a delivery order of an object. The sourceFecPayloadID attribute may define a format of an identifier of a source FEC payload. The FECParameters element may define FEC parameters. This may include FEC encoding id, instance id, and so on. The SourceFlowProperty element may provide attribute information on corresponding source flow. For example, the attribute information may include location information on broadcast for delivery of corresponding source flow data. Here, the location information on the broadcast may include information on a data pipe or a physical layer pipe (PLP) in a broadcast stream. In addition, when source flow data is transmitted through another broadcast stream, the source flow data may include information on a broadcast stream identifier, and a data pipe or a physical layer pipe (PLP) in a corresponding stream.

FIG. 90 illustrates signaling data transmitted to rapidly scan a broadcast service by a receiver in a next-generation broadcast system according to another embodiment of the present invention. The illustrated service acquisition information may further add information on link layer signaling of the aforementioned service acquisition information. The information on the link layer signaling may include flag information indicating whether link layer signaling is present, version information on link layer signaling data, and information on a PLP or a data pipe for transmitting link layer signaling. FIC information (service acquisition information) for supporting rapid broadcast service scan and service/component acquisition may include information on an application layer transport session for transmitting service and component data. As illustrated in the drawing, system acquisition information may be represented in a binary format or, in some embodiments, represented in another format such as XML.

The system acquisition information may include the following field. An FIC_portocol_version field may indicate a protocol version of signaling information (Version of structure of FIC). A TSID field may indicate an identifier of an overall broadcast stream. An FIC_data_version field may indicate data version of the FIC instance. The FIC_data_version field may be increased whenever content of the FIC is changed. A num_partitions field may indicate the number of partitions of a broadcast stream. In order to use the num_partitions field, it is assumed that each broadcast stream is divided into one or more partitions and transmitted. Each partition may include a plurality of DPs by one broadcaster. Each partition may indicate a portion of a broadcast stream used by one broadcaster. A partition_id field may indicate an identifier of a corresponding partition. A partition_protocol_version field may indicate a version of the aforementioned partition structure. A num_services field may indicate the number of at least one component belonging to a corresponding partition. A service_id field may indicate an identifier of a service. A service_data_version field may indicate change in service loop data in an FIC or change in service signaling data associated with a corresponding service. The service_data_version field may be incremented by 1 whenever included service data is changed. The receiver may detect change in data of a service loop of FIC or change in signaling associated with a corresponding service using the service_data_version field. The channel_number field may indicate a channel number associated with a corresponding service. A service_category field may indicate a category of a corresponding service and, for example, indicate A/V, audio, ESG, CoD, and so on. A short_service_name_length field may indicate a length of a name indicating a corresponding service. The short_service_name field may indicate a name of a corresponding service. The service_status field may indicate the status of the service and may indicate an active or suspended, hidden or shown attribute depending on the value thererof. The service_distribution field may have attributes similar to the "multi-ensemble" flag of the ATSC M/H document. For example, the service_distribution field may indicate information about whether a corresponding service is entirely included in a corresponding partition, whether the corresponding service is partially included in the corresponding partition but is presentable with the corresponding partition only, whether another partition is required for presentation, or whether another broadcast stream is required for presentation. The sp_indicator field is a service protection flag that may indicate whether one or more components needed for the presentation are protected. An IP_version_flag field may indicate subsequent IP address format. When a corresponding field value is 0, the field may indicate that an IPv4 address format is used, and when the value is 1, the field may indicate that an IPv6 address format is used. A source_IP_address_flag field may indicate whether a source_IP_addr is included. When a corresponding field value is 1, this may indicate that a source_IP_addr is present. A num_transport_session field may indicate the number of transport sessions (e.g., ROUTE or MMTP session) for transmitting component data of a corresponding service in a broadcast stream. A source_IP_addr field may indicate a source IP address of an IP datagram including component data of a corresponding service when the aforementioned source_IP_address_flag value is 1. A dest_IP_addr field may indicate a destination IP address of an IP datagram including component data of a corresponding service. A dest_UDP_port field may indicate a UDP port number of an IP datagram including component data of a corresponding service. An LSID_DP field may indicate a data pipe identifier of a physical layer for transmitting signaling including detailed information on a transfer session. Here, signaling including the detailed information on the transfer session may be, for example, LCT session instance description including information on a detailed LCT transfer session of each ROUTE session in the case of ROUTE. An LSID_tsi field may indicate an identifier of a transfer session for transmitting a transfer session instance description as signaling including detailed information on a transfer session. Here, the session instance description may be LSID in the case of an LCT transfer session. Service signaling associated with a corresponding service may be transmitted through a transfer session for transmitting a transfer session instance description. A service_signaling_flag field may indicate whether the transfer session transmits service signaling. When a value of the service signaling_flag is 1, this may indicate that a DP including service signaling is present. A signaling_data_version field may indicate change in the associated service signaling data. Whenever service signaling data is changed, a corresponding field may be incremented by 1. The receiver may detect change in signaling associated with a corresponding service using the signaling_data_version field. A signaling_DP field may indicate an identifier of a data pipe of a physical layer for transmitting service signaling. A signaling_tsi field may indicate an identifier of a transfer session for transmitting service signaling, A link_layer_signaling_flag may indicate whether service acquisition information transmits link layer (or low layer) signaling. A link_layer_signaling_data_version may indicate change in associated link layer (or low layer) signaling data. The corresponding field may be incremented by 1 whenever link layer signaling data is changed. The receiver may detect change in link layer (or low layer) signaling using the field. A link_layer_signaling_DP may indicate an identifier of a data pipe of a physical layer for transmitting link layer (or low layer) signaling used in an L2 layer. A Transport session descriptors field may include transfer session level of descriptors. Each descriptor is capable of being extended and each descriptor may include a num_descriptors field. Each descriptor may include a descriptor loop, the number of which corresponds to a value indicated by the num_descriptors field. The Transport session descriptors field may include transfer session level of descriptors. The service descriptors field may include service level of descriptors. A Partition descriptors field may include a partition level of descriptor and one partition may indicate a portion of a broadcast stream used by one broadcaster. An FIC session descriptors field may include FIC level of descriptors. In some embodiments, each field included in the aforementioned FIC may be included in another table other than FIC and may be transmitted along with a broadcast signal.

FIG. 91 illustrates signaling data transmitted for rapid scan of a broadcast service of a receiver by a next-generation broadcast system according to another embodiment of the present invention. FIC information (service acquisition information) for supporting rapid broadcast service scan and service/component acquisition may include information on an application layer transport session for transmitting service and component data. In addition, the service acquisition information may further include information on link layer signaling. As illustrated in the drawing, the service acquisition information may be represented in a binary format but, in some embodiments, may be represented in a different format such as XML.

The service acquisition information may include the following field. An FIC_portocol_version field may indicate a protocol version of signaling information (Version of structure of FIC). A TSD field may indicate an identifier of an overall broadcast stream. A num_partitions field may indicate the number of a broadcast stream. In order to use the num_partitions field, it may be assumed that each broadcast stream is capable of being divided into one or more partitions and transmitted. Each partition may include a plurality of DPs by one broadcaster. Each partition may indicate a part of a broadcast stream used by one broadcaster. A partition_id field may indicate an identifier of a corresponding partition. A partition_protocol_version_field may indicate a version of the aforementioned partition structure. A num_services field may indicate the number of at least one component belonging to a corresponding partition. Each service may include a plurality of signaling tables. For example, each service may include DASH MPD including information on components and segments thereof, CMT including an identifier of components included in a broadband stream and other broadcast streams, AST as an application signaling table, and a URL signaling table (UST) including at least one URL among MPD, CMT, and AST. These signaling tables may be included in a signaling channel of a corresponding service. A service_id field may indicate an identifier of a service. A service_data_version field may indicate change in service loop data in FIC A service_data_version field may be incremented by 1 whenever included service data is changed. For example, whenever FIC, MPD, CMT, AST, or UST is changed, the field may be incremented by 1. The receiver may detect change in data of a service loop of FIC or change in signaling associated with a corresponding service using the service_data_version field. A service_channel_number field may indicate a channel number associated with a corresponding service. A service_category field may indicate a category of a corresponding service and may be, for example, A/V, audio, ESG, or CoD. A service_short_name_length field may indicate a length of a name indicating a corresponding service. A service_short_name field may indicate a name indicating a corresponding service. A service_status field may indicate the status of the service and may indicate an active or suspended, hidden or shown attribute depending on the value thereof. A service_distribution field may have attributes similar to a "multi-ensemble" flag of the ATSC M/H document. For example, the field may indicate information on whether a corresponding service is entirely included in a corresponding partition, whether presentation is possible only in a corresponding partition even if the service is partially included in the corresponding partition, whether another partition is required for presentation, or whether another broadcast stream is required for presentation. An sp_indicator field may indicate whether one or more components required for presentation need to be protected for presentation as a service protection flag. An IP_version_flag field may indicate subsequent IP address format. When a corresponding field value is 0, the field may indicate that an IPv4 address format is used, and when the value is 1, the field may indicate that an IPv6 address format is used. A num_ROUTE_sessions field may include the number of transfer sessions for transmitting component data of a corresponding service in a broadcast stream. For example, the transfer session may be a ROUTE session. The following information may be set with respect to each ROUTE session. A source_IP_addr field may indicate a source IP address of an IP datagram including component data of a corresponding service. A dest_IP_addr field may indicate a destination IP address of an IP datagram including component data of a corresponding service. A dest_UDP_port field may indicate a UDP port number of an IP datagram of component data of a corresponding service. An LSID_DP field may indicate a data pipe identifier of a physical layer for transmitting signaling including detailed information on a transfer session, Here, the signaling including the detailed information on the transfer session may be, for example, LCT session instance description including information on a detailed LCT transfer session of each ROUTE session in the case of ROUTE. An LSID_tsi field may indicate an identifier of a transfer session for transmitting a transfer session instance description as signaling including detailed information on a transfer session. Here, the session instance description may be LSID in the case of LCT transfer session. Service signaling associated with a corresponding service may be transmitted through a transfer session for transmitting transfer session instance description. A component signaling flag field may indicate whether the transfer session transmits service signaling. When a value of the component_signaling_flag is 1, this may indicate that the field includes service signaling (e.g., DASH media presentation description (MPD) or CMT) of data transmitted through a corresponding transfer session. Here, the CMT may be a component mapping table and may include an identifier of components transmitted through a broadband and also include information on a component included in a broadcast stream. Each service may include a service signaling channel and the service signaling channel may include MPD, CMT, AST, and/or UST. A service signaling channel may be one signaling channel of a plurality of ROUTE sessions for a service and whether the service signaling channel is present may be indicated through a component signaling flag. When a plurality of transfer sessions (ROUTE or MMTP session) transmits signaling and service components, the aforementioned service signaling tables may be transmitted in one transfer session. A link_layer_signaling_flag may indicate whether service acquisition information transmits link layer (or low layer) signaling. A link_layer_signaling_data_version may indicate change in associated link layer (or low layer) signaling data. The corresponding field may be incremented by 1 whenever link layer signaling data is changed. The receiver may detect change in link layer (or low layer) signaling using the field. A link_layer_signaling_DIP may indicate a Data pipe identifier of a physical layer for transmitting link layer (or low layer) signaling used in an L2 layer.

A ROUTE session descriptors field may include a transfer session level of descriptors. Each descriptor is capable of being extended and each descriptor may include a num_descriptors field. Each descriptor may include a descriptor loop, the number of which corresponds to a value indicated by the num_descriptors field. The Transport session descriptors field may include transfer session level of descriptors. The service descriptors field may include service level of descriptors. A Partition descriptors field may include a partition level of descriptor and one partition may indicate a portion of a broadcast stream used by one broadcaster. An FIC session descriptors field may include FIC level of descriptors.

In some embodiments, each field included in the aforementioned service acquisition information may be included in a broadcast signal and may be transmitted along with other information other than service acquisition information.

Figure 92:
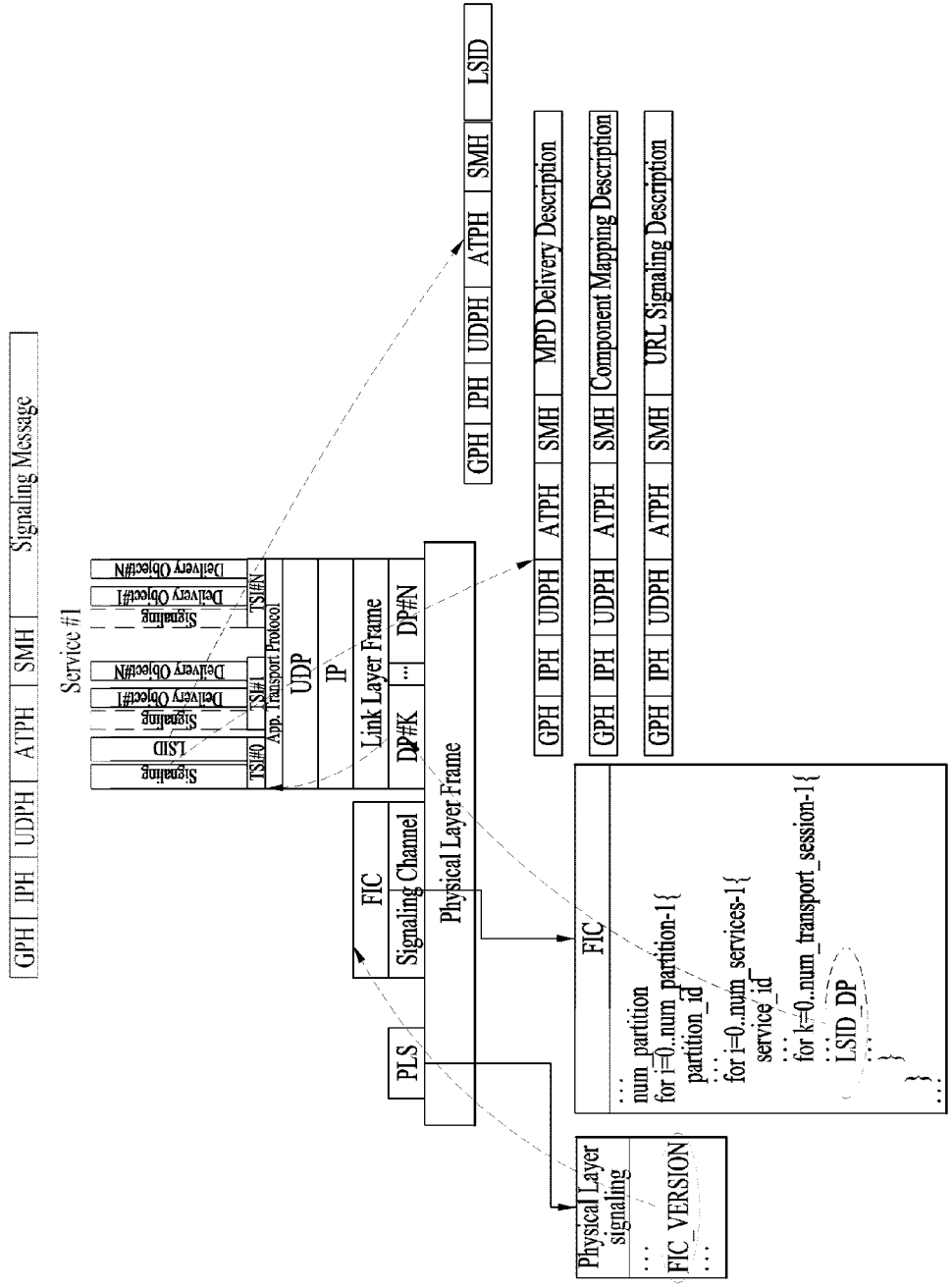
FIG. 92 illustrates a method of acquiring service layer signaling in a next-generation broadcast system according to an embodiment of the present invention.

FIG. 92 illustrates a method of acquiring service layer signaling in a next-generation broadcast system according to an embodiment of the present invention. In the upper part of the drawing, the service layer signaling may be encapsulated in the illustrated form as a format of service layer signaling in a next-generation broadcast system. For example, the encapsulated service layer signaling may include a Generic packet header (GPH), an IP packet Header (IPH), a UDP datagram header (UDPH), an application transport protocol (e.g., ROUTE or MMTP) header (ATPH), a signaling message header (SMH), and a signaling message. When the above aforementioned service signaling is used in a next-generation broadcast system, the service signaling may be transmitted as illustrated in the lower part of the drawing. A broadcast signal of the next-generation broadcast system may be transmitted through a physical layer frame. A broadcast signal frame may include physical layer signaling. Information on physical layer signaling may include a field of rapid service acquisition information, The corresponding field may include version information on rapid service acquisition information and, in other words, the corresponding field may indicate whether a physical layer frame includes rapid service acquisition information or parses rapid service acquisition information. The receiver may acquire rapid service acquisition information using a corresponding field of physical layer signaling. A broadcast signal of a next-generation broadcast system may include rapid service acquisition information in a physical layer frame. The rapid service acquisition information may include a service identifier and include information on a PLP or a data pipe for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the pipe. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation format. That is, the format of service layer signaling may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include MPD delivery description, component mapping description, or URL signaling description according to a type of a message transmitted through service layer signaling.

As illustrated in the drawing, the transfer session instance descriptor may have the aforementioned encapsulation form. That is the format of the transfer session instance descriptor may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include a transfer session instance descriptor. In the present invention, the transfer session instance descriptor may be transmitted in one of service layer signaling items.

Figure 93:
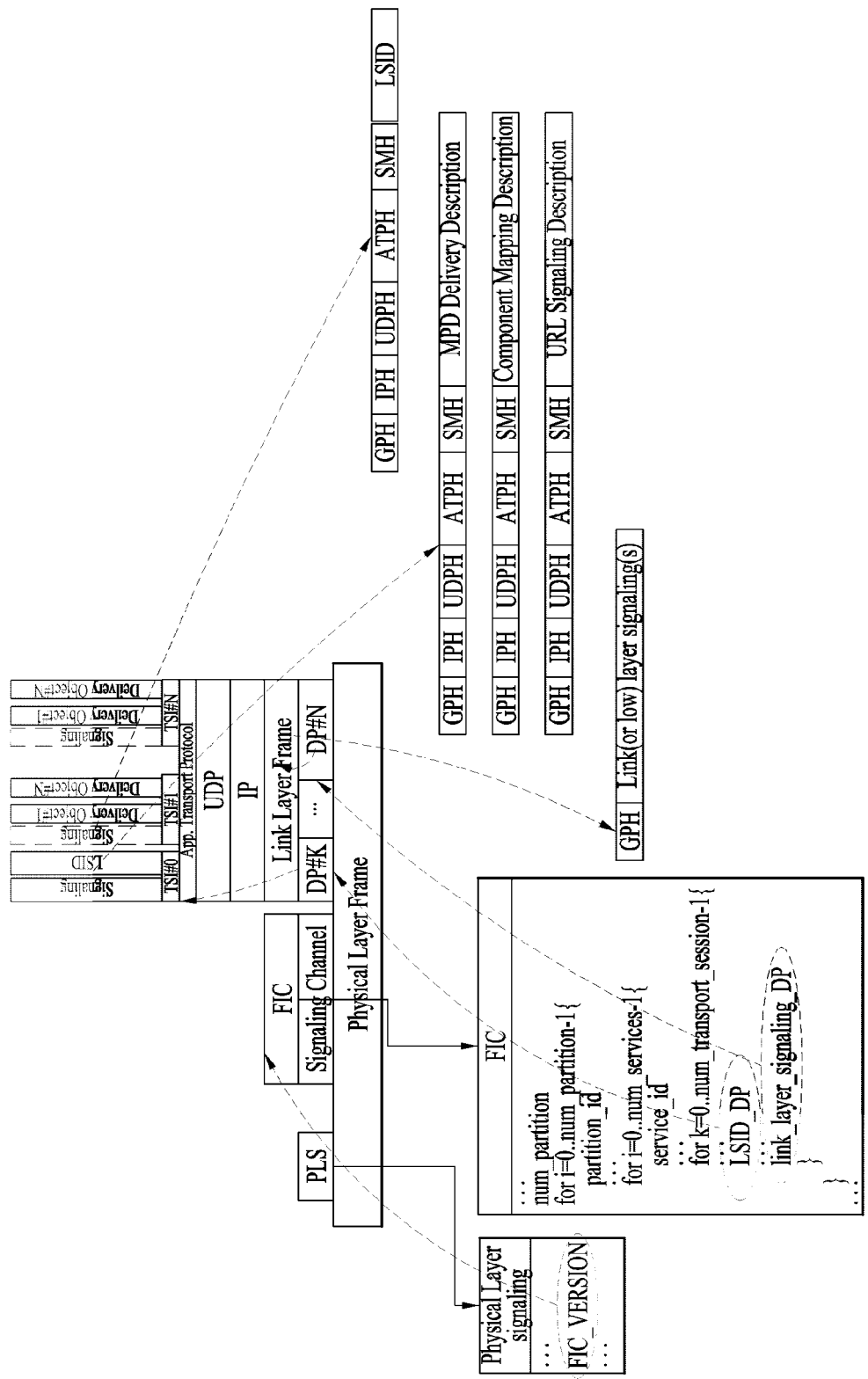
FIG. 93 illustrates a method of acquiring service layer signaling and link layer signaling in a next-generation broadcast system according to an embodiment of the present invention.

FIG. 93 illustrates a method of acquiring service layer signaling and link layer signaling in a next-generation broadcast system according to an embodiment of the present invention. When the next-generation broadcast system uses the above proposed service layer signaling, the service layer signaling may be transmitted as illustrated in the drawing. A broadcast signal of the next-generation broadcast system may be transmitted through a physical layer frame. A broadcast signal frame may include physical layer signaling. Information on physical layer signaling may include a field of rapid service acquisition information. The corresponding field may include version information on rapid service acquisition information and, in other words, the corresponding field may indicate whether a physical layer frame includes rapid service acquisition information or parses rapid service acquisition information. The receiver may acquire rapid service acquisition information using a corresponding field of physical layer signaling. A broadcast signal of the next-generation broadcast system may include rapid service acquisition information in a physical layer frame. The rapid service acquisition information may include a service identifier and include information on a PLP or a data pipe for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the pipe. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation format. That is, the format of service layer signaling may include Generic packet header(GPH), IP packet Header (IPH), UDP datagram header (UDPH), application transport protocol (e.g., ROUTE or MMTP) header (ATPH), signaling message header (SMH), and signaling message. Here, the signaling message may include MPD) delivery description, component mapping description, or URL signaling description according to a type of a message transmitted through service layer signaling.

As illustrated in the drawing, the transfer session instance descriptor may have the aforementioned encapsulation form. That is, the format of the transfer session instance descriptor may include a Generic packet header(GPH), IP packet Header (IPH), UDP datagram header (UDPH), application transport protocol (e.g., ROUTE or MMTP) header (ATPH), signaling message header (SMH), and signaling message. Here, the signaling message may include a transfer session instance descriptor. In the present invention, the transfer session instance descriptor may be transmitted in one of service layer signaling items.

In addition, rapid service acquisition information may include information on a PLP or a data pipe for transmitting link layer signaling. That is, the receiver may identify a PLP for transmitting link layer signaling using data pipe or PLP identifier information included in rapid service acquisition information and acquire link layer signaling included in the PLP. As illustrated in the drawing, the format of the transmitted link layer signaling may include Generic packet header (GPH) and signaling message. Here, the signaling message may include information on link layer signaling. The receiver may acquire Link Layer signaling (or low layer signaling) through a data pipe or the like and acquire service/component signaling such as a component mapping table through an application transport protocol.

Figure 94:
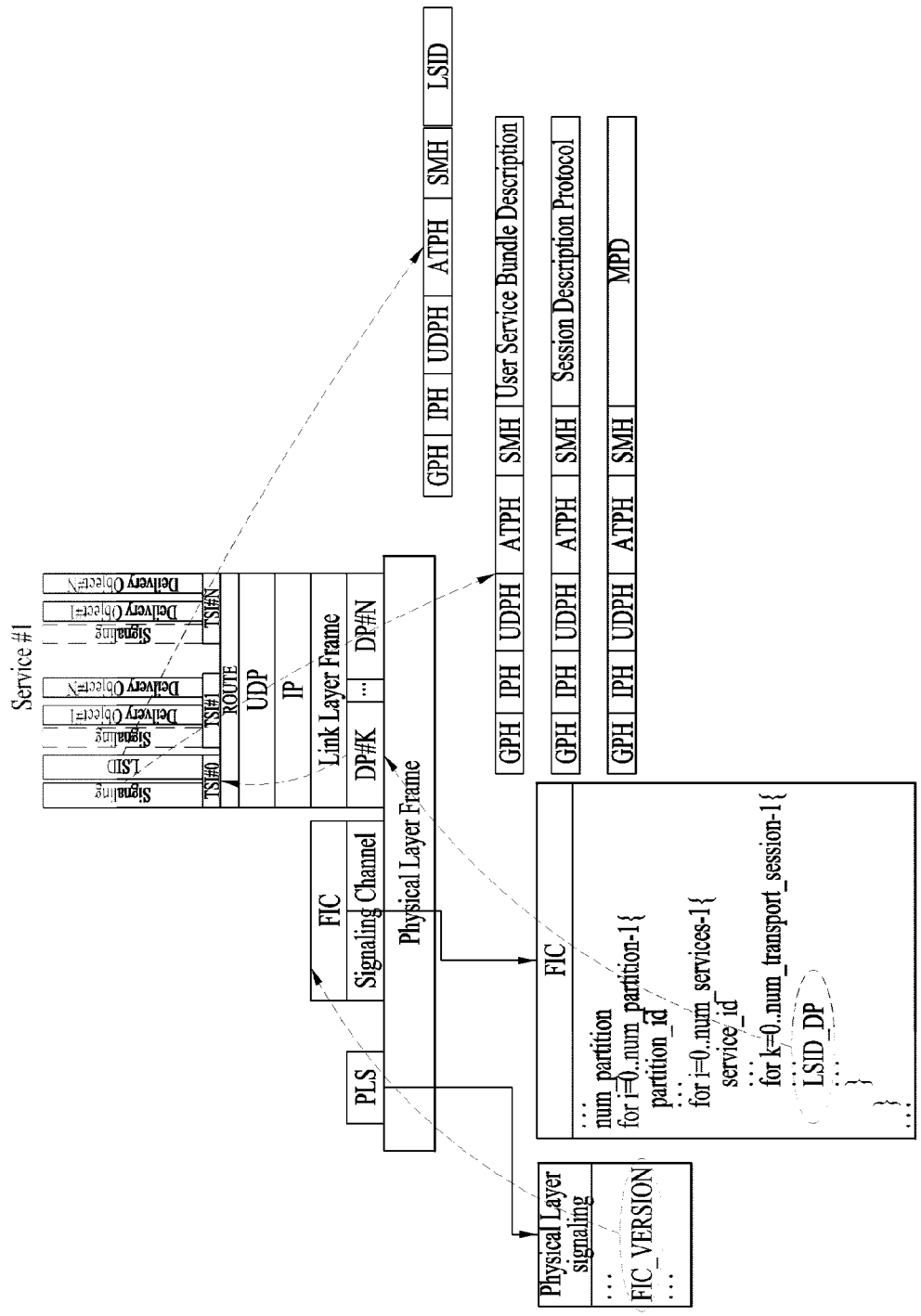
FIG. 94 illustrates a method of acquiring service layer signaling in a next-generation broadcast system according to an embodiment of the present invention.

FIG. 94 illustrates a method of acquiring service layer signaling in a next-generation broadcast system according to an embodiment of the present invention. When the next-generation broadcast system uses 3GPP eMBMS signaling and so on for service/component signaling, the 3GPP eMBMS signaling may be transmitted as illustrated in the drawing. Here, the service layer signaling may include User Service Bundle Description (USBD), MPD, and Session Description Protocol and further include transfer session instance description. A broadcast signal of the next-generation broadcast system may be transmitted through a physical layer frame. The broadcast signal frame may include physical layer signaling. Information on the physical layer signaling may include a field of rapid service acquisition information. The corresponding field may include version information on rapid service acquisition information and, in other words, the corresponding field may indicate whether a physical layer frame includes rapid service acquisition information or parses rapid service acquisition information. The receiver may acquire rapid service acquisition information using a corresponding field of physical layer signaling. A broadcast signal of the next-generation broadcast system may include rapid service acquisition information in a physical layer frame. The rapid service acquisition information may include a service identifier and include information on a data pipe or PLP for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the pipe. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation format. That is, a format of service layer signaling may include Generic packet header(GPH), IP packet Header (IPH), UDP datagram header (UDPH), application transport protocol (e.g., ROUTE or MMTP) header (ATPH), signaling message header (SMH), and signaling message. Here, the signaling message may include User Service Bundle Description (USBD), MPD, and Session Description Protocol according to a type of a message transmitted through service layer signaling.

As illustrated in the drawing, the transfer session instance descriptor may have the aforementioned encapsulation form. That is, the format of the transfer session instance descriptor may include a Generic packet header (GPH), an IP packet Header (IPH), a UDP datagram header (UDPH), an application transport protocol (e.g., ROUTE or MMTP) header (ATPH), a signaling message header (SMH), and a signaling message. Here, the signaling message may include a transfer session instance descriptor. In the present invention, the transfer session instance descriptor may be transmitted in one of service layer signaling items.

Figure 95:
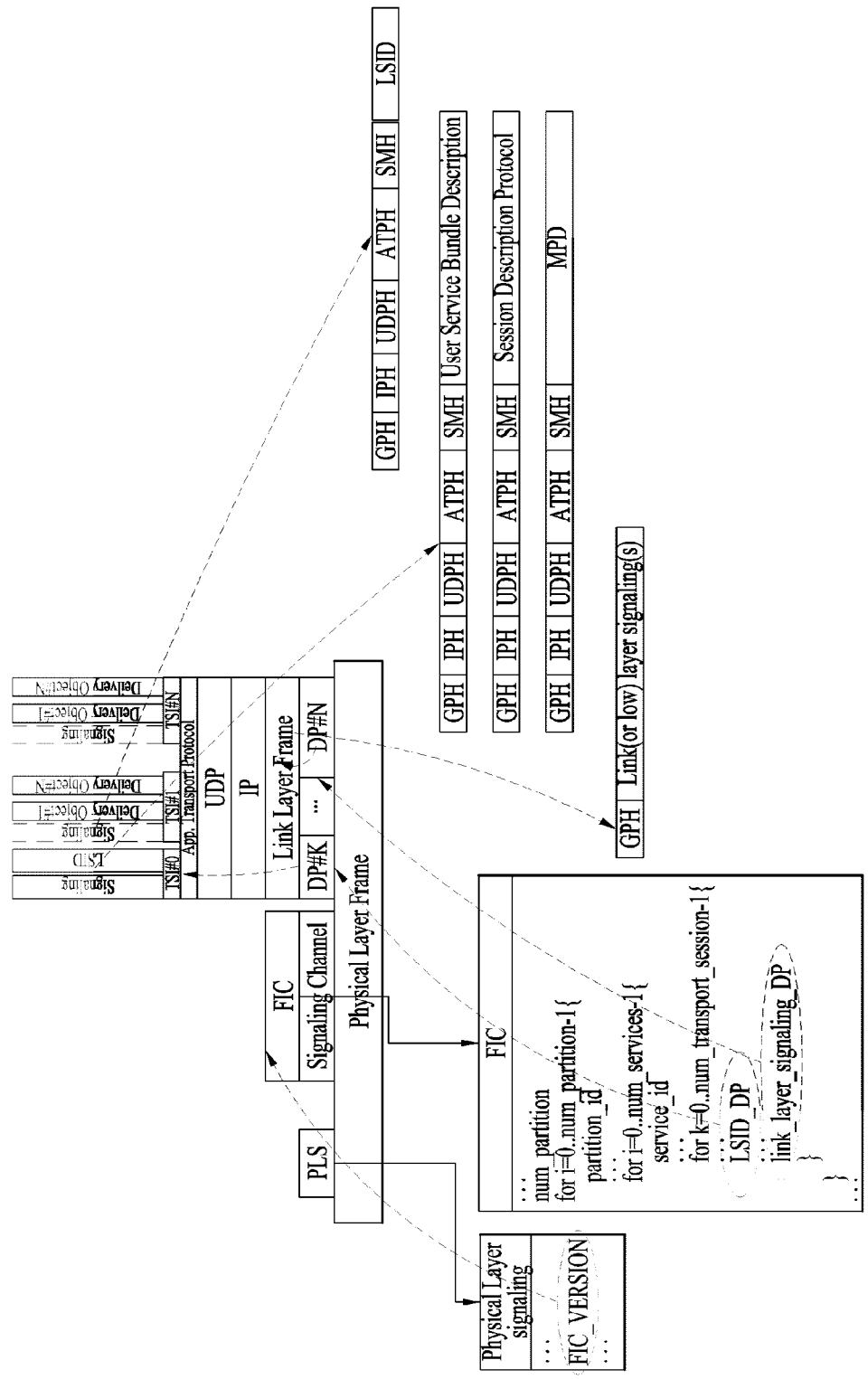
FIG. 95 illustrates a method of acquiring service layer signaling and link layer signaling in a next-generation broadcast system according to an embodiment of the present invention.

FIG. 95 illustrates a method of acquiring service layer signaling and link layer signaling in a next-generation broadcast system according to an embodiment of the present invention. When the next-generation broadcast system uses 3GPP eMBMS signaling, the 3GPP eMBMS signaling may be transmitted as illustrated in the drawing. A broadcast signal of the next-generation broadcast system may be transmitted through a physical layer frame. The broadcast signal frame may include physical layer signaling. Information on the physical layer signaling may include a field of rapid service acquisition information. The corresponding field may include version information on rapid service acquisition information and, in other words, the corresponding field may indicate whether a physical layer frame includes rapid service acquisition information or parses rapid service acquisition information. The receiver may acquire rapid service acquisition information using a corresponding field of physical layer signaling. A broadcast signal of the next-generation broadcast system may include rapid service acquisition information in a physical layer frame.

The rapid service acquisition information may include a service identifier and include information on a data pipe or PLP for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the pipe. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation format. That is, a format of service layer signaling may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include User Service Bundle Description (USBD), MPD, and Session Description Protocol according to a type of a message transmitted through service layer signaling.

As illustrated in the drawing, the transfer session instance descriptor may have the aforementioned encapsulation form. That is, the format of the transfer session instance descriptor may include Generic packet header (GPH), IP packet Header (IPH), UDP datagram header (UDPH), application transport protocol (e.g., ROUTE or MMTP) header (ATPH), signaling message header (SMH), and signaling message. Here, signaling message may include a transfer session instance descriptor. In the present invention, the transfer session instance descriptor may be transmitted in one of service layer signaling items.

The rapid service acquisition information may include information on a PLP or a data pipe for transmitting link layer signaling. That is, the receiver may identify a PLP for transmitting link layer signaling using a data pipe or PLP identifier information included in the rapid service acquisition information and acquire link layer signaling included in the PLP. As illustrated in the drawing, the format of the transmitted link layer signaling may include Generic packet header (GPH) and a signaling message. Here, the signaling message may include information on link layer signaling. The receiver may acquire Link Layer signaling (or low layer signaling) through a data pipe or the like and acquire service/component signaling such as a component mapping table through an application transport protocol. That is, the next-generation broadcast system may include signaling information on a PLP or data pipe with link layer signaling included in a physical layer frame.

Figure 96:
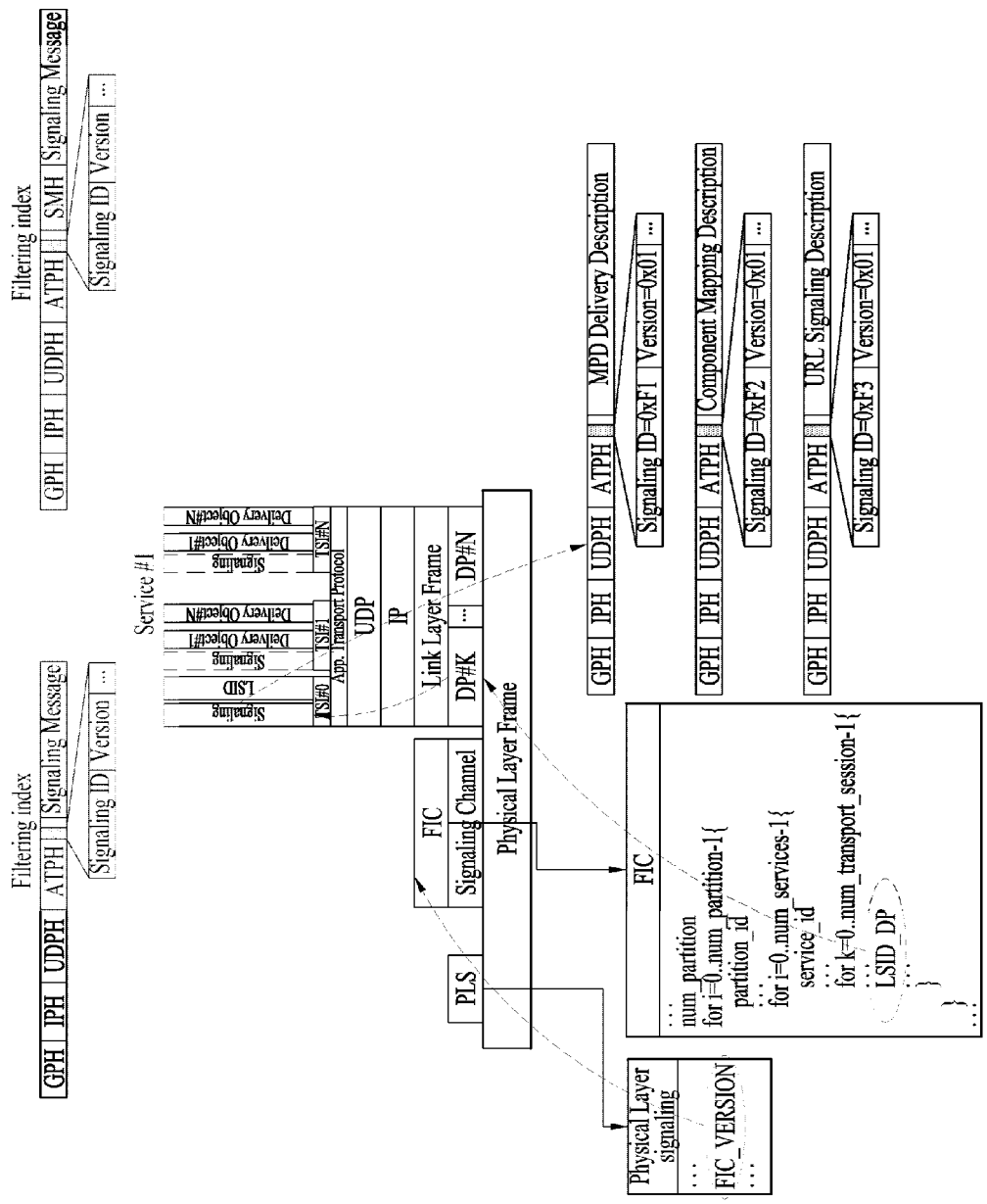
FIG. 96 illustrates a method of transmitting service layer signaling in a next-generation broadcast system according to an embodiment of the present invention.

FIG. 96 illustrates a method of transmitting service layer signaling in a next-generation broadcast system according to an embodiment of the present invention. The upper part of the drawing illustrates a format of service layer signaling used in the next-generation broadcast system according to the present invention and service layer signaling may be encapsulated in the illustrated form. For example, the encapsulated service layer signaling may include Generic packet header (GPH), IP packet Header (IPH), UDP datagram header (UDPH), application transport protocol (e.g., ROUTE or MMTP) header (ATPH), and a signaling message combination, as illustrated in the upper-left part of the drawing. In addition, the encapsulated service layer signaling may include Generic packet header (GPH), IP packet Header (IPH), UDP datagram header (UDPH), application transport protocol (e.g., ROUTE or MMTP) header (ATPH), signaling message header (SMH), and a signaling message combination, as illustrated in the upper-right part of the drawing. The ATPH may include a filtering index of service layer signaling. Here, the filtering index may include signaling id, version, and so on. The signaling id may include identifier information on service layer signaling and the version may indicate a version of information included in service layer signaling. The receiver may determine whether service layer signaling is received and parsed using the signaling id and the version.

When the next-generation broadcast system uses the above proposed service signaling, the service signaling may be transmitted as illustrated in the lower part of the drawing. A broadcast signal of the next-generation broadcast system may be transmitted through a physical layer frame. The broadcast signal frame may include physical layer signaling. Information on the physical layer signaling may include a field of rapid service acquisition information. A corresponding field may include version information on the rapid service acquisition information and, in other words, the corresponding field may include whether a physical layer frame includes rapid service acquisition information or parses rapid service acquisition information. The receiver may acquire rapid service acquisition information using a corresponding field of the physical layer signaling. A broadcast signal of the next-generation broadcast system may include rapid service acquisition information in a physical layer frame. The rapid service acquisition information may include a service identifier and include information on a PLP or data pipe for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the pipe. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation format. That is, a format of service layer signaling may include Generic packet header(GPH), IP packet Header (IPH), UDP datagram header (UDPH), application transport protocol (e.g., ROUTE or MMTP) header (ATPH), signaling message header (SMH), and signaling message. Here, the signaling message may include MPD) delivery description, component mapping description, or URL signaling description according to a type of a message transmitted by service layer signaling. As illustrated in the drawing, the ATPH may include a filtering index of service layer signaling. Here, the filtering index may include signaling id, version, and so on. The signaling id may include identifier information on service layer signaling and the version may indicate a version of information included in the service layer signaling. For example, service layer signaling including MPD delivery description may have a value of 0xF1 as signaling id. In addition, the version information may have a value of 0x01 and version information may be changed when the content of MPD delivery description as a signaling message of corresponding service layer signaling is changed. In addition, service layer signaling including component mapping description may have a value of 0xF2 as a signaling id. The version information may have a value of 0x01 and may be changed when the content of component mapping description as a signaling message of corresponding service layer signaling is changed. In addition, service layer signaling including URL signaling description may have a value of 0xF3 as signaling id. The version information may have a value of 0x01 and may be changed when the content of URL signaling description as a signaling message of corresponding service layer signaling is changed. As such, the receiver may filter desired service layer signaling using signaling id and version information as filtering information included in an application transport protocol header of service layer signaling. For example, in order to receive MPD delivery description, service layer signaling with signaling id of 0xF1 may be received. In this case, corresponding service layer signaling may be parsed only when version information is checked and is updated compared with pre-received MPD delivery description. As such, the receiver may reduce a number of times of unnecessary parsing operation on service layer signaling and reduce processing overhead. As described above, the next-generation broadcast system may add signaling ID and version information to a header of a transfer protocol of service layer signaling and support filtering of information desired by a receiving end.

Figure 97:
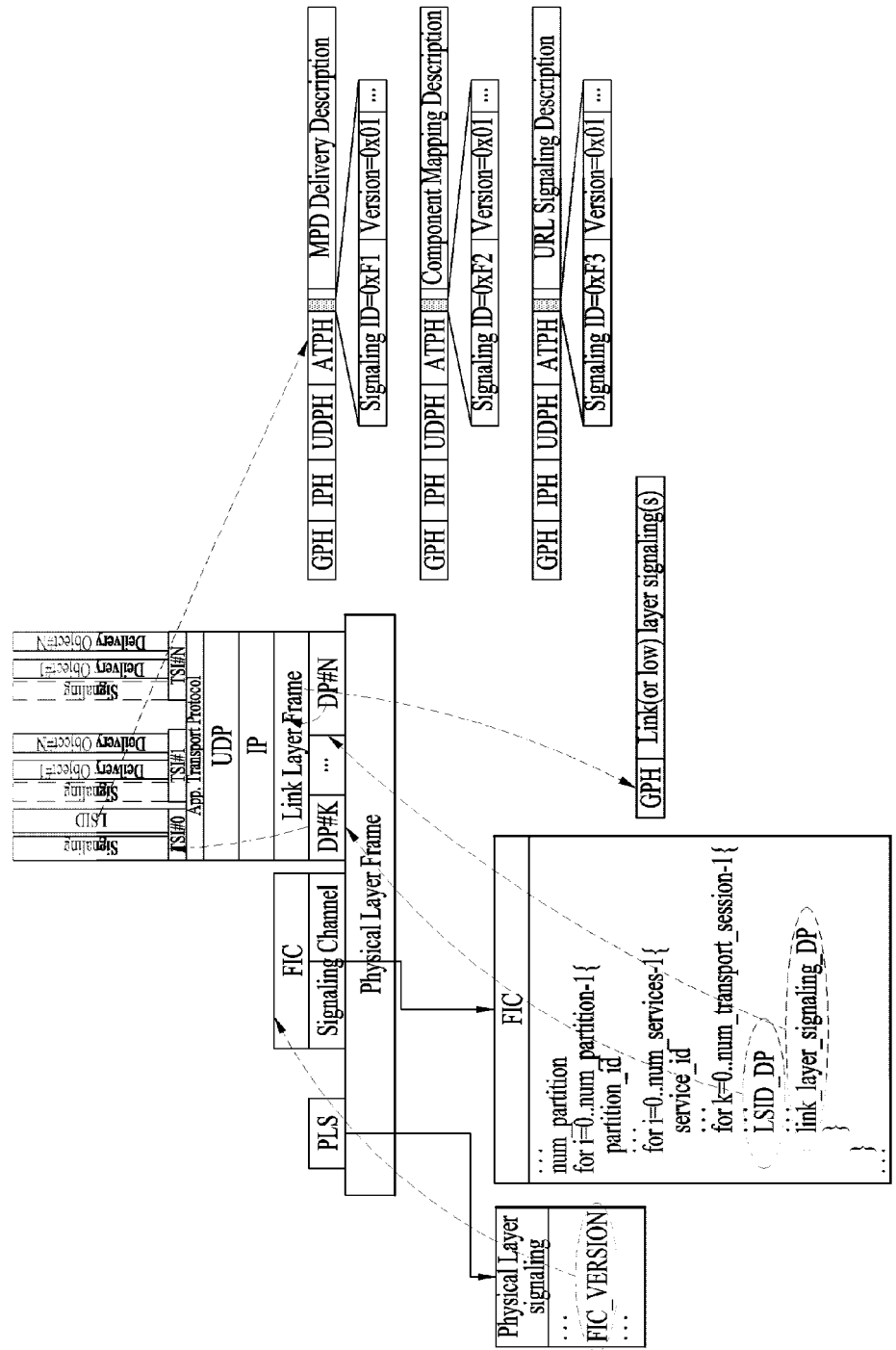
FIG. 97 is a diagram illustrating a method of transmitting service layer signaling and link layer signaling in a next-generation broadcast system according to an embodiment of the present invention.

FIG. 97 is a diagram illustrating a method of transmitting service layer signaling and link layer signaling in a next-generation broadcast system according to an embodiment of the present invention. Service layer signaling used in a next-generation broadcast system according to the present invention may be encapsulated. For example, the encapsulated service layer signaling may include Generic packet header (GPH), IP packet Header (IPH), UDP datagram header (UDPH), application transport protocol (e.g., ROUTE or MMTP) header (ATPH), and a signaling message combination. The encapsulated service layer signaling may include Generic packet header(GPH), IP packet Header (IPH), UDP datagram header (UDPH), application transport protocol (e.g., ROUTE or MMTP) header (ATPH), signaling message header (SMH), and a signaling message combination. The ATPH may include a filtering index of service layer signaling. Here, the filtering index may include signaling id, version, and so on. The signaling id may include identifier information on service layer signaling and the version may indicate a version of information included in the service layer signaling.

When the next-generation broadcast system uses the above proposed service signaling, the service signaling may be transmitted as illustrated in the drawing. A broadcast signal of the next-generation broadcast system may be transmitted through a physical layer frame. The broadcast signal frame may include physical layer signaling. Information on the physical layer signaling may include a field of rapid service acquisition information. The corresponding field may include version information on rapid service acquisition information and, in other words, the corresponding field may indicate whether a physical layer frame includes rapid service acquisition information or parses the rapid service acquisition information. The receiver may acquire rapid service acquisition information using a corresponding field of the physical layer signaling. A broadcast signal of the next-generation broadcast system may include rapid service acquisition information in the physical layer frame. The rapid service acquisition information may include a service identifier and include information on a PLP or data pipe for transmitting at least one of service layer signaling or a transfer session instance descriptor. That is, the receiver may identify a PLP for transmitting at least one of service layer signaling or a transfer session instance descriptor using data pipe or PLP identifier information included in the rapid service acquisition information and may acquire a transfer session instance descriptor or service layer signaling information included in the PLP. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation form. That is, a format of the service layer signaling may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include MPD delivery description, component mapping description, or URL signaling description according to a type of a message transmitted through the service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. For example, service layer signaling including MPD delivery description may have a value of 0xF1 as signaling id. In addition, the version information may have a value of 0x01 and version information may be changed when the content of MPD delivery description as a signaling message of corresponding service layer signaling is changed. In addition, service layer signaling including component mapping description may have a value of 0xF2 as a signaling id. The version information may have a value of 0x01 and may be changed when the content of component mapping description as a signaling message of corresponding service layer signaling is changed. In addition, service layer signaling including URL signaling description may have a value of 0xF3 as signaling id. The version information may have a value of 0x01 and may be changed when the content of URL signaling description as a signaling message of corresponding service layer signaling is changed. As such, the receiver may filter desired service layer signaling using signaling id and version information as filtering information included in an application transport protocol header of service layer signaling. For example, in order to receive MPD delivery description, service layer signaling with signaling id of 0xF1 may be received. In this case, corresponding service layer signaling may be parsed only when version information is checked and is updated compared with pre-received MPD delivery description. As such, the receiver may reduce a number of times of unnecessary parsing operation on service layer signaling and reduce processing overhead. As described above, the next-generation broadcast system may add signaling ID and version information to a header of a transfer protocol of service layer signaling and support filtering of information desired by a receiving end.

In addition, the rapid service acquisition information may include information on a PLP or a data pipe for transmitting the link layer signaling. That is, the receiver may identify a PLP for transmitting link layer signaling using a data pipe or PLP identifier information included in the rapid service acquisition information and acquire link layer signaling included in the PLP. As illustrated in the drawing, the format of the transmitted link layer signaling may include Generic packet header (GPH) and signaling message. Here, the signaling message may include information on link layer signaling. The receiver may acquire Link Layer signaling (or low layer signaling) through a data pipe or the like and acquire service/component signaling such as a component mapping table through an application transport protocol. That is, the next-generation broadcast system may include signaling information on a data pipe or PLP including link layer signaling in a physical layer frame.

Figure 98:
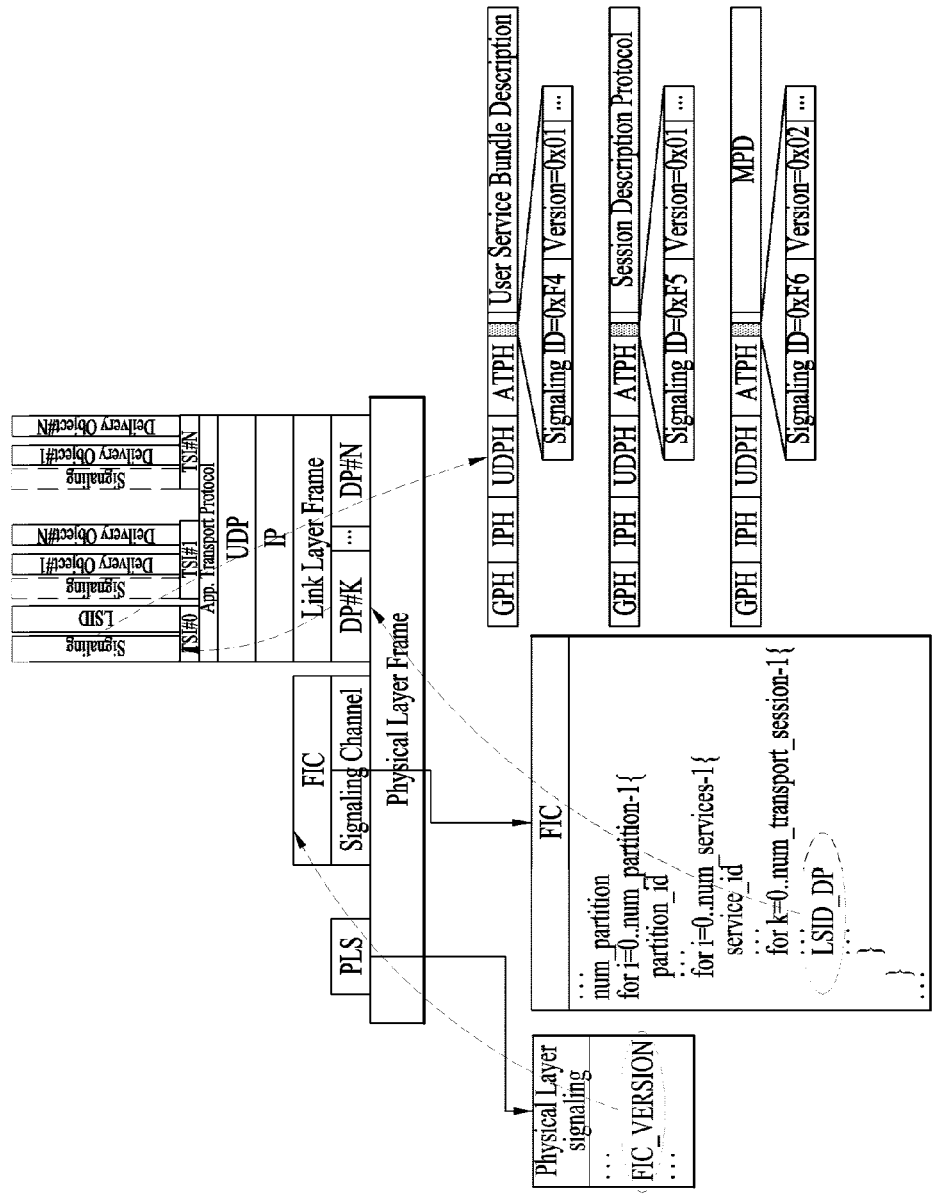
FIG. 98 illustrates a method of transmitting service layer signaling in a next-generation broadcast system according to an embodiment of the present invention.

FIG. 98 illustrates a method of transmitting service layer signaling in a next-generation broadcast system according to an embodiment of the present invention. Service layer signaling used in the next-generation broadcast system according to the present invention may be encapsulated. For example, the encapsulated service layer signaling may include Generic packet header (GPH), IP packet Header (IPH), UDP datagram header (UDPH), application transport protocol (e.g., ROUTE or MMTP) header (ATPH), and a signaling message combination. Alternatively, the encapsulated service layer signaling may include Generic packet header(GPH), IP packet Header (IPH), UDP datagram header (UDPH), application transport protocol (e.g., ROUTE or MMTP) header (ATPH), signaling message header (SMH), and a signaling message combination. In addition, the ATPH may include a filtering index of service layer signaling. Here, the filtering index may include signaling id, version, and so on. The signaling id may include identifier information on service layer signaling and the version may indicate a version of information included in the service layer signaling.

When the next-generation broadcast system uses 3GPP eMBMS signaling, the 3GPP eMBMS signaling may be transmitted as illustrated in the drawing. When the next-generation broadcast system uses the above proposed service signaling, the service signaling may be transmitted as illustrated in the lower part of the drawing. A broadcast signal of the next-generation broadcast system may be transmitted through a physical layer frame. The broadcast signal frame may include physical layer signaling. Information on the physical layer signaling may include a field of the rapid service acquisition information. The corresponding field may include version information on the rapid service acquisition information. In other words, the corresponding field may indicate whether a physical layer frame includes the rapid service acquisition information or parses the rapid service acquisition information. The receiver may acquire the rapid service acquisition information using the corresponding field of the physical layer signaling. A broadcast signal of the next-generation broadcast system may include rapid service acquisition information in a physical layer frame. The rapid service acquisition information may include a service identifier and include information on a PLP or data pipe for transmitting at least one of service layer signaling or a transfer session instance descriptor. That is, the receiver may identify a PLP for transmitting at least one of service layer signaling or a transfer session instance descriptor using PLP identifier information or a data pipe included in the rapid service acquisition information and acquire service layer signaling information or a transfer session instance descriptor included in the PLP. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

Figure 99:
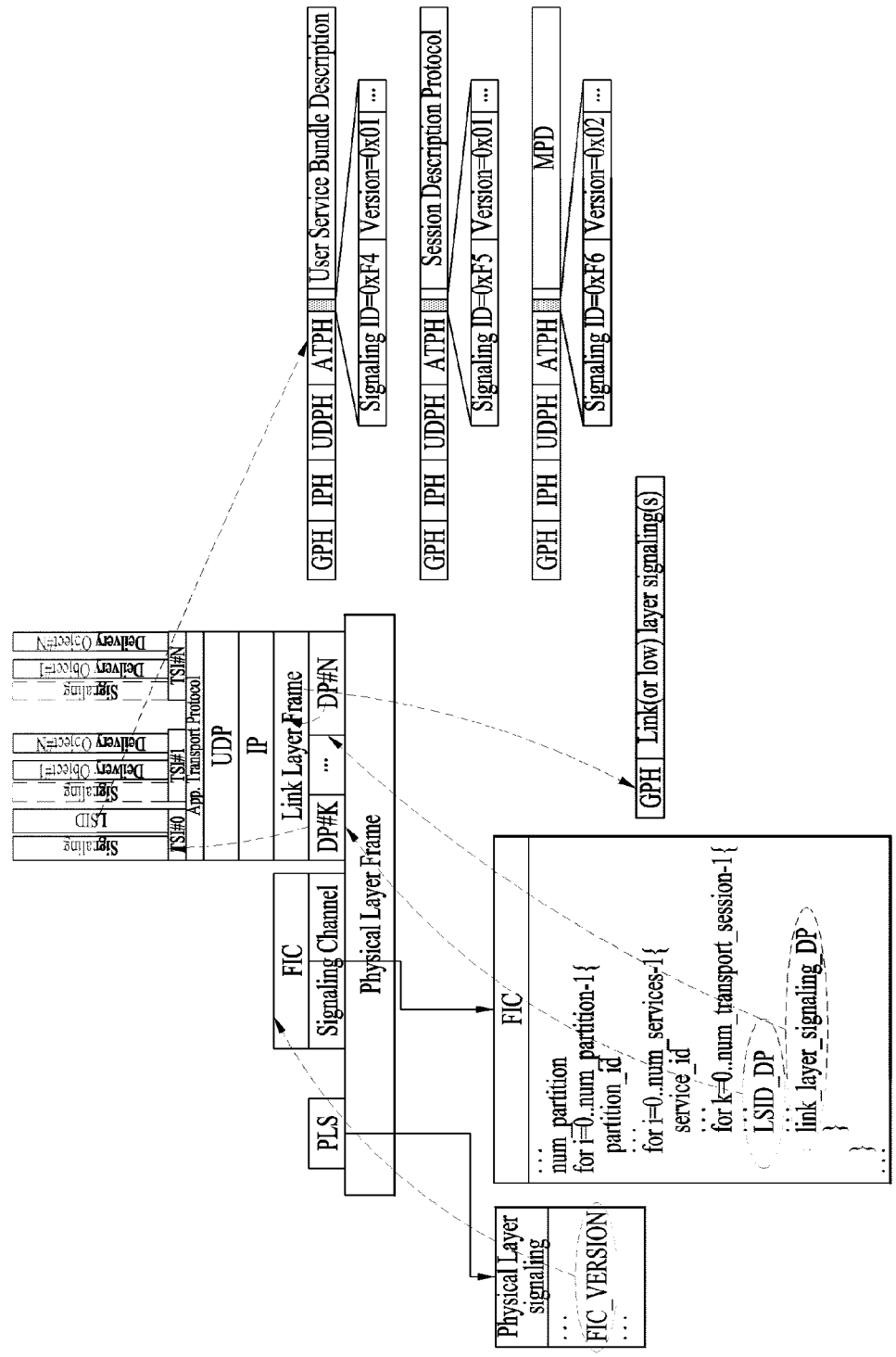
FIG. 99 is a diagram illustrating a method of transmitting service layer signaling and link layer signaling in a next-generation broadcast system according to an embodiment of the present invention.

As illustrated in the drawing, service layer signaling may have the aforementioned encapsulation form. That is, a format of the service layer signaling may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include User Service Bundle Description (USBD), MPD, and Session Description Protocol according to a type of a message transmitted through the service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. For example, service layer signaling including User Service Bundle Description may have a value of 0xF4 as signaling id. In addition, the version information may have a value of 0x01 and version information may be changed when the content of User Service Bundle Description as a signaling message of corresponding service layer signaling is changed. In addition, service layer signaling including Session Description Protocol may have a value of 0xF5 as signaling id. The version information may have a value of 0x01 and may be changed when the content of Session Description Protocol as a signaling message of corresponding service layer signaling is changed. In addition, service layer signaling including MPD may have a value of 0xF6 as signaling id. The version information may have a value of 0x02 and may be changed when the content of MPD as a signaling message of corresponding service layer signaling is changed. As such, the receiver may filter desired service layer signaling using signaling id and version information as filtering information included in an application transport protocol header of service layer signaling. For example, in order to receive User Service Bundle Description, service layer signaling with signaling id of 0xF4 may be received. In this case, corresponding service layer signaling may be parsed only when version information is checked and is updated compared with pre-received User Service Bundle Description. As such, the receiver may reduce a number of times of unnecessary parsing operation on service layer signaling and reduce processing overhead. As described above, the next-generation broadcast system may add signaling ID and version information to a header of a transfer protocol of service layer signaling and support filtering of information desired by a receiving end, FIG. 99 is a diagram illustrating a method of transmitting service layer signaling and link layer signaling in a next-generation broadcast system according to an embodiment of the present invention. Service layer signaling used in the next-generation broadcast system according to the present invention may be encapsulated. For example, the encapsulated service layer signaling may include Generic packet header (GPH), IP packet Header (IPH), UDP datagram header (UDPH), application transport protocol (e.g., ROUTE or MMTP) header (ATPH), and a signaling message combination. Alternatively, the encapsulated service layer signaling may include Generic packet header (GPH), IP packet Header (IPH), UDP datagram header (UDPH), application transport protocol (e.g., ROUTE or MMTP) header (ATPH), signaling message header (SMH), and a signaling message combination. In addition, the ATPH may include a filtering index of service layer signaling. Here, the filtering index may include signaling id, version, and so on. The signaling id may include identifier information on service layer signaling and the version may indicate a version of information included in the service layer signaling.

When the next-generation broadcast system uses 3GPP eMBMS signaling, the 3GPP eMBMS signaling may be transmitted as illustrated in the drawing. A broadcast signal of the next-generation broadcast system may be transmitted through a physical layer frame. The broadcast signal frame may include physical layer signaling. Information on the physical layer signaling may include a field of rapid service acquisition information. The corresponding field may include version information on the rapid service acquisition information and, in other words, may indicate whether a physical layer frame includes the rapid service acquisition information or parses the rapid service acquisition information. The receiver may acquire the rapid service acquisition information using the corresponding field of the physical layer signaling. A broadcast signal of the next-generation broadcast system may include rapid service acquisition information in a physical layer frame. The rapid service acquisition information may include a service identifier and include information on a PLP or a data pipe for transmitting at least one of service layer signaling or a transfer session instance descriptor. That is, the receiver may identify a PLP for transmitting at least one of service layer signaling or a transfer session instance descriptor using PLP identifier information or a data pipe included in the rapid service acquisition information and acquire service layer signaling information or a transfer session instance descriptor included in the PLP. As illustrated in the drawing, the service layer signaling information or the transfer session instance descriptor may be transmitted by a $0^{th}$ transfer session in a corresponding PLP. That is, service layer signaling may be transmitted by a transfer session corresponding to tsi=0 in a PLP indicated by a PLP identifier included in service acquisition information. In other words, an identifier of the transfer session for transmitting service layer signaling may be fixed to 0.

As illustrated in the drawing, service layer signaling may have the aforementioned encapsulation form, That is, a format of the service layer signaling may include Generic packet header (GPH), IP packet Header (IPH), UDP datagram header (UDPH), application transport protocol (e.g., ROUTE or MMTP) header (ATPH), signaling message header (SMH), and signaling message. Here, the signaling message may include User Service Bundle Description (USBD), MPD, and Session Description Protocol according to a type of a message transmitted through service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. For example, service layer signaling including User Service Bundle Description may have a value of 0xF4 as signaling id. In addition, the version information may have a value of 0x01 and version information may be changed when the content of User Service Bundle Description as a signaling message of corresponding service layer signaling is changed. In addition, service layer signaling including Session Description Protocol may have a value of 0xF5 as signaling id. The version information may have a value of 0x01 and may be changed when the content of Session Description Protocol as a signaling message of corresponding service layer signaling is changed. In addition, service layer signaling including MPD may have a value of 0xF6 as signaling id, The version information may have a value of 0x02 and may be changed when the content of MPD as a signaling message of corresponding service layer signaling is changed. As such, the receiver may filter desired service layer signaling using signaling id and version information as filtering information included in an application transport protocol header of service layer signaling. For example, in order to receive User Service Bundle Description, service layer signaling with signaling id of 0xF4 may be received. In this case, corresponding service layer signaling may be parsed only when version information is checked and is updated compared with pre-received User Service Bundle Description. As such, the receiver may reduce a number of times of unnecessary parsing operation on service layer signaling and reduce processing overhead. As described above, the next-generation broadcast system may add signaling ID and version information to a header of a transfer protocol of service layer signaling and support filtering of information desired by a receiving end.

The rapid service acquisition information may include information on a PLP or a data pipe for transmitting link layer signaling. That is, the receiver may identify a PLP for transmitting link layer signaling using PLP identifier information or a data pipe included in the rapid service acquisition information and acquire link layer signaling included in the PLP. As illustrated in the drawing, the format of the transmitted link layer signaling may include Generic packet header (GPH) and signaling message. Here, the signaling message may include information on link layer signaling. The receiver may acquire Link Layer signaling (or low layer signaling) through a data pipe or the like and acquire service/component signaling such as a component mapping table through an application transport protocol. That is, the next-generation broadcast system may include signaling information on a PLP or a data pipe including link layer signaling in a physical layer frame.

Figure 100:
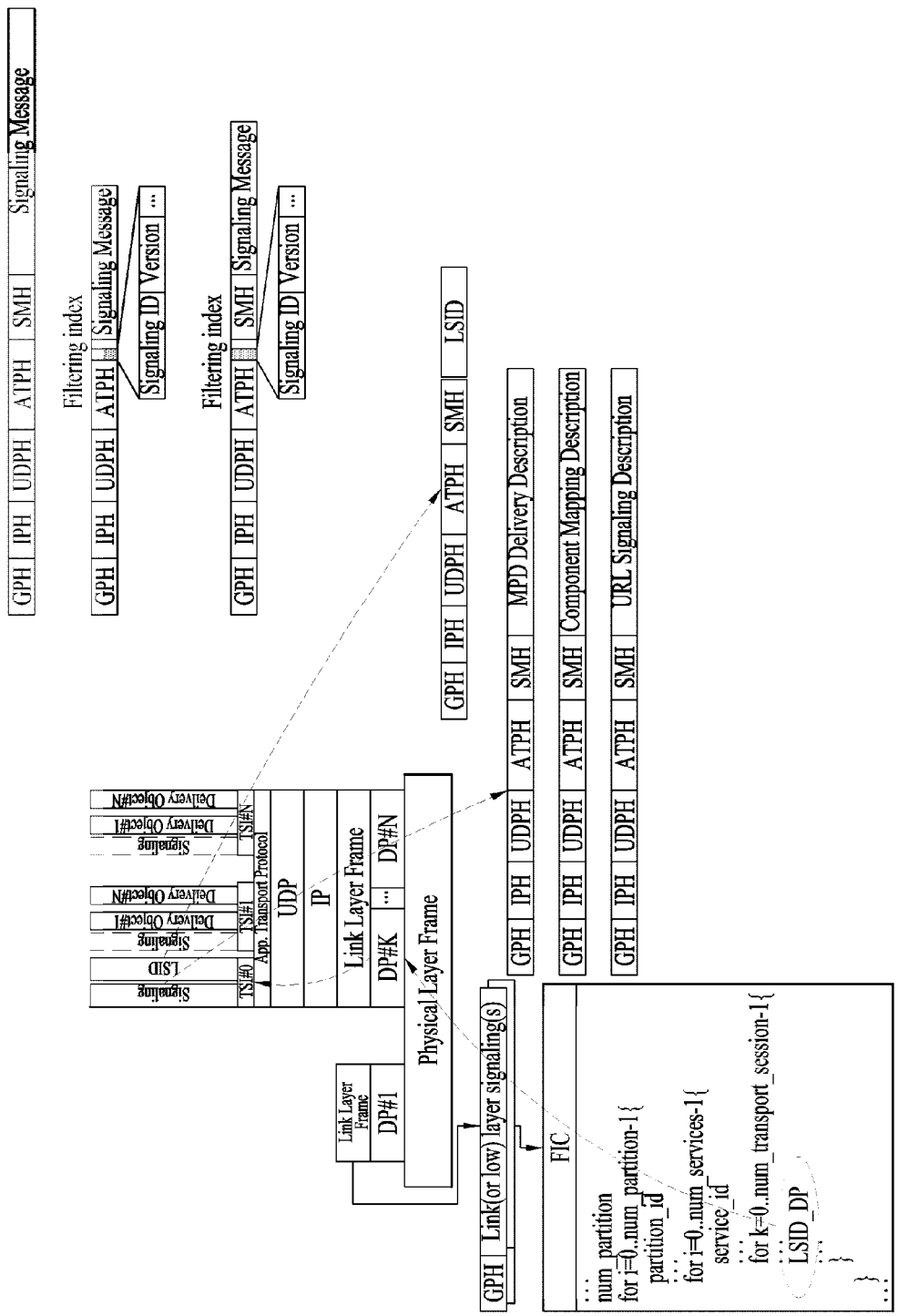
FIG. 100 illustrates a method of transmitting service layer signaling of a next-generation broadcast system according to an embodiment of the present invention.

FIG. 100 illustrates a method of transmitting service layer signaling of a next-generation broadcast system according to an embodiment of the present invention. The service layer signaling may include the aforementioned signaling or 3GPP eMBMS signaling. When there is no Fast Information Channel in a broadcast signal of the next-generation broadcast system, signaling data for supporting rapid service scan and acquisition may be transmitted a common data pipe, a data pipe, or a PLP in a physical frame, as illustrated in the drawing. In this case, signaling data related to rapid service scan and acquisition, and so on may be encapsulated in the form of link (or low) layer signaling and may be transmitted along with other link (or low) layer signaling and so on. That is, a PLP in the frame may transmit signaling data including service acquisition information. In addition, the signaling data may be transmitted through the same data pipe or PLP as service/component signaling or component data, a separate data pipe, or PLP. The service/component signaling may transmit the above proposed signaling, 3GPP eMBMS signaling, or the like. As described above, corresponding signaling may include Generic packet header (GPH), IP packet Header (IPH), UDP datagram header (UDPH), application transport protocol (e.g., ROUTE or MMTP) header (ATPH), signaling message header (SMH), and signaling message. Here, the SMH may not be included in signaling a format in some embodiments. Here, the ATPH may include a filtering index of service layer signaling. Here, the filtering index may include signaling id, version, or the like. The signaling id may include identifier information on service layer signaling and the version may indicate a version of information included in the service layer signaling.

The lower part of the drawing illustrates a method of acquiring service layer signaling using service acquisition information included in link layer signaling. The PLP of the broadcast signal frame may include link layer signaling. The link layer signaling may include the aforementioned rapid service scan and acquisition information. The rapid service scan and acquisition information may include PLP identifier information including service layer signaling of a service identifier and a corresponding service. The PLP indicated by the corresponding PLP identifier may include service layer signaling. As described above, the service layer signaling may include Generic packet header (GPH), IP packet Header (IPH), UDP datagram header (UDPH), application transport protocol (e.g., ROUTE or MMTP) header (ATPH), signaling message header (SMH), and signaling message. The signaling message of service layer signaling may include transfer session instance description, MPD delivery description, component mapping description, or URL signaling description. A next-generation broadcast signal receiver may parse service layer signaling to acquire a desired service.

Figure 101:
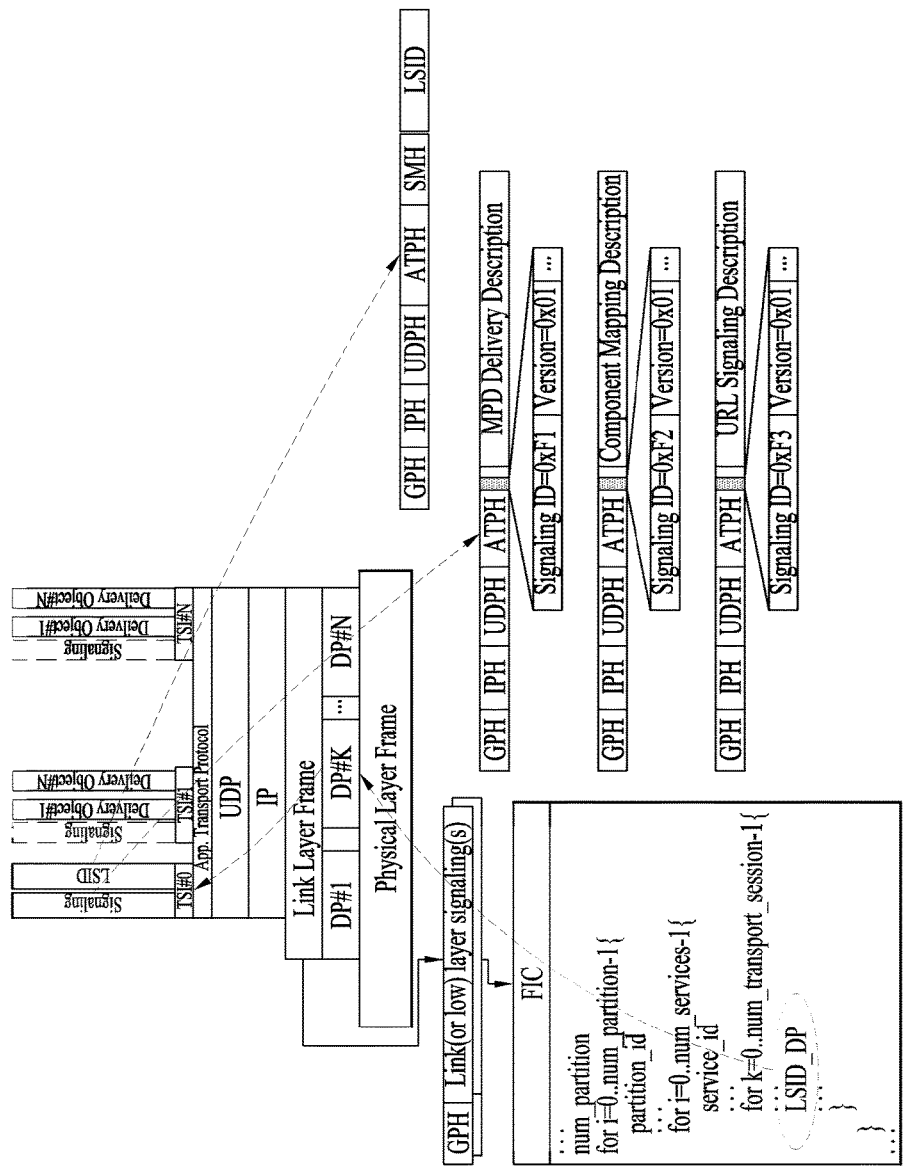
FIG. 101 is a diagram illustrating a method of transmitting service layer signaling in a next-generation broadcast system according to an embodiment of the present invention.

FIG. 101 is a diagram illustrating a method of transmitting service layer signaling in a next-generation broadcast system according to an embodiment of the present invention. The service layer signaling may include the aforementioned signaling or 3GPP eMBMS signaling. The PLP of the broadcast signal frame may include link layer signaling. The link layer signaling may include the aforementioned rapid service scan and acquisition information. The rapid service scan and acquisition information may include PLP identifier information including service layer signaling of a service identifier and a corresponding service. The PLP indicated by the corresponding PLP identifier may include service layer signaling. As described above, the service layer signaling may include Generic packet header (GPH), IP packet Header (IPH), UDP datagram header (UDPH), application transport protocol (e.g., ROUTE or MMTP) header (ATPH), and signaling message. The signaling message of the service layer signaling may include transfer session instance description, MPD delivery description, component mapping description, or URL signaling description. A next-generation broadcast signal receiver may parse service layer signaling to acquire a desired service. Here, the ATPH may include a filtering index of service layer signaling. Here, the filtering index may include signaling id, version, and so on. The signaling id may include identifier information on service layer signaling and the version may indicate a version of information included in the service layer signaling. A method of filtering service layer signaling using a filtering index is the same as the aforementioned method.

Figure 102:
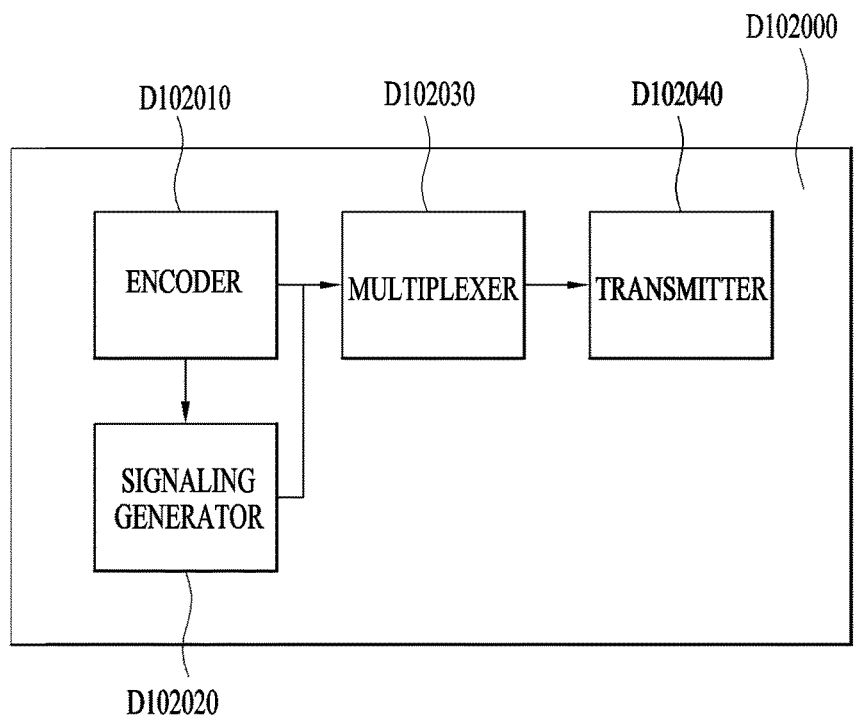
FIG. 102 is a diagram illustrating a next-generation broadcast transmitting apparatus according to an embodiment of the present invention.

FIG. 102 is a diagram illustrating a next-generation broadcast transmission apparatus according to an embodiment of the present invention. The next-generation broadcast transmission apparatus according to the present invention may transmit media stream and signaling information in a broadcast signal. The next-generation broadcast transmission apparatus may transmit signaling information on the aforementioned media stream or component in the signaling information. The signaling information may include information for the aforementioned rapid service scan and acquisition, service signaling information, information on a transfer session, information for mapping a service and a component, information on MPD, User Service Bundle Description (USBD), MPD, Session Description Protocol, and so on. According to the present invention, the service layer signaling may have the aforementioned encapsulation form. That is, a format of the service layer signaling may include at least one of Generic packet header (GPH), IP packet Header (IPH), UDP datagram header (UDPH), application transport protocol (e.g., ROUTE or MMTP) header (ATP-H), signaling message header (SMH), or signaling message. Here, the signaling message may include one of service signaling information, information on a transfer session, information for mapping a service and a component, information on MPD, User Service Bundle Description (USBD), MPD, or Session Description Protocol according to a type of a message transmitted through service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling.

A next-generation broadcast transmission apparatus D102000 may include an encoder D102010, a signaling generator D102020, a multiplexer D102030, and/or a transmitter D102040. The encoder D102010 may encode media data in a media stream. The signaling generator D102020 may generate signaling information for signaling a media stream or a component. As described above, the signaling information may include at least one of information on the aforementioned rapid service scan and acquisition, service signaling information, information on a transfer session, information for mapping a service and a component, information on MPD, User Service Bundle Description (USBD), MPD, or Session Description Protocol. The multiplexer D102030 may multiplex a media stream and signaling information to generate a broadcast signal. Here, the broadcast signal may include MPEG2-TS, IP, or GS stream inputs that are input to an input format block of a broadcast signal transmission apparatus of the aforementioned next-generation broadcast service. The transmitter D102040 may transmit the generated broadcast signal.

Figure 103:
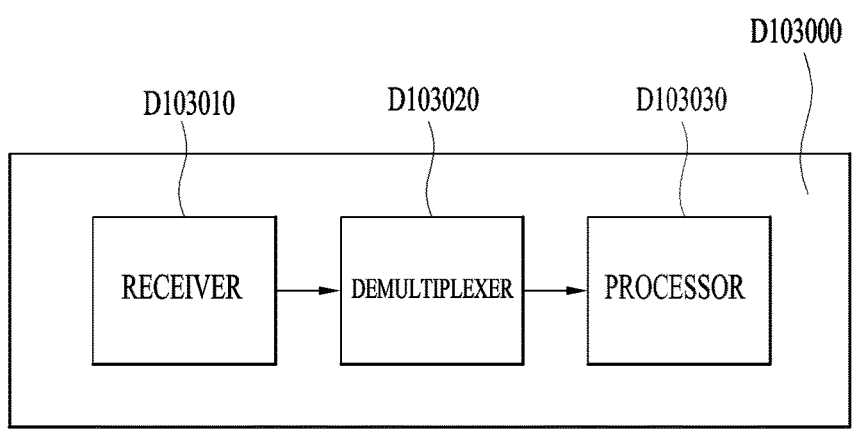
FIG. 103 is a diagram illustrating a next-generation broadcast receiving apparatus according to an embodiment of the present invention.

FIG. 103 is a diagram illustrating a next-generation broadcast receiving apparatus according to an embodiment of the present invention. The next-generation broadcast receiving apparatus may receive a broadcast signal including media stream and signaling information. The next-generation broadcast receiving apparatus may parse signaling information included in the broadcast signal. The signaling information may include information for the aforementioned rapid service scan and acquisition, service signaling information, information on a transfer session, information for mapping a service and a component, information on MPD, User Service Bundle Description (USBD), MPD, and/or Session Description Protocol. A next-generation broadcast receiving apparatus D103000 may include a receiver D103010, a demultiplexer D103020, and/or a processor D103030.

The receiver D103010 may receive a terrestrial broadcast signal and/or a broadband broadcast signal. Here, the broadcast signal may include signaling information for signaling the multiplexed media stream and signaling information for signaling a media stream. An operation of the receiver D103010 may be performed by the aforementioned tuner in the same way. The demultiplexer D103020 may demultipiex the received broadcast signal to acquire a media stream and signaling information. The signaling information may be parsed by the aforementioned parser and the next-generation broadcast receiving apparatus may acquire signaling information on a broadcast service and a component. The processor D103030 may acquire information on a mapping relation between a service and a component, information on a transfer session, information on MPD, User Service Bundle Description (USBD), MPD, and/or Session Description Protocol using the signaling information. In the present invention, the service layer signaling may have the aforementioned encapsulation form. That is, a format of the service layer signaling may include at least one of Generic packet header (GPH), IP packet Header (IPH), UDP datagram header (UDPH), application transport protocol (e.g., ROUTE or MMTP) header (ATPH), signaling message header (SMH), or signaling message. Here, the signaling message may include one of service signaling information, information on a transfer session, information for mapping a service and a component, information on MPD, User Service Bundle Description (USBD), MPD, or Session Description Protocol according to a type of a message transmitted through service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. The next-generation broadcast receiving apparatus may filter the received service layer signaling to selectively parse desired service layer signaling and filtering may be performed based on at least one of the signaling id and the version that are the aforementioned index.

Figure 104:
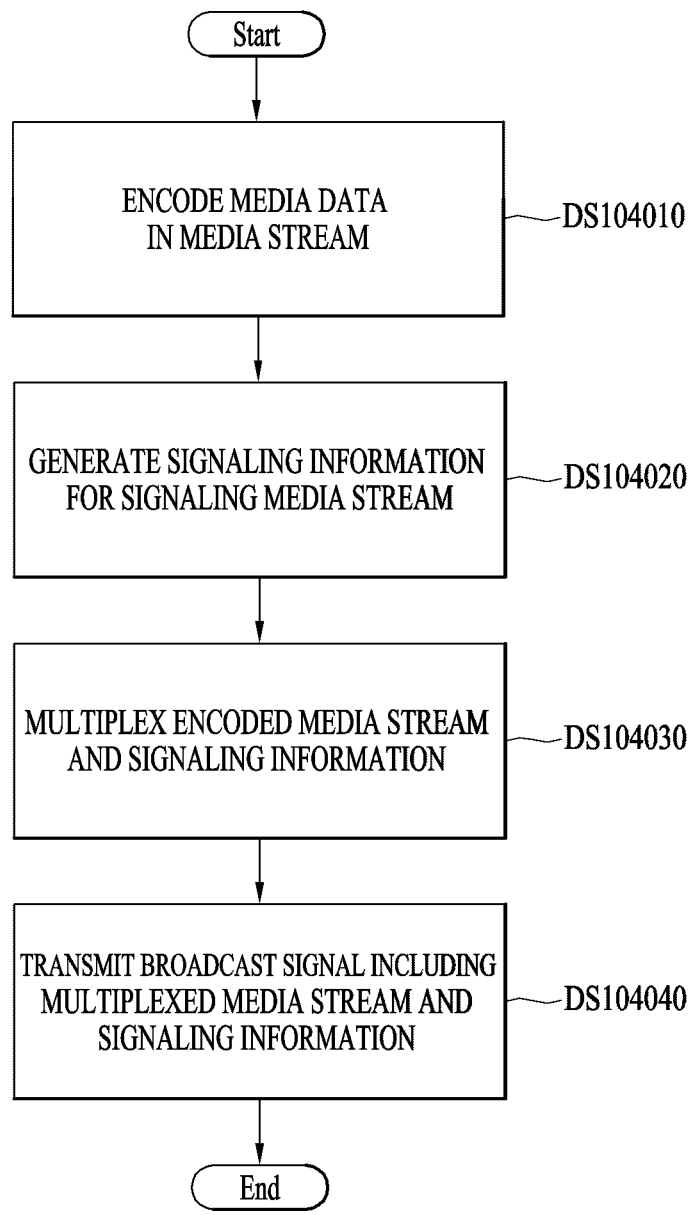
FIG. 104 is a diagram illustrating a next-generation broadcast transmission method according to an embodiment of the present invention.

FIG. 104 is a diagram illustrating a next-generation broadcast transmission method according to an embodiment of the present invention. In the next-generation broadcast transmission method according to the present invention, a media stream and signaling information may be transmitted in a broadcast signal. In the next-generation broadcast transmission method, signaling information on the aforementioned media stream or component may be transmitted in the signaling information. The signaling information may include one of information for the aforementioned rapid service scan and acquisition, service signaling information, information on a transfer session, information for mapping a service and a component, information on MPD, User Service Bundle Description (USBD), MPD, or Session Description Protocol.

The next-generation broadcast transmission method may be performed as follows. In the next-generation broadcast transmission method, media data may be encoded in a media stream (DS104010). In the next-generation broadcast transmission method, signaling information for signaling a media stream may be generated (DS104020). As described above, the signaling information may include one of information for the aforementioned rapid service scan and acquisition, service signaling information, information on a transfer session, information for mapping a service and a component, information on MPD, User Service Bundle Description (USBD), MPD, or Session Description Protocol. In the present invention, the service layer signaling may have the aforementioned encapsulation form. That is, a format of the service layer signaling may include at least one of Generic packet header (GPH), IP packet Header (IPH), UDP datagram header (UDPH), application transport protocol (e.g., ROUTE or MMTP) header (ATPH), signaling message header (SMH), or signaling message. Here, the signaling message may include one of service signaling information, information on a transfer session, information for mapping a service and a component, information on MPD, User Service Bundle Description (USBD), MPD, or Session Description Protocol according to a type of a message transmitted through service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. The next-generation broadcast signal may be filtered by a receiving end based on at least one of signaling id and version that are the aforementioned filtering index. In the next-generation broadcast transmission method, a media stream and signaling information may be multiplexed to generate a broadcast signal (DS104030). Here, the broadcast signal may include MPEG2-TS, IP, or OS stream inputs that are input to an input format block of a broadcast signal transmission apparatus of the aforementioned next-generation broadcast service. In the next-generation broadcast transmission method, a broadcast signal including a media stream and signaling information may be transmitted (DS104040).

Figure 105:
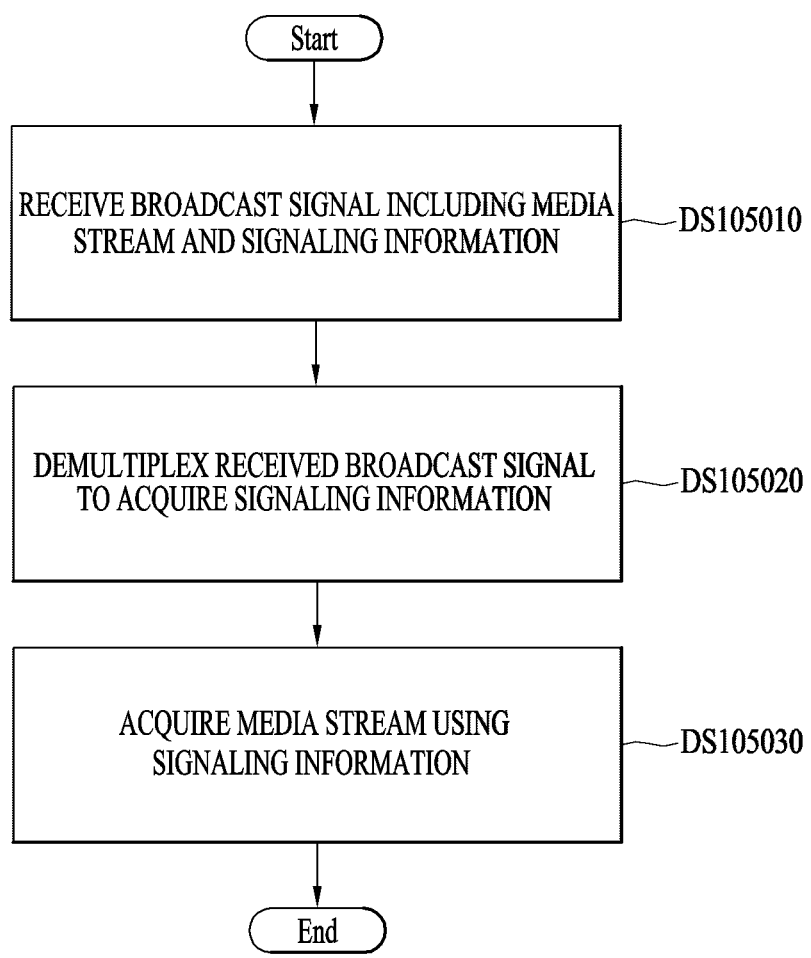
FIG. 105 is a diagram illustrating a next-generation broadcast reception method according to an embodiment of the present invention.

FIG. 105 is a diagram illustrating a next-generation broadcast reception method according to an embodiment of the present invention. In the next-generation broadcast reception method, a broadcast signal including a media stream and signaling information may be received. In the next-generation broadcast reception method, signaling information may be parsed and may include at least one of information for the aforementioned rapid service scan and acquisition, service signaling information, information on a transfer session, information for mapping a service and a component, information on MPD, User Service Bundle Description (USBD), MPD, or Session Description Protocol The next-generation broadcast reception method may be performed as follows. In the next-generation broadcast reception method, a broadcast signal may be received (DS105010). Here, the broadcast signal may include signaling information for signaling the multiplexed media stream and media stream. In the next-generation broadcast reception method, the broadcast signal may be demultiplexed to acquire signaling information (DS105020). The signaling information may be parsed by the aforementioned signaling parser and the next-generation broadcast reception method may acquire signaling information on a media stream. In the next-generation broadcast reception method, the media stream may be acquired using signaling information (DS105030). In the present invention, the service layer signaling may have the aforementioned encapsulation form. That is, a format of the service layer signaling may include at least one of Generic packet header (GPH), IP packet Header (IPH), UDP datagram header (UDPH), application transport protocol (e.g., ROUTE or MMTP) header (ATPH), signaling message header (SMH), or signaling message. Here, the signaling message may include one of service signaling information, information on a transfer session, information for mapping a service and a component, information on MPD, User Service Bundle Description (USBD), MPD, or Session Description Protocol according to a type of a message transmitted through service layer signaling. As described above, the ATPH may include a filtering index of service layer signaling. Here, the filtering index may include signaling id, version, and so on. The signaling id may include identifier information on service layer signaling and the version may indicate a version of information included in the service layer signaling. In the next-generation broadcast reception method, the received service layer signaling may be filtered to selectively parse desired service layer signaling and filtering may be performed based on at least one of signaling id and version that are aforementioned filtering index.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or processor. In addition, the above-mentioned methods of the present invention may be realized by codes written in recoding media configured to be read by a processor so that the codes may be read by the processor supplied from the apparatus.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description may be configured in a manner of being selectively combined with one another entirely or in part to enable various modifications.

In addition, a method according to the present invention may be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes may be saved and executed according to a distributive system.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both the product invention and the process invention are described in the specification and the description of both inventions may be supplementarily applied as needed.

It will be appreciated by those skilled in the art that various modifications and variations may be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Mode For Invention

Various embodiments have been described in the best mode for carrying out the invention.

INDUSTRIAL APPLICABILITY

The embodiments of the present invention are available in a series of broadcast signal provision fields.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting a broadcast signal, the method comprising:
    encoding service data for at least one broadcast service;
    encoding service layer signaling including a Media Presentation Description and a Transport Session Description for the at least one broadcast service;
    encoding link layer signaling including an identifier of a physical layer pipe (PLP) which carries the service layer signaling, wherein the link layer signaling is included in a first PLP; and
    transmitting the broadcast signal including the encoded service data, the encoded service layer signaling and the encoded link layer signaling,
    wherein the broadcast signal further includes information for rapid service scan and acquisition, and
    wherein the information for rapid service scan and acquisition is included in the first PLP.

2. The method according to claim 1, wherein the link layer signaling further includes a source internet protocol (IP) address, a destination IP address, a source user data gram protocol (UDP) port and a destination UDP port.

3. An apparatus for transmitting a broadcast signal, the apparatus comprising:
    a first encoder to encode service data for at least one broadcast service;
    a second encoder to encode service layer signaling and link layer signaling,
    wherein the service layer signaling includes a Media Presentation Description and a Transport Session Description for the at least one broadcast service,
    wherein the link layer signaling includes an identifier of a physical layer pipe (PLP) which carries the service layer signaling, and
    wherein the link layer signaling is included in a first PLP; and
    a transmitter to transmit the broadcast signal including the encoded service data, the encoded service layer signaling and the encoded link layer signaling,
    wherein the broadcast signal further includes information for rapid service scan and acquisition, and
    wherein the information for rapid service scan and acquisition is included in the first PLP.

4. The apparatus according to claim 3, wherein the link layer signaling further includes a source Internet protocol (IP) address, a destination IP address, a source user datagram protocol (UDP) port and a destination UDP port.

5. A method for receiving a broadcast signal, the method comprising:
- receiving the broadcast signal including service data, service layer signaling and link layer signaling for at least one broadcast service;
- decoding the link layer signaling including an identifier of a physical layer pipe (PLP) which carries the service layer signaling, wherein the link layer signaling is included in a first PLP;
- decoding the service layer signaling including a Media Presentation Description and a Transport Session Description for the at least one broadcast service from the PLP identified by the link layer signaling; and
- decoding the service data by using the service layer signaling,
- wherein the broadcast signal further includes information for rapid service scan and acquisition, and
- wherein the information for rapid service scan and acquisition is included in the first PLP.

6. An apparatus for receiving a broadcast signal, the apparatus comprising:
- a receiver to receive the broadcast signal including service data, service layer signaling and link layer signaling for at least one broadcast service;
- a first decoder to decode the link layer signaling including an identifier of a physical layer pipe (PLP) which carries the service layer signaling,
- wherein the first decoder further decodes the service layer signaling from the PLP identified by the link layer signaling,
- wherein the service layer signaling includes a Media Presentation Description and a Transport Session Description for the at least one broadcast service, and
- wherein the link layer signaling is included in a first PLP; and
- a second decoder to decode the service data by using the service layer signaling,
- wherein the broadcast signal further includes information for rapid service scan and acquisition, and
- wherein the information for rapid service scan and acquisition is included in the first PLP.

* * * * *